US011084936B2

(12) United States Patent
Enomura et al.

(10) Patent No.: US 11,084,936 B2
(45) Date of Patent: *Aug. 10, 2021

(54) METHOD FOR PRODUCING OXIDE PARTICLES WITH CONTROLLED COLOR CHARACTERISTICS, OXIDE PARTICLES, AND COATING OR FILM-LIKE COMPOSITION COMPRISING THE SAME

(71) Applicant: M. TECHNIQUE CO., LTD., Izumi (JP)

(72) Inventors: Masakazu Enomura, Izumi (JP); Daisuke Honda, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 59 days.

This patent is subject to a terminal disclaimer.

(21) Appl. No.: 16/511,725

(22) Filed: Jul. 15, 2019

(65) Prior Publication Data

US 2019/0338137 A1 Nov. 7, 2019

Related U.S. Application Data

(62) Division of application No. 15/540,958, filed as application No. PCT/JP2017/003876 on Feb. 2, 2017, now Pat. No. 10,400,107.

(30) Foreign Application Priority Data

Feb. 2, 2016 (JP) .............................. JP2016-018434
Feb. 2, 2016 (JP) .............................. JP2016-018435

(Continued)

(51) Int. Cl.
*C01G 49/02* (2006.01)
*C01G 9/02* (2006.01)
(Continued)

(52) U.S. Cl.
CPC ................ *C09C 1/24* (2013.01); *C01B 13/36* (2013.01); *C01F 17/235* (2020.01); *C01G 9/02* (2013.01);
(Continued)

(58) Field of Classification Search
CPC ........................................................ A61K 8/25
See application file for complete search history.

(56) References Cited

U.S. PATENT DOCUMENTS 4,487,869 A 12/1984 Panush
4,729,785 A 3/1988 Schwab et al.
(Continued)

FOREIGN PATENT DOCUMENTS

JP 59-31004 A 2/1984
JP 59-75960 A 4/1984
(Continued)

OTHER PUBLICATIONS

Japanese Office Action dated Aug. 15, 2017, for corresponding Japanese Application No. 2017-533983, with English translation.
(Continued)

Primary Examiner — Alexandre F Ferre
(74) Attorney, Agent, or Firm — Birch, Stewart, Kolasch & Birch, LLP.

(57) ABSTRACT

A method for producing oxide particles with controlled color characteristics and to provide oxide particles with controlled color characteristics includes controlling color characteristics of the oxide particles by controlling the ratio of M-OH bonds, the binding of one or more different elements (M) other than oxygen or hydrogen with hydroxyl group (OH), in oxide particles selected from metal oxide particles and metalloid oxide particles. Oxide particles having controlled color characteristics of any one of reflectance, transmittance, molar absorption coefficient, hue, or color saturation can be (Continued)

provided by controlling the percentage of the M-OH bonds contained in metal oxide particles or metalloid oxide particles.

24 Claims, 42 Drawing Sheets

(30) Foreign Application Priority Data

| | | |
|---|---|---|
| Jun. 2, 2016 | (JP) | JP2016-111346 |
| Jun. 3, 2016 | (WO) | PCT/JP2016/066542 |
| Jun. 22, 2016 | (JP) | JP2016-123800 |
| Oct. 5, 2016 | (WO) | PCT/JP2016/079700 |
| Oct. 5, 2016 | (WO) | PCT/JP2016/079709 |
| Oct. 5, 2016 | (WO) | PCT/JP2016/079710 |
| Nov. 7, 2016 | (WO) | PCT/JP2016/083001 |
| Nov. 29, 2016 | (WO) | PCT/JP2016/085460 |

(51) Int. Cl.

| | |
|---|---|
| C01F 17/00 | (2020.01) |
| C09C 3/06 | (2006.01) |
| C09C 1/24 | (2006.01) |
| C01B 13/36 | (2006.01) |
| C01G 51/00 | (2006.01) |
| C01F 17/235 | (2020.01) |
| C09C 1/04 | (2006.01) |

(52) U.S. Cl.
CPC .......... *C01G 49/02* (2013.01); *C01G 51/40* (2013.01); *C09C 1/043* (2013.01); *C09C 3/063* (2013.01); *C01P 2002/72* (2013.01); *C01P 2002/82* (2013.01); *C01P 2002/85* (2013.01); *C01P 2004/50* (2013.01); *C01P 2004/64* (2013.01); *C01P 2004/84* (2013.01); *C01P 2006/60* (2013.01); *C01P 2006/62* (2013.01); *C01P 2006/66* (2013.01)

(56) References Cited

U.S. PATENT DOCUMENTS

| | | | |
|---|---|---|---|
| 5,340,393 | A | 8/1994 | Jacobson |
| 5,827,507 | A | 10/1998 | Oshima et al. |
| 5,914,101 | A | 6/1999 | Tapley et al. |
| 6,235,270 | B1 * | 5/2001 | Ishii .......... A61K 8/11 |
| | | | 106/403 |
| 6,534,044 | B1 | 3/2003 | Wada et al. |
| 2002/0117084 | A1 | 8/2002 | Hayashi et al. |
| 2002/0168523 | A1 | 11/2002 | Uchida et al. |
| 2008/0134941 | A1 | 6/2008 | Sanada |
| 2010/0008872 | A1 | 1/2010 | Katusic et al. |
| 2010/0021712 | A1 | 1/2010 | Katayama |
| 2010/0040567 | A1 | 2/2010 | Katusic et al. |
| 2010/0047590 | A1 | 2/2010 | Ueda et al. |
| 2010/0074837 | A1 | 3/2010 | Shio et al. |
| 2010/0155310 | A1 | 6/2010 | Enomura |
| 2010/0242793 | A1 | 9/2010 | Greb et al. |
| 2011/0015054 | A1 | 1/2011 | Enomura |
| 2011/0036268 | A1 | 2/2011 | Inoguchi |
| 2011/0101263 | A1 | 5/2011 | Tokumitsu et al. |
| 2013/0343979 | A1 | 12/2013 | Kuraki et al. |
| 2014/0027667 | A1 | 1/2014 | Rowe |
| 2014/0037519 | A1 | 2/2014 | Kuraki et al. |
| 2014/0308158 | A1 | 10/2014 | Maekawa et al. |
| 2015/0030760 | A1 | 1/2015 | Enomura |
| 2015/0202655 | A1 | 7/2015 | Nakano et al. |
| 2015/0217332 | A1 | 8/2015 | Fujii et al. |
| 2017/0130358 | A1 | 5/2017 | Enomura |
| 2017/0213624 | A1 | 7/2017 | Ohkoshi et al. |

FOREIGN PATENT DOCUMENTS

| | | | |
|---|---|---|---|
| JP | 60-106866 | A | 6/1985 |
| JP | 60-135506 | A | 7/1985 |
| JP | 61-256705 | A | 11/1986 |
| JP | 63-54979 | A | 3/1988 |
| JP | 6-192593 | A | 7/1994 |
| JP | 7-506081 | A | 7/1995 |
| JP | 8-12961 | A | 1/1996 |
| JP | 8-253317 | A | 10/1996 |
| JP | 10-120419 | A | 5/1998 |
| JP | 10-130021 | A | 5/1998 |
| JP | 2000-2274 | A | 1/2000 |
| JP | 2001-270225 | A | 10/2001 |
| JP | 2002-188021 | A | 7/2002 |
| JP | 2002-308629 | A | 10/2002 |
| JP | 2003-277644 | A | 10/2003 |
| JP | 2006-249411 | A | 9/2006 |
| JP | 2007-131460 | A | 5/2007 |
| JP | 2007-161539 | A | 6/2007 |
| JP | 2008-63200 | A | 3/2008 |
| JP | 2008-239460 | A | 10/2008 |
| JP | 2008-260648 | A | 10/2008 |
| JP | 2009-67613 | A | 4/2009 |
| JP | 2009-82902 | A | 4/2009 |
| JP | 2009-263547 | A | 11/2009 |
| JP | 2009-545509 | A | 12/2009 |
| JP | 2010-508229 | A | 3/2010 |
| JP | 2010-168468 | A | 8/2010 |
| JP | 2010-530448 | A | 9/2010 |
| JP | 2011-94212 | A | 5/2011 |
| JP | 4868558 | B1 | 2/2012 |
| JP | 2013-249393 | A | 12/2013 |
| JP | 2014-29024 | A | 2/2014 |
| JP | 2014-42891 | A | 3/2014 |
| JP | 2014-42892 | A | 3/2014 |
| WO | WO 98/26011 | A1 | 6/1998 |
| WO | WO 98/47476 | A1 | 10/1998 |
| WO | WO 00/42112 | A1 | 7/2000 |
| WO | WO 2008/044469 | A1 | 4/2008 |
| WO | WO 2008/062871 | A1 | 5/2008 |
| WO | WO 2008/129901 | A1 | 10/2008 |
| WO | WO 2009/008392 | A1 | 1/2009 |
| WO | WO 2009/008393 | A1 | 1/2009 |
| WO | WO 2009/107674 | A1 | 9/2009 |
| WO | WO 2012/127669 | A1 | 9/2012 |
| WO | WO 2012/147209 | A1 | 11/2012 |
| WO | WO 2013/073695 | A1 | 5/2013 |
| WO | WO 2013/128592 | A1 | 9/2013 |
| WO | WO 2016/009926 | A1 | 1/2016 |
| WO | WO 2016/010018 | A1 | 1/2016 |
| WO | WO 2016/060223 | A1 | 4/2016 |

OTHER PUBLICATIONS

Japanese Office Action, dated Aug. 8, 2017, for Japanese Application No. 2017-531789, with an English translation.
Japanese Office Action, dated Dec. 27, 2016, for Japanese Application No. 2016-567277, with an English translation.
Japanese Office Action, dated Sep. 12, 2017, for Japanese Application No. 2017-533984, with an English translation.
Japanese Office Action, dated Sep. 12, 2017, for Japanese Application No. 2017-533985, with an English translation.
Japanese Office Action, dated Sep. 5, 2017, for Japanese Application No. 2017-531789, with an English translation.
Written Opinion of the International Searching Authority for PCT/JP2017/003876 (PCT/ISA/237) dated May 9, 2017.

* cited by examiner (A)

(B)

(A)

(B)

(A)

(B)

(a) BF (b) Co (c) Zn (d) O (e) Si

METHOD FOR PRODUCING OXIDE PARTICLES WITH CONTROLLED COLOR CHARACTERISTICS, OXIDE PARTICLES, AND COATING OR FILM-LIKE COMPOSITION COMPRISING THE SAME

CROSS REFERENCE TO RELATED APPLICATIONS

This application is a Divisional of copending application Ser. No. 15/540,958, filed on Jun. 29, 2017, which is a national phase of PCT International Application No. PCT/JP2017/003876 filed on Feb. 2, 2017, which claims the benefit under 35 U.S.C. § 119(a) to Patent Application No. 2016-018434, filed in Japan on Feb. 2, 2016, Patent Application No. 2016-018435, filed in Japan on Feb. 2, 2016, Patent Application No. 2016-111346, filed in Japan on Jun. 2, 2016, Patent Application No. PCT/JP2016/066542, filed in Japan on Jun. 3, 2016, Patent Application No. 2016-123800, filed in Japan on Jun. 22, 2016, Patent Application No. PCT/JP2016/079700, filed in Japan on Oct. 5, 2016, Patent Application No. PCT/JP2016/079709, filed in Japan on Oct. 5, 2016, Patent Application No. PCT/JP2016/079710, filed in Japan on Oct. 5, 2016, Patent Application No. PCT/JP2016/083001, filed in Japan on Nov. 7, 2016, and Patent Application No. PCT/JP2016/085460, filed in Japan on Nov. 29, 2016, all of which are hereby expressly incorporated by reference into the present application.

TECHNICAL FIELD

The present invention relates to a method for producing oxide particles with controlled color characteristics, oxide particles, and a coating or film-like composition comprising the oxide particles.

BACKGROUND ART

Oxide particles have characteristic features, such as UV-absorption properties and near infrared ray reflection properties, which can be changed depending on the selection of a type of metal or metalloid element contained in the oxide particles. Thus, the oxide particles have been used in a wide range of fields, including cosmetics, such as sunscreen agents, lipsticks, and foundations; building materials, such as materials for exterior walls and signboards; or paints used for vehicles and glasses. Furthermore, when the intended use of oxide particles is of being applied to the human body, like cosmetics, the properties of beauty, texture, and safety are extremely demanded. In the case of using oxide particles in materials, such as materials for exterior walls and signboards or paints used for vehicles or the like, the demand for design properties, such as vividness and color aesthetic appearance, is also very high.

For this reason, there have been proposed a method for enhancing the properties of oxide, such as iron oxide and zinc oxide, including color characteristics, UV-absorption properties, and infrared ray reflection properties, by the process of atomizing the oxide (See, for example, Patent Literature 1 and Patent Literature 2) or the process of producing oxide using a plurality of elements other than iron or zinc (see, for example, Patent Literature 3 and Patent Literature 4).

However, although the transparency of fine particle dispersion can be improved by atomization, it is difficult to control their reflectance, transmission/absorption properties, color characteristics including hue and color saturation, and the like. In a complex oxide formation, furthermore, the properties of oxide largely change depending on the kinds of metals to be combined, causing in particular a difficulty of controlling the color characteristics of the oxide. These facts therefore make the properties of oxide particles difficult to be delicately controlled in a precise manner.

Patent Literatures 5 and 6, in which the inventions thereof are disclosed by the present inventors, disclose a method for producing uniform oxide nanoparticles by the process of precipitating various nanoparticles of an iron oxide and the like between two processing surfaces being capable of approaching to and separating from each other and rotating relative to each other. However, these patent literatures do not describe the method for manufacturing oxide with the objective of controlling the color characteristics of the oxide. In other words, Patent Literature 5 describes the separate formation of oxide and hydroxide, while Patent Literature 6 describes the manufacture of uniform oxide.

CITATION LIST

Patent Literature

Patent Literature 1: JP 2009-263547
Patent Literature 2: WO 1998/026011
Patent Literature 3: JP 2010-530448
Patent Literature 4: JP 2013-249393
Patent Literature 5: JP 4868558
Patent Literature 6: WO 2009/008393

SUMMARY OF THE INVENTION

Technical Problem

In light of such circumstances, an object of the present invention is to provide a method for producing oxide particles with controlled color characteristics, and to provide oxide particles with controlled color characteristics. That is, the object is to control the color characteristics by controlling the amount of hydroxyl groups contained in the oxide for the purpose of maximally improving the original properties of the oxide and compensating for such properties. The ratio and morphology of M-OH bonds contained in oxides vary depending on the process of producing the oxides and any environmental change after the production. An object is to control the reflectance of oxide in a near-infrared region of 780 nm to 2500 nm in wavelength. Also, an object is to control the reflectance, transmittance, hue, or color saturation of oxide in a visible region of 380 nm to 780 nm in wavelength. Furthermore, an object of the present invention is to control reflectance or molar absorption coefficient in a visible region of 190 nm to 380 nm. The present inventors have completed the present invention by finding the relevance of the ratio of M-OH bonds contained in oxide particles and the transmission, absorption, reflection properties and hue or color saturation of the oxide particles, such as iron oxide particles, zinc oxide particles, cerium oxide particles, and cobalt-zinc-complex oxide particles, and also found that the color characteristics of oxide particles can be improved by controlling the ratio of M-OH bonds contained in oxide particles. In view of the above circumstances, an object of the present invention is to provide a coating or film-like composition containing oxide particles having controlled color characteristics.

Solution to the Problem

The present inventors have found that the ratio of M-OH bonds contained in metal oxide particles or metalloid oxide particles (hereinafter, collectively referred to as "oxide particles") has relevance to the transmission properties, absorption properties, reflection properties, color characteristics such as hue or color saturation or the like of oxide particles, and as a result, have completed the present invention.

More specifically, the present invention is a method for producing oxide particles, the process featuring that the color characteristics of the oxide particles are controlled by controlling the ratio of M-OH bonds which are the bonding of one or two or more elements (M) other than oxygen or hydrogen with hydroxyl groups (OH), contained in oxide particles selected from metal oxide particles and metalloid oxide particles.

In the present invention, preferably, the ratio of M-OH bonds as described above may be calculated by waveform separation of peaks derived from the above oxide particles at wavenumbers of 100 $cm^{-1}$ to 1250 $cm^{-1}$ in an infrared absorption spectrum. The color characteristics are controlled preferably by controlling an area ratio of the waveform-separated peak derived from the M-OH bonds to the total area of each waveform-separated peak.

In the present invention, preferably, the color characteristics of the oxide particles may be any one of reflectance, transmittance, molar absorption coefficient, hue, or color saturation.

In the present invention, preferably, the ratio of M-OH bonds contained in the oxide particles is controlled by modifying a functional group contained in the oxide particles. In the present invention, preferably, the modification of the functional group is any one of an addition reaction, an elimination reaction, a dehydration reaction, and a displacement reaction. In the present invention, preferably, the modification of the functional group is esterification.

In the present invention, preferably, the ratio of M-OH bonds is controlled by a state of a dispersion in which the oxide particles are dispersed in a dispersion medium. In the present invention, preferably, the dispersion is in the form of a coating film, and the color characteristics of the oxide particles are controlled by subjecting the coating film-like dispersion to a heat treatment.

In the present invention, preferably, the ratio of M-OH bond is controlled using a dispersion-improving apparatus comprising a removal unit with a membrane filter.

In the present invention, preferably, the oxide particles are oxide particles in which at least a part of the surface of a single oxide particle or at least a part of the surface of an aggregate formed by aggregation of a plurality of oxide particles is coated with a silicon compound.

In the present invention, preferably, the particle diameter of the oxide particle or the aggregate of oxide particle is 1 nm or more and 50 nm or less.

The present invention may be embodied as a method for producing oxide particles, wherein the average reflectance for light rays at wavelengths of 780 nm to 2500 nm is controlled to be high by controlling the area ratio of the waveform-separated peak derived from the M-OH bonds to the total area of each waveform-separated peak to be low.

The present invention may be embodied as a method for producing oxide particles, wherein an average molar absorption coefficient for light rays at wavelengths of 190 nm to 380 nm is controlled to be high by controlling the area ratio of the waveform-separated peak derived from the M-OH bonds to the total area of each waveform-separated peak to be low.

Furthermore, the present invention is silicon compound-coated oxide particles in which at least a part of the surface of the oxide particles is coated with a silicon compound, wherein the oxide contained in the oxide particles is iron oxide, and the silicon compound is able to change the color characteristics of the oxide particles by coating at least partially the surface of the oxide particles, the ratio of M-OH bonds contained in the oxide particles is 8% or more and 14.5% or less, and the average reflectance of the oxide particles for light rays at wavelengths of 780 nm to 2500 nm is 50% or more.

Furthermore, the present invention is silicon compound-coated oxide particles in which at least a part of the surface of the oxide particles is coated with a silicon compound, wherein the oxide contained in the oxide particles is iron oxide, and the silicon compound is able to change the color characteristics of the oxide particles by coating at least partially the surface of the oxide particles, the ratio of M-OH bonds contained in the oxide particles is 10% or more and 15% or less, and the maximum reflectance of the oxide particles for light rays at a wavelength of 400 nm to 620 nm is 18% or less.

Furthermore, the present invention is silicon compound-coated oxide particles in which at least a part of the surface of the oxide particles is coated with a silicon compound, wherein the oxide contained in the oxide particles is iron oxide, and the silicon compound is able to change the color characteristics of the oxide particles by coating at least partially the surface of the oxide particles, the ratio of M-OH bonds contained in the oxide particles is 9.5% or more and 15% or less, and the average reflectance of the oxide particles for light rays at wavelengths of 620 nm to 750 nm is 22% or less.

Furthermore, the present invention is silicon compound-coated oxide particles in which at least a part of the surface of the oxide particles is coated with a silicon compound, wherein the oxide contained in the oxide particles is iron oxide, and the silicon compound is able to change the color characteristics of the oxide particles by coating at least partially the surface of the oxide particles, the ratio of M-OH bonds contained in the oxide particles is 8% or more and 15% or less, and hue H ($=b^*/a^*$) in an $L^*a^*b^*$ colorimetric system is in the range of 0.5 to 0.9.

Furthermore, the present invention is silicon compound-coated oxide particles in which at least a part of the surface of the oxide particles is coated with a silicon compound, wherein the oxide contained in the oxide particles is iron oxide, and the silicon compound is able to change the color characteristics of the oxide particles by coating at least partially the surface of the oxide particles, the ratio of M-OH bonds contained in the oxide particles is 9% or more and 15% or less, and, in a transmission spectrum of a dispersion in which the oxide particles are dispersed in a dispersion medium, the transmittance for light rays at a wavelength of 380 nm is 5% or less and the transmittance for light rays at a wavelength of 600 nm is 80% or more.

Furthermore, the present invention is silicon compound-coated oxide particles in which at least a part of the surface of the oxide particles is coated with a silicon compound, wherein the oxide contained in the oxide particles is iron oxide, and the silicon compound is able to change the color characteristics of the oxide particles by coating at least partially the surface of the oxide particles, the ratio of M-OH bonds contained in the oxide particles is 9% or more and 15% or less, and, in a dispersion in which the oxide particles are dispersed in a dispersion medium, an average molar absorption coefficient for light rays at wavelengths of 190 nm to 380 nm is 2200 L/(mol·cm) or more.

Furthermore, the present invention is silicon compound-coated oxide particles in which at least a part of the surface of the oxide particles is coated with a silicon compound, wherein the oxide contained in the oxide particles is iron oxide, and the silicon compound is able to change the color characteristics of the oxide particles by coating at least partially the surface of the oxide particles, the oxide particles includes ester bonds, the ratio of M-OH bonds contained in the oxide particles is 9% or more and 13% or less, and the average reflectance of the oxide particles for light rays at wavelengths of 780 nm to 2500 nm is 50% or more.

Furthermore, the present invention is silicon compound-coated oxide particles in which at least a part of the surface of the oxide particles is coated with a silicon compound, wherein the oxide contained in the oxide particles is iron oxide, and the silicon compound is able to change the color characteristics of the oxide particles by coating at least partially the surface of the oxide particles, the ratio of M-OH bonds contained in the oxide particles is 8% or more and 9.3% or less, or 13.3% or more and 15% or less, and the average reflectance of the oxide particles for light rays at wavelengths of 620 nm to 750 nm is higher than 22%.

Furthermore, the present invention is silicon compound-coated oxide particles in which at least a part of the surface of the oxide particles is coated with a silicon compound, wherein the oxide contained in the oxide particles is zinc oxide, and the silicon compound is able to change the color characteristics of the oxide particles by coating at least partially the surface of the oxide particles, the ratio of M-OH bonds contained in the oxide particles is 30% or more and 39% or less, and the average reflectance of the oxide particles for light rays at wavelengths of 780 nm to 2500 nm is 72% or more.

Furthermore, the present invention is silicon compound-coated oxide particles in which at least a part of the surface of the oxide particles is coated with a silicon compound, wherein the oxide contained in the oxide particles is zinc oxide, and the silicon compound is able to change the color characteristics of the oxide particles by coating at least partially the surface of the oxide particles, the ratio of M-OH bonds contained in the oxide particles is 30% or more and 36% or less, and a wavelength at which the reflectance of the oxide particles is 15% is 375 nm or more.

Furthermore, the present invention is silicon compound-coated oxide particles in which at least a part of the surface of the oxide particles is coated with a silicon compound, wherein the oxide contained in the oxide particles is zinc oxide, and the silicon compound is able to change the color characteristics of the oxide particles by coating at least partially the surface of the oxide particles, the ratio of M-OH bonds contained in the oxide particles is 38% or more and 42% or less, and an average reflectance for light rays at wavelengths of 380 nm to 780 nm is 86% or more.

Furthermore, the present invention is silicon compound-coated oxide particles in which at least a part of the surface of the oxide particles is coated with a silicon compound, wherein the oxide contained in the oxide particles is zinc oxide, and the silicon compound is able to change the color characteristics of the oxide particles by coating at least partially the surface of the oxide particles, the ratio of M-OH bonds contained in the oxide particles is 31% or more and 39% or less, and a color saturation $C(=((a^*)^2+(b^*)^2)^{1/2})$ in an L*a*b* colorimetric system is in the range of 0.5 to 13.

Furthermore, the present invention is silicon compound-coated oxide particles in which at least a part of the surface of the oxide particles is coated with a silicon compound, wherein the oxide contained in the oxide particles is zinc oxide, and the silicon compound is able to change the color characteristics of the oxide particles by coating at least partially the surface of the oxide particles, the ratio of M-OH bonds contained in the oxide particles is 38% or more and 42% or less, and, in a transmission spectrum of a dispersion in which the oxide particles are dispersed in a dispersion medium, the transmittance for light rays at a wavelength of 340 nm is 10% or less and the transmittance for light rays at wavelengths of 380 nm to 780 nm is 92% or more.

Furthermore, the present invention is silicon compound-coated oxide particles in which at least a part of the surface of the oxide particles is coated with a silicon compound, wherein the oxide contained in the oxide particles is zinc oxide, and the silicon compound is able to change the color characteristics of the oxide particles by coating at least partially the surface of the oxide particles, the ratio of M-OH bonds contained in the oxide particles is 30% or more and 36% or less, and, in a transmission spectrum of a dispersion in which the oxide particles are dispersed in a dispersion medium, a wavelength at which the reflectance of the oxide particles becomes 15% is 365 nm or more.

Furthermore, the present invention is silicon compound-coated oxide particles in which at least a part of the surface of the oxide particles is coated with a silicon compound, wherein the oxide contained in the oxide particles is zinc oxide, and the silicon compound is able to change the color characteristics of the oxide particles by coating at least partially the surface of the oxide particles, the ratio of M-OH bonds contained in the oxide particles is 30% or more and 42% or less, and, in a dispersion in which the oxide particles are dispersed in a dispersion medium, an average molar absorption coefficient for light rays at wavelengths of 200 nm to 380 nm is 700 L/(mol·cm) or more.

Furthermore, the present invention is silicon compound-coated oxide particles in which at least a part of the surface of the oxide particles is coated with a silicon compound, wherein the oxide contained in the oxide particles is zinc oxide, and the silicon compound is able to change the color characteristics of the oxide particles by coating at least partially the surface of the oxide particles, the ratio of M-OH bonds contained in the oxide particles is 31% or more and 39% or less, a color saturation $C(=((a^*)^2+(b^*)^2)^{1/2})$ in an L*a*b* colorimetric system is in the range of 0.5 to 13, and an L* value in the L*a*b* colorimetric system is in the range of 95 to 97.

Furthermore, the present invention is silicon compound-coated oxide particles in which at least a part of the surface of the oxide particles is coated with a silicon compound, wherein the oxide contained in the oxide particles is cerium oxide, and the silicon compound is able to change the color characteristics of the oxide particles by coating at least partially the surface of the oxide particles, the ratio of M-OH bonds contained in the oxide particles is 25% or more and 35% or less, and, in a dispersion in which the oxide particles are dispersed in a dispersion medium, an average molar absorption coefficient for light rays at wavelengths of 200 nm to 380 nm is 4000 L/(mol·cm) or more.

Furthermore, in the present invention, preferably, oxide particles having the controlled ratio of M-OH bonds contained in the oxide particles are oxide particles in which at least a part of the surface of a single oxide particle or at least a part of the surface of an aggregate formed by aggregation of a plurality of oxide particles is coated with a silicon compound, and the particle diameter of the oxide particle or the aggregate of oxide particle is 1 nm or more and 50 nm or less.

Furthermore, the present invention may be embodied as one in which the silicon compound comprises amorphous silicon oxide.

Furthermore, the present invention is preferably oxide particles comprising iron oxide, wherein the ratio of M-OH bonds contained in the oxide particles is 1.5% or more and 7.5% or less, and, in a dispersion in which the oxide particles are dispersed in a dispersion medium, an average molar absorption coefficient for light rays at wavelengths of 190 nm to 380 nm is 1000 L/(mol·cm) or more.

Furthermore, the present invention is preferably oxide particles comprising iron oxide, wherein the ratio of M-OH bonds contained in the oxide particles is 1.5% or more and 7.5% or less, and the average reflectance of the oxide particles for light rays at wavelengths of 780 nm to 2500 nm is 55% or more.

Furthermore, the present invention is preferably oxide particles comprising cerium oxide, wherein the ratio of M-OH bonds contained in the oxide particles is 12.5% or less, and an average molar absorption coefficient for light rays at wavelengths of 200 nm to 380 nm is 3500 L/(mol·cm) or more.

Furthermore, the present invention is preferably oxide particles comprising cerium oxide, wherein the ratio of M-OH bonds contained in the oxide particles is 11% or less, and in a dispersion in which the oxide particles are dispersed in a dispersion medium, an average molar absorption coefficient for light rays at wavelengths of 200 nm to 380 nm is 4000 L/(mol·cm) or more.

Furthermore, the present invention is preferably oxide particles composed of cobalt zinc complex oxide, wherein the ratio of M-OH bonds contained in the oxide particles is 0.5% or more and 20% or less, and an average molar absorption coefficient for light rays at wavelengths of 200 nm to 380 nm is 700 L/(mol·cm) or more.

Furthermore, the present invention is preferably oxide particles composed of silicon-cobalt-zinc-complex oxide, wherein the ratio of M-OH bonds contained in the oxide particles is 13% or more and 33% or less, and in a dispersion in which the oxide particles are dispersed in a dispersion medium, an average molar absorption coefficient for light rays at wavelengths of 200 nm to 380 nm is 800 L/(mol·cm) or more.

Furthermore, the present invention is preferably oxide particles composed of any one of the iron oxide, the cerium oxide, the cobalt zinc complex oxide, or the silicon-cobalt-zinc-complex oxide, wherein the primary particle diameter of the oxide particles is 100 nm or less.

Furthermore, the present invention is preferably oxide particles comprising zinc oxide particles having a primary particle diameter of 50 nm or less, wherein the ratio of M-OH bonds contained in the oxide particles is 12% or less, and in a dispersion in which the oxide particles are dispersed in a dispersion medium, an average molar absorption coefficient for light rays at wavelengths of 200 nm to 380 nm is 500 L/(mol·cm) or more.

Furthermore, the present invention is preferably oxide particles comprising zinc oxide particles having a primary particle diameter of 50 nm or less, wherein the ratio of M-OH bonds contained in the oxide particles is 11.2% or less, and in a dispersion in which the oxide particles are dispersed in a dispersion medium, an average molar absorption coefficient for light rays at wavelengths of 200 nm to 380 nm is 650 L/(mol·cm) or more.

Furthermore, the present invention is preferably oxide particles comprising zinc oxide particles having a primary particle diameter of 50 nm or less, wherein the ratio of M-OH bonds contained in the oxide particles is 12% or less, and the average reflectance of the oxide particles for light rays at a wavelength of 780 nm to 2500 nm is 65% or more.

Furthermore, the present invention is preferably oxide particles comprising zinc oxide particles having a primary particle diameter of 50 nm or less, wherein the ratio of M-OH bonds contained in the oxide particles is 12% or less, and in a dispersion in which the oxide particles are dispersed in a dispersion medium, a transmittance for light rays at a wavelength of 330 nm is 10% or less, and an average reflectance for light rays at wavelengths of 380 nm to 780 nm is 90% or more.

Furthermore, the present invention is the haze value of an oxide dispersion obtained by dispersing the oxide particles in the dispersion medium is 1% or less.

Furthermore, the present invention may be embodied as a coating or film-like oxide composition comprising the oxide particles having the controlled ratio of M-OH bonds.

Advantageous Effects of the Invention

According to the present invention, oxide particles having controlled color characteristics of any one of reflectance, transmittance, molar absorption coefficient, hue, or color saturation can be provided by controlling the ratio of M-OH bonds contained in metal oxide particles or metalloid oxide particles. The control of the ratio of M-OH bonds allows the color characteristics of oxide particles to be strictly controlled, so that the design of a composition can be easily performed more accurately than the conventional one to deal with the diversifying application and target properties of oxide particles.

DESCRIPTION OF THE INVENTION

Hereinafter, the present invention will be described by way of exemplary embodiments with reference to the attached drawings. However, the aspects of the present invention are not limited to the embodiment described below.

(Oxide Particles)

The oxide particles according to the present invention are those in which the color characteristics, such as reflectance, transmittance, molar absorption coefficient, hue, or color saturation, are controlled by controlling the ratio of M-OH bonds contained in oxide particles. The use of oxide particles according to the present invention for a composition intended to be applied to a coating film, a coated body, the skin of a human, or the like, or a film-like composition intended to be used for glass or the like enables effective coloring, while preventing a decrease in design, appearance, and texture. Thus, a coating or film-like oxide composition that can be effectively used for an object to be coated can be provided.

(Configuration of Oxide Particles—1)

The oxide particles according to the present invention are those containing one or more different elements other than oxygen or hydrogen obtained by way of reaction, crystallization, precipitation, co-precipitation, or the like. For the one or more different elements other than oxygen or hydrogen, metal elements, or metalloid elements in the chemical periodic table are preferable. Preferably, the metalloid elements used in the present invention may include, but not specifically limited to, Si, Ge, As, Sb, Te, Se or the like. The oxide particles may consist of a single element of these metal and metalloid elements. The oxide particles may be combined oxide particles consisting of a plurality of elements or may be combined oxide particles containing metal and metalloid elements. In the case of oxide particles containing different elements, the oxide particles may be in the form of the above combined oxide particles. Alternatively, as described later, the present invention can be embodied such that at least a part of the surface of oxide particles may be coated with oxide containing elements different from elements other than oxygen contained in the oxide particles.

(Configuration of Oxide Particles—2)

The oxide particles according to the present invention are not limited to those composed of only oxides. The present invention can be embodied by including a compound other than oxides to the extent that it does not affect the present invention. Alternatively, the present invention can be embodied such that oxide particles may be those containing a compound other than oxides or combined oxide particles or oxide particles in which at least a part of the surface thereof is coated with a compound other than oxides. Examples of the compound other than oxides include hydroxides, nitrides, carbides, various salts, such as nitrates and sulfates, hydrates, and organic solvates.

(Configuration of Oxide Particles—3)

Figure 1:
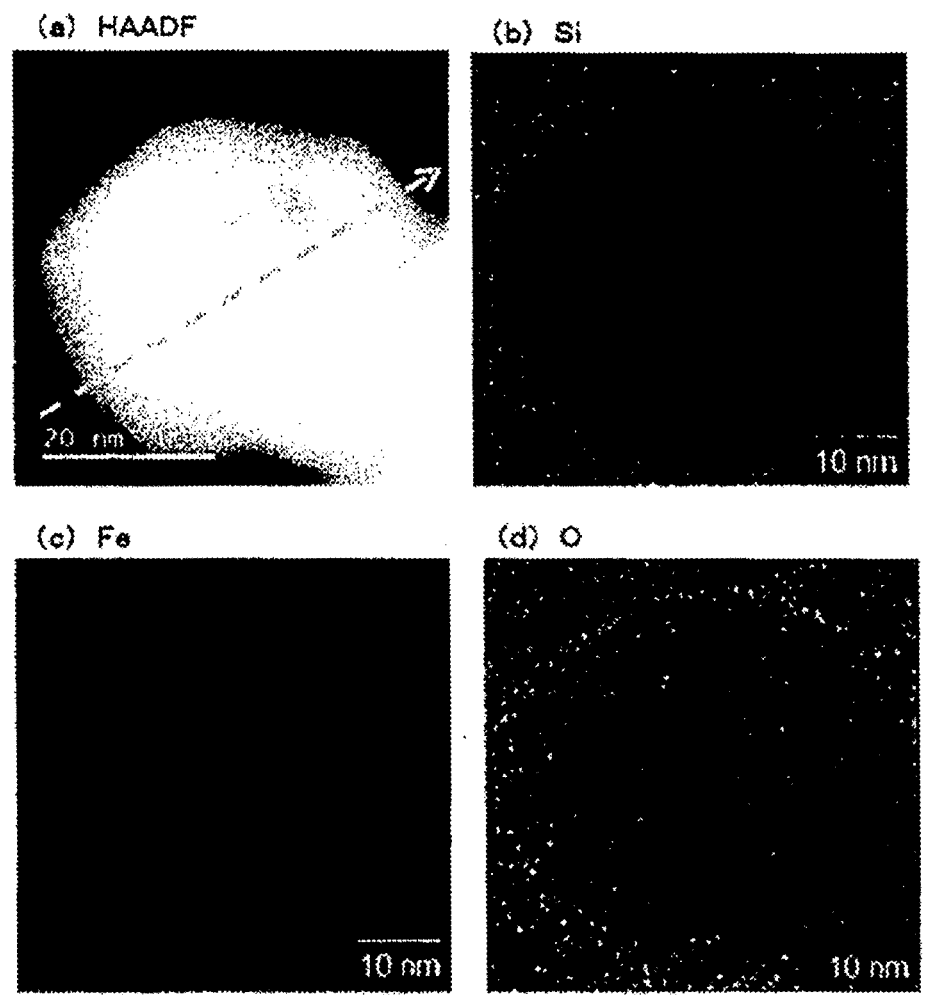
FIG. 1 is a diagram illustrating the results of STEM mapping of silicon compound-coated iron oxide particles in which the surface of iron oxide particles were coated with a silicon compound, obtained in Example 1-5 of the present invention.
Figure 2:
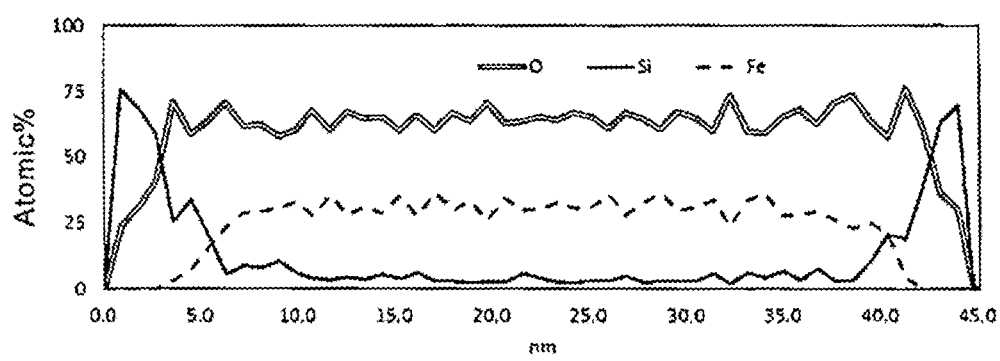
FIG. 2 is a diagram illustrating the results of a line analysis of silicon compound-coated iron oxide particles in which the surface of iron oxide particles were coated with a silicon compound, obtained in Example 1-5 of the present invention.
Figure 3:
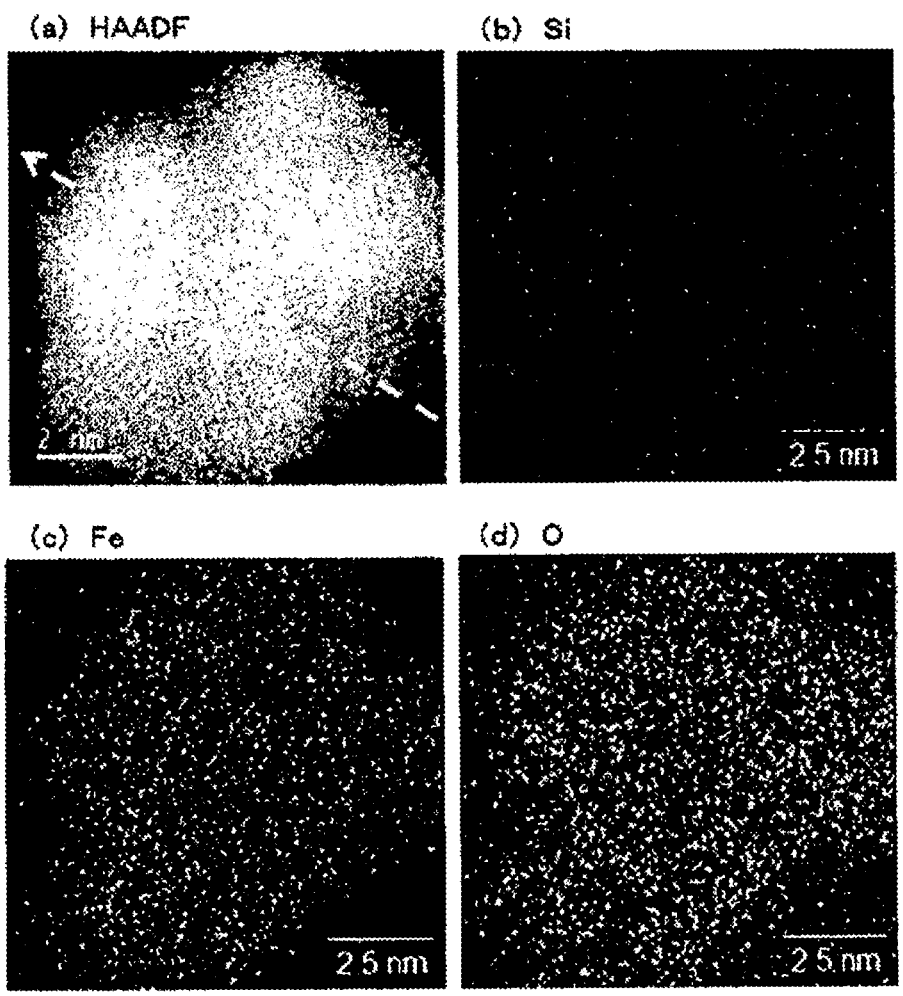
FIG. 3 is a diagram illustrating the results of STEM-mapping of silicon compound-coated iron oxide particles in which a part of the surface of iron oxide particles obtained in Example 1 of the present invention is coated with a silicon compound.
Figure 4:
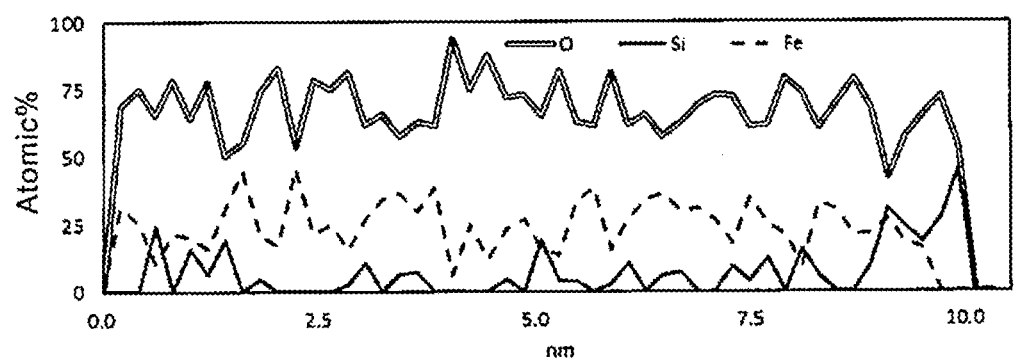
FIG. 4 is a diagram illustrating the results of a line analysis of silicon compound-coated iron oxide particles in which a part of the surface of iron oxide particles obtained in Example 1 of the present invention is coated with a silicon compound.

As an example of the oxide particles according to the present invention, oxide particles in which at least a part of the surface thereof obtained in Example 1-5 is coated with silicon oxide, which is one of silicon compounds. FIG. 1 represents STEM mapping results of the silicon oxide-coated iron oxide particles obtained in Example 1-5. In FIG. 1, (a) is a dark field image (HAADF image), (b) is the mapping result of silicon (Si), (c) is the mapping result of iron (Fe), and (d) is the mapping result of oxygen (O). As illustrated in FIG. 1, iron and oxygen are detected in the entire particles, and silicon is mainly detected on the surface of the particles. FIG. 2 represents the results of a line analysis at the position indicated by the broken line in the HAADF image of FIG. 1, the results showing the atomic % (mol %) of the element detected in the line segment from the end to the end of a particle. As is evident from FIG. 2, oxygen and silicon were detected over the entire analytical range in the line analysis. For iron, the inner side from the edge to several nm of the particle was detected. It is indicative of the fact that the surface of iron oxide is coated with silicon oxide. FIG. 3 represents the results of STEM mapping of silicon oxide-coated oxide particles obtained in Example 1 described later. FIG. 4 represents the results of the line analysis at the position indicated by the broken line in the HAADF image of FIG. 3. As is evident from FIGS. 3 and 4, the particles obtained in Example 1 are different from those obtained in Example 1-5, the oxide particles are not entirely coated with silicon oxide, but are partially coated with silicon oxide and provided as silicon oxide-coated particles. Thus, as an example of the present inventive oxide can be embodied as silicon compound-coated oxide particles such that at least a part of the surface of oxide particles is coated with a silicon compound.

(Description of M-OH Bonds—1)

Figure 5:
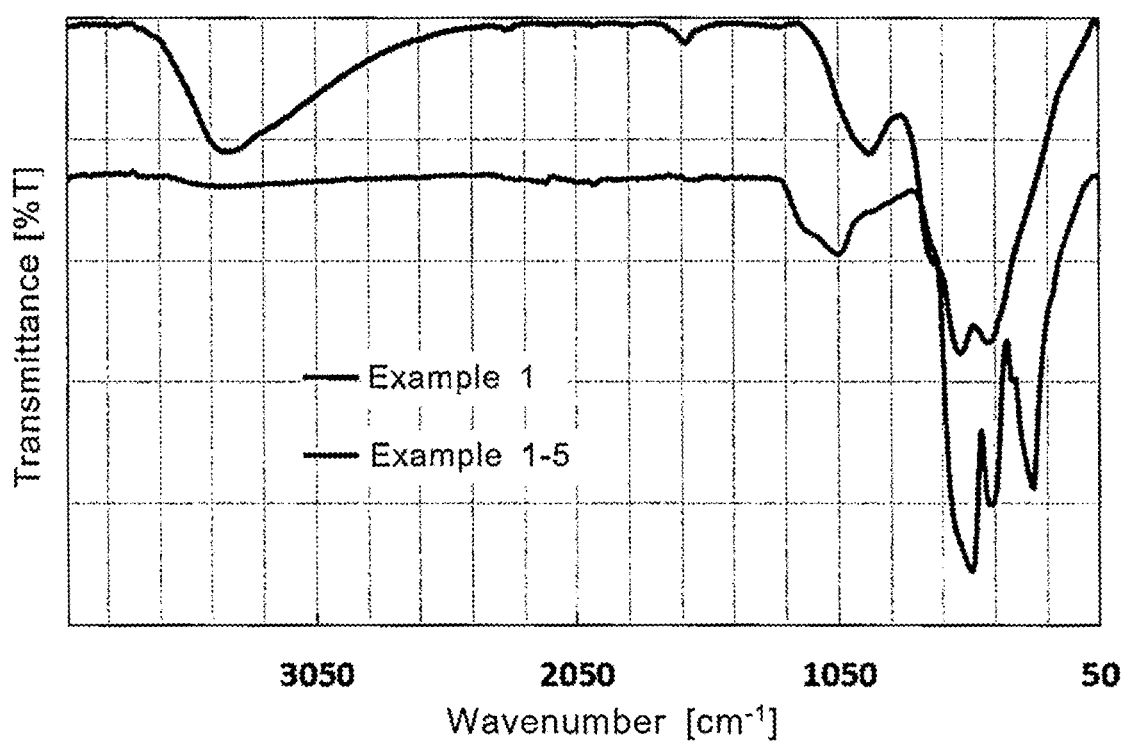
FIG. 5 is a diagram illustrating the results of IR measurement of silicon compound-coated iron oxide particles obtained in Example 1 and Example 1-5 of the present invention.

FIG. 5 represents the results of FT-IR measurement of the silicon compound-coated oxide particles obtained in Example 1 and Example 1-5 by the ATR method (hereinafter abbreviated as IR measurement). Here, IR is abbreviation of the infrared absorption spectroscopy. The IR measurement results of the silicon compound-coated oxide particles obtained in Example 1-5 can be seen such that, as compared with the results of IR measurement on the silicon compound-coated oxide obtained in Example 1, broad peaks around 1650 $cm^{-1}$ and around 3400 $cm^{-1}$ are small and broad peaks in the vicinity of 800 $cm^{-1}$ to 1250 $cm^{-1}$ are shifted toward the higher wavenumbers. In the present invention, among these peaks, the peak in the vicinity of 3400 $cm^{-1}$ may be a peak derived from a hydroxyl group (—OH), such as one in water, the peaks in the vicinity of 800 $cm^{-1}$ to 1250 $cm^{-1}$ may be peaks that include peaks derived from the M-OH bonds. In the present invention, various color characteristics are controlled by controlling the M-OH bonds contained in oxide particles, and, for instance, the ratio of M-OH bonds can be determined from the IR-measurement results. The ratio of M-OH bonds may be measured by a method other than IR measurement. Examples of such a method include X-ray photoelectron spectroscopy (XPS), solid state nuclear magnetic resonance (solid NMR), and electron energy loss spectroscopy (EELS).

(Description of M-OH Bonds—2)

Figure 6:
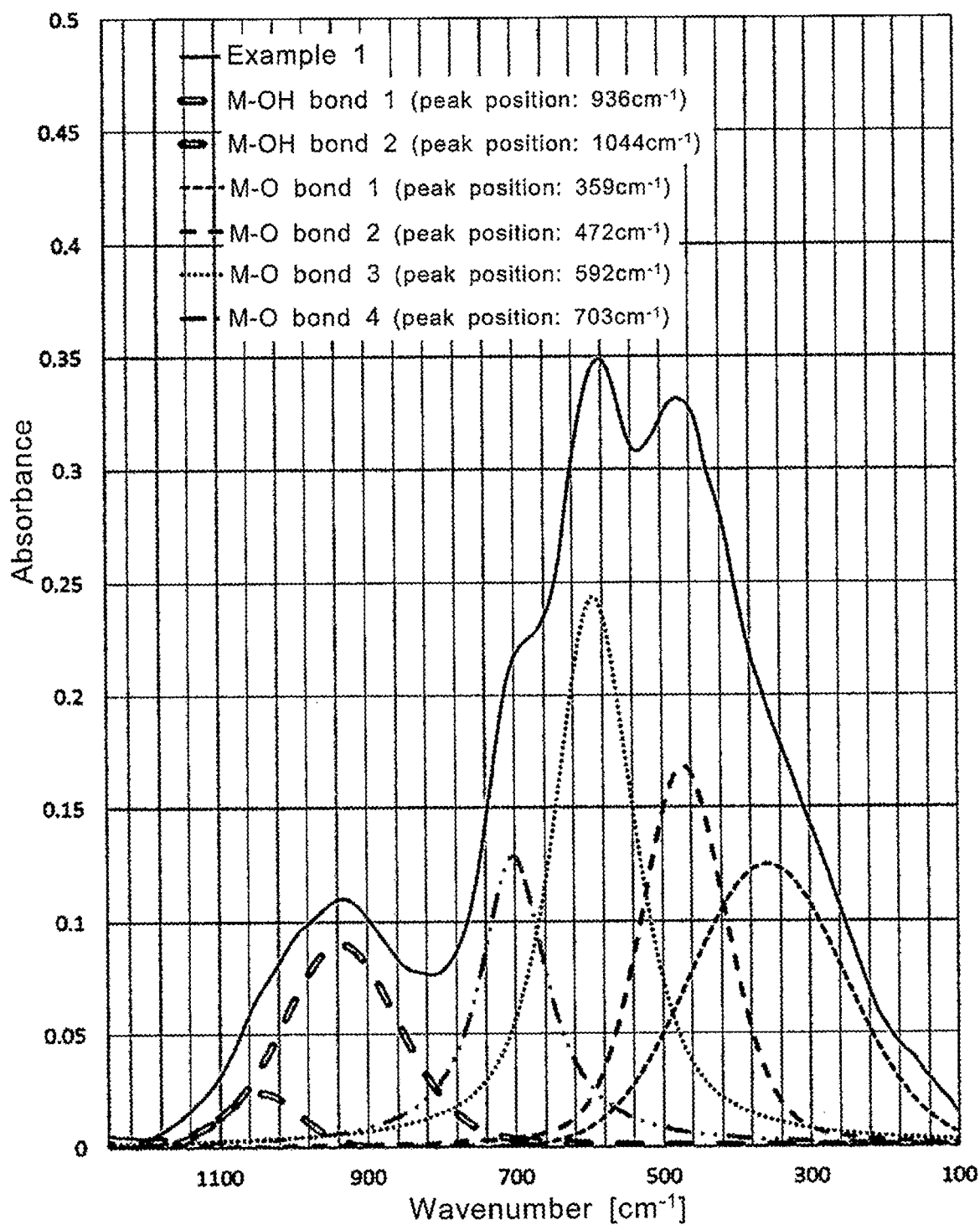
FIG. 6 is a diagram illustrating the results of waveform separation of a region at wavenumbers of 100 cm$^{-1}$ to 1250 cm$^{-1}$ in the IR-measurement results of silicon compound-coated iron oxide particles obtained in Example 1 of the present invention.

The results of waveform separation of the peaks at wavenumbers of 100 $cm^{-1}$ to 1250 $cm^{-1}$ in the IR measurement results are shown in FIG. 6 for Example 1 and in FIG.

Figure 7:
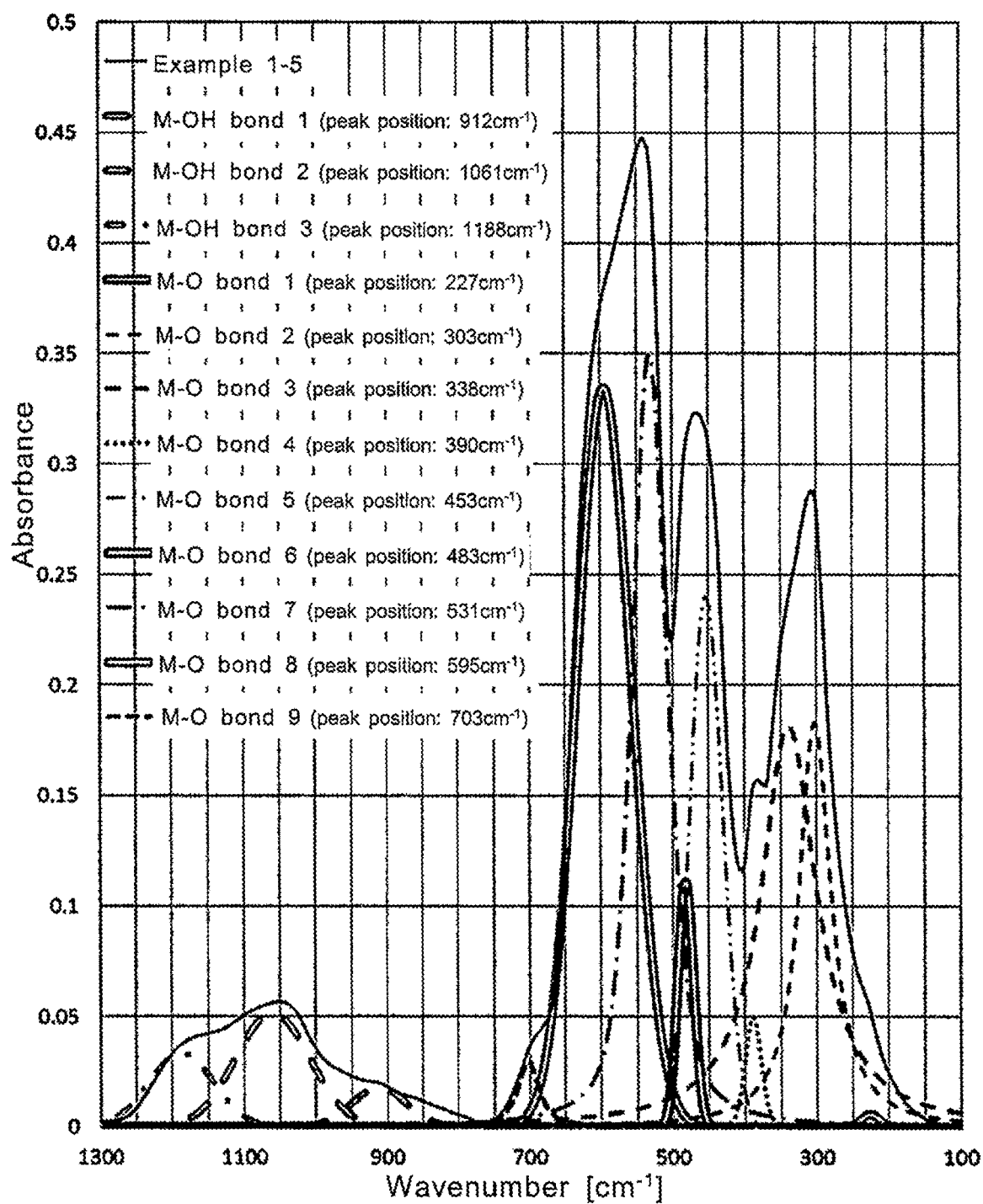
FIG. 7 is a diagram illustrating the results of waveform separation of the IR-measurement results of silicon compound-coated iron oxide particles obtained in Example 1-5 of the present invention in a region at wavenumbers of 100 cm$^{-1}$ to 1250 cm$^{-1}$.

7 for Example 1-5. In the above description, the vertical axis of the graph for IR measurement results represents the values of transmittance (% T), while the vertical axis for the waveform separation represents the values of absorbance. In FIGS. 6 and 7, therefore, the vertical axis represents the values of absorbance. In the present invention, as a result of waveform separation of peaks at wavenumbers of 100 cm$^{-1}$ to 1250 cm$^{-1}$ in the IR measurement results, the oxide particles may be preferably oxide particles having controlled color characteristics. That is, the color characteristics are controlled such that the peaks waveform-separated at wavenumbers of 800 cm$^{-1}$ to 1250 cm$^{-1}$ are provided as peaks derived from M-OH bonds, the peaks waveform-separated at wavenumbers of 100 cm$^{-1}$ to 800 cm$^{-1}$ are provided as peaks derived from M-O bonds, and the area ratio of the peak waveform-separated for the M-OH bonds to the total area of each peak of the waveform-separated peaks is controlled in a region at wavenumbers of 100 cm$^{-1}$ to 1250 cm$^{-1}$. In other words, in the results of the IR measurement in Example 1 shown in FIG. 6, the ratio of M-OH bonds contained in oxide particles is derived such that four peaks waveform-separated at wavenumbers of 100 cm$^{-1}$ to 800 cm$^{-1}$ are provided as peaks derived from M-O bonds, two peaks waveform-separated at wavenumbers of 800 cm$^{-1}$ to 1250 cm$^{-1}$ are provided as peaks derived from M-OH bonds, and the area ratio of the peak waveform-separated for the M-OH bonds to the total area of each peak of the waveform-separated peaks is controlled in a region at wavenumbers of 100 cm$^{-1}$ to 1250 cm$^{-1}$ is calculated. As is evident from FIGS. 6 and 7, the total area ratio of each peak of the waveform-separated peaks for the M-OH bonds to the total peak components of waveform-separated peaks is found to be small as compared with Example 1. In other words, it represents that the ratio of M-OH bonds contained in the oxide particles of Example 1-5 is lower than the ratio of M-OH bonds contained in the oxide particles of Example 1. In the present invention, as an example of calculating the ratio of M-OH bonds, waveform separation is performed on peaks at wavenumbers of 100 cm$^{-1}$ to 1250 cm$^{-1}$ in the IR measurement results, and the area ratio (M-OH ratio [%]) calculated from the total area of M-OH bonds waveform-separated at waveforms of 800 cm$^{-1}$ to 1250 cm$^{-1}$ to the total area of all waveform-separated peaks is represented as the ratio of M-OH bonds.

(Description of M-OH Bonds—3)

Here, the oxide particles of Example 1 and Example 1-5 are silicon compound-coated iron oxide particles prepared by coating the surface of iron oxide particles with silicon oxide as described above. Thus, M in the M-OH bonds is iron (Fe) or silicon (Si), and the M-OH bonds can be identified as Fe—OH bonds or Si—OH bonds. Also, the M-O bond can be specified as a Fe—O bond or a Si—O bond just as in the case with the M-OH bond. The present invention has found that the color characteristics of the oxide particles can be controlled such that peaks at wavenumbers of 100 cm$^{-1}$ to 1250 cm$^{-1}$ are waveform-separated, and the peaks waveform-separated at wavenumbers of 800 cm$^{-1}$ to 1250 cm$^{-1}$ are recognized as peaks derived from the M-OH bonds, and then the area ratio (M-OH ratio [%]) calculated from the total area of the M-OH bonds with respect to the total area of all the waveform-separated peaks is controlled. In the present invention, however, among peaks waveform-separated at wavenumbers of 800 cm$^{-1}$ to 1250 cm$^{-1}$, peaks which can be attributed to those different from the M-OH bonds, are not limited to belonging to the M-OH bonds. For instance, among peaks waveform-separated at wavenumbers of 800 cm$^{-1}$ to 1250 cm$^{-1}$ which was identified as M-OH bonds in Example 1, peaks waveform-separated in the vicinity of 1044 cm$^{-1}$ and peaks waveform-separated in the vicinity of 1061 cm$^{-1}$ and 1188 cm$^{-1}$ in Example 1-5 can be identified as M-O bonds (Si—O bonds) for the silica skeleton structure, but not be identified as M-OH bonds (Si—OH bonds) (e.g., the peaks can be attributed in the vicinity of 1044 cm$^{-1}$: stretching vibration of ≡Si—O—Si≡, in the vicinity of 1061 cm$^{-1}$: Si—O stretching vibration of the silica skeleton, in the vicinity of 1188 cm$^{-1}$:stretching vibration of ≡Si—O—Si≡, so that they can be recognized as M-O bonds (Si—O bonds). In this way, by further subdividing peaks waveform-separated at wavenumbers of 800 cm$^{-1}$ to 1250 cm$^{-1}$ into the M-OH bonds and other bonds different from M-OH bonds, such as M-O bonds to derive the ratio of M-OH bonds, the ratio of M-OH bonds may be controlled in more detail to control the color characteristics of the oxide particles. Alternatively, the ratio of M-OH bonds may be controlled to control the color characteristics of the oxide particles by deriving the ratio of M-OH bonds by waveform-separating only the peaks at wavenumbers of 800 cm$^{-1}$ to 1250 cm$^{-1}$.

(Description of M-OH Bonds—4)

Figure 8:
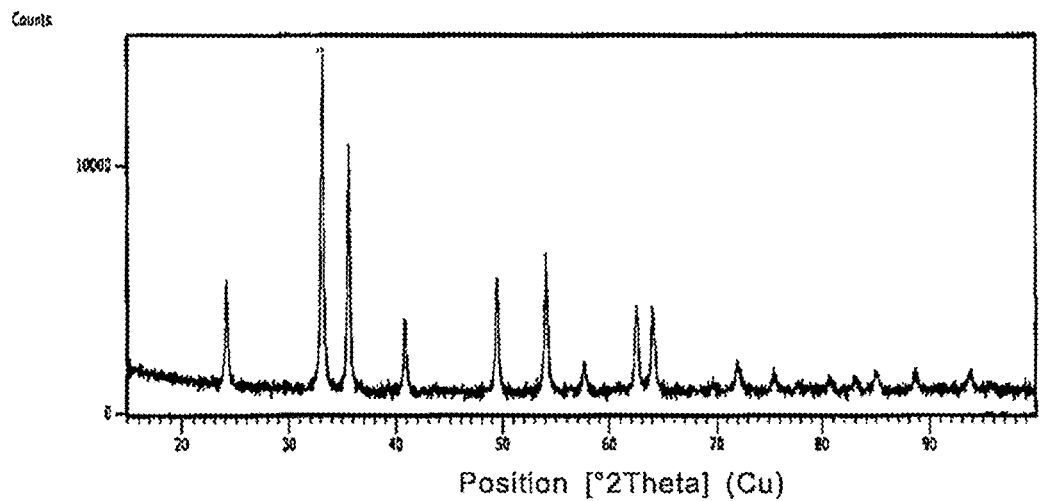
FIG. 8 is a diagram illustrating the results of XRD measurement of silicon compound-coated iron oxide particles obtained in Example 1-5 of the present invention.

FIG. 8 represents XRD measurement results of the oxide particles obtained in Example 1-5. As is evident from FIG. 8, no peak is observed other than the peaks derived from $\alpha$-Fe$_2$O$_3$. Also in Example 1, no peak is observed other than the peaks derived from $\alpha$-Fe$_2$O$_3$ (not shown). Nevertheless, in the IR measurement results, peaks derived from the M-OH bonds were detected. Thus, the M-OH bonds are mainly present on the surface of oxide particles rather than the inside thereof. In the XRD measurement results, therefore, it is thought that no peak of hydroxide or the like were not detected. Further, the XRD measurement results showed that the silicon compound confirmed by the above IR measurement contains amorphous.

(Specific Examples of Ratio of M-OH Bonds and Color Characteristics)

Figure 9:
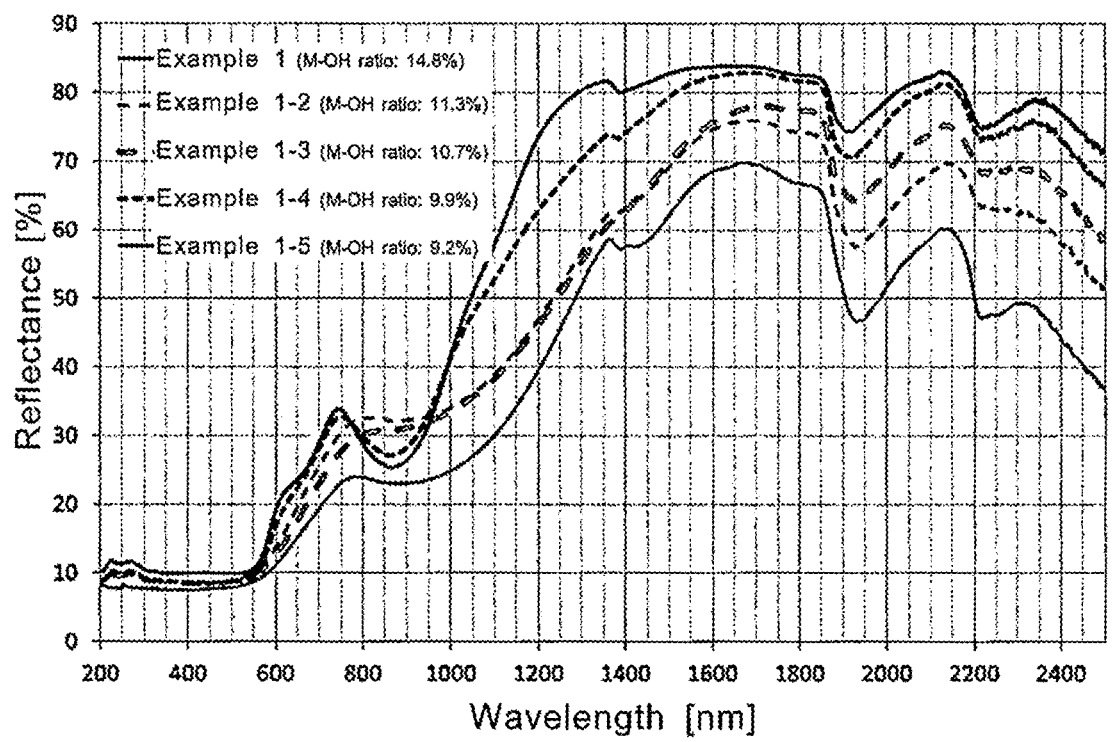
FIG. 9 is a diagram illustrating the results of reflection-spectrum measurement of silicon compound-coated iron oxide particles for light rays at wavelengths of 200 nm to 2500 nm, the oxide particles being obtained in the examples of the present invention.
Figure 10:
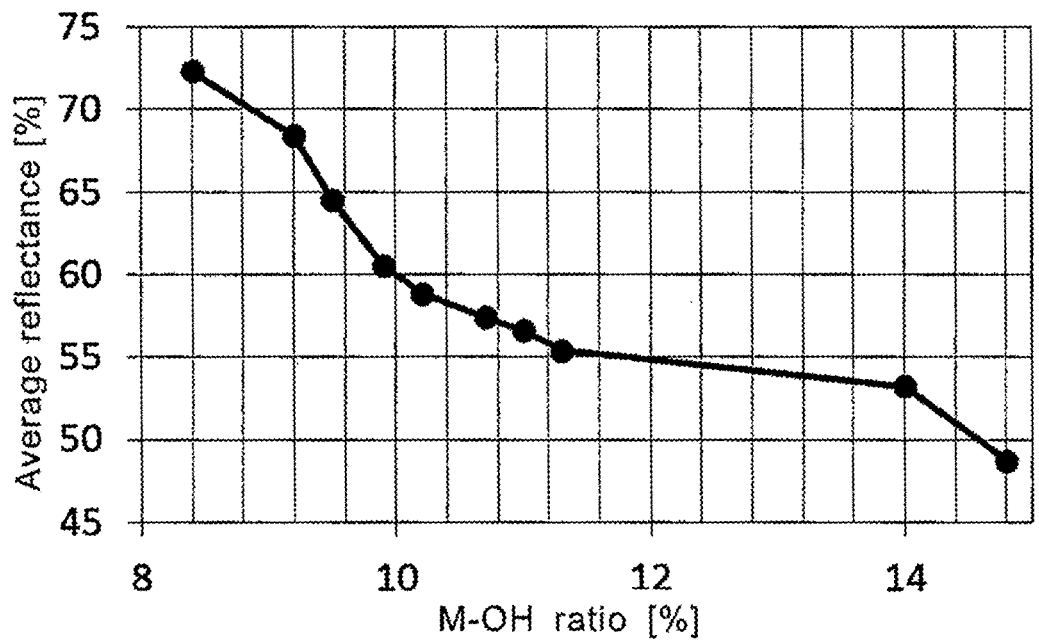
FIG. 10 is a graphic diagram illustrating the average reflectance for light rays at wavelengths of 780 nm to 2500 nm for the ratio of M-OH bonds contained in silicon compound-coated iron oxide particles obtained in the examples of the present invention.

FIG. 9 represents reflection spectra of oxide particles respectively obtained in Example 1 and Examples 1-2 to 1-5 for light rays at wavelengths of 200 nm to 2500 nm. First, as is evident from the figure, with respect to the reflectance for the light rays of the near-infrared region at wavelengths of 780 nm to 2500 nm, the silicon compound-coated oxide particles obtained in Example 1-5 is higher than the silicon compound-coated oxide particles obtained in Example 1. Waveform separation was performed on peaks at wavenumbers of 100 cm$^{-1}$ to 1250 cm$^{-1}$ in the IR spectrum. For the area ratio of the peaks of M-OH bonds to the total area of each waveform-separated peak (M-OH ratio [%]), descending order is Example 1-5, Example 1-4, Example 1-3, Example 1-2, and Example 1. For the average reflectance for light rays at wavelengths of 780 nm to 2500 nm, ascending order is Example 1-5, Example 1-4, Example 1-3, Example 1-2, and Example 1. The average reflectance for light rays at wavelengths of 780 nm to 2500 nm refers to the simple average value of the reflectance values at all the respective measurement wavelengths in a wavelength region of 780 nm to 2500 nm. FIG. 10 represents a graph of the average reflectance for light rays at wavelengths of 780 nm to 2500 nm for the ratio of M-OH [%]. As is evident from FIG. 10, the lower the ratio of M-OH, the higher the average reflectance for light rays at wavelengths of 780 nm to 2500 nm tended to be observed. In other words, the oxide particles of the present invention are the oxide particles having as one of the color characteristics the average reflectance for light rays at wavelengths of 780 nm to 2500 nm controlled by controlling the ratio of M-OH bonds contained in the oxide particles, and preferably having the average reflectance for light rays at wavelengths of 780 nm to 2500 nm enhanced by lowering the ratio of M-OH bonds. Furthermore, when the oxide particles are silicon compound-coated oxide particles, the M-OH bonds can be Fe—OH bonds or Si—OH bonds. Thus, by controlling the ratio of M-OH bonds to 8% or more and 14.5% or less, the average reflectance of the oxide particles for light rays at wavelengths of 780 nm to 2500 nm can be 50% or more in the resulting silicon compound-coated oxide particles.

(Control of Ratio of M-OH Bonds and Color Characteristics)

In the present invention, in a manner similar to the reflectance or average reflectance for light rays in a near-infrared region, or at the wavelengths of 780 nm to 2500 nm, the ratio of M-OH bonds contained in oxide particles is controlled to allow the oxide particles to have correctly and properly controlled color characteristics. Here, the color characteristics include, for example, molar absorption coefficient, average molar absorption coefficient, or transmittance for light rays in a ultraviolet region, or at wavelengths of 190 nm (200 nm) to 380 nm; and reflectance, average reflectance, transmittance, or average transmittance for light rays in a visible region, or at wavelengths of 380 nm to 780 nm; and hue H ($=b^*/a^*$) or color saturation C($=((a^*)^2+(b^*)^2)^{1/2}$) in an L*a*b* colorimetric system. In particular, therefore, oxide particles suitable for use in a coating or film-like composition can be provided.

(Color Characteristics: Average Molar Absorption Coefficient)

From the absorbance and the molar concentration of a substance to be measured in a measurement sample in an ultraviolet-visible absorption spectrum measurement, a molar absorption coefficient can be calculated by the following equation 1:

$$\varepsilon = A/(c \cdot 1) \quad \text{(Equation 1)}$$

wherein c is a constant inherent to the substance and referred to as a molar absorption coefficient, and corresponds to the absorbance of a 1 mol/L dispersion medium with a thickness of 1 cm, and thus the unit is L/(mol·cm). In the equation, "A" is an absorbance in ultraviolet-visible absorption spectrum measurement; "c" is the molar concentration (mol/L) of a sample; and "1" is the length through which light is transmitted (optical path length) (cm), and is usually the thickness of a cell used in the measurement of ultraviolet-visible absorption spectrum. In the present invention, to demonstrate the ability to absorb light rays in the ultraviolet region of wavelengths of 190 nm (200 nm) to 380 nm, in the measurement wavelength region of wavelengths of 190 nm (200 nm) to 380 nm, a simple average of molar absorption coefficients at all the measurement wavelengths is calculated and evaluated as an average molar absorption coefficient.

(Color Characteristics: Average Reflectance Value or Average Transmittance)

As described above, furthermore, the average reflectance for light rays at wavelengths of 780 nm to 2500 nm refers to the simple average value of the reflectance values at all the respective measurement wavelengths for a reflection spectrum in a wavelength region of 780 nm to 2500 nm. Furthermore, the average transmittance at wavelengths of 380 nm to 780 nm refers to the simple average value of the transmittances at all the respective measurement wavelengths for a transmittance spectrum in a region at wavelengths of 380 nm to 780 nm.

The average molar absorption coefficient, average reflectance, and average transmittance are not limited to the above-described wavelength ranges, and a wavelength region to be averaged according to the intended color characteristics can be set appropriately.

(Color Characteristics: Hue or Color Saturation)

Hue and color saturation in the present invention can be represented by hue H ($=b^*/a^*$, $b^*>0$, $a^*>0$) in an L*a*b* colorimetric system and color saturation C=$((a^*)^2+(b^*)^2)_{1/2}$. Here, the L*a*b* colorimetric system is one of the uniform color space, and L* is a value representing the brightness, and the larger the numerical value, the brighter it is. Also, a* and b* represent chromaticity. In the present invention, the colorimetric system is not limited to the L*a*b* colorimetric system. The color characteristics may be evaluated using any of other colorimetric systems, such as an XYZ system.

(Control of Ratio of M-OH Bonds: Description of Method—1)

In the present invention, the method for controlling the ratio of M-OH bonds is not particularly limited, but it is preferable to control the ratio of M-OH bonds by modification of functional groups contained in oxide particles. The functional modification can control the ratio of M-OH bonds by a method for subjecting the functional groups contained in oxide particles to a process using a substitution reaction, addition reaction, elimination reaction, dehydration reaction, condensation reaction, or the like. For controlling the ratio of M-OH bonds, the ratio of M-OH bonds may be increased or decreased. In the present invention, preferably, the above control may esterify the M-OH bonds. The esterification is accomplished, for example, by a dehydration/condensation reaction in which OH is detached from a carboxyl group (—COOH) and H is detached from a hydroxyl group (—OH). The ratio of M-OH bonds can also be controlled by a method for allowing hydrogen peroxide or ozone to act on oxide particles. For precipitating oxide particles in a liquid, the ratio of M-OH bonds may be controlled by a formulation for precipitating the oxide particles, a method for controlling pH, or the like. As an example of the dehydration reaction, the ratio of M-OH bonds may be controlled by a method for heat-treating the oxide particles. For controlling the ratio of M-OH bonds by the method for heat-treating oxide particles, a dry-heat treatment may be performed. Alternatively, the oxide particles may be dispersed in a dispersion medium and the resulting dispersion may be then subjected to a heat treatment. As will be described later, the ratio of M-OH bonds may be controlled by dispersing oxide particles in a target solvent, adding a substance containing functional groups to the dispersion liquid, and subjecting the dispersion to a treatment, such as stirring. The ratio of M-OH bonds may be controlled by subjecting them to a treatment, such as stirring, in a dispersion liquid containing precipitated oxide particles. Furthermore, the ratio of M-OH bonds may be controlled using an apparatus in which a dispersing device and a membrane filter are communicated with each other. That is, when a method for removing impurities from a slurry containing oxide particles by treating the particles with a dispersion treatment and cross-flow membrane filtration, the temperature of the slurry, the temperature of a washing liquid used for cross-flow, or the like is changed to control the ratio of M-OH bonds. In this case, a uniform modification can be performed on the primary particles of oxide particles, particularly the surfaces of the respective primary particles. There is therefore an advantage that the ratio of M-OH bonds contained in oxide particles and the color characteristics thereof can be controlled more closely and homogeneously.

For the adjustment of pH for precipitation of the oxide particles, a pH modulator, such as an acidic or basic substance, may be included in at least one of various solution and solvents in the present invention. Alternatively, the pH may be adjusted by changing the flow rate when mixing a fluid containing an oxide raw material with an oxide precipitation solvent.

The method for changing a functional group contained in the oxide particles according to the present invention is not particularly limited. The functional group may be changed by dispersing the oxide particles in a target solvent, adding a substance containing a functional group to the dispersion, and subjecting the dispersion to a treatment such as stirring. Alternatively, it may be carried out by mixing a fluid containing the oxide particles with a fluid containing a substance having functional groups using the above micro-reactor.

The substance containing a functional group is not particularly limited, but is a substance containing a functional group that can be substituted with a hydroxyl group contained in the oxide particles. Examples of such a substance include: acylating agents, such as acetic anhydride and propionic anhydride; methylating agents, such as dimethyl sulfate and dimethyl carbonate; and silane coupling agents, such as chlorotrimethylsilane and methyl trimethoxysilane.

As described above, the ratio of M-OH bonds can be controlled by a method for allowing hydrogen peroxide or ozone to act on oxide particles. The method for allowing hydrogen peroxide or ozone to act on oxide particles is not particularly limited. It may be performed by dispersing oxide particles in a target solvent and adding a solution, such as hydrogen peroxide or ozone, or an aqueous solution containing them to the dispersion, followed by treatment, such as stirring. Alternatively, it may be performed by mixing a fluid containing oxide particles and a fluid containing hydrogen peroxide or ozone using the micro-reactor described above.

The dispersion may be a liquid dispersion in which oxide particles are dispersed in a liquid dispersion medium, such as water, an organic solvent, or resin, or may be a film-like dispersion prepared by using a dispersion liquid containing oxide particles. When heat treatment is performed in a state of a dispersion containing oxide particles, agglomeration of particles can be suppressed as compared with a heat treatment in a dry state. For example, when the oxide particles of the present invention are used for a multilayer-coating film and a high-design multilayer-coating film as described in JP 2014-042891 and JP 2014-042892, the color characteristics of the oxide particles can be controlled by controlling the ratio of M-OH bonds contained in the oxide particles by heat treatment or the like after the oxide particles are formed into the multilayer coating film or the multilayer coating film. Thus, such a use is therefore suitable for reduction of the number of steps and strict control of color characteristics. Incidentally, the multilayer coating film and the highly designed multilayer coating film described in JP 2014-042891 and JP 2014-042892 have a high difference between highlight and shade for a specific color, the intensity largely varies depending on the observation angle, thereby realizing the sense of depth and denseness. It is therefore required to improve the transmittance for a specific color in order to enhance highlight and to increase the difference between highlight and shade. Such a coating film provided as an oxide particle dispersion can increase its transparency, which serves as the ability to absorb ultraviolet rays of oxide particles, as its molar absorption coefficient in the ultraviolet region, which is the ability to absorb ultraviolet rays of oxide particles, is larger. In addition, a reduction in the amount of oxide particles used can also reduce the haze value.

The oxide particles, such as silicon compound-coated zinc oxide particles, can be applied to applications other than the above-mentioned application for laminated coating films. For example, the oxide particles can be dispersed in a laminated glass, which sandwiches an intermediate film of resin or the like between plate glasses and is adhered thereto, a film-like composition used for glass of a building, or the like to suitably improve the absorption of ultraviolet rays and the reflection of near infrared rays. Further, since the oxide particles can enhance the transmission properties to visible light, the oxide particles can be also suitably used as an oxide composition for UV protection and near-infrared protection-purpose glass. The color characteristics of oxide particles can be controlled by controlling the ratio of M-OH bonds contained in the oxide particles. That is, after dispersing the oxide particles into glass, resin, or the like in a manner similar to the above laminated coating film, the functional groups in the oxide particles are changed by heat treatment or the like to control the color characteristics. This procedure is suitable for reduction of the number of steps as well as control of strict color characteristics like the above-mentioned multilayer coating film.

(Preferred Embodiment of Oxide Particles—1)

In the present invention, the primary particle diameter of the oxide particles is preferably in the range of 1 nm or more and 100 nm or less, and more preferably 1 nm or more and 50 nm or less. As described above, the ratio of M-OH bonds contained in the oxide particles may exist mainly on the surface of the particles. Thus, the oxide particles having a primary particle diameter of 100 nm or less have an increased surface area as compared with oxide particles having a primary particle diameter of more than 100 nm. Controlling the ratio of M-OH bonds of the oxide particles may have a large influence on color characteristics, such as absorption, reflection, hue, or color saturation. Thus, the oxide particles having a primary particle diameter of 100 nm or less have an advantage that the predetermined color characteristics, particularly those suitable for use as a coated product or film, can be suitably exhibited by controlling the ratio of M-OH bonds contained in the oxide particles.

(Preferred Embodiment of Oxide Particles—2)

In the present invention, preferably, for the oxide particles coated with at least a part of the surface of the particles, such as the silicon compound-coated iron oxide particles, the ratio of the average primary particle diameter of the oxide particles after coating with the compound to the average primary particle diameter of the oxide particles before coating is 100.5% or more and 190% or less. If the coating of the compound on the oxide particles is too thin, there is a possibility that the effect on the color characteristics of the oxide particles coated with the compound cannot be exhibited. Preferably, therefore, the average primary particle diameter of the oxide particles after coating with the compound may be 100.5% or more of the average primary particle diameter of the oxide particles. In addition, in the case where the coating is too thick or when covered with coarse aggregates, it is difficult to control the color characteristics. Preferably, therefore, the average primary particle diameter of the oxide particles after coating with the compound may be 190% or less of the average primary particle diameter of the oxide particles. The oxide particles coated with the compound according to the present invention may be a core-shell type compound-coated oxide particles in which the entire surface of the oxide particles serving as a core are uniformly coated with the compound. Furthermore, the compound-coated oxide particles are preferably compound-coated oxide particles in which two or more oxide particles are not aggregated and at least a part of the surface of a single oxide particle is coated with a compound. It may be compound-coated oxide particles in which at least a part of the surface of an aggregate formed by aggregation of a plurality of oxide particles with is coated with a compound.

(Preferred Embodiment of Oxide Particles—3)

The compound that covers at least a part of the surface of the oxide in the present invention is preferably a silicon compound, more preferably a compound containing silicon oxide, and still more preferably a compound containing amorphous silicon oxide. By including the amorphous silicon oxide in the silicon compound, it is possible to strictly control the color characteristics, such as transmittance, molar absorption coefficient, hue, and saturation, of the silicon compound-coated oxide particles. In the case where the silicon compound is crystalline silicon oxide, it is extremely difficult to cause M-OH (Si—OH) to exist, so that it may be difficult to control the color characteristics of the present invention in some cases.

(Method for Producing Oxide Particles: Apparatus)

Examples of the method for producing oxide particles according to the present invention include a process in which oxide particles are prepared by using a dilution-type reaction in a micro-reactor, a batch vessel, or by a pulverization method using a bead mill or the like; and, simultaneously with or after the preparation, controlling the ratio of M-OH bonds contained in oxide particles in a reaction vessel or the like. Furthermore, the apparatus and the method as described in JP 2009-112892, which are proposed by the applicant of the present application, may be used to control the production of oxide particles or to control both the production of oxide particles and the ratio of M-OH bonds contained in the oxide particles. The apparatus described in JP 2009-112892 has a stirring tank having an inner circumferential surface having a circular cross section and an agitating tool attached to the inner circumferential surface of the stirring tank with a slight gap therebetween. The stirring vessel comprises at least two fluid inlets and at least one fluid outlet. One of the fluid inlets introduces a first processed fluid containing one of the reactants among fluids to be processed into the stirred vessel. From the other one of the fluid inlets, a second processed fluid containing one of reactants different from the above reactant is introduced into the stirring vessel from a flow path different from the first treated fluid. At least one of the stirring tank and the stirring device rotates at a high speed with respect to the other, thereby bringing the fluid to be processed into a thin film state. In this thin film, the reactants included in at least both the first and second fluids to be treated are brought into react with each other. In order to introduce three or more fluids to be treated into the stirring tank, as illustrated in FIGS. 4 and 5 of the publication, three or more introduction pipes may be provided. Examples of the micro-reactor include apparatuses having the same principle as the fluid treatment apparatuses described in Patent Literatures 5 and 6.

As an example of the method for producing oxide particles according to the present invention, it is preferred to use a method for producing oxide particles by preparing a oxide raw-material liquid containing at least raw materials of oxide particles and a oxide-precipitation solvent containing at least an oxide precipitation substance for precipitating oxide particles, and producing oxide particles in a mixture fluid in which the oxide raw-material liquid and the oxide-precipitation solvent using a method of reaction, crystallization, separation, co-precipitation, or the like. As described above, in the method for producing oxide particles by the method of reaction, crystallization, separation, co-precipitation, or the like of the oxide particles, the particles having the ratio of M-OH bonds controlled to a predetermined value may be produced.

For the raw materials of the oxide particles in the present invention, it is not limited in particular. Any raw material that can be formed into an oxide by the method of reaction, crystallization, separation, co-precipitation, or the like may be applicable. For example, metal or metalloid elementary substances and compounds can be exemplified. Furthermore, in the present invention, the above metal or metalloid compounds are collectively referred to as a compound. Examples of the compound include, but not limited to, metal or metalloid salts, oxides, hydroxides, hydroxide oxides, nitrides, carbides, complexes, organic salts, organic complexes, organic compounds, and hydrates and organic solvates thereof. Examples of metal or metalloid salts include, but not particularly limited to, metal or metalloid nitrates and nitrites, sulfates and sulfites, formates and acetates, phosphates, phosphites, hypophosphites and chlorides, oxy salts or acetylacetonate salts or hydrates thereof, organic solvates, and the like. Examples of the organic compound include metal or metalloid alkoxides and the like. These metals or metalloid compounds may be used alone or may be used in combination of two or more.

Further, as in the case that the oxide particles are silicon compound-coated oxide particles, examples of silicon compound raw materials in the case of oxide particles containing a silicon compound include oxides and hydroxides of silicon, as well as compounds of silicon salts, alkoxides, and the like, and hydrates thereof. Examples of the compound include, but not limited to, silicates, such as sodium silicate, phenyltrimethoxysilane, methyltrimethoxysilane, methyltriethoxysilane, 3-glycidoxypropyl trimethoxysilane, 3-trifluoropropyl-trimethoxysilane, methacryloxypropyl triethoxysilane, tetramethoxysilane (TMOS), tetra Ethoxysilane (TEOS), oligomer condensates of TEOS, such as ethyl silicate 40, tetraisopropylsilane, tetrapropoxysilane, tetraisobutoxysilane, and tetrabutoxysilane, and other substances similar to any of them. As raw materials of the silicon compounds, furthermore, bis(triethoxysyril) methane, 1, 9-bis (triethoxycyril) nonane, diethoxy dichlorosilane, triethoxy chlorosilane, or the like may be used. When the oxide particles in the present invention are silicon compound-coated oxide particles, silicon may be preferably contained in an amount of 2 to 80%, more preferably 5 to 50% in relation to an element other than oxygen that constitutes oxide particles to be coated. The amount and type of the silicon compound material can be appropriately selected on the basis of the type of target oxide particles.

When the raw materials of the oxide particle or the silicon compound are solid, the raw materials of oxide particles may be in a molten state or a state in which the raw materials of the oxide particles are mixed or dissolved in a solvent (including a state of molecular dispersion). Even when the raw materials of the oxide particles are liquid or gas, the raw materials may be preferably used in a state of being mixed or dissolved in a solvent described later (including a state of molecular dispersion).

The oxide precipitation substance is not particularly limited as long as it is a substance capable of precipitating the raw materials of oxide particles contained in an oxide raw-material liquid as oxide particles. For example, an acidic substance or a basic substance can be used. At least an oxide-precipitation substance is preferably used in a state being mixed, dissolved, and molecularly dispersed in a solvent described later.

Examples of the basic substance include metal hydroxides, such as sodium hydroxide and potassium hydroxide; metal alkoxide, such as sodium methoxide and sodium isopropoxide; amine compounds, such as triethylamine, diethylaminoethanol, and diethylamine; and ammonia.

Examples of the acid substance include inorganic acids, such as aqua regia, hydrochloric acid, nitric acid, fuming nitric acid, sulfuric acid, and fuming sulfuric acid; and organic acids, such as formic acid, acetic acid, chloroacetic acid, dichloroacetic acid, oxalic acid, trifluoroacetic acid, trichloroacetic acid, and citric acid. The basic substance and the acidic substance can also be used for precipitating oxide particles. In addition, as described above, these substances can also be used as pH-adjusting agents for controlling the ratio of M-OH bonds contained in the oxide particles.

(Solvent)

Examples of the solvent used as a solvent for any of the oxide raw-material liquid and the oxide precipitation solvent include, for example, water, an organic solvent, and a mixed solvent composed of two or more of them. Examples of the water include tap water, ion-exchanged water, pure water, ultrapure water, and RO water (reverse osmosis water). Examples of the organic solvent include an alcohol compound solvent, an amide compound solvent, a ketone compound solvent, an ether compound solvent, an aromatic compound solvent, an carbon disulfide, an aliphatic compound solvent, a nitrile compound solvent, a sulfoxide compound solvent, a halogen compound solvent, an ester compound solvent, an ionic liquid, a carboxylic acid compound, and a sulfonic acid compound. The above solvents may be used alone or may be used as a mixture of two or more. Examples of the alcohol compound solvent include monohydric alcohols, such as methanol and ethanol, and polyols, such as ethylene glycol and propylene glycol.

(Dispersants, Etc.)

In the present invention, various additives, such as various dispersants and surfactants, may be used on the basis of purpose and necessity as far as they do not adversely affect the preparation of oxide particles. As a dispersant or surfactant, but not particularly limited to, any of various generally used and commercially available products, manufactured goods, and newly synthesized products can be used. For example, anionic surfactants, cationic surfactants, nonionic surfactants, and dispersing agents, such as various polymers, can be included. These dispersants and surfactants may be used alone or in combination of two or more of them. The surfactant and dispersant described above may be contained in at least one of the oxide raw material liquid and the oxide precipitation solvent. Further, the surfactant and the dispersant described above may be contained in another fluid different from the oxide raw material liquid and the oxide precipitation solvent.

(Control of Ratio of M-OH Bonds: Outline of Method)

In the present invention, the ratio of M-OH bonds is controlled. Here, the M-OH bond is a bond between a hydroxyl group (OH) and a single or two or more different elements (M) other than oxygen or hydrogen contained in the oxide particles as described above. As a concrete method, the control can be performed in two steps: one for preparing untreated oxide particles having a predetermined primary particle diameter, which can be a target for the control of the ratio of M-OH bonds; and other for treating the untreated oxide particles to control the ratio of M-OH bonds contained in such oxide particles. However, in the step of preparing the untreated oxide particles, the production of oxide particles by precipitation or the like may be performed such that particles in which the ratio of M-OH bonds is controlled to a predetermined value.

(Coating Composition or Film-Like Composition—1)

The coating oxide composition or film-like oxide composition of the present invention is applicable to any of those described in JP 2014-042891 and JP 2014-042892, but not particularly limited thereto. Alternatively, for example, it is applicable to any of those for various kinds of paints, such as solvent-based paints and water-based paints. If necessary, the coating oxide composition may further contain additives properly based on the purpose. Examples of the additive may include, in addition to pigments and dyes, a wetting agent, a dispersing agent, a color separation-preventing agent, a leveling agent, a viscosity adjusting agent, an anti-skinning agent, an anti-gelling agent, an anti-foaming agent, a thickener, an anti-sagging agent, a fungicide, an ultraviolet absorber, a film-forming aid, a surfactant, and a resin component. Examples of the resin component for the purpose of painting may include a polyester resin, a melamine resin, a phenol resin, an epoxy resin, a vinyl chloride resin, an acrylic resin, an urethane resin, a silicone resin, and a fluorine resin. A coated product to which a paint containing the coating oxide composition of the present invention is applied may be a single coated product composed of a single layer coated product, or a multilayer coated product composed of a plurality of coating compositions, such as those for laminated coating films as described in JP 2014-02891 and JP 2014-042892. Alternatively, such a coated product may be included in a paint containing a pigment or any of other paints, such as a clear paint. When the film-like composition is intended, the composition may include as needed a binder resin, a curing agent, a curing catalyst, a leveling agent, a surfactant, a silane coupling agent, a coloring agent such as a defoaming agent, a pigment or a dye, an antioxidant, and the like.

(Coating Composition or Film-Like Composition—2)

The coating oxide composition or the film-like oxide composition according to the present invention comprises: oxide particle power; a dispersion in which oxide particles are dispersed in a liquid dispersion medium; and oxide particles in the form of a dispersion in which oxide particles are dispersed in a solid, such as a glass or resin, or in a liquid or the like before solidification. The oxide particles contained in the coating oxide composition or in the film-like oxide composition may be composed of one oxide particle, or may be composed of an aggregate formed of a plurality of oxide particles being aggregated, or may be a mixture of both compositions. If the aggregate is composed of a plurality of oxide particles being aggregated, the diameter of the aggregate is preferably 50 nm or less. Further, the oxide composition may be used as one being dispersed in cosmetics or paint together with various pigments, or may be over-coated on a coating film. Furthermore, oxide particles can be used as a sole pigment. Examples of the liquid dispersion medium include water, such as tap water, distilled water, RO water (reverse osmic water), pure water, and ultrapure water; an alcohol solvent, such as methanol, ethanol, and isopropyl alcohol; a polyhydric alcohol solvent, such as propylene glycol, ethylene glycol, diethylene glycol, and glycerin; an ester solvent, such as ethyl acetate and butyl acetate; an aromatic solvent, such as benzene, toluene, and xylene; a ketone solvent, such as acetone and methyl ethyl ketone; a nitrile solvent such as acetonitrile; a silicone oil; a vegetable oil; and a wax. These dispersion media may be used alone or may be used in combination of two or more.

(Color of Coating Composition or Film-Like Composition)

The color of the coated product, film, or glass is not particularly limited. The coating oxide composition or film-like composition of the present invention can be used for the desired hue. The dye or pigment may be suitably formulated with a coating composition used in a coated product of white family, gray family, black family, for example colors from white color with the lightness of 10 to black color with the lightness of 0 in the Munsell colorimetric system; yellow to green families, for example colors with the hue of Y to BG in the Munsell hue circle; or blue to purple families, for example colors with the hue of B to P in the Munsell hue circle (each including metallic color). However, the colors are not limited to these colors, and colors with other hues may be applicable. Furthermore, a coating composition containing the oxide particles of the present invention can be suitably used for a coating film or a topcoat of a coated body exhibiting any of these colors to remarkably reduce loss of color development of each color. The design of the coated body can be therefore improved. Various pigments and dyes can be used as necessary for the pigment or dye contained in the coating composition. For example, all pigments and dyes registered in the color indexes can be used. Among them, for example, pigments for green color are pigments and dyes classified as C.I. I. Pigment Green; pigments for blue color are pigments and dyes classified as C.I. I. Pigment Blue; pigments for white color are pigments and dyes classified as C.I. I. Pigment Blue; pigments for yellow color are pigments and dyes classified as C.I. I. Pigment Yellow; pigments and dyes for red color are pigments and dyes classified as C.I. I. Pigment Red; and pigments and dyes for violet color are pigments and dyes classified as C.I. I. Pigment Violet. More specifically, the pigments and dyes include, for example, quinaridone pigments, such as C.I. I. Pigment Red 122 and C.I. I. Pigment Violet 19; diketopyrrolopyrrole pigments, such as C.I. I. Pigment Red 254 and C.I. I. Pigment Orange 73, such as such as quinaridone pigments; naphthol pigments, such as C. I. Pigment Red 150 and C.I. I. Pigment Red 170; perylene pigments, such as C. I. Pigment Red 123 and C.I. I. Pigment Red 179; and azo pigments, such as C. I. Azo Pigment Red 144. These pigments and dyes may be used alone or may be used in combination of two or more. Here, the oxide composition of the present invention may be used alone without being mixed with any of the above pigments and dyes or may be formulated in a coating or film-like composition. By containing the oxide particles in the coating composition according to the present invention, it is possible to construct a coated product having higher color saturation and a large difference between highlight and shade when used for laminated coating, for example, as described in JP 2014-04289 and JP 2014-042892. In other words, the coating composition containing the oxide particles is preferable because white sharpness does not occur in the shade, sharp metallic texture or the like can be obtained by an increase in blackness level, and the like. The oxide particles can be preferably included in a film-like composition for use in a transparent substrate, such as glass for buildings, vehicles, displays, and the like, because of its advantages of: effectively absorbing and shielding ultraviolet ray to enhance the safety to the human body, thereby suppressing the decomposition of organic matters or the like inside buildings and vehicles; effectively reflecting and shielding near infrared rays, thereby suppressing an increase in temperature in buildings and vehicles; and exhibiting high transmission properties to visible light. Thus, a film or glass with high transparency can be provided.

EXAMPLE

Hereinafter, the present invention will be described in more detail with reference to examples, but the present invention is not limited to only these examples. Pure water used in the examples below was of a conductivity of 0.86 μS/cm (measurement temperature: 25° C.), unless otherwise noted.

(Preparation of Samples for TEM Observation and Preparation of Samples for STEM Observation)

A part of the wet cake sample of oxide particles obtained in Examples was dispersed in propylene glycol and further diluted 100 times with isopropyl alcohol (IPA). The obtained diluted liquid was dropped on a collodion membrane or micro grid and dried to prepare a sample for TM observation or a sample for STEM observation.

(Transmission Electron Microscope and Energy Dispersive X-Ray Analysis Apparatus: TEM-EDS Analysis)

For observation and quantitative analysis of oxide particles by TEM-EDS analysis, a transmission electron microscope JEM-2100 (manufactured by JEOL Ltd.) equipped with an energy dispersive X-ray analyzer JED-2300 (manufactured by JEOL Ltd.) was used. For observation, conditions were an acceleration voltage of 80 kV and a magnification of ×25,000 or more. The particle diameter was calculated from the distance between the maximum outer circumferences of the oxide particles observed by TEM, and then the average value (average primary particle diameter) of the results of measuring the particle diameters of 100 particles were calculated. The molar ratio of the elemental components constituting the oxide in the oxide particles was calculated by TEM-EDS, and then the average value of the results of calculating the molar ratio for 10 or more particles was calculated.

(Scanning Transmission Electron Microscope and Energy Dispersive X-Ray Analysis Apparatus: STEM-EDS Analysis)

For the mapping and quantification of elements contained in the oxide particles by STEM-EDS analysis, an atomic resolution analytical electron microscope JEM-ARM 200F (manufactured by JEOL Ltd.) equipped with an energy dispersive X-ray analyzer Centurio (manufactured by JEOL Ltd.) was used. For observation, conditions were an acceleration voltage of 80 kV, a magnification of ×50,000 or more, and a beam size of 0.2 nm in diameter.

(X-Ray Diffraction Measurement)

For X-ray diffraction (XRD) measurement, a powder X-ray diffractometer EMPYREAN (manufactured by PANalytical Division, Spectris Co., Ltd.) was used. Measurement conditions were as follows: a measurement range of 10 to 100 [degrees 2-Theta], a Cu anticathode, a tube voltage of 45 kV, a tube current of 40 mA, and a scan rate of 0.3 degrees per minute. XRD measurement was carried out on the dry powder of oxide particles obtained in each example.

(Ft-Ir Measurement)

FT-IR measurement was carried out using a Fourier transform infrared spectrophotometer FT/IR-6600 (manufactured by JAJASCO Corporation). The measurement conditions were a resolution of 4.0 cm$^{-1}$ and an accumulated number of 1024, using an ATR method under nitrogen atmosphere. Waveform separation of peaks at wavenumbers of 100 cm$^{-1}$ to 1250 cm$^{-1}$ in the infrared absorption spectrum was performed using the spectral analysis program attached to the control software of FT/IR-6600 mentioned above to give a residual square sum of 0.01 or less. Measurement was carried out using dry powder of oxide particles obtained in Examples.

(Transmission Spectrum, Absorption Spectrum, Reflection Spectrum, Hue, and Color Saturation)

An ultraviolet-visible/near-infrared spectrophotometer (product name: V-770, manufactured by JAJASCO Corporation) was used for transmission spectrum, absorption spectrum, reflection spectrum, hue, and color saturation. The transmission spectrum was measured at 190 nm to 800 nm or 200 nm to 800 nm and the absorption spectrum at 190 nm to 800 nm or 200 nm to 800 nm, with a sampling rate of 0.2 nm at a low measurement rate. For a specific wavelength region, the values of transmittance at a plurality of measurement wavelengths were simply averaged and provided as the average transmittance. After measuring the absorption spectrum, a molar absorption coefficient at each measurement wavelength was calculated from both the absorbance obtained from the measurement result and the concentration of oxide in the dispersion. The results are graphically represented; the measurement wavelength is plotted on the horizontal axis and the molar absorption coefficient is plotted on the vertical axis. The measurement employed a liquid cell of 1 cm in thickness. Further, the molar absorption coefficients at a plurality of measurement wavelengths of 190 nm (200 nm) to 380 nm were simply averaged to calculate an average molar absorption coefficient.

The measurement of a reflection spectrum was carried out under conditions of a measurement range of 200 nm to 2500 nm, a sampling rate of 2.0 nm, a measurement rate of medium, and double beam spectrophotometry as a measurement method. Total reflection measurement was performed to measure specular reflection and diffused reflection. For the measurement on powders, a standard white plate (product name: Spectralon (trademark), manufactured by Labsphere) was used for background measurement (baseline setting). The reflection spectrum was measured using the dry powder of the silicon compound-coated iron oxide particles obtained in each example. For a specific wavelength region, the values of reflectance at a plurality of measurement wavelengths were simply averaged, thereby giving the average reflectance value. From the reflection spectrum measurement results, hue and saturation were measured under the conditions that the colorimetric system was an L*a*b* colorimetric system, the field of view was 2 (deg.), an optical source was D65-2, the color-matching function was JIS Z8701:1999, and a date interval was 5 nm. Then, each value of the resulting L*, a*, and b* was substituted into the equations of hue H=b*/a* and color saturation C=((a*)$^2$+(b*)$^2$)$^{1/2}$ to calculate both hue and color saturation.

Example 1

Hereinafter, Example 1 describes silicon compound-coated iron oxide particles in which at least part of the surface of iron oxide particles provided as oxide particles is coated with a silicon compound. Using a high-speed rotation-type dispersion emulsifier CLEARMIX (product name: CLM-2.2S, manufactured by M Technique Co., Ltd.), an oxide raw-material liquid (liquid A), an oxide precipitation solvent (liquid B), and a silicon compound raw-material liquid (liquid C) were prepared. Using CLEARMIX at a rotor rotational speed of 20,000 rpm, the respective ingredients of the oxide raw-material liquid were stirred and homogeneously mixed together at a preparation temperature of 40° C. for 30 minutes to prepare an oxide raw-material liquid. Also, based on the formulation of the oxide precipitation solvent shown in Example 1 of Table 1, using CLEARMIX at a rotor rotational speed of 15,000 rpm, the respective ingredients of the oxide raw-material liquid were stirred and homogeneously mixed together at a preparation temperature of 45° C. for 30 minutes to prepare an oxide precipitation solvent. Furthermore, based on the formulation of the silicon compound raw-material liquid show in Example 1 of Table 1, using CLEARMIX at a rotor speed of 6,000 rpm, the respective ingredients of the silicon compound raw-material liquid were stirred and homogeneously mixed together at a preparation temperature of 20° C. for 10 minutes to prepare a silicon compound raw-material liquid. Regarding substances indicated by chemical formulas and abbreviations described in Table 1, 97 wt % $H_2SO_4$ used was concentrated sulfuric acid (manufactured by Kishida Chemical Co., Ltd.), NaOH used was sodium hydroxide (manufactured by KANTOCHEMICAL CO., LTD.), TEOS used was tetraethyl orthosilicate (manufactured by Wako Pure Chemical Industries, Ltd.), and $Fe(NO_3)_3 \cdot 9H_2O$ used was iron nitrate nonahydrate (manufactured by KANTOCHEMICAL CO., LTD.).

Subsequently, the prepared oxide raw-material liquid, oxide precipitation solvent, and silicon compound raw-material liquid were mixed together using a fluid treatment apparatus described in Patent Literature 6 of the present applicant. Here the fluid treatment apparatus described in Patent Literature 6 is one described in FIG. 1(B) of the literature. The apparatus used has a concentric annular shape that surrounds an opening at the center of the processing surface 2, which is configured as a disk in which openings d20 and d30 of second and third introduction portions are formed in a ring shape. In particular, an oxide raw-material liquid as liquid A was introduced from the first introduction portion d1 into between the processing surfaces 1 and 2, and an oxide precipitation solvent as liquid B was introduced from the second introduction portion d2 into between the processing surfaces 1 and 2 while driving a processing portion 10 at a rotational speed of 1,130 rpm to allow the oxide raw materials and the oxide precipitation solvent to be mixed in a thin film fluid, thereby precipitating iron oxide particles to be provided as a core between the processing surfaces 1 and 2. Then, a silicon compound raw-material liquid as liquid C was introduced from the third introduction portion d3 into between the processing surfaces 1 and 2 to mix it with a mixture fluid that contains iron oxide particles to be provided as a core in the thin film fluid. A silicon compound was precipitated on the surface of the iron oxide particles to be provided as a core. Then, a discharge liquid containing silicon compound-coated iron oxide particles (hereinafter, also referred to as a dispersion of silicon compound-coated iron oxide particles) from between the processing surfaces 1 and 2 of the fluid treatment apparatus.

Subsequently, the discharged dispersion of silicon compound-coated iron oxide particles was collected in a beaker b through a vessel v.

Table 2 represents operating conditions of the fluid treatment apparatus, average primary particle diameters calculated from the TEM observation results of the obtained silicon compound-coated iron oxide particles, the molar ratios of Si/Fe calculated from TEM-EDS analysis, and calculated values calculated from the formulations and introduction flow rates of liquid A, liquid B, and liquid C. The introduction temperature (liquid feed temperature) and the introduction pressure (liquid feed pressure) of the liquid A shown in Table 2 was the actual temperature of liquid A under the introduction pressure in the first introduction portion d1. Likewise, the introduction temperature of liquid B is the actual temperature of liquid B under the introduction pressure in the second introduction portion d2. The introduction temperature of liquid C is the actual temperature of liquid C under the introduction pressure in the third introduction portion d3.

The measurement of pH was performed using a pH meter of type D-51 made in HORIBA, Ltd. Before the introduction of liquid A, liquid B, and liquid C into the fluid treatment apparatus, the pH vales of these liquids were measured at room temperature. It was difficult to measure both the pH of the mixed fluid immediately after mixing the oxide raw-material liquid and the oxide precipitation solvent and the pH immediately after mixing the fluid containing the core iron oxide particles and the silicon compound raw-material liquid. Thus, the dispersion of silicon compound-coated iron oxide particles was discharged from the apparatus and then collected into beaker b. Then, the pH of the dispersion was measured at room temperature.

From the dispersion of silicon compound-coated iron oxide particles, which was discharged from the fluid treatment apparatus and then collected into the beaker b, a dried power and a wet cake sample were prepared. The preparation method was carried out according to a conventional method of this type of treatment. The discharged dispersion of silicon compound-coated iron oxide particles was collected. The silicon compound-coated iron oxide particles were then precipitated, and a resulting supernatant was removed. Subsequently, the precipitated particles were subjected to three cycles of washing with 100 parts by weight of pure water and precipitation, followed by three cycles of washing with pure water and precipitation. After washing the silicon compound-coated iron oxide particles, a part of wet cake of the silicon compound-coated iron oxide particles was dried at 25° C. under −0.10 PaG for 20 hours to give a dried power. The remainder was taken as a wet cake sample.

TABLE 1

| Example 1 | | | | | | | | | | |
|---|---|---|---|---|---|---|---|---|---|---|
| Formulation of the 1st fluid (liquid A: Oxide raw material liquid) | | | | | Formulation of the 2nd fluid (liquid B: Oxide precipitation solvent) | | | | | |
| Formulation | | | | | Formulation | | | | | |
| Raw material | [wt %] | Raw material | [wt %] | pH | pH [° C.] | Raw material | [wt %] | Raw material | [wt %] | pH | pH [° C.] |
| $Fe(NO_3)_3 \cdot 9H_2O$ | 2.00 | Pure water | 98.00 | 1.8 | 26.6 | NaOH | 9.00 | Pure water | 91.00 | >14 | — |

| Formulation of the 3rd fluid (liquid C: Silicon compound raw material liquid) | | | | | | | |
|---|---|---|---|---|---|---|---|
| Formulation | | | | | | | |
| Raw material | [wt %] | Raw material | [wt %] | Raw material | [wt %] | pH | pH [° C.] |
| Pure water | 96.36 | 97 wt % $H_2SO_4$ | 2.46 | TEOS | 1.19 | <1 | — |

TABLE 2

| Example 1 | | | | | | | | | | | | | |
|---|---|---|---|---|---|---|---|---|---|---|---|---|---|
| Introduction flow rate (liquid feed flow rate) [ml/min] | | | Introduction temperature (liquid feed temperature) [° C.] | | | Introduction pressure (liquid feed pressure) [MPaG] | | | Discharged liquid | | Shell/Core Si/Fe [Molar ratio] | | Average primary particle diameter [nm] |
| Liquid A | Liquid B | Liquid C | Liquid A | Liquid B | Liquid C | Liquid A | Liquid B | Liquid C | pH | Temp. [° C.] | Calc. value | EDS | |
| 400 | 40 | 50 | 141 | 87 | 86 | 0.412 | 0.10 | 0.20 | 11.02 | 30.6 | 0.14 | 0.14 | 9.60 |

FIG. 3 represents the result of mapping with the STEM of silicon compound-coated iron oxide particles obtained in Example 1, and FIG. 4 represents the result of the line analysis at the position indicated by the broken line in the HAADF image of FIG. 3. As is evident from FIGS. 3 and 4, in the silicon compound-coated iron oxide particles obtained in Example 1, some of the particles were observed not entirely covered with silicon oxide, and silicon compound-coated iron oxide particles in which part of the surface of iron oxide particles was covered with a silicon compound were observed.

The silicon compound-coated iron oxide particles obtained in Example 1 were dehydrated by heat treatment with an electric furnace to change functional groups contained in the silicon compound-coated iron oxide particles. The heat treatment conditions were as follows: untreated in Example 1; 200° C. in Example 1-2; 400° C. in Example 1-3; 600° C. in Example 1-4; and 800° C. in Example 1-5. For each heat treatment temperature, the duration of heat treatment was 30 minutes. FIG. 1 represents the results of mapping with the STEM of the silicon compound-coated iron oxides obtained in Example 1-5. FIG. 2 represents the results of line analysis at the position indicated by the broken line in the HAADF image of FIG. 1.

As illustrated in FIGS. 1 and 2, the silicon compound-coated iron oxide particles obtained in Example 1-5 were observed as iron oxide particles in which the entire particles were coated with a silicon compound.

FIG. 5 represents the results of IR measurement of the silicon compound-coated oxide particles obtained in Example 1 and Example 1-5 by the ATR method. The IR measurement results of the silicon compound-coated oxide particles obtained in Example 1-5 can be seen such that, as compared with the results of IR measurement on the silicon compound-coated oxide obtained in Example 1, broad peaks around 1650 $cm^{-1}$ and around 3400 $cm^{-1}$ are small and broad peaks in the vicinity of 800 $cm^{-1}$ to 1250 $cm^{-1}$ are shifted toward the higher wavenumbers.

The results obtained by waveform separation peaks at wavenumbers of 100 $cm^{-1}$ to 1250 $cm^{-1}$ in the IR measurement results of Example 1 or Example 1-5 described above are represented in FIG. 6 for Example 1 and FIG. 7 for Example 1-5. As is evident from FIGS. 6 and 7, the total area ratio of each peak of the waveform-separated peaks for the M-OH bonds to the total peak components of waveform-separated peaks in Example 1-5 is found to be small as compared with Example 1. In other words, it was shown that the ratio of M-OH bonds contained in oxide particles of Example 1-5 is lower than that of the ratio of M-OH bonds contained in oxide particles of Example 1. The results show that a factor that appears to shift broad peaks in the vicinity of 800 $cm^{-1}$ to 1250 $cm^{-1}$ toward the higher wavenumbers may be a decrease in the ratio of peaks contained in the silicon compound-coated iron oxide particles, particularly the ratio of peaks waveform-separated to M-OH bond 1 (in the vicinity of 936 $cm^{-1}$ in Example 1 and in the vicinity of 912 $cm^{-1}$ in Example 1-5).

FIG. 8 represents the results of XRD measurement of silicon compound-coated iron oxide particles obtained in Example 1-5. As is evident from FIG. 8, only the peaks that came from $\alpha\text{-}Fe_2O_3$ were detected in the XRD measurement. In other words, it was confirmed that a silicon compound confirmed in the STEM and IR measurements was non-crystalline.

FIG. 9 represents reflection spectra of oxide particles obtained in Example 1 and Examples 1-2 to 1-5 for light rays at wavelengths of 200 nm to 2500 nm. First, as is evident from the figure, with respect to the reflectance for the rays of the near-infrared region at wavelengths of 780 nm to 2500 nm, the silicon compound-coated oxide particles obtained in Example 1-5 is higher than the silicon compound-coated oxide particles obtained in Example 1. Waveform separation was performed on peaks at wavenumbers of 100 $cm^{-1}$ to 1250 $cm^{-1}$ in the IR spectrum. For the total area of each of the waveform-separated peaks (ratio of M-OH [%]), descending order is Example 1-5, Example 1-4, Example 1-3, Example 1-2, and Example 1. For the average reflectance for light rays at wavelengths of 780 nm to 2500 nm, ascending order is Example 1-5, Example 1-4, Example 1-3, Example 1-2, and Example 1. FIG. 10 represents a graph of the average reflectance for light rays at wavelengths of 780 nm to 2500 nm for the ratio of M-OH [%]. FIG. 10 represents, in addition to Example 1 and Examples 1-2 to 1-5, the data of the average reflectance value for light beams at wavelengths of 780 nm to 2500 nm of silicon compound-coated iron oxide particles on which the heat treatment temperature was changed to change the ratio of M-OH bonds. As is evident from FIG. 10, the lower the ratio of M-OH, the higher the average reflectance for light rays at wavelengths of 780 nm to 2500 nm tended to be observed. In other words, silicon compound-coated iron oxide particles, which is one kind of the oxide particles of the present invention, are the silicon compound-coated iron oxide particles having as one of the color characteristics the average reflectance for light rays at wavelengths of 780 nm to 2500 nm controlled by controlling the ratio of M-OH bonds contained in the silicon compound-coated iron oxide particles, preferably having the average reflectance for light rays at wavelengths of 780 nm to 2500 nm enhanced by lowering the ratio of M-OH bonds, and more preferably having the average reflectance value for light rays at wavelengths of 780 nm to 2500 nm enhanced to 50% by lowering the ratio of M-OH bonds to 8% or more and 14.5% or less. The use of such silicon compound-coated iron oxide particles in a coating composition allows the coating composition to be suitably used in a paint to exert an advantageous effect of suppressing a rise in temperature of a coated body irradiated with sunlight.

Figure 11:
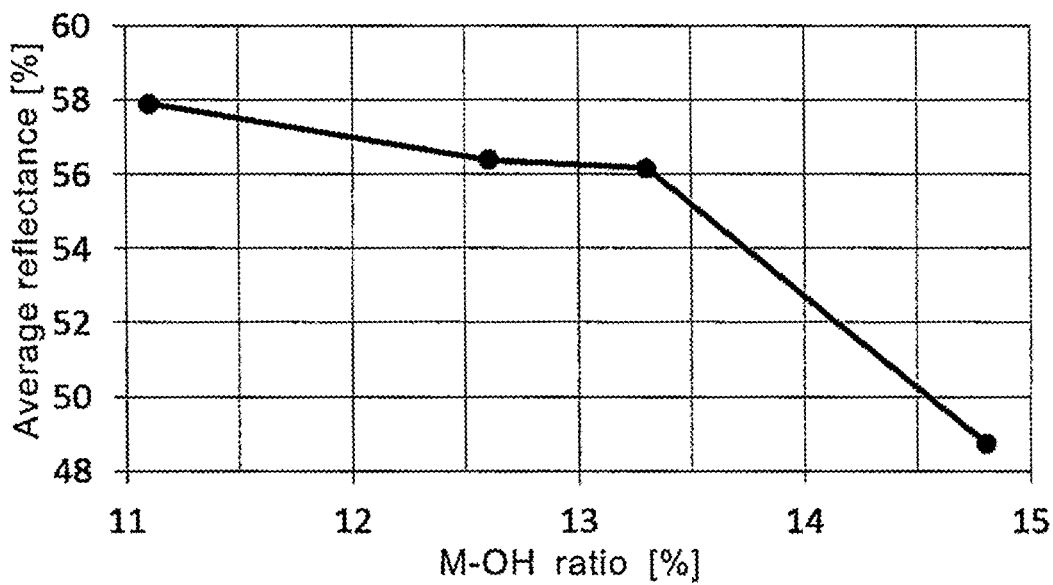
FIG. 11 is a graphic diagram illustrating the average reflectance for light rays at wavelengths of 780 nm to 2500 nm for the ratio of M-OH bonds contained in silicon compound-coated iron oxide particles obtained in the examples of the present invention where an aqueous dispersion of silicon compound-coated iron oxide particles is subjected to a heat treatment.

FIG. 11 is a graphic diagram illustrating the average reflectance for light rays at wavelengths of 780 nm to 2500 nm for the ratio of M-OH bonds contained in silicon compound-coated iron oxide particles, which were heat-treated such that an aqueous dispersion of the silicon compound-coated iron oxide particles obtained in Example 1 was allowed to stand at 100° C. for 0.5 hours, 1.0 hour, and 2.0 hours. The ratio of M-OH bonds in each treatment time period, which was determined by the IR measurement and waveform separation, was follows: 14.8% in Example 1 (without treatment); 13.3% in 0.5-hour treatment; 12.6% in 1.0 hour-treatment; and 11.1% in 2.0-hour treatment. As is evident from FIG. 11, the lower the ratio of M-OH, the higher the average reflectance for light rays at wavelengths of 780 nm to 2500 nm was observed. In the present invention, when the ratio of M-OH bonds contained in the silicon compound-coated iron oxide particles is controlled by heat treatment, the oxide particles may be in a dry state or may be in a state of being dispersed in a dispersion medium.

Figure 12:
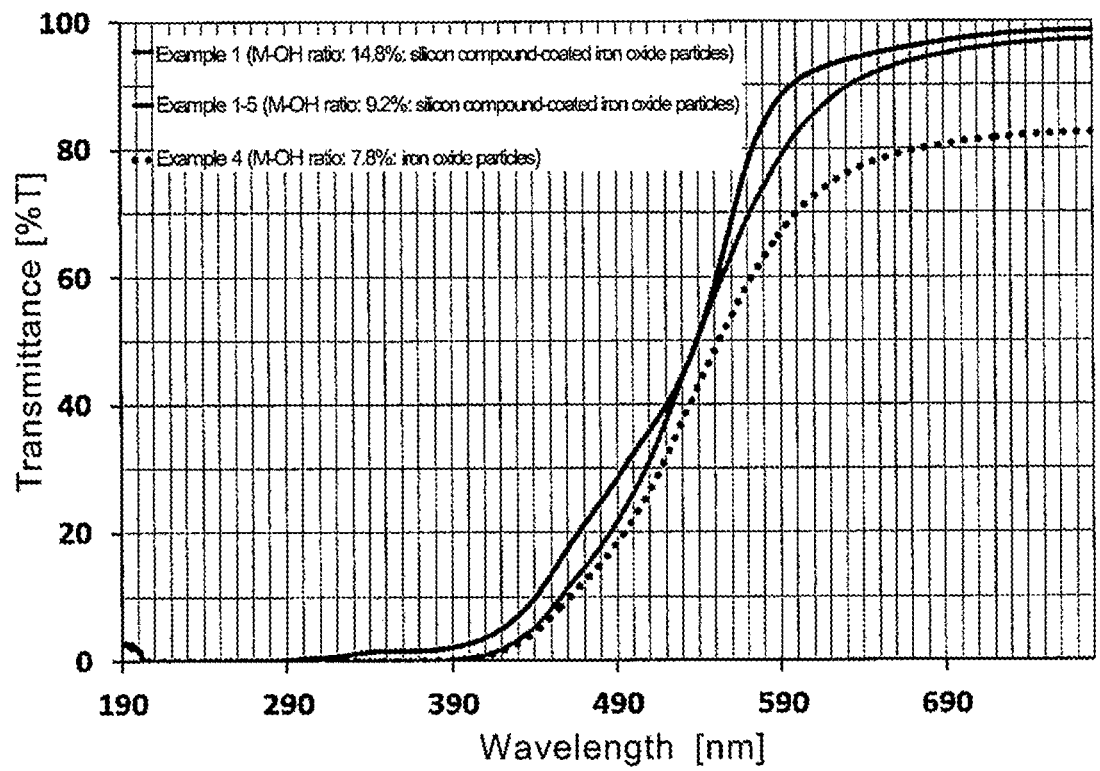
FIG. 12 is a diagram illustrating the results of the transmission spectrum measurement of dispersions in which silicon compound-coated iron oxide particles obtained in Example 1 and Example 1-5 and iron oxide particles obtained in Example 4 of the present invention were respectively dispersed in propylene glycol.

FIG. 12 represents transmission spectra of silicon compound-coated iron oxide particles obtained in Example 1 and Example 1-5 and, for comparison, a dispersion of iron oxide particles obtained in Example 4 described below, which have the surface not coated with a silicon compound, being dispersed as $Fe_2O_3$ at a concentration of 0.05% by weight in propylene glycol.

The iron oxide particles, in which the surface thereof was not coated with the silicon compound, obtained in Example 4 were produced in the same manner as in Example 1 to obtain iron oxide particles having the same particle diameter as in Example 1, except that the third fluid in Example 1 is not used and that the third introduction portion and the opening d30 of the third introduction portion of the fluid treatment apparatus described in Patent Literature 6 were not formed.

As illustrated in. 12, by changing the ratio of M-OH bonds contained in the silicon compound-coated iron oxide particles, it is found that the shape of the transmission spectrum changes. Furthermore, it is found that the silicon compound-coated iron oxide particles obtained in Example 1 and Example 1-5 have higher transmittance to light rays at wavelengths of 600 nm to 780 m, compared with the iron oxide of Example 4 having the surface thereof not coated with a silicon compound. The similar results as in Example 1 and Example 1-5 were obtained for Examples 1-2 to 1-4. In the present invention, the ratio of M-OH bonds contained in the silicon compound-coated iron oxide particles is 9% or more and 15% or less. In the transmission spectrum of the dispersion in which the silicon compound-coated iron oxide particles are dispersed in a dispersion medium, it is preferable that the transmittance for light rays at a wavelength of 380 nm is 5% or less and the transmittance for light rays at a wavelength of 600 nm is 80% or more.

Next, silicon compound-coated iron oxide particles were prepared such that, at the time of preparing the silicon compound-coated iron oxide particles in Example 1, the flow rate of the second fluid (liquid B) was changed to vary the pH of the discharge liquid. Table 3 describes the ratio of M-OH [%], which is the area ratio of peaks with respect to the total area of each waveform-separated peak after performing waveform separation on peaks at wavenumbers of 100 cm$^{-1}$ to 1250 cm$^{-1}$. The ratio of M-OH bonds was changed by controlling the pH value for the precipitation of silicon compound-coated oxide particles.

silicon compound-coated iron oxide particles. As is evident from FIG. 14, the silicon compound-coated iron oxide particles obtained by the modification of functional groups of silicon compound in the silicon compound-coated iron oxide particles in Example 1 are those having the maximum reflectance of 18% or less with respect to light rays at wavelengths of 400 nm to 620 nm of the above silicon compound-coated iron oxide particles in the case that the ratio of M-OH bonds contained in the silicon compound-coated iron oxide particles is in the range of 10% or more and 15% or less, exerting the effect of suppressing the reflection of light other than red. Because such a silicon compound-coated iron oxide particles can reduce the amount of light rays except red, it can be suitably used in a coating composition, such as a laminated paint film with red.

Figure 15:
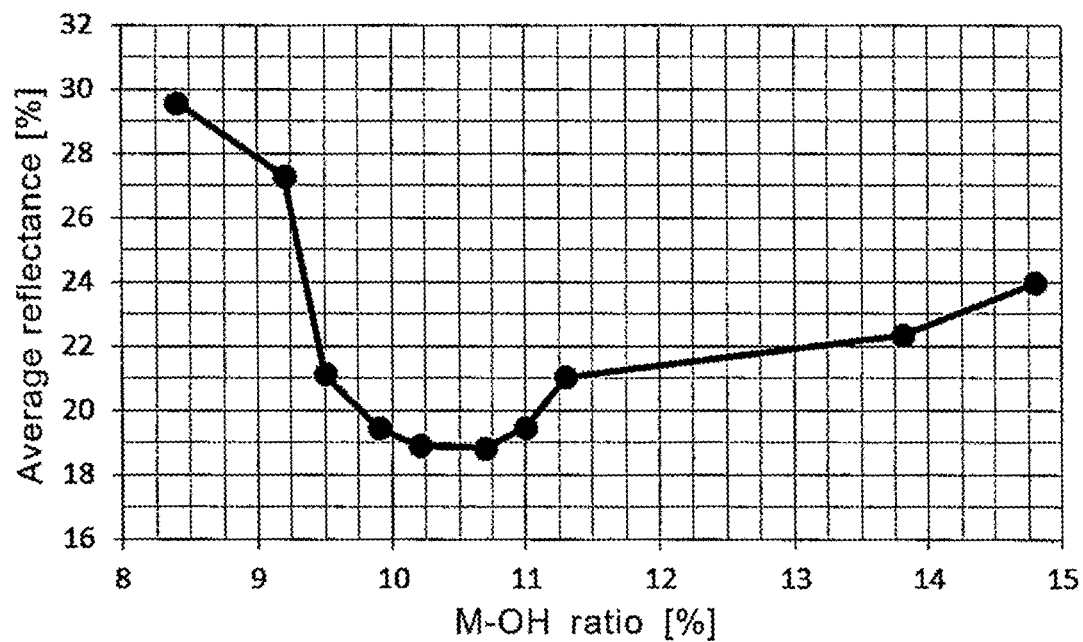
FIG. 15 is a graphic diagram illustrating the average reflectance for light rays at wavelengths of 620 nm to 750 nm for the ratio of M-OH bonds contained in silicon compound-coated iron oxide particles obtained in the examples of the present invention.

FIG. 15 is a graphic diagram illustrating the average reflectance for light rays at wavelengths of 620 nm to 750 nm for the ratio of M-OH bonds contained in the silicon compound-coated iron oxide particles obtained in Example 1 by modification of functional groups contained in the modification of functional groups. As is evident from FIG. 15, in the case that the ratio of M-OH bonds contained in the silicon compound-coated iron oxide particles is in the range of 5% or more and 13% or less, the average reflectance of the oxide particles for light rays at wavelengths of 620 nm to 750 nm is 22% or less. Such silicon compound-coated iron oxide particles are able to reduce the reflectance in the red region. Thus, the silicon compound-coated iron oxide particles are preferable because, when used for a multilayer coating film, the effect of increasing the difference between highlight and shade is large. Among the examples represented in FIG. 15, the silicon compound-coated iron oxide particles in which the ratio of M-OH bonds contained therein is 8% more and 9.3% or less or more than 13.3% and 15% or less and the average reflectance of the oxide particles for light rays at wavelengths of 620 nm to 750 nm is higher than 22% strongly develops red color as compared with the silicon compound-coated iron oxide in which the average reflectance thereof for light rays at wavelengths of 620 nm to 750 nm is 22% or less. The particles can be suitably used for reduction of a red pigment separately used for forming

TABLE 3

| Example | Introduction flow rate (liquid feed flow rate) [ml/min] | | | Introduction temperature (liquid feed temperature) [° C.] | | | Introduction pressure (liquid feed pressure) [MPaG] | | | Discharged liquid | | Shell/Core Si/Fe [Molar ratio] | | Average primary particle diameter [nm] | M-H ratio [%] |
|---|---|---|---|---|---|---|---|---|---|---|---|---|---|---|---|
| | Liquid A | Liquid B | Liquid C | Liquid A | Liquid B | Liquid C | Liquid A | Liquid B | Liquid C | pH | Temp. [° C.] | Calc. value | EDS | | |
| 1-6 | 400 | 50 | 50 | 141 | 87 | 86 | 0.402 | 0.10 | 0.20 | 12.17 | 29.6 | 0.14 | 0.14 | 9.58 | 14.0 |
| 1-7 | 400 | 39 | 50 | 141 | 87 | 86 | 0.396 | 0.10 | 0.20 | 9.42 | 32.9 | 0.14 | 0.14 | 9.67 | 14.2 |
| 1-8 | 400 | 38 | 50 | 141 | 87 | 86 | 0.382 | 0.10 | 0.20 | 6.87 | 31.8 | 0.14 | 0.14 | 9.59 | 13.8 |

Figure 13:
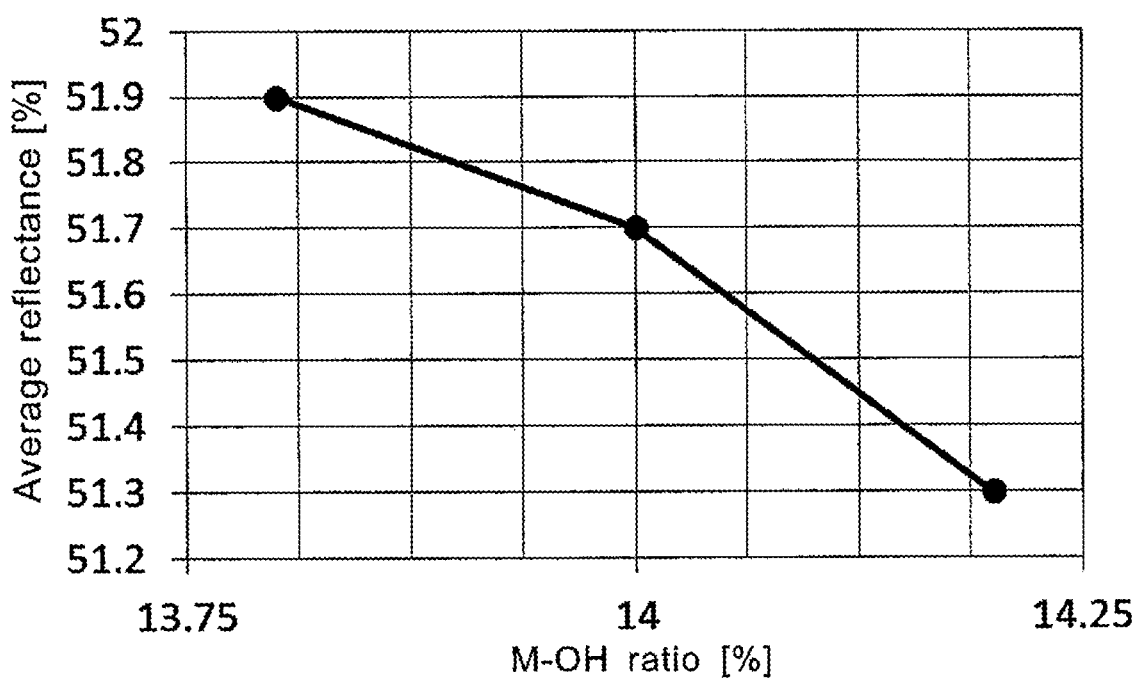
FIG. 13 is a graphic diagram illustrating the average reflectance for light rays at wavelengths of 780 nm to 2500 nm for the ratio of M-OH bonds contained in silicon compound-coated iron oxide particles obtained in the examples of the present invention.

FIG. 13 is a graphic diagram illustrating the average reflectance for light rays at wavelengths of 780 nm to 2500 nm for the ratio of M-OH bonds contained in the silicon compound-coated iron oxide particles obtained in Examples 1-5 to 1-8. As is evident from FIG. 13, the lower the ratio of M-OH, the higher the average reflectance for light rays at wavelengths of 780 nm to 2500 nm tended to be observed as with Example 1 to Example 1-5.

Figure 14:
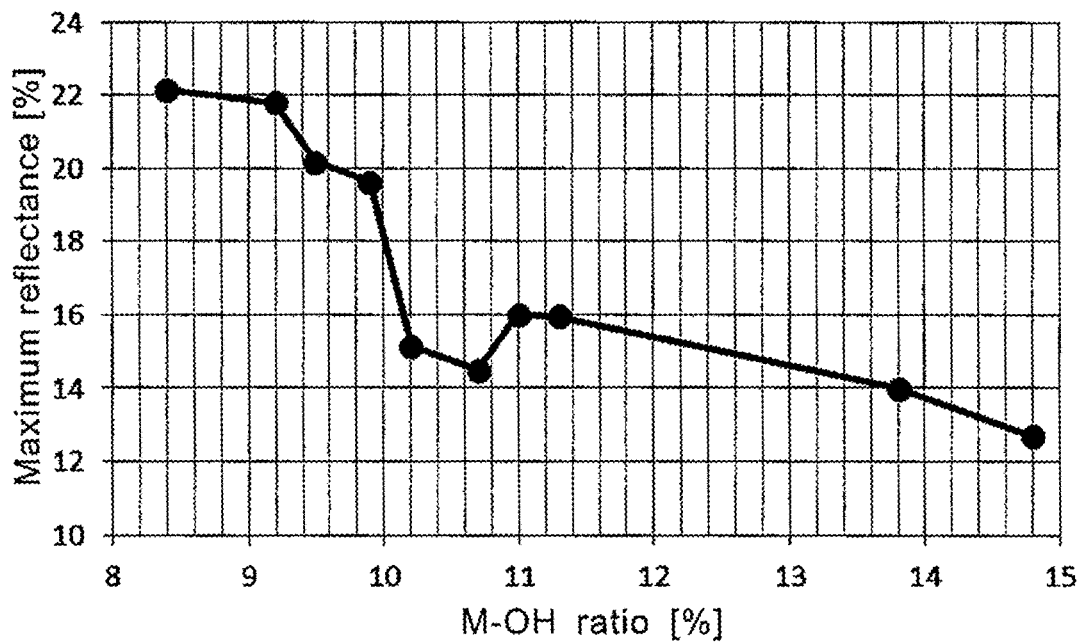
FIG. 14 is a graphic diagram illustrating the maximum reflectance for light rays at wavelengths of 400 nm to 620 nm for the ratio of M-OH bonds contained in silicon compound-coated iron oxide particles obtained in the examples of the present invention.

FIG. 14 is a graphic diagram illustrating the maximum reflectance for light rays at wavelengths of 400 nm to 620 nm for the ratio of M-OH bonds contained in silicon compound-coated iron oxide particles obtained in Example 1 by modification of functional groups contained in the a red coating film when used as a red pigment or for a general paint, as well as suitably used for fine adjustment of color and the like.

Figure 16:
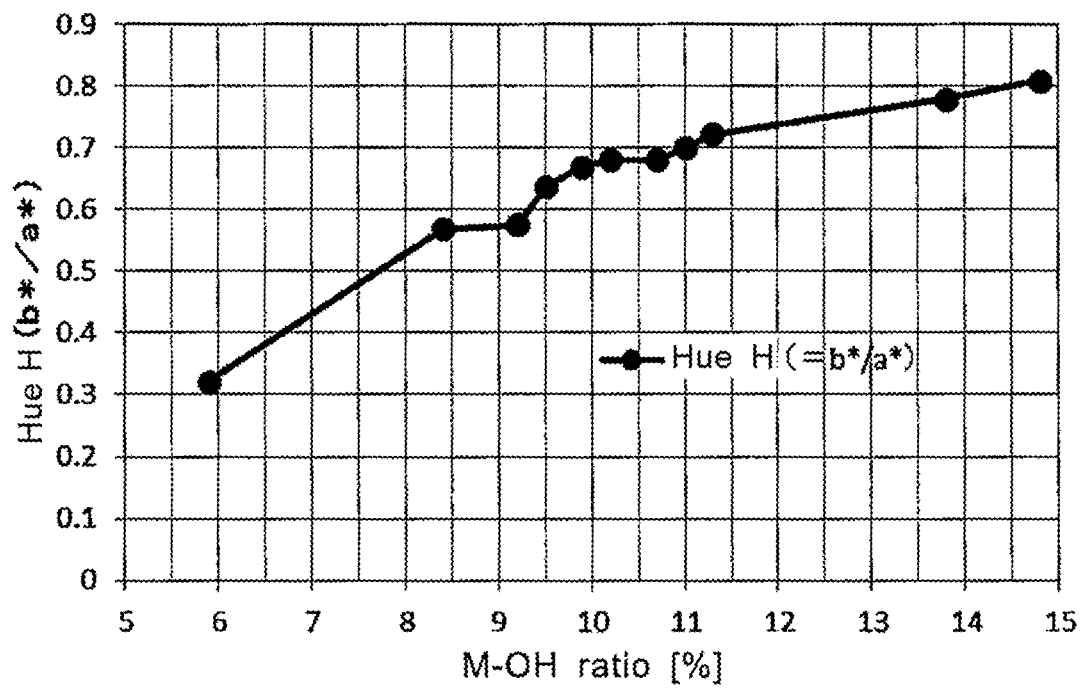
FIG. 16 is a graphic diagram illustrating hue in an L*a*b* colorimetric system for the ratio of M-OH bonds contained in silicon compound-coated iron oxide particles obtained in the examples of the present invention.

FIG. 16 is a graphic diagram illustrating hue in an L*a*b* colorimetric system for the ratio of M-OH bonds contained in silicon compound-coated iron oxide particles obtained in Example 1. In addition, Table 4 represents hue H of the silicon compound-coated iron oxide particles obtained in Example 1 and Examples 1-2 to 1-5 and hue H of the iron oxide particles obtained in Example 4. As is evident from Table 4, the ratio of the M-OH bonds contained in the iron oxide particles in which the surface thereof is not coated with the silicon compound is lower as compared with the silicon compound-coated iron oxide particles. In addition, the hue of the iron oxide particles is out of the range of the hue of silicon compound-coated iron oxide particles. The control of the color characteristics by controlling the M-OH bonds of the present invention can also be carried out by coating at least a part of the surface of the particles. It can be understood that the hue of the silicon compound-coated iron oxide particles cannot be achieved by merely converting the iron oxide particles into nano-particles. In the silicon compound-coated iron oxide particles of the present invention, preferably, the ratio of M-OH bonds contained therein is 8% or more and 15% or less, and hue H (=b*/a*) in an L*a*b* colorimetric system is in the range of 0.5 to 0.9.

TABLE 4

| | Example | | | | | |
|---|---|---|---|---|---|---|
| | 1 | 1-2 | 1-3 | 1-4 | 1-5 | 4 |
| M-OH ratio [%] | 14.8 | 11.3 | 10.7 | 9.9 | 9.2 | 7.8 |
| Hue H (=b*/a*) | 0.81 | 0.72 | 0.68 | 0.67 | 0.58 | 0.96 |

Figure 17:
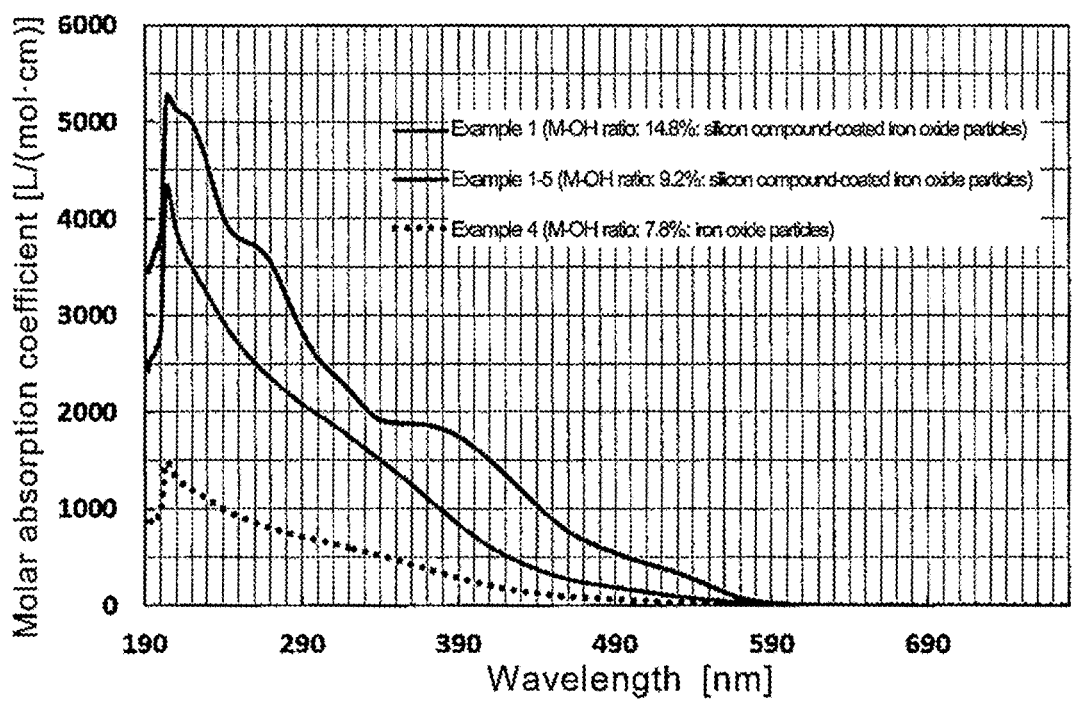
FIG. 17 is a graphic diagram illustrating the molar absorption coefficient of a dispersion medium in which silicon compound-coated iron oxide particles obtained in Example 1 and Example 1-5 of the present invention are dispersed in polypropylene glycol and the molar absorption coefficient of a dispersion medium in which iron oxide particles obtained in Example 4 of the present invention is dispersed in polypropylene glycol.
Figure 18:
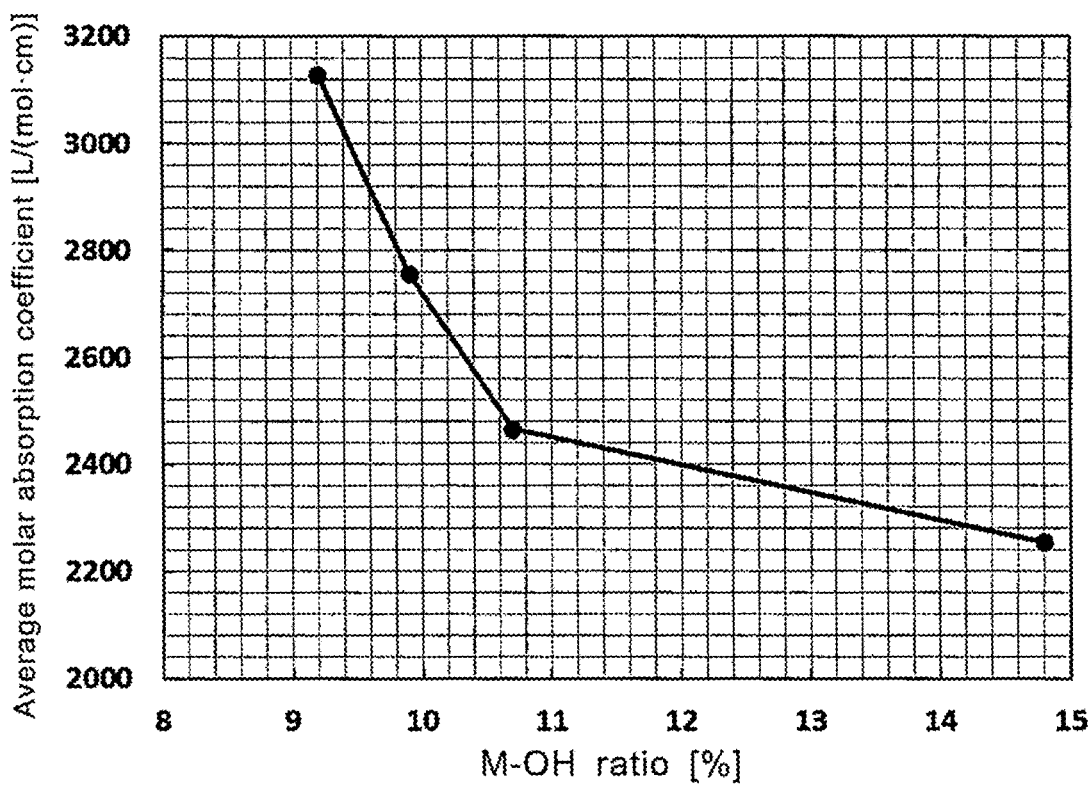
FIG. 18 is a graphic diagram illustrating the average molar absorption coefficient for light rays at wave lengths of 190 nm to 380 nm for a dispersion in which silicon compound-coated iron oxide particles are dispersed in propylene glycol with respect to the ratio of M-OH bonds contained in the silicon compound-coated iron oxide particles obtained in each of Examples 1, 1-3, 1-4, and 1-5.

FIG. 17 is a graphic diagram that represents, with respect to the measurement wavelength, an absorption spectrum of a dispersion medium in which silicon compound-coated iron oxide particles obtained in Example 1 and Example 1-5 of the present invention are dispersed in polypropylene glycol and an absorption spectrum of a dispersion in which iron oxide particles obtained in Example 4 are dispersed in polypropylene glycol, and represents a molar absorption coefficient calculated from the concentration of silicon compound-coated iron oxide particles (as $Fe_2O_3$) in a dispersion used in the measurement. Furthermore, FIG. 18 is a graphic diagram illustrating the average molar absorption coefficient for light rays at wave lengths of 190 nm to 380 nm with respect to the ratio of M-OH bonds contained in the silicon compound-coated iron oxide particles obtained in each of Examples 1, 1-3, 1-4, and 1-5. Furthermore, in Table 5, the ratio of M-OH in the silicon compound-coated iron oxide particles obtained in each of Example 1 and Examples 1-3 to 1-5 and the average molar absorption coefficient thereof at waveforms of 190 nm to 380 nm are represented together with the average molar absorption coefficient of the iron oxide particles obtained in Example 4 at wavelengths of 190 nm to 380 nm.

TABLE 5

| | Example | | | | |
|---|---|---|---|---|---|
| | 1 | 1-3 | 1-4 | 1-5 | 4 |
| M-OH ratio [%] | 14.8 | 10.7 | 9.9 | 9.2 | 7.8 |
| Average molar absorption coefficient [L/(mol · cm)] (190-380 nm) | 2255 | 2467 | 2756 | 3129 | 770 |

As is evident from FIG. 18 and Table 5, as the M-OH ratio decreased, the average molar absorption coefficient at the wavelengths of 190 nm to 380 nm tended to increase. As is evident from Table 5, silicon compound-coated iron oxide particles obtained in Example 1 and Example 1-5 have an extremely high average molar absorption coefficient at wavelengths of 190 nm to 380 nm as compared with the iron oxide particles in which the surface thereof is coated with silicon compound. In the silicon compound-coated iron oxide particles according to the represent invention, it is preferable that the ratio of M-OH bonds contained in the silicon compound-coated iron oxide particles is 9% or more and 15% or less, and, in a dispersion in which the silicon compound-coated oxide particles, an average molar absorption coefficient of the dispersion medium to light rays at wavelengths of 190 nm to 380 nm is 2200 L/(mol·cm) or more. As the molar absorption coefficient increases to this level, the design of the coating or film-like composition is facilitated. Simply mixing with a very small amount of silicon compound-coated iron oxide can protect the film from ultraviolet rays. Utilizing the red coloration of iron oxide furthermore, it is possible to produce coated products, films, and glass products with high design properties of from light skin color to red color.

Figure 19:
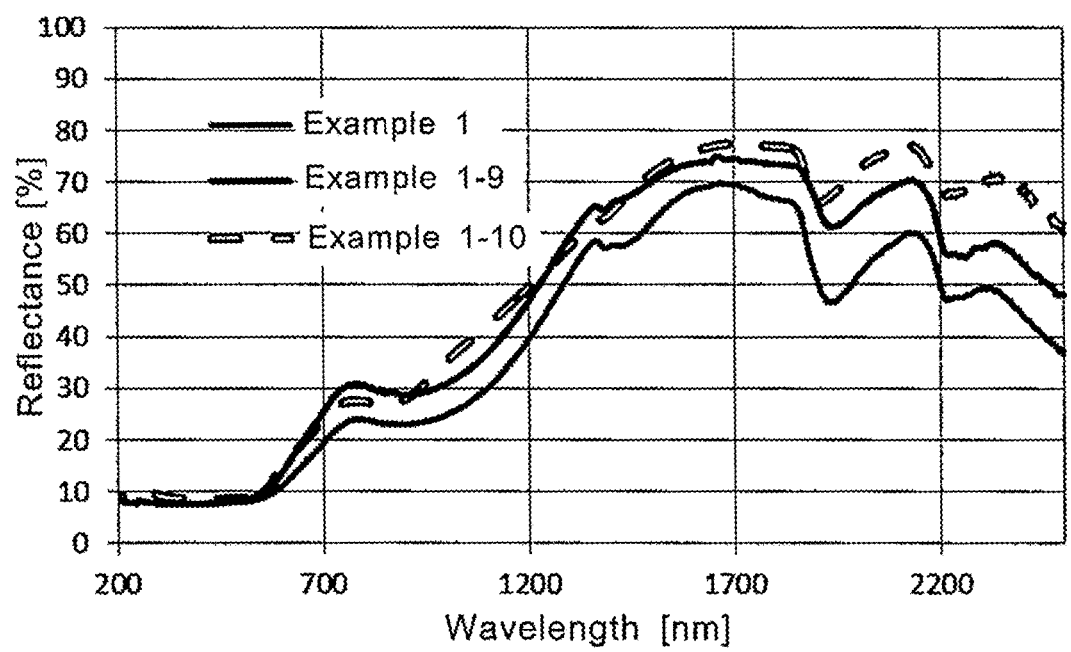
FIG. 19 is a diagram illustrating the results of reflection spectrum measurement of silicon compound-coated iron oxide particles for light rays at wavelengths of 200 nm to 2500 nm, the oxide particles being obtained in each of Examples 1, 1-9, and 1-10 of the present invention.

FIG. 19 represents the reflection spectrum of silicon compound-coated iron oxide particles obtained by, as the modification of functional groups of silicon compound-coated oxide particles, reacting a hydroxyl group and an acetyl group contained in the silicon compound-coated iron oxide particles obtained in Example 1 with each other to provide an acetoxysilyl group to the silicon compound-coated iron oxide particles. Table 6 represents the IR spectrum, the M-OH ratio calculated from waveform separation, and the average reflectance of the oxide particles for light rays at wavelengths of 780 nm to 2500 nm. In order to give an acetoxysilyl group as an ester group to the silicon compound-coated iron oxide particles obtained in Example 1, the following operation was performed on the silicon compound-coated iron oxide particles of Example 1-9. First, 1 part by weight of the silicon compound-coated iron oxide particles obtained in Example 1 was charged into 99 parts by weight of propylene glycol (manufactured by Kishida Chemical Co., Ltd.), and subjected to 1-hour dispersion treatment using a high-speed rotation-type dispersion emulsifier CLEARMIX (product name: CLM-2.2S, manufactured by M Technique Co., Ltd) at a rotor speed of 20,000 rpm at 65° C. to prepare a dispersion. Then, 1 part by weight of acetic anhydride (manufactured by Kishida Chemical Co., Ltd.) and 2 parts by weight of pyridine (manufactured by KANTO CHEMICAL CO., LTD.) were added to 1 part by weight of the propylene glycol dispersion of the silicon compound-coated iron oxide particles, and subjected to 1-hour dispersion treatment using a high-speed rotation-type dispersion emulsifier at a rotor speed of 20,000 rpm at 65° C. The resulting treated liquid was centrifuged at 26,000 G for 15 minutes, and the supernatant was then separated to obtain a precipitate. A part of the sediment was dried at −0.10 MPaG at 25° C. for 20 hours to obtain a dried powder. The results of the TEM observation confirmed that the silicon compound-coated iron oxide particles obtained in Example 1-9 were substantially the same kind of particles as the silicon compound-coated iron oxide particles obtained in Example 1.

Figure 20:
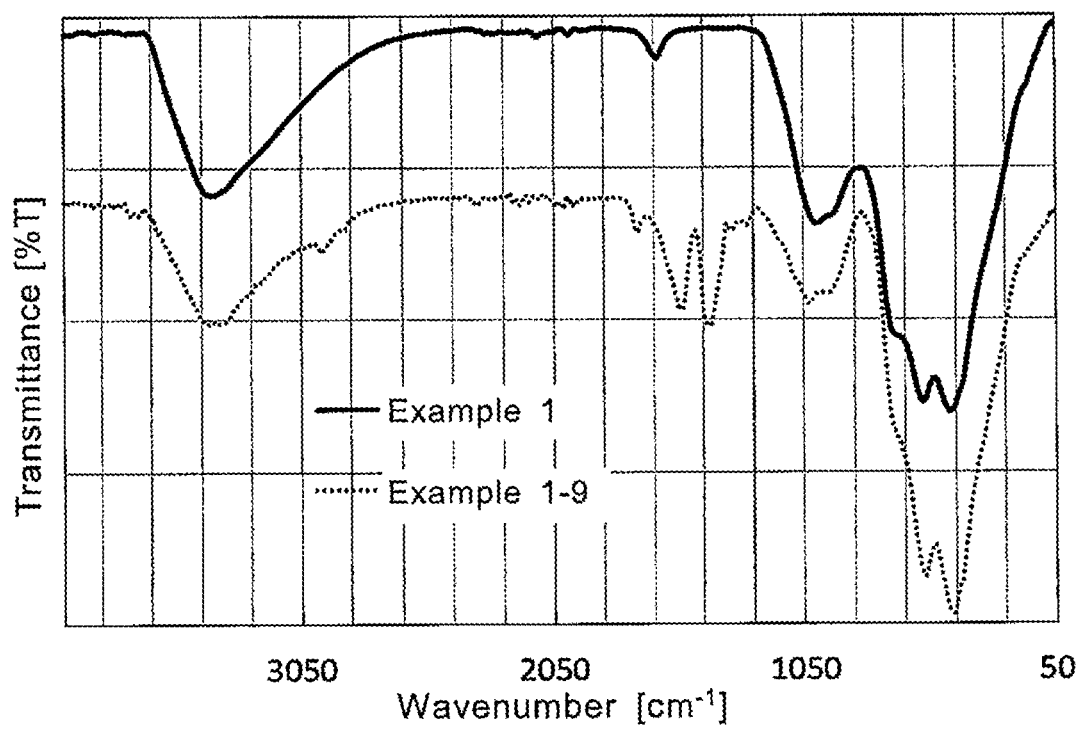
FIG. 20 is a diagram illustrating the results of IR measurement of silicon compound-coated iron oxide particles obtained in Example 1 and Example 1-9 of the present invention.

FIG. 20 is a diagram illustrating the results of FT-IR spectrum (infrared absorption spectrum) measurement of the silicon compound-coated iron oxide particles obtained in Example 1 and Example 1-9. From the FT-IR measurement results of the silicon compound-coated iron oxide particles obtained in Example 1-9, which were prepared by addition of acetoxysilyl group to the silicon compound-coated iron oxide particles obtained in Example 1, a broad peak derived from the hydroxyl group in the vicinity of 2900 $cm^{-1}$ to 3600 $cm^{-1}$ observed in the FT-IR measurement results of the silicon compound-coated iron oxide particles obtained in Example 1 was lowered. A new peak was detected in the vicinity of 1450 $cm^{-1}$ and in the vicinity of 1600 $cm^{-1}$. It is thought that the acetoxysilyl group was given to the silicon compound-coated iron oxide particles as a result of generation of an ester bond by the reaction of hydroxyl group with acetyl group contained in the silicon compound-coated iron oxide particles obtained in Example 1. Furthermore, peaks in the vicinity of 800 cm$^{-1}$ to 1250 cm$^{-1}$ were changed. In the IR spectra of Example 1 and Example 1-9, waveform separation was performed at wavenumbers in the range of 100 cm$^{-1}$ to 1250 cm$^{-1}$ to calculate the ratio of M-OH. The results are listed in Table 6 together with the average reflectance of the oxide particles for light rays at wavelengths of 780 nm to 2500 nm. The results of the silicon compound-coated iron oxide particles obtained in Example 1-10 were also shown in Table 6 and FIG. 19 obtained in Example 1-10 under the same conditions except that a temperature of 80° C. and a dispersion treatment time of 2 hour were employed in the steps of addition of pyrimidine and acetic anhydride and the 1-hour dispersion treatment at a rotor speed of 20,000 rpm at 65° C. in Example 1-9.

As is evident from FIG. 19 and Table 6, it is found that an acetyl group was acted on a hydroxyl group contained in the silicon compound-coated iron oxide particles to cause a decrease in the ratio of M-OH and an increase in the average reflectance for light rays at wavelengths of 780 nm to 2500 nm. As is evident from Table 6, Examples 1-9 and 1-10 caused a lower ratio of M-OH as compared with Example 1, and tended to increase the average reflectance for light rays at wavelengths of 780 nm to 2500 nm. In the present invention, preferable silicon compound-coated oxide particles are those in which the silicon compound thereof includes an ester bond, the ratio of M-OH bonds thereof is 9% or more and 13% or less, and the average reflectance for light rays at wavelengths of 780 nm to 2500 nm to be the silicon compound-coated oxide particles of than 50%.

TABLE 6

| | Example | | |
|---|---|---|---|
| | 1 | 1-9 | 1-10 |
| M-OH ratio [%] | 14.8 | 10.5 | 9.2 |
| Average reflectance [%] (780-2500 nm) | 48.8 | 56.9 | 67.4 |

Example 1-11 to Example 1-13

Figure 34:
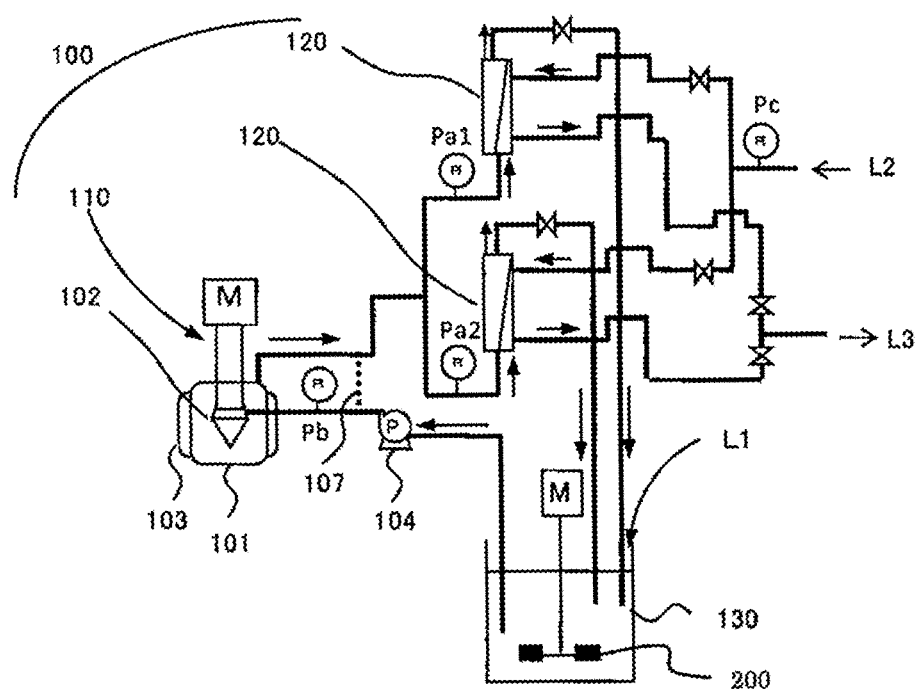
FIG. 34 is a schematic diagram illustrating an apparatus used for the method for controlling the ratio of M-OH bonds contained in the oxide particles of the present invention.

Next, silicon compound-coated iron oxide particles were prepared in the same manner as in Example 1 except that the dispersion of silicon compound-coated iron oxide particles, which was discharged from the fluid treatment apparatus and collected in the beaker in Example 1, was processed using a dispersion modifier 100 shown in FIG. 34. The dispersion modifier 100 is an example of a device that makes the dispersing device and the membrane filter communicate with each other. The dispersion modifier 100 of FIG. 34 is the representative example of the device that can be used for controlling the ratio of M-OH bonds in accordance with the present invention for removing impurities from the dispersion of silicon compound-coated iron oxide particles and adjusting the pH and conductivity thereof. Specifically, the dispersion modifier 100 includes a dispersion-processing device 110, a removal part 120 having a membrane filter, and a storage container 13, which are connected to each other through a piping system. The dispersion-processing device 110 mainly includes, as main components, a dispersion container 101 and a dispersing machine 102 disposed in the dispersion container 101.

The dispersion of silicon compound-coated iron oxide particles, which was discharged from the fluid treatment apparatus and collected in the beaker in Example 1 is provided as a dispersion of silicon compound-coated iron oxide particles L1 and charged into a storage container 130. Then, a pump 104 is activated to supply the dispersion of silicon compound-coated iron oxide particles L1 to a dispersion container 101. The dispersion of silicon compound-coated iron oxide particles L1 delivered by the pump 104 fills the inside of the dispersion container 101 and overflows. Then, the dispersion is sent to the removal part 120, and a part thereof is discharged as a filtrate L3 together with the crossflow-cleaning liquid L2, and the other part thereof is charged into the storage container 130 again. It is preferable that the storage container 130 is provided with a stirrer 200 for making the concentration of the dispersion uniform. The dispersion of silicon compound-coated iron oxide particles introduced into the storage container 130 is supplied to the dispersion container 101, and the dispersion and the removal of impurities are continuously and repeatedly performed.

The apparatus based on the principle represented in FIG. 34 is effectively used to modify the dispersion of silicon compound-coated iron oxide particles, thereby allowing the impurities to be released in the aggregate of silicon compound-coated iron oxide particles contained in the dispersion of silicon compound-coated iron oxide particles; removing the impurities before re-aggregation progresses over time or in a state that more impurities are being present in the liquid of the dispersion; and, in a state that the silicon compound-coated iron oxide particles are uniformly dispersed, strictly controlling the ratio of M-OH bonds for each of individual silicon compound-coated iron oxide particles.

Table 7 represents the conditions for controlling the ratio of M-OH bonds using the dispersion modifier 100 in FIG. 34.

First, 15 kg of pure water (Table 7: (1), pH 5.89 (measurement temperature: 22.4° C.), conductivity: 0.80 μS/cm (measurement temperature: 22.4° C.)) was introduced into the storage container 130. Then the pump 104 was activated to supply the pure water to the dispersion container 101 equipped with the dispersing machine 102 (Table 7 (3), a high-speed rotation-type dispersion emulsifier CLEARMIX, product name: CLM-2. 2S, rotor: R1, screen: S 0.8-48, manufactured by M Technique Co., Ltd.). The pure water supplied by the pump 104 filled the dispersion container 101 and overflowed therefrom. Then, the pure water was fed into a hollow fiber dialyzer (Table 7: (4), film area: 2.2 m$^2$, material: polysulfone, manufactured by Nikisso Co., Ltd.), which was provided as a filtration film of the removal part 120 in which pure water was fed as a cross-flow washing liquid at a flow rate of 1.5 L/min at 21° C. (Table 7: (2), pH: 5.89 (measurement temperature: 22.4° C.)), conductivity: 0.80 μS/cm (measurement temperature: 22.4° C.). Subsequently, part of the pure water was discharged as a filtrate L3 together with a cross-flow washing liquid, and the remaining part of the pure water was returned to the storage container 130.

Next, the dispersing machine 102 was activated at a rotor speed of 20,000 rpm (Table 7: (5), circumferential speed: 31.4 m/s). At the stage when pure water was discharged until the pure water in the storage container 130 reached 1 L (ca. 1 kg), 14 L (ca. 14 kg) of the dispersion of silicon compound-coated iron oxide particles (pH: 11.02 (measurement temperature: 30.6° C.)) was introduced into the storage container 130 (Table 7: (6), (7)). The dispersion of silicon compound-coated iron oxide particles was mixed with the pure water circulating in the apparatus, and then circulated from the container to the container through the dispersion-processing device and the membrane filter in a manner similar to the pure water. At this time, the pH of the dispersion of silicon compound-coated iron oxide particles in the storage container was 10.88 (measurement temperature: 26.6° C.) (Table 7: 26.6° C.) (Table 7: (8)), conductivity: 8120 μS/cm (measurement temperature: 26.6° C.) (Table 7: (9)).

The dispersion of silicon compound-coated iron oxide particles was subjected to dispersion treatment in the dispersion container 101, and then fed into the removal part 120 and filtered to discharge a filtrate containing impurities L3 together with the cross-flow washing liquid. The dispersion of silicon compound-coated iron oxide particles fed by the pump 104 at a flow rate of 8.8 L/min (Table 7: (10)) was returned to the storage container 130 at a flow rate of 7.3 L/min (Table 7 (11)). Thus, the filtrate L3 that contains impurities was successively discharged at a flow rate of 1.5 L/min through the membrane filter of the removal part 120.

At the stage when the dispersion of silicon compound-coated iron oxide particles in the storage container 130 was concentrated up to 1.5 L (ca. 1.5 kg), 13.5 L (ca. 13.5 kg) of pure water (pH: 5.89 (measurement temperature: 22.4° C.), conductivity: 0.80 μS/cm (measurement temperature: 22.4° C.) was introduced into the storage container 130 (Table 7: (13), (14)). The state of being activated was kept and continued during and before and after the introduction to remove impurities in the dispersion of silicon compound-coated iron oxide particles. The concentration of the silicon compound-coated iron oxide particles in the dispersion thereof varied from 0.4 to 2.0 wt % during the period between the enrichment (1.5 L of the concentrated dispersion) and the dilution (15 L of the diluted dispersion) 2.0 wt % (Table 7: (15)). Pressure gauges in FIG. 34 indicated 0.10 MPaG in two Pa, 0.15 MPaG in Pb, and 0.02 MPaG in Pc (Table 7: (16), (17), and (18)). The immediately preceding transport path from the dispersion container 101 to the removal part 120 had a path length (Lea) of 0.3 m (Table 7: (19)) and a pipping inner diameter (Leb) of 0.0105 m (Table 7: (20)). The flow velocity of the dispersion of silicon compound-coated iron oxide particles in the immediately preceding transport path was 1.2 m/sec (Table 7: (21)). In addition, the time T1 until the removal of impurities from the dispersion container 101 was started by the removal part 120 was 0.24 sec (0.24 sec) (Table 7: (22)) and was thus considered to be 3 seconds or less. Furthermore, a thermometer (not shown) disposed in the dispersion container 101 indicated a temperature of 23 to 26° C. (Table 7: (23)). The temperature of the dispersion of silicon compound-coated iron oxide particles in the storage container 130 was 23 to 26° C. (Table 7: (24)). For conductivity measurement, an electrical conductivity meter, model number ES-51 manufactured by HORIBA, Ltd., was used (Table 7: (25)).

Both the procedures for dispersing the dispersion of silicon compound-coated iron oxide particles and procedures for removal of impurities in the dispersion of silicon compound-coated iron oxide particles were carried out repeatedly until the pH of the dispersion of silicon compound-coated iron oxide particles reached 6.91 (measurement temperature: 24.6° C.) and the conductivity thereof reached 7.14 μS/cm. The impurities contained in the aggregates of silicon compound-coated iron oxide particles were also removed. Thus, each of the silicon compound-coated iron oxide particles in the dispersion thereof was modified.

TABLE 7

| | Processing solution | Examples 1-11<br>Silicon compound-coated iron oxide particle dispersion liquid |
|---|---|---|
| (1) | 1st amount of solution charged into container 130 | Type: Pure water<br>pH 5.89 (measurement temperature: 22.4° C.)<br>Conductivity 0.80 μS/cm (measurement temperature 22.4° C.)<br>Input: 15 kg |
| (2) | Type, flow rate, and temperature of cross flow cleaning liquid | Type: Pure water<br>pH 5.89 (measurement temperature: 22.4° C.)<br>Conductivity 0.80 μS/cm (measurement temperature 22.4° C.)<br>Flow rate: 1.5 L/min, 21° C. |
| (3) | Dispersing machine 102 | CLEARMIX (product name: CLM-2. 2S, rotor: R1, screen: S 0.8-48, manufactured by M Technique Co., Ltd.) |
| (4) | Removal part 120 | Hollow fiber type dialyzer PN-220 (film area: 2.2 m², material: polysulfone), manufactured by Nikkiso Co., Ltd. |
| (5) | Rotor speed | 20,000 rpm (peripheral speed: 31.4 m/S) |
| (6) | Start of charging oxide particle dispersion | When the first pure water inside the vessel 130 has been reduced to 1 L |
| (7) | Input of oxide particle dispersion into oxide container 130 | 14 L (ca. 14 kg) |
| (8) | pH of oxide particle dispersion liquid inside vessel 130 | 10.88 (measuring temperature: 26.6° C.) |
| (9) | Conductivity of oxide particle dispersion liquid inside the vessel 130 | 8120 μS/cm (measurement temperature: 26.6° C.) |
| (10) | Flow rate of pump 104 | 8.8 L/min |
| (11) | Flow rate oxide particle dispersion liquid is returned to storage container 130 | 7.3 L/min |
| (12) | Discharge amount (calculated value) of filtrate L3 by removal part 120 | 1.5 L/min |
| (13) | Timing of introduction of diluent into container 130 | When the dispersion amount in storage container 130 is concentrated to 1.5 L |
| (14) | Type and input of 2nd different dilution to storage container 130 | Type: Pure water<br>pH 5.89 (measurement temperature: 22.4° C.)<br>Conductivity 0.80 μS/cm (measurement temperature 22.4° C.)<br>Input: 13.5 L (ca. 13.5 kg) |

TABLE 7-continued

| Processing solution | Examples 1-11<br>Silicon compound-coated iron oxide particle dispersion liquid |
|---|---|
| (15) Concentration of oxide particles in oxide particle dispersion | 0.4 wt % to 2.0 wt % |
| (16) Pressure gauge | Pa: Both of two are 0.10 MPaG |
| (17) Pressure gauge | Pb: 0.15 MPaG |
| (18) Pressure gauge | Pc: 0.02 MPaG |
| (19) Path length (Lea) | 0.3 m |
| (20) Pipping inner diameter (Leb) | 0.0105 m |
| (21) Flow velocity of oxide particle dispersion liquid in immediately preceding transport path | 1.2 m/sec |
| (22) Time T1 until removal part 120 starts removal of impurities from dispersion container 101 | 0.24 sec |
| (23) Thermometer placed in the dispersion container 101 | 23° C. to 26° C. |
| (24) Temperature of oxide particle dispersion | 23° C. to 26° C. |
| (25) Conductivity measuring machine | Electrical conductivity meter, model number ES-51 manufactured by HORIBA, Ltd. |

By changing the treatment temperature in the modification of the dispersion of silicon compound-coated iron oxide particles shown in (23) and (24) of Table 7, silicon compound-coated iron oxide particles having different ratios of M-OH in Examples 1-11 to 1-13 were prepared. Table 8 represents, together with the results of Example 1, the treatment temperature for modifying the dispersion of silicon compound-coated iron oxide particles, the ratio of M-OH in the resulting silicon compound-coated iron oxide particles, the average reflectance values thereof at wavelengths of 780 nm to 2500 nm, and the molar absorption coefficients thereof at wavelengths of 190 nm to 380 nm.

TABLE 8

| | Example | | | |
|---|---|---|---|---|
| | 1 | 1-11 | 1-12 | 1-13 |
| Treatment temperature (Table 7: (23)) [° C.] | — | 23-26 | 43-46 | 59-61 |
| Treatment temperature (Table 7: (24)) [° C.] | — | 23-26 | 43-46 | 59-61 |
| M-OH ratio [%] | 14.8 | 13.8 | 10.1 | 9.4 |
| Average reflectance [%] (780-2500 nm) | 48.8 | 54.2 | 60.1 | 68.4 |
| Average molar absorption coefficient [L/(mol · cm)] (190-380 nm) | 2255 | 2314 | 2614 | 2946 |

As is evident from Table 8, the lower the ratio of M-OH the higher the average reflectance of the oxide particles at wavelengths of 780 nm to 2500 nm and the molar absorption coefficient at wavelengths of 190 nm to 380 nm tended to be observed. Thus, it is found that the color characteristics of the oxide particles can be controlled by controlling the ratio of M-OH.

Example 2

Example 2 describes, as oxide particles, silicon compound-coated zinc oxide particles in which at least a part of the surface of zinc oxide particles is coated with a silicon compound. An oxide precipitation solvent (liquid A), an oxide raw-material liquid (liquid B), and a silicon compound raw-material liquid (liquid C) were prepared using a high-speed rotation-type dispersion emulsifier CLERMIX (product name: CLM-2.2S, manufactured by M Technique Co., Ltd.). Specifically, based on the formulation of the oxide raw-material liquid shown in Example 2 in Table 9, the ingredients of the oxide raw-material liquid were homogeneously mixed by stirring them at 20,000 rpm for 30 minutes at a preparation temperature of 40° C. using CLEARMIX to prepare an oxide raw-material liquid. Based on the formulation of the oxide precipitation solvent shown in Example 2 in Table 9, the ingredients of the oxide raw-material liquid were homogeneously mixed by stirring them at 15,000 rpm for 30 minutes at a preparation temperature of 45° C. using CLEARMIX to prepare an oxide precipitation solvent. Furthermore, based on the formulation of the oxide precipitation solvent shown in Example 2 in Table 9, the ingredients of the oxide raw-material liquid were homogeneously mixed by stirring them at 15,000 rpm for 30 minutes at a preparation temperature of 45° C. using CLEARMIX to prepare an oxide precipitation solvent. Furthermore, based on the formulation of a silicon compound shown in Example 2 in Table 9, the ingredients of silicon compound-coated iron oxide particles were homogeneously mixed by stirring them at 6,000 rpm for 10 minutes at a preparation temperature of 20° C. using CLEARMIX to prepare silicon compound-coated iron oxide particles.

Regarding substances indicated by chemical formulas and abbreviations described in Table 9, 97 wt % $H_2SO_4$ used was concentrated sulfuric acid (manufactured by Kishida Chemical Co., Ltd.), KOH used was potassium hydroxide (manufactured by KANTOCHEMICAL CO., LTD.), TEOS used was tetraethyl orthosilicate (manufactured by Wako Pure Chemical Industries, Ltd.), and ZnO used was zinc oxide (manufactured by KANTOCHEMICAL CO., LTD.).

Subsequently, the prepared oxide raw-material liquid, oxide precipitation solvent, and silicon compound raw-material liquid were mixed together using a fluid treatment apparatus described in Patent Literature 6 of the present applicant. A method for treating each fluid and a method for collecting the treated liquid were carried out in a manner similar to Example 1.

Table 10 represents, as with Example 1, the operating conditions of the fluid treatment apparatus, the average primary particle diameter calculated from the TEM observation result of the obtained silicon compound-coated zinc oxide particles, and the molar ratio of Si/Zn calculated from the TEM-EDS analysis, as well as calculated values calculated based on the formulations and introduced flow rates of liquid A, liquid B, and liquid C. The procedures for pH measurement, analysis, and particle-washing were also carried out in the same manner as in Example 1.

TABLE 9

Example 2

| Formulation of the 1st fluid (liquid A: Oxide precipitation solvent) | | | | | Formulation of the 2nd fluid (liquid B: Oxide raw material liquid) | | | | | | | |
|---|---|---|---|---|---|---|---|---|---|---|---|---|
| Formulation | | | | | Formulation | | | | | | | |
| Raw material | Raw [wt %] | Raw material | [wt %] | pH | pH [° C.] | Raw material | [wt %] | Raw material | [wt %] | Raw material | [wt %] | pH | pH [° C.] |
| 97 wt % H$_2$SO$_4$ | 6.29 | MeOH | 93.71 | <1 | — | ZnO | 3.00 | KOH | 46.56 | Pure water | 50.44 | >14 | — |

| Formulation of the 3rd Fluid (liquid C: Silicon compound raw material liquid) | | | | | | | |
|---|---|---|---|---|---|---|---|
| Formulation | | | | | | | |
| Raw material | [wt %] | Raw material | [wt %] | Raw material | [wt %] | pH | pH [° C.] |
| MeOH | 88.12 | 35% HCl | 10.22 | TEOS | 1.66 | <1 | — |

TABLE 10

Example 2

| Introduction flow rate (liquid feed flow rate) [ml/min] | | | Introduction temperature (liquid feed temperature) [° C.] | | | Introduction pressure (liquid feed pressure) [MPaG] | | | Discharged liquid | | Shell/Core Si/Zn [Molar ratio] | | Average primary particle |
|---|---|---|---|---|---|---|---|---|---|---|---|---|---|
| Liquid A | Liquid B | Liquid C | Liquid A | Liquid B | Liquid C | Liquid A | Liquid B | Liquid C | pH | Temp. [° C.] | Calc. value | EDS | diameter [nm] |
| 575 | 50 | 75 | 28 | 25 | 25 | 0.108 | 0.10 | 0.10 | 13.61 | 35.7 | 0.32 | 0.32 | 14.10 |

Figure 21:
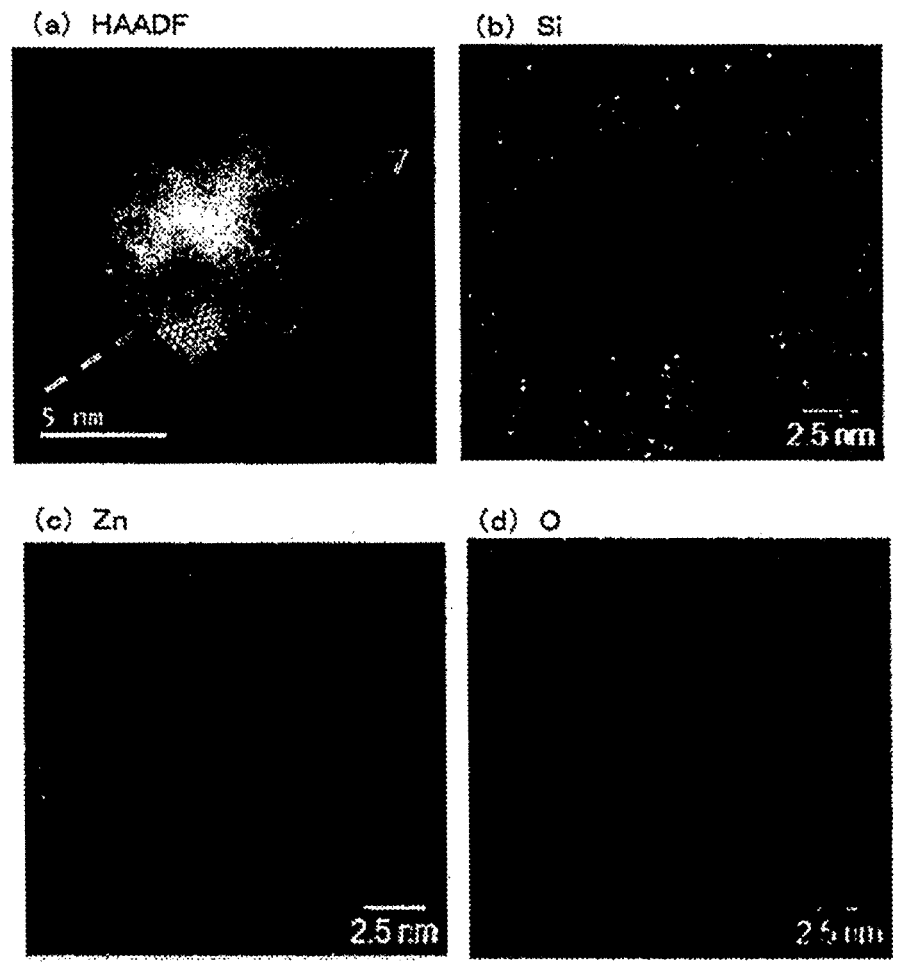
FIG. 21 is a diagram illustrating the results of STEM mapping of silicon compound-coated iron oxide particles in which the surface of zinc oxide particles were coated with a silicon compound, obtained in Example 2 of the present invention.
Figure 22:
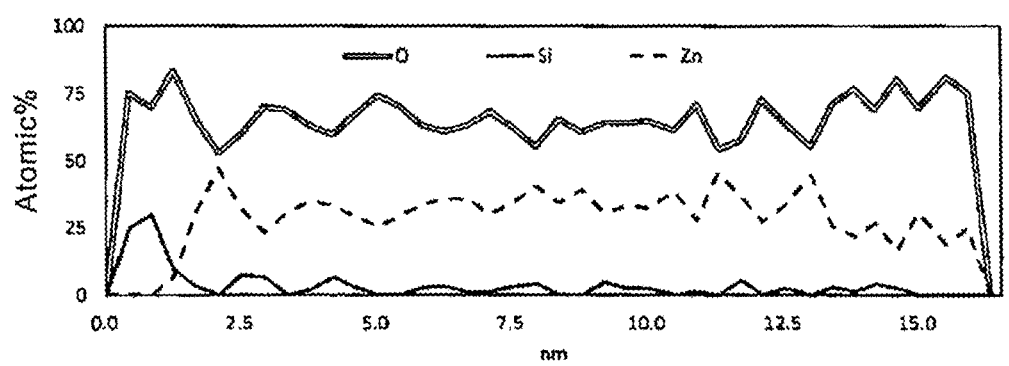
FIG. 22 is a diagram illustrating the results of a line analysis of silicon compound-silicon compound-coated zinc oxide particles in which the surface of iron oxide particles were coated with a silicon compound, obtained in Example 2 of the present invention.

FIG. 21 represents the results of mapping with the STEM of the silicon compound-coated zinc oxide particles obtained in Example 2. FIG. 22 represents the results of line analysis at the position indicated by the broken line in the HAADF image of FIG. 21. As is evident from FIGS. 21 and 22, the silicon compound-coated zinc oxide particles obtained in Example 2 were those in which the particles were not entirely coated with a silicon compound. The silicon compound-coated zinc oxide particles having their surfaces partially coated with the silicon compound were also observed.

Figure 23:
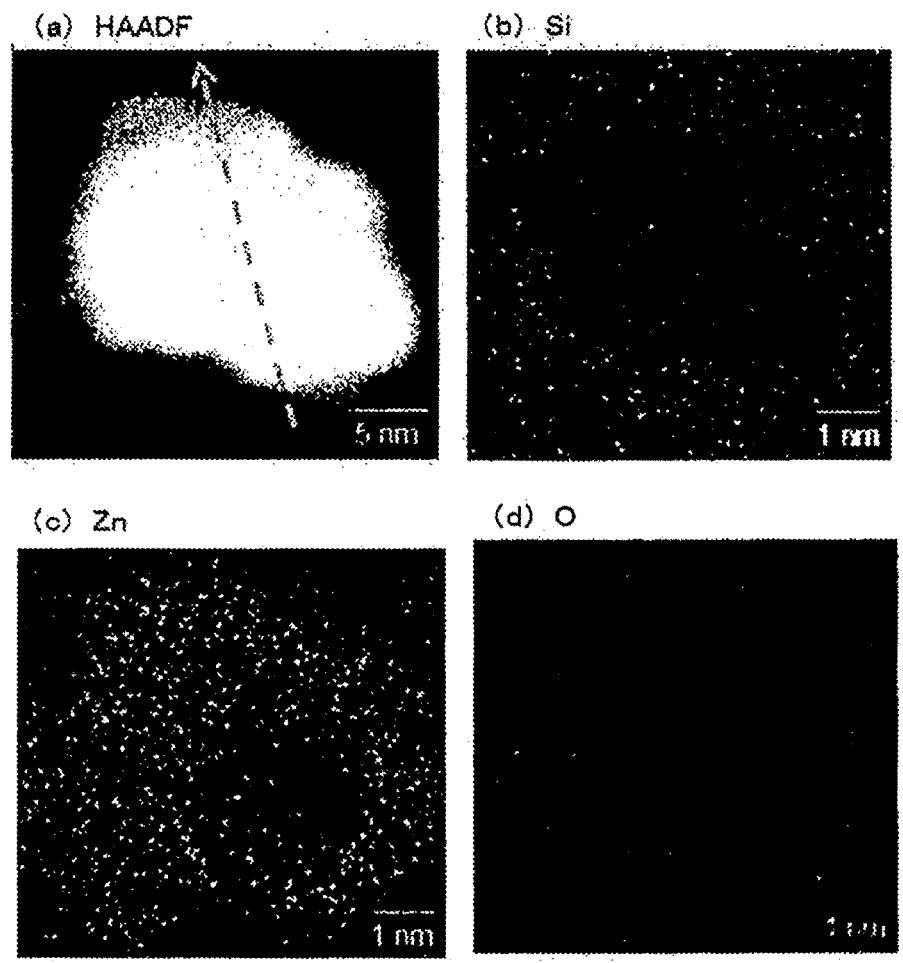
FIG. 23 is a diagram illustrating the results of STEM mapping of silicon compound-coated iron oxide particles in which part of the surface of zinc oxide particles obtained in Example 2-4 of the present invention is coated with a silicon compound.
Figure 24:
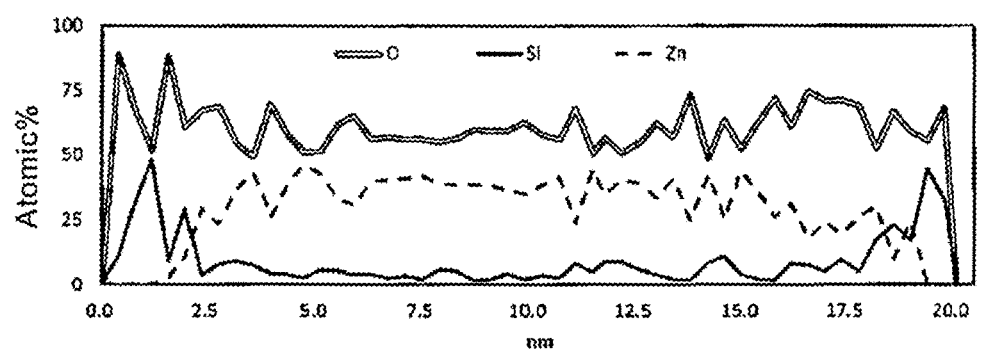
FIG. 24 is a diagram illustrating the results of a line analysis of silicon compound-coated iron oxide particles in which part of the surface of zinc oxide particles obtained in Example 2-4 of the present invention is coated with a silicon compound.

The silicon compound-coated zinc oxide particles obtained in Example 2 were subjected to heat treatment with an electric furnace to modify the functional groups contained in the silicon compound-coated zinc oxide particles. The heat treatment conditions were as follows: untreated in Example 2; 200° C. in Example 2-2; 400° C. in Example 2-3; and 600° C. in Example 2-4. For each heat treatment temperature, the duration of heat treatment was 30 minutes. FIG. 23 represents the results of mapping with the STEM of the silicon compound-coated zinc oxide particles obtained in Example 2-4. FIG. 24 represents the results of line analysis at the position indicated by the broken line in the HAADF image of FIG. 23. As is evident from FIGS. 23 and 24, the silicon compound-coated zinc oxide particles obtained in Example 2-4 were observed as the zinc oxide particles entirely coated with zinc oxides.

Figure 25:
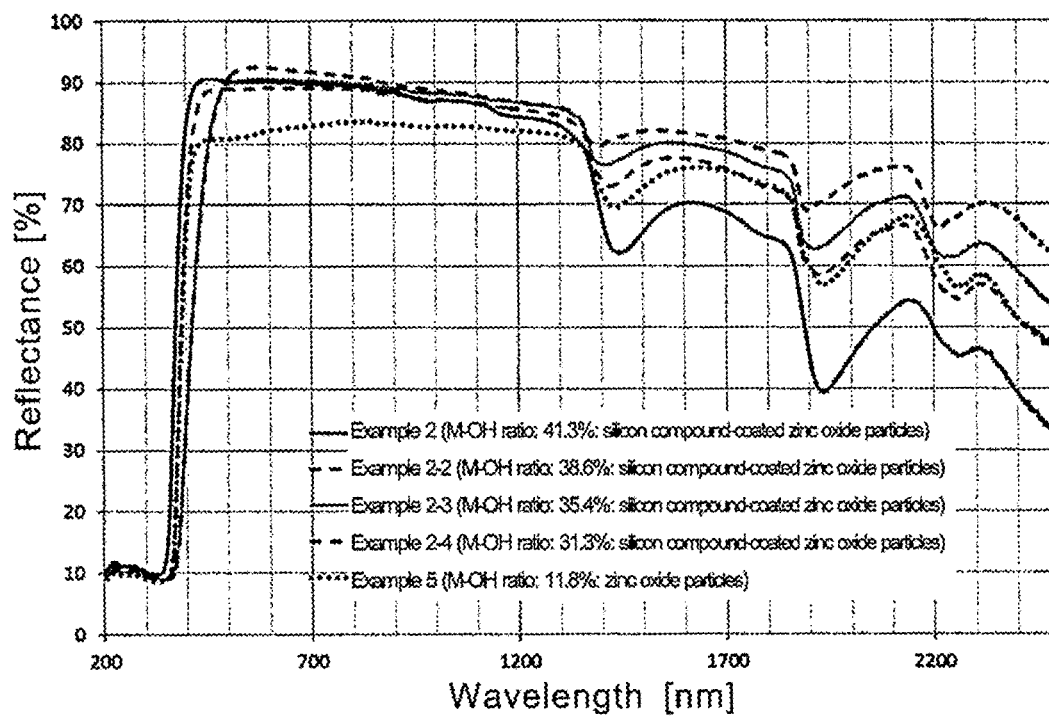
FIG. 25 is a diagram illustrating the results of reflection spectrum measurement of silicon compound-coated zinc oxide particles for light rays at wavelengths of 200 nm to 2500 nm, the oxide particles being obtained in the examples of the present invention.

FIG. 25 represents the reflectance spectra of the silicon compound-coated zinc oxide particles obtained in Example 2 and Examples 2-2 to 2-4 and, for comparison, zinc oxide particles obtained in Example 5, which have the surface not coated with a silicon compound, for light rays at wavelengths of 200 nm to 2500 nm.

The zinc oxide particles obtained in Example, which have the surface not coated with a silicon compound, 5 were produced in the same manner as in Example 2 to obtain zinc oxide particles having the same particle diameter as in Example 2, except that the third fluid in Example 2 is not used and that the third introduction portion and the opening d30 of the third introduction portion of the fluid treatment apparatus described in Patent Literature 6 were not formed.

Figure 26:
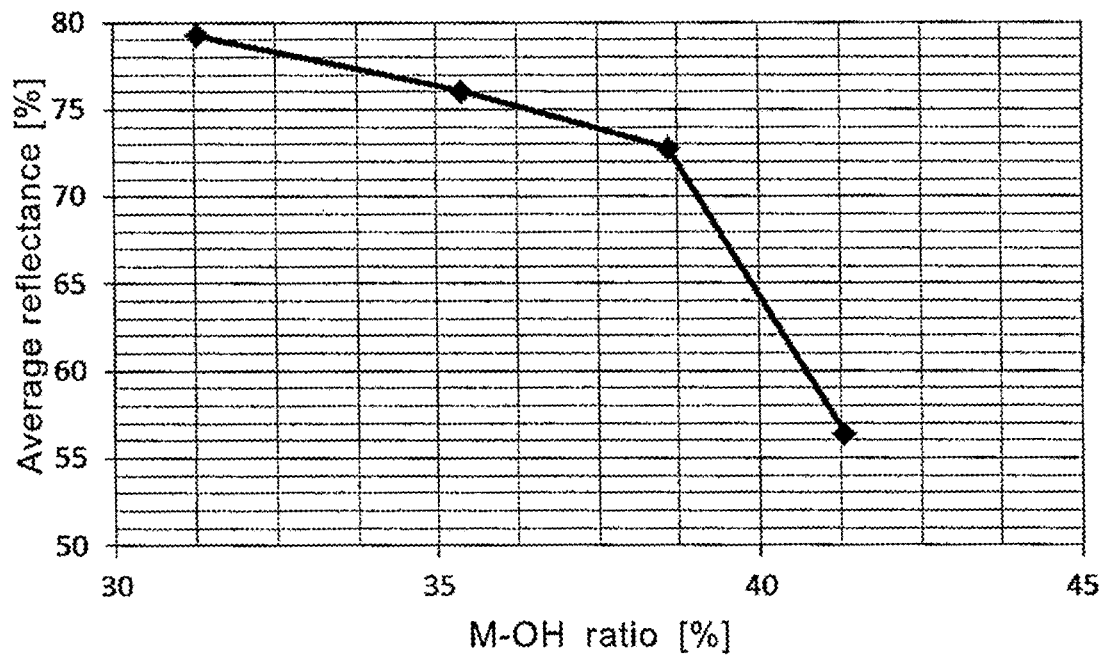
FIG. 26 is a graphic diagram illustrating the average reflectance for light rays at wavelengths of 780 nm to 2500 nm for the ratio of M-OH bonds contained in silicon compound-coated zinc oxide particles obtained in the examples of the present invention.

As is evident from FIG. 25, with respect to the reflectance for the rays of the near-infrared region at wavelengths of 780 nm to 2500 nm, the silicon compound-coated zinc oxide particles obtained in Example 2-4 is higher than the silicon compound-coated oxide particles obtained in Example 2. Waveform separation was performed on peaks at wavenumbers of 100 cm$^{-1}$ to 1250 cm$^{-1}$ in the IR spectrum. For the total area of each of the waveform-separated peaks (ratio of M-OH [%]), descending order is Example 2-4, Example 2-3, Example 2-2, and Example 2. For the average reflectance of the oxide particles for light rays at wavelengths of 780 nm to 2500 nm, ascending order is Example 2-4, Example 2-3, Example 2-2, and Example 2. FIG. 26 represents a graph of the average reflectance for light rays at wavelengths of 780 nm to 2500 nm for the ratio of M-OH [%]. As is evident from FIG. 26, the lower the ratio of M-OH, the higher the average reflectance of the oxide particles for light rays at wavelengths of 780 nm to 2500 nm tended to be observed. Furthermore, in Table 11, the ratio of M-OH in the silicon compound-coated iron oxide particles obtained in each of Example 2 and Examples 2-2 to 2-4 and the average molar absorption coefficient thereof at waveforms of 780 nm to 2500 nm are represented together with the average molar absorption coefficient of the zinc oxide particles obtained in Example 4 at wavelengths of 780 nm to 2500 nm.

TABLE 11

| | Example | | | | |
|---|---|---|---|---|---|
| | 2 | 2-2 | 2-3 | 2-4 | 5 |
| M-OH ratio [%] | 41.3 | 38.6 | 35.4 | 31.3 | 11.8 |
| Average reflectance [%] (780-2500 nm) | 56.4 | 72.8 | 76.0 | 79.3 | 68.3 |

As is evident from Table 11, silicon compound-coated zinc oxide particles obtained in Example 2 and Example 2-4 have a high average reflectance value at wavelengths of 780 nm to 2500 nm as compared with the zinc oxide particles in which the surface thereof is not coated with a silicon compound. With respect to the silicon compound-coated zinc oxide particles according to the present invention, preferably, the ratio of M-OH bonds contained in the silicon compound-coated zinc oxide particles is 30% or more and 39% or less, and the average reflectance of the oxide particles for light rays at wavelengths of 780 nm to 2500 nm is 72% or more. The use of such silicon compound-coated zinc oxide particles in a coating composition allows the coating composition to be suitably used in a paint to exert an advantageous effect of suppressing a rise in temperature of a coated body irradiated with sunlight.

Figure 27:
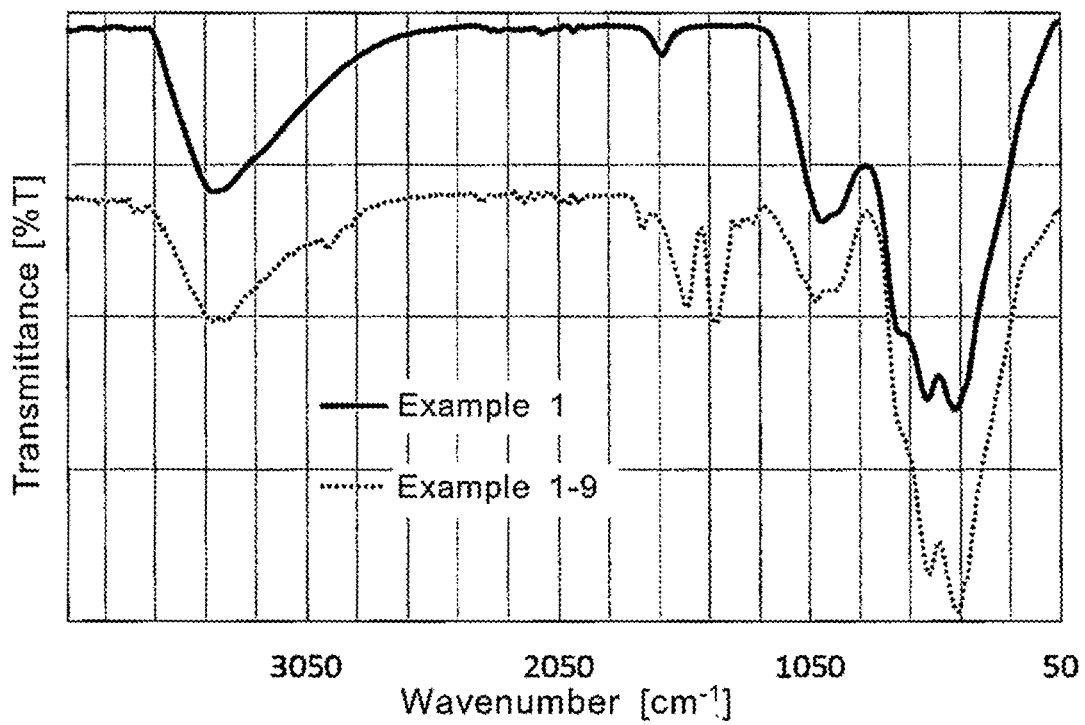
FIG. 27 is a graphic diagram illustrating the results of reflection spectrum measurement for light rays at wavelengths of 200 nm to 780 nm for the ratio of M-OH bonds contained in silicon compound-coated zinc oxide particles obtained in the examples of the present invention.

FIG. 27 represents the reflectance spectra of the silicon compound-coated zinc oxide particles obtained in Example 2 and Examples 2-2 to 2-4 and zinc oxide particles obtained in Example 4 for light rays at wavelengths of 200 nm to 780 nm. The ratio of M-OH bonds contained in silicon compound-coated zinc oxide particles was changed, and as a result a change was observed in an absorption region at wavelengths of 340 nm to 380 nm. Also, in the silicon compound-coated zinc oxide particles obtained in Example 2-3 and 2-4, the ratio of M-OH bonds included was 30% or more and 36% or less and the reflectance thereof reached 15% at a wavelength of 375 nm or more. Thus, because of the absorption of light in a wider ultraviolet region, such silicon compound-coated zinc oxide particles are suitable for a film-like composition used in a coating composition, glass, or the like for ultraviolet shielding. Table 12 represents the ratio of M-OH bonds contained in the silicon compound-coated zinc oxide particles obtained in each of Example 2 and Example 2-2 to Example 2-4 and the average reflectance value thereof for light rays at wavelengths of 380 nm to 780 nm in wavelength.

TABLE 12

| | Example | | | | |
|---|---|---|---|---|---|
| | 2 | 2-2 | 2-3 | 2-4 | 5 |
| M-OH ratio [%] | 41.3 | 38.6 | 35.4 | 31.3 | 11.8 |
| Average reflectance [%] (380-780 nm) | 89.0 | 86.4 | 82.6 | 83.5 | 79.9 |

In the silicon compound-coated zinc oxide particles obtained in Example 2 and 2-2, the ratio of M-OH bonds included was 38% or more and 42% or less and the average reflectance value was 86% or more for light rays at a wavelength of 780 nm. Thus, because of reflecting light over the entire visible region, such silicon compound-coated zinc oxide particles can be suitably used for white pigments.

Figure 28:
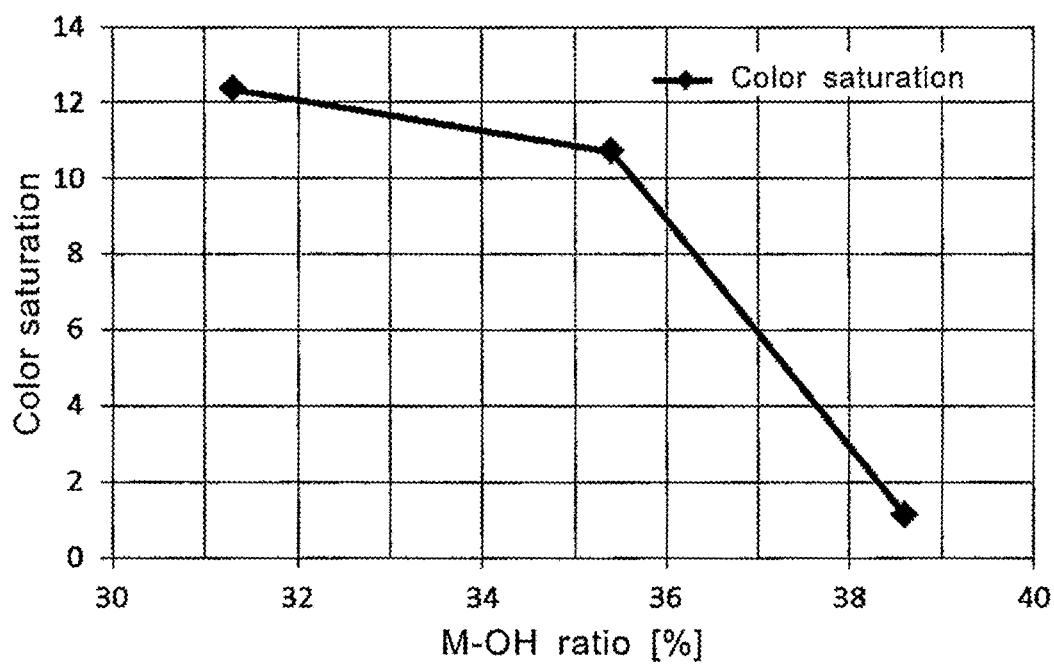
FIG. 28 is a graphic diagram illustrating color saturation in an L*a*b* colorimetric system for the ratio of M-OH bonds contained in silicon compound-coated zinc oxide particles obtained in the examples of the present invention.

FIG. 28 represents a graph of color saturation $C(=((a^*)^2+(b^*)^2)^{1/2})$ in an $L^*a^*b^*$ colorimetric system with respect to the ratio of M-OH bonds contained in the silicon compound-coated iron oxide particles. As is evident from FIG. 28, the higher the ratio of M-OH bonds, the lower the color saturation tended. In the present invention, preferably, the ratio of M-OH bonds contained in the silicon compound-coated zinc oxide particles is 31% or more and 39% or less, and color saturation $C(=((a^*)^2+(b^*)^2)^{1/2})$ in an $L^*a^*b^*$ colorimetric system is in the range of 0.5 to 13.

Figure 29:
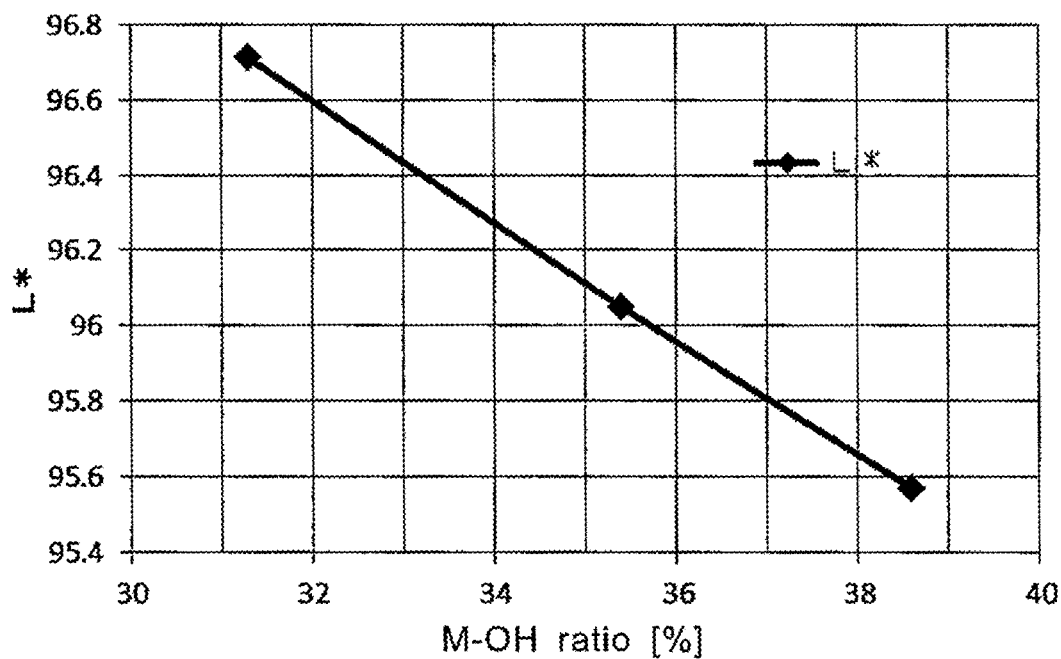
FIG. 29 is a graphic diagram illustrating L* values in an L*a*b* colorimetric system for the ratio of M-OH bonds contained in silicon compound-coated zinc oxide particles obtained in the examples of the present invention.

FIG. 29 represents a graph of $L^*$ values in an $L^*a^*b^*$ colorimetric system with respect to the ratio of M-OH bonds contained in the silicon compound-coated iron oxide particles. As is evident from FIG. 29, the higher the ratio of M-OH bonds, the lower the $L^*$ value tended. In the present invention, preferably, the silicon compound-coated zinc oxide particles have the ratio of M-OH bonds contained therein of 31% or more and 39% or less, color saturation C $(=((a^*)^2+(b^*)^2)^{1/2})$ in an $L^*a^*b^*$ colorimetric system in the range of 0.5 to 13, and an $L^*$ value in the $L^*a^*b^*$ colorimetric system in the range of 95 to 97. Thus, the silicon compound-coated zinc oxide particles have high whiteness and can suitably be used as a white pigment.

Figure 30:
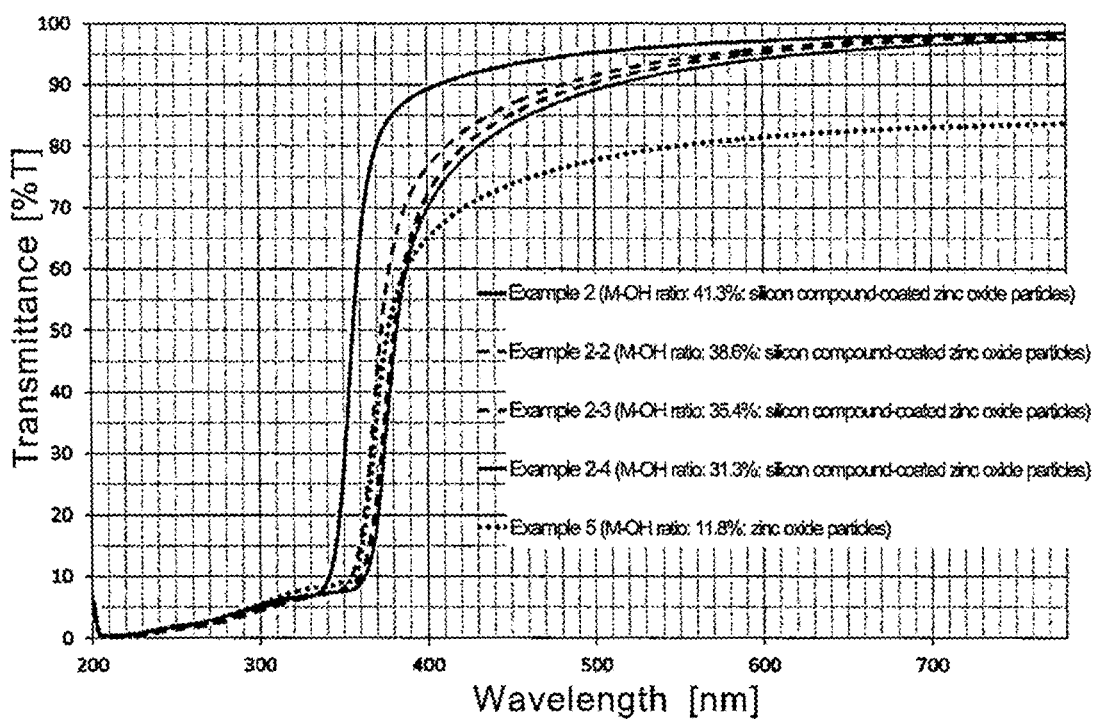
FIG. 30 is a diagram illustrating the results of the transmission spectrum measurement of dispersions in which silicon compound-coated iron oxide particles obtained in Examples 2, 2-2, 2-3, and 2-4 and zinc oxide particles obtained in Example 5 of the present invention were respectively dispersed in propylene glycol.

FIG. 30 represents transmission spectra of dispersions in which silicon compound-coated iron oxide particles obtained in Examples 2 and Example 2-2 to 2-4 and zinc oxide particles obtained in Example 5 were respectively dispersed in propylene glycol as ZnO at a concentration of 0.011% by weight in propylene glycol. Furthermore, Table 13 represents the ratio of M-OH in the silicon compound-coated iron oxide particles obtained in each of Example 2 and Example 2-2 to 2-4 and the average transmittance for light rays at wavelengths of 380 nm to 780 nm in the transmission spectrum.

TABLE 13

| | Example | | | | |
|---|---|---|---|---|---|
| | 2 | 2-2 | 2-3 | 2-4 | 5 |
| M-OH ratio [%] | 41.3 | 38.6 | 35.4 | 31.3 | 11.8 |
| Average transmittance [%] (380-780 nm) | 95.7 | 92.4 | 91.1 | 89.9 | 78.5 |

In Example 2 and Examples 2-2 to 2-4, the ratio of M-OH bonds decreases, while the edge of the absorption in a region at a wavelength of 380 nm or less is evidently shifted to the longer wavelength side. Furthermore, as is evident from the table, the silicon compound-coated zinc oxide particles obtained in Example 2 and Example 2-4 have higher transmittance at wavelengths of 380 nm to 780 nm than the zinc oxide particles obtained in Example 5, and efficiently absorb light rays at wavelengths of 200 nm to 380 nm, the ultraviolet region, as well as high transparency. In the present invention, the ratio of M-OH bonds included in the silicon compound-coated zinc oxide particle mentioned above is 38% or more and 42% or less. In the transmission spectrum of the dispersion in which the silicon compound-coated zinc oxide particles are dispersed in a dispersion medium, it is preferable that the transmittance for light rays at a wavelength of 340 nm is 10% or less and the average transmittance for light rays at wavelengths of 380 nm to 780 nm is 92% or more. Thus, such silicon compound-coated zinc oxide particles are suitable for providing a coating composition having the good balance between the ability of absorbing ultraviolet rays at wavelengths of 380 nm or less and the transparency when the oxide particles are used for cosmetics, such as lipsticks, foundations, sunscreen agents, and a coating composition intended to be applied to the skin, as well as a film-like composition used for a coating film, coating body, glass, or the like. Further, from the transmission spectrum of the silicon compound-coated oxide obtained in each of Examples 2-3 and 2-4, the absorption in an ultraviolet region at wavelengths of 200 nm to 380 nm is shifted to the longer wavelength side as compared with Example 2. In the present invention, preferably, the ratio of M-OH bonds contained in silicon compound-coated zinc oxide particles is 30% or more and 36% or less, and the reflectance thereof becomes 15% at a wavelength of 375 nm or more. Thus, light rays in an ultraviolet region at wavelengths of 200 nm to 380 nm can be broadly absorbed.

Figure 31:
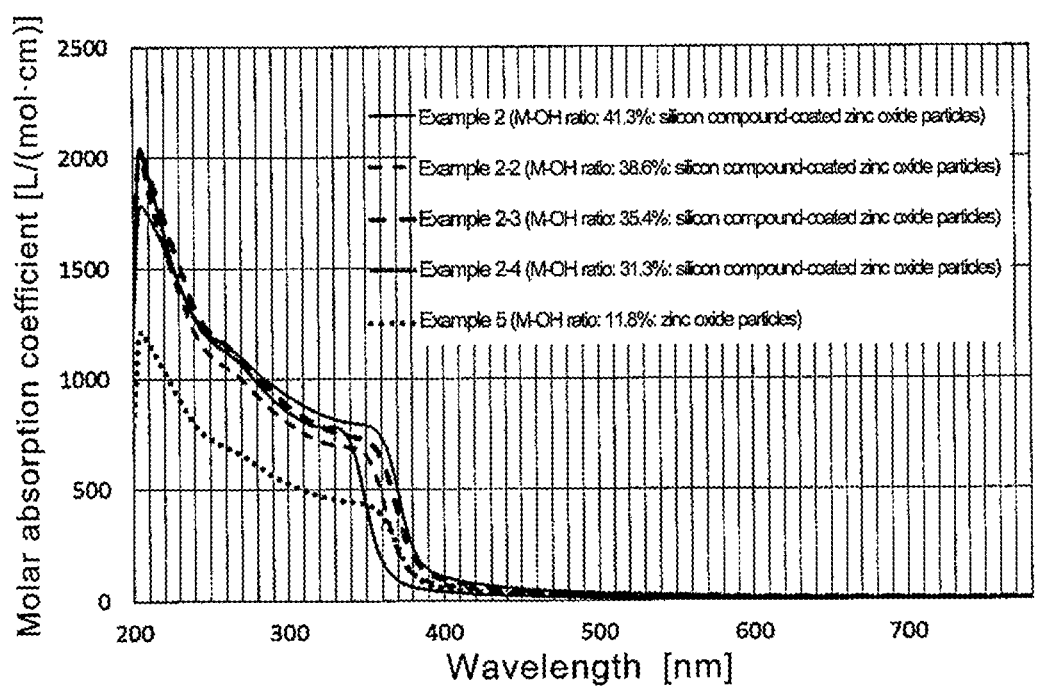
FIG. 31 is a diagram illustrating molar absorption coefficients of dispersions in which silicon compound-coated iron oxide particles obtained in Example 1 and Examples 2, 2-2, 2-3, and 2-4 and zinc oxide particles obtained in Example 5 of the present invention were respectively dispersed in propylene glycol.

FIG. 31 represents a graph of molar absorption coefficients calculated from: the results of absorption spectrum measurement of the dispersions in which silicon compound-coated iron oxide particles obtained in Example 2 and Examples 2-2 to 2-4 and zinc oxide particles obtained in Example 5 were respectively dispersed in propylene glycol; and the concentrations of silicon compound-coated zinc oxide particles (as ZnO) in the dispersions used in the measurement. Table 14 represents the ratio of M-OH in the silicon compound-coated zinc oxide particles obtained in each example and the molar absorption coefficient thereof at wavelengths of 200 nm to 380 nm together with the molar absorption coefficient of zinc oxide particles obtained in Example 5 at wavelengths of 200 nm to 380 nm.

TABLE 14

| | Example | | | | |
|---|---|---|---|---|---|
| | 2 | 2-2 | 2-3 | 2-4 | 5 |
| M-OH ratio [%] | 41.3 | 38.6 | 35.4 | 31.3 | 11.8 |
| Average molar absorption coefficient [L/(mol · cm)] (200-380 nm) | 951 | 943 | 1038 | 1040 | 623 |

As is evident from Table 14, the lower the ratio of M-OH, the higher the molar absorption coefficient tended to be observed. As is evident from the table, furthermore, the silicon compound-coated zinc oxide particles obtained in Example 2 and Example 2-4 have a high molar absorption coefficient at wavelengths of 200 nm to 380 nm as compared with the zinc oxide particles obtained in Example 5. In the present invention, the ratio of M-OH bonds contained in silicon compound-coated zinc oxide particles is 30% or more and 42% or less. In the dispersion in which the silicon compound-coated zinc oxide particles are dispersed in the dispersion medium, the silicon compound-coated zinc oxide particles preferably has a molar absorption coefficient of 700 L/(mol·cm) or more for light rays at wavelengths of 200 nm to 380 nm. As a result, it is possible to efficiently absorb light rays at wavelengths of 200 nm to 380 nm, which correspond to ultraviolet rays of UVA, UVB, and UVC. Thus, such silicon compound-coated zinc oxide particles can be suitable for attaining a further increase in transparency while attaining a decrease in the amount used when used for a coating or film-like composition.

Example 2-5 to Example 2-7

Subsequently, from the dispersion of silicon compound-coated zinc oxide particles discharged from the fluid treatment apparatus and collected in the beaker in the Example 2, silicon compound-coated zinc oxide particles were prepared in a manner similar to Example 1 except that the dispersion was subjected to the dispersion modifier 100 shown in FIG. 34. Table 15 represents the conditions for controlling the ratio of M-OH bonds in the silicon compound-coated zinc oxide particles using the dispersion modifier 100 in FIG. 34. Excepting of the contents of Table 5, silicon compound-coated zinc oxide particles with the controlled ratio of M-OH bonds were prepared in a manner similar to Example 1-11 to Example 1-13.

Both the procedures for dispersing the dispersion of silicon compound-coated iron oxide particles and procedures for removal of impurities in the dispersion of silicon compound-coated iron oxide particles were carried out repeatedly until the pH of the dispersion of silicon compound-coated iron oxide particles reached 7.02 (measurement temperature: 23.1° C.) and the conductivity thereof reached 0.06 µS/cm. The impurities contained in the aggregates of silicon compound-coated iron oxide particles were also removed. Thus, each of the silicon compound-coated iron oxide particles in the dispersion thereof was modified.

TABLE 15

| | | Processing solution | Examples 2-5<br>Silicon compound-coated zinc oxide particle dispersion liquid |
|---|---|---|---|
| | (1) | 1st amount of solution charged into container 130 | Type: MeOH<br>pH 7.00 (measurement temperature: 23.5° C.)<br>Conductivity 0.01 µS/cm (measurement temperature 23.5° C.)<br>Input: 15 L (ca. 12 kg) |
| | (2) | Type, flow rate, and temperature of cross flow cleaning liquid | Type: MeOH<br>pH 7.00 (measurement temperature: 23.5° C.)<br>Conductivity 0.01 µS/cm (measurement temperature 23.5° C.)<br>Flow rate: 0.7 L/min, 24° C. |
| | (3) | Dispersing machine 102 | CLEARMIX (product name: CLM-2. 2S, rotor: R1, screen: S 0.8-48, manufactured by M Technique Co., Ltd.) |
| | (4) | Removal part 120 | Hollow fiber type dialyzer PN-220 (film area: 2.2 m², material: polysulfone), manufactured by Nikkiso Co., Ltd. |
| | (5) | Rotor speed | 10,000 rpm (peripheral speed: 15.7 m/S) |
| | (6) | Start of changing oxide particle dispersion | When the first pure water inside the vessel 130 has been reduced to 1 L |
| | (7) | Input of oxide particle dispersion into oxide container 130 | 15 L (ca. 12 kg) |

TABLE 15-continued

| | Processing solution | Examples 2-5<br>Silicon compound-coated zinc oxide particle dispersion liquid |
|---|---|---|
| (8) | pH of oxide particle dispersion liquid inside vessel 130 | more than 14 (measuring temperature: 23.2° C.) |
| (9) | Conductivity of oxide particle dispersion liquid inside the vessel 130 | 3636 μS/cm (measurement temperature: 23.2° C.) |
| (10) | Flow rate of pump 104 | 8.8 L/min |
| (11) | Flow rate oxide particle dispersion liquid is returned to storage container 130 | 7.3 L/min |
| (12) | Discharge amount (calculated value) of filtrate L3 by removal part 120 | 1.5 L/min |
| (13) | Timing of introduction of diluent into container 130 | When the dispersion amount in storage container 130 is concentrated to 1.5 L |
| (14) | Type and input of 2nd different dilution to storage container 130 | Type: MeOH<br>pH 7.00 (measurement temperature: 23.5° C.)<br>Conductivity 0.01 μS/cm (measurement temperature 23.5° C.)<br>Flow rate: 0.7 L/min, 24° C. |
| (15) | Concentration of oxide particles in oxide particle dispersion | 1.0 wt % to 10.0 wt % |
| (16) | Pressure gauge | Pa: Both of two are 0.10 MPaG |
| (17) | Pressure gauge | Pb: 0.15 MPaG |
| (18) | Pressure gauge | Pc: 0.02 MPaG |
| (19) | Path length (Lea) | 0.3 m |
| (20) | Pipping inner diameter (Leb) | 0.0105 m |
| (21) | Flow velocity of oxide particle dispersion liquid in immediately preceding transport path | 1.2 m/sec |
| (22) | Time T1 until removal part 120 starts removal of impurities from dispersion container 101 | 0.24 sec |
| (23) | Thermometer placed in the dispersion container 101 | 23° C. to 24° C. |
| (24) | Temperature of oxide particle dispersion | 23° C. to 24° C. |
| (25) | Conductivity measuring machine | Electrical conductivity meter, model number ES-51 manufactured by HORIBA. Ltd. |

By changing the treatment temperature in the modification of the dispersion of silicon compound-coated iron oxide particles shown in (23) and (24) of Table 15, silicon compound-coated iron oxide particles having different ratios of M-OH in Examples 2-5 to 2-7 were prepared. Table 16 represents, together with the results of Example 2, the treatment temperature for modifying the dispersion of silicon compound-coated iron oxide particles, the ratio of M-OH in the resulting silicon compound-coated iron oxide particles, the average reflectance values thereof at wavelengths of 780 nm to 2500 nm, the average reflectance values thereof at wavelengths of 380 nm to 780 nm, the transmittances thereof at wavelengths 380 nm to 780 nm, and the molar absorption coefficients thereof at wavelengths of 200 nm to 380 nm.

TABLE 16

| | Example | | | |
|---|---|---|---|---|
| | 2 | 2-5 | 2-6 | 2-7 |
| Treatment temperature (Table 15: (23)) [° C.] | — | 23-24 | 35-37 | 45-48 |
| Treatment temperature (Table 15: (24)) [° C.] | — | 23-24 | 35-37 | 45-48 |
| M-OH ratio [%] | 41.3 | 39.2 | 38.6 | 36.6 |
| Average reflectance [%] (780-2500 nm) | 56.4 | 70.4 | 74.3 | 75.3 |
| Average reflectance [%] (380-780 nm) | 89.0 | 87.4 | 86.4 | 84.3 |
| Average transmittance [%] (380-780 nm) | 95.7 | 93.4 | 92.3 | 91.7 |
| Average molar absorption coefficient [L/(mol · cm)] (200-380 nm) | 951 | 965 | 969 | 1020 |

As is evident from FIG. 16, the lower the ratio of M-OH, the higher the average reflectance values thereof at wavelengths of 780 nm to 2500 nm, the average reflectance values thereof at wavelengths of 780 nm to 2500 nm, the transmittances thereof at wavelengths 380 nm to 780 nm, and the molar absorption coefficients thereof at wavelengths of 200 nm to 380 nm tended to be observed. Thus, it is found that the color characteristics of the oxide particles can be controlled by controlling the ratio of M-OH.

Example 3

Example 3 describes silicon compound-coated cerium oxide particles in which at least a part of the surface of cerium oxide particles is coated with a silicon compound. An oxide precipitation solvent (liquid A), an oxide raw-material liquid (liquid B), and a silicon compound raw-material liquid (liquid C) were prepared using a high-speed rotation-type dispersion emulsifier CLERMIX (product name: CLM-2.2S, manufactured by M Technique Co., Ltd.). Based on the formulation of the oxide raw-material liquid shown in Table 17 of Example 3, the ingredients of the oxide raw-material liquid were homogeneously mixed by stirring them at a rotor speed of 20,000 rpm for 30 minutes at a preparation temperature of 45° C. using CLEARMIX to prepare an oxide raw-material liquid. Further, based on the formulation of the oxide precipitation solvent shown in Example 3 of Table 17, the ingredients of the oxide precipitation solvent were homogeneously mixed by stirring them at 15,000 rpm for 30 minutes at a preparation temperature of 40° C. using CLEARMIX to prepare an oxide precipitation solvent. Further, based on the formulation of the silicon compound raw-material liquid shown in Example 3 of Table 17, the ingredients of the silicon compound raw-material liquid were homogeneously mixed by stirring them at 6,000 rpm for 10 minutes at a preparation temperature of 20° C. using CLEARMIX to prepare a silicon compound raw-material liquid.

Regarding substances indicated by chemical formulas and abbreviations described in Table 17, DAME used was dimethyl aminoethanol (manufactured by Kishida Chemical Co., Ltd.), 60 wt % $HNO_3$ used was concentrated nitric acid (manufactured by Kishida Chemical Co., Ltd.), $Ce(NO_3)_3 \cdot 6H_2O$ was cerium (III) nitrate hexahydrate (manufactured by Wako Pure Chemical Industries, Ltd.), and TEOS was tetraethylorthosilicate (Wako Pure Chemical Industries, Ltd.).

Subsequently, the prepared oxide raw-material liquid, oxide precipitation solvent, and silicon compound raw-material liquid were mixed together using a fluid treatment apparatus described in Patent Literature 6 of the present applicant. A method for treating each fluid and a method for collecting the treated liquid were carried out in a manner similar to Example 1.

Table 18 represents, as with Example 1, the operating conditions of the fluid treatment apparatus, the average primary particle diameter calculated from the TEM observation result of the obtained silicon compound-coated cerium oxide particles, and the molar ratio of Si/Ce calculated from the TEM-EDS analysis, as well as calculated values calculated based on the formulations and introduced flow rates of liquid A, liquid B, and liquid C. The procedures for pH measurement, analysis, and particle-washing were also carried out in the same manner as in Example 1.

were not entirely coated with a silicon compound. The silicon compound-coated cerium oxide particles having their surfaces partially coated with the silicon compound were also observed.

The silicon compound-coated cerium oxide particles obtained in Example 3 were subjected to heat treatment with an electric furnace to modify the functional groups contained in the silicon compound-coated cerium oxide particles. The heat treatment conditions were as follows: untreated in Example 3; 200° C. in Example 3-2; 400° C. in Example 3-3; and 600° C. in Example 2-4. For each heat treatment temperature, the duration of heat treatment was 30 minutes.

Figure 33:
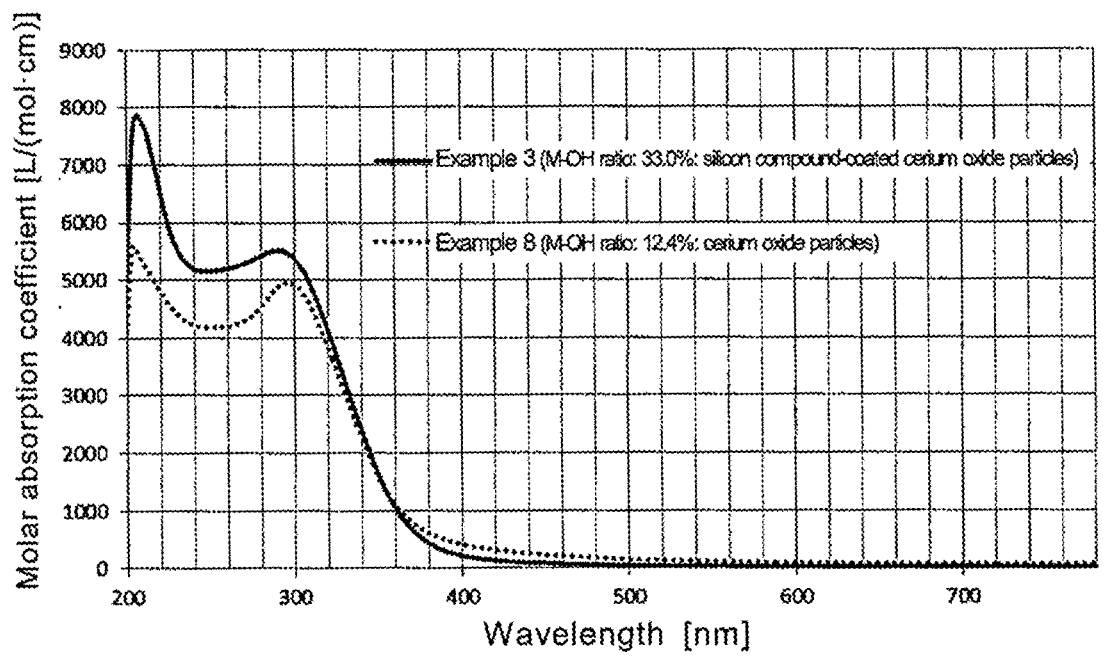
FIG. 33 is a diagram illustrating molar absorption coefficients of dispersions in which silicon compound-coated cerium oxide particle obtained in Example 3 and cerium oxide particle obtained in Example 8 of the present invention were respectively dispersed in propylene glycol.

FIG. 33 represents a graph of molar absorption coefficients calculated from: the results of absorption spectrum measurement of the dispersions in which silicon compound-coated cerium oxide particles obtained in Example 3 and cerium oxide particles obtained in Example 8 in which the surface thereof is uncoated were respectively dispersed in propylene glycol; and the concentrations of silicon compound-coated cerium oxide particles in the dispersions used in the measurement. Furthermore, Table 19 represents the ratio of silicon compound-coated cerium oxide particles obtained in each example in Table 19 and the molar absorption coefficients of cerium oxide particles obtained in Example 8 at wavelengths of 200 nm to 380 nm in com-

TABLE 17

Example 3

| Formulation of the 1st fluid (liquid A: Oxide precipitation solvent) | | | | | Formulation of the 2nd fluid (liquid B: Oxide raw material liquid) | | | | |
|---|---|---|---|---|---|---|---|---|---|
| Formulation | | | | | Formulation | | | | |
| | | | pH | | | | | pH | |
| Raw material | [wt %] | Raw material | [wt %] | pH | [° C.] | Raw material | [wt %] | Raw material | [wt %] | pH | [° C.] |
| DMAE | 1.40 | Pure water | 98.60 | 11.4 | 26.7 | $Ce(NO_3)_3 6H_2O$ | 9.00 | Pure water | 91.00 | 3.2 | 29.0 |

| Formulation of the 3rd fluid (liquid C: Silicon compound raw material liquid) | | | | | | | |
|---|---|---|---|---|---|---|---|
| Formulation | | | | | | | |
| | | | | | | pH | |
| Raw material | [wt %] | Raw material | [wt %] | Raw material | [wt %] | pH | [° C.] |
| Pure water | 99.49 | 60% $HNO_3$ | 0.01 | TEOS | 0.40 | 3.0 | 25.1 |

TABLE 18

Example 3

| Introduction flow rate (liquid feed flow rate) [ml/min] | | | Introduction temperature (liquid feed temperature) [° C.] | | | Introduction pressure (liquid feed pressure) [MPaG] | | | Discharged liquid | | Shell/Core Si/Ce [Molar ratio] | | Average primary particle |
|---|---|---|---|---|---|---|---|---|---|---|---|---|---|
| Liquid A | Liquid B | Liquid C | Liquid A | Liquid B | Liquid C | Liquid A | Liquid B | Liquid C | pH | Temp. [° C.] | Calc. value | EDS | diameter [nm] |
| 100 | 40 | 50 | 134 | 83 | 27 | 0.296 | 0.10 | 0.10 | 7.33 | 22.9 | 0.12 | 0.12 | 5.26 |

Figure 32:
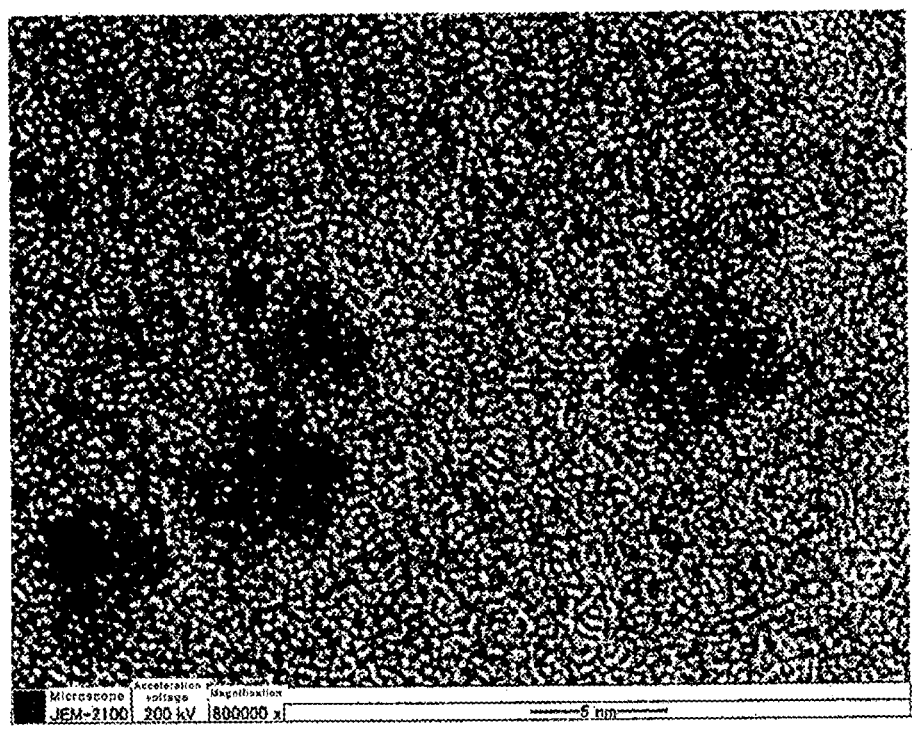
FIG. 32 is a TEM photograph of silicon compound-coated oxide cerium particles in which the surface of cerium oxide particles obtained in Example 3 of the present invention is coated with a silicon compound.

FIG. 32 represents a TEM photograph of silicon compound-coated cerium oxide particles obtained in Example 3. The silicon compound-coated cerium oxide particles obtained in Example 3 were those in which the particles parison with the molar absorption coefficients thereof at wavelengths of 200 nm to 380 nm.

Cerium oxide particles having the same particle diameters as those of Example 3 were prepared in a manner similar to Example 3 except that cerium oxide particles obtained in Example 8, which have the surface not coated with a silicon compound, did not use the third fluid in Example 3 and openings d30 of the third introduction portion of the fluid treatment apparatus and the third introduction portion of the fluid treatment apparatus described in Patent Literature 6 were not formed.

TABLE 19

|  | Example | | | |
|---|---|---|---|---|
|  | 3 | 3-2 | 3-3 | 8 |
| M-OH ratio [%] | 33.0 | 30.3 | 29.1 | 12.4 |
| Average molar absorption coefficient (L/(mol · cm)] (200-380 nm) | 4363 | 4516 | 4781 | 3655 |

As is evident from Table 19, the lower the ratio of M-OH, the higher the molar absorption coefficient tended to be observed. As is evident from the table, furthermore, the silicon compound-coated cerium oxide particles obtained in the example have high molar absorption coefficients at wavelengths of 200 nm to 380 nm as compared with the cerium oxide particles obtained in Example 5. In the present invention, preferably, the ratio of M-OH bonds contained in silicon compound-coated cerium oxide particles is 25% or more and 35% or less, and the silicon compound-coated cerium oxide particles has a molar absorption coefficient of 4000 L/(mol·cm) or more for light rays at wavelengths of 200 nm to 380 nm in a dispersion in which the silicon compound-coated cerium oxide particles are dispersed. As a result, it is possible to efficiently absorb light rays at wavelengths of 200 nm to 380 nm, which correspond to ultraviolet rays of UVA, UVB, and UVC. Thus, such silicon compound-coated zinc oxide particles can be suitable for attaining a further increase in transparency while attaining a decrease in the amount used when used for a coating composition.

As described above, the method for producing oxide particles of the present invention makes it possible to control delicate and strict color characteristics of silicon compound-coated oxide particles. Thus, when used in a coating composition, it is possible to strictly control transmission, absorption, hue, color saturation, and molar absorption coefficient for light rays in the ultraviolet, visible, and near infrared regions. When applied to the human body, it does not impair the texture and beauty. When used for a coating body, it can protect the human body and painted body from ultraviolet rays and near infrared rays without damaging the design.

Example 4

Example 4 describes iron oxide particles. An oxide raw-material liquid (liquid A) and an oxide precipitation solvent (liquid B) were prepared using a high-speed rotation-type dispersion emulsifier CLERMIX (product name: CLM-2.2S, manufactured by M Technique Co., Ltd.). Specifically, based on the formulation of the oxide raw-material liquid shown in Example 4 of Table 20, the ingredients of the silicon compound raw-material liquid were homogeneously mixed by stirring them at 20,000 rpm for 30 minutes at a preparation temperature of 40° C. using CLEARMIX to prepare a silicon compound raw-material liquid. Furthermore, based on the formulation of the oxide precipitation solvent shown in Example 4 of Table 20, the ingredients of the oxide precipitation solvent were homogeneously mixed by stirring them at a rotor speed of 15,000 rpm for 30 minutes at a preparation temperature of 45° C. using CLEARMIX to prepare an oxide precipitation solvent.

Regarding substances indicated by chemical formulas and abbreviations described in Table 20, NaOH was sodium hydroxide (manufactured by KANTOCHEMICAL CO., LTD.) and $Fe(NO_3)_3 \cdot 9H_2O$ used was iron nitrate nonahydrate (manufactured by KANTOCHEMICAL CO., LTD.).

Subsequently, the prepared oxide raw-material liquid and the oxide precipitation solvent were mixed together using a fluid treatment apparatus described in Patent Literature 6 of the present applicant. A method for treating each fluid and a method for collecting the treated liquid were carried out in a manner similar to Example 1. In addition, Example 4 did not use the third introduction portion d3 and liquid C (not shown).

As in the case with Example 1, Table 21 represents the operating conditions of the fluid treatment apparatus and the average primary particle diameter calculated from the results of the TEM observation of the resulting iron oxide particles. The procedures for pH measurement, analysis, and particle-washing were also carried out in the same manner as in Example 1. As a result of the TEM observation, the primary particle diameters were approximately 5 nm to 15 nm, and as described in Table 21, the average primary particle diameter was 9.53 nm.

TABLE 20

| Example 4 | | | | | | | | | |
|---|---|---|---|---|---|---|---|---|---|
| Formulation of the 1st fluid (liquid A: Oxide raw material liquid) | | | | | Formulation of the 2nd fluid (liquid B: Oxide precipitation solvent) | | | | |
| Formulation | | | | | Formulation | | | | |
| Raw material | [wt %] | Raw material | [wt %] | pH | pH [° C.] | Raw material | [wt %] | Raw material | [wt %] | pH | pH [° C.] |
| $Fe(NO_3)_3 9H_2O$ | 2.00 | Pure water | 98.00 | 1.8 | 26.6 | NaOH | 9.00 | Pure water | 91.00 | >14 | — |

TABLE 21

Example 4

| Introduction flow rate (liquid feed flow rate) [ml/min] | | Introduction temperature (liquid feed temperature) [° C.] | | Introduction pressure (liquid feed pressure) [MPaG] | | Discharged liquid | | Average primary particle diameter [nm] |
|---|---|---|---|---|---|---|---|---|
| Liquid A | Liquid B | Liquid A | Liquid B | Liquid A | Liquid B | pH | Temp. [° C.] | |
| 400 | 40 | 142 | 86 | 0.436 | 0.10 | 11.59 | 29.9 | 9.53 |

The iron oxide particles obtained in Example 4 were subjected to a heat treatment using an electric furnace to modify the functional groups contained in the iron oxide particles. The heat treatment conditions were as follows: untreated in Example 4; 100° C. in Example 4-2; 200° C. in Example 4-3; and 300° C. in Example 4-4. For each heat treatment temperature, the duration of heat treatment was 30 minutes. The iron oxide particles obtained in Example 4-2 to Example 4-4 also had primary particle diameters of approximately 5 nm to 15 nm.

Figure 35:
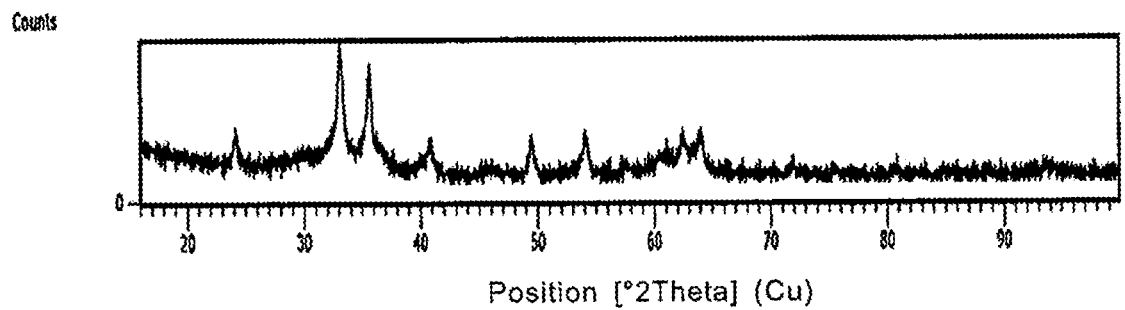
FIG. 35 is a diagram illustrating the results of XRD measurement of iron oxide particles obtained in Example 4 of the present invention.

FIG. 35 represents the results of XRD measurement of iron oxide particles obtained in Example 4. As is evident from FIG. 35, only the peaks that came from iron oxide ($\alpha$-$Fe_2O_3$) were detected in the XRD measurement. Similarly, for the results of XRD measurements in Example 4-2 to 4-4, peaks derived from iron oxide were only detected as illustrated in FIG. 35.

Figure 36:
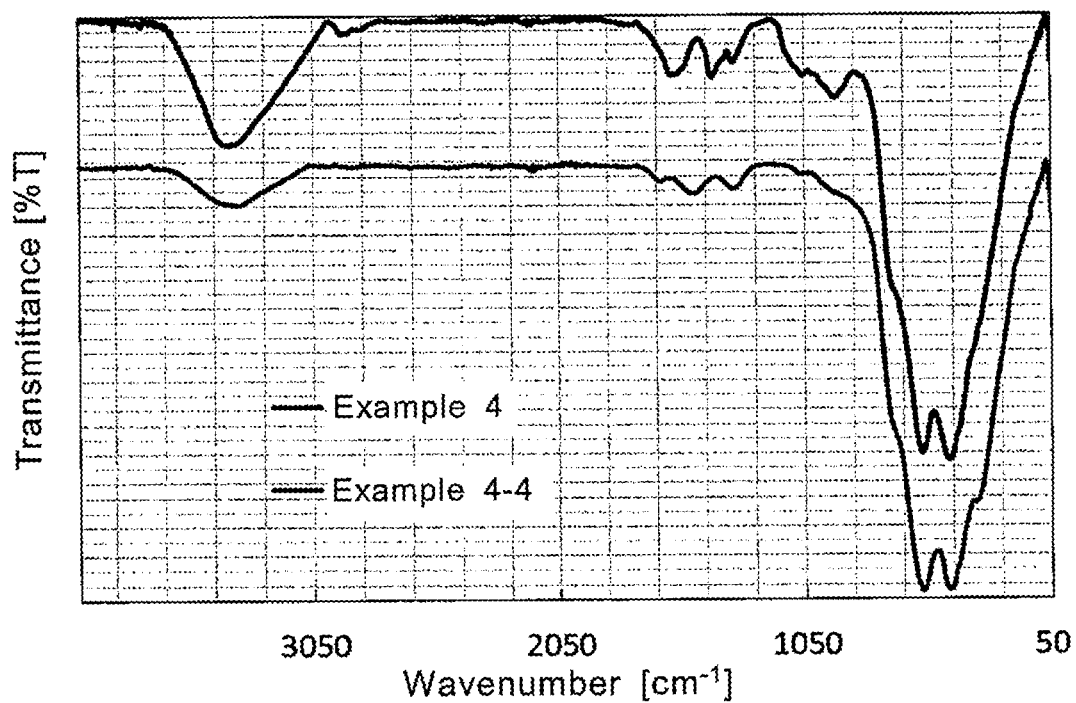
FIG. 36 is a diagram illustrating the results of IR measurement in a region at wavenumbers of 50 cm$^{-1}$ to 4000 cm$^{-1}$ of iron oxide particles obtained in Example 4 and Example 4-4 of the present invention.

FIG. 36 represents the results of FT-IR measurement of the iron oxide particles obtained in Example 4 and Example 4-4 by the ATR method. From the IR measurement results of the iron oxide particles obtained in Example 4-4, as compared with the results of IR measurement on the iron oxide obtained in Example 4, broad peaks in the vicinity of 800 $cm^{-1}$ to 1250 $cm^{-1}$ originated from the M-OH bonds and peaks in the vicinity of 1250 $cm^{-1}$ to 1750 $cm^{-1}$, which can be caused by reaction of M-OH bonds with carbon oxide, can be recognized smaller.

Figure 37:
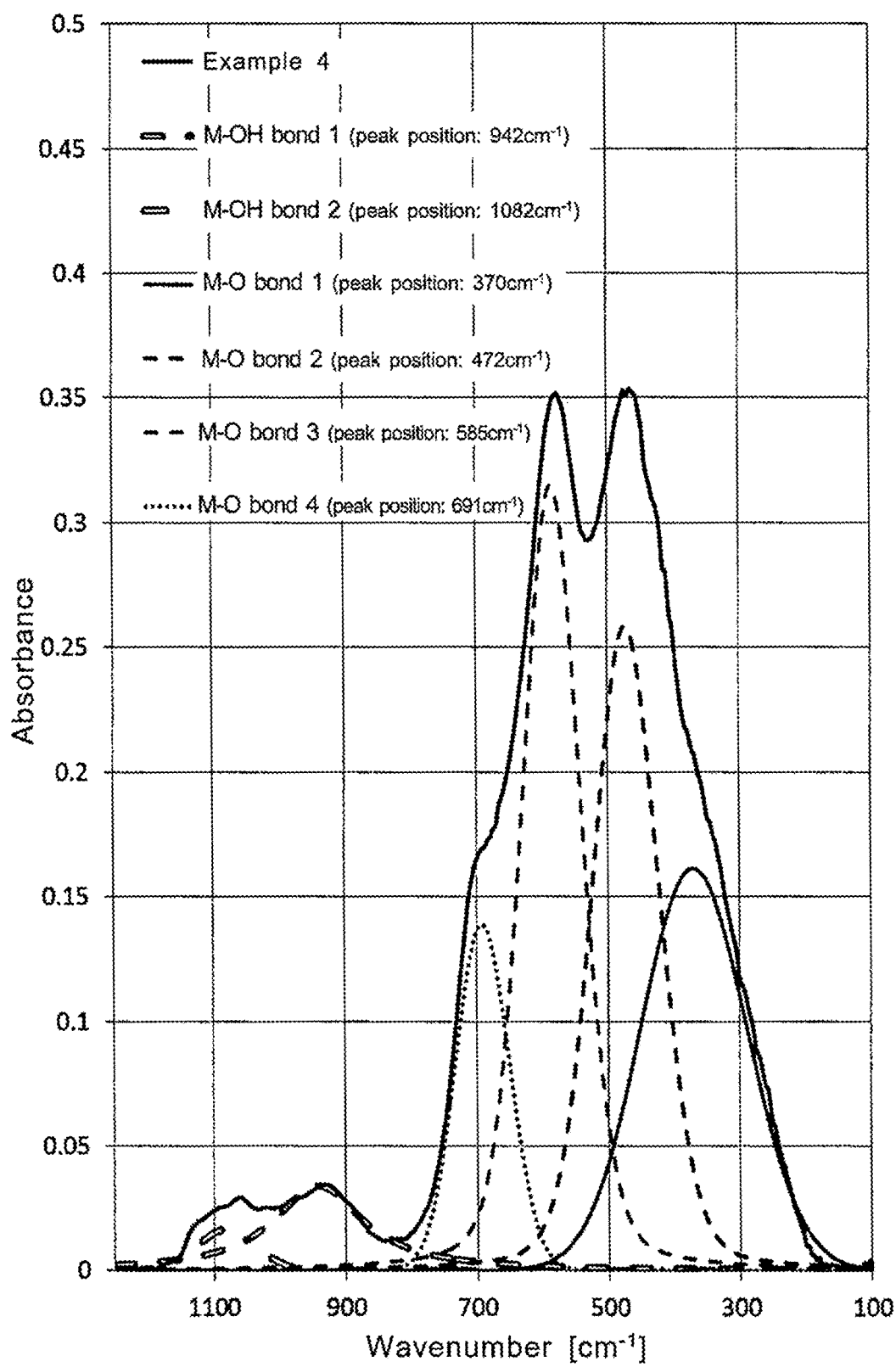
FIG. 37 is a diagram illustrating the results of waveform separation of the IR measurement results of silicon compound-coated iron oxide particles obtained in Example 4 of the present invention in a region at wavenumbers of 100 cm$^{-1}$ to 1250 cm$^{-1}$.
Figure 38:
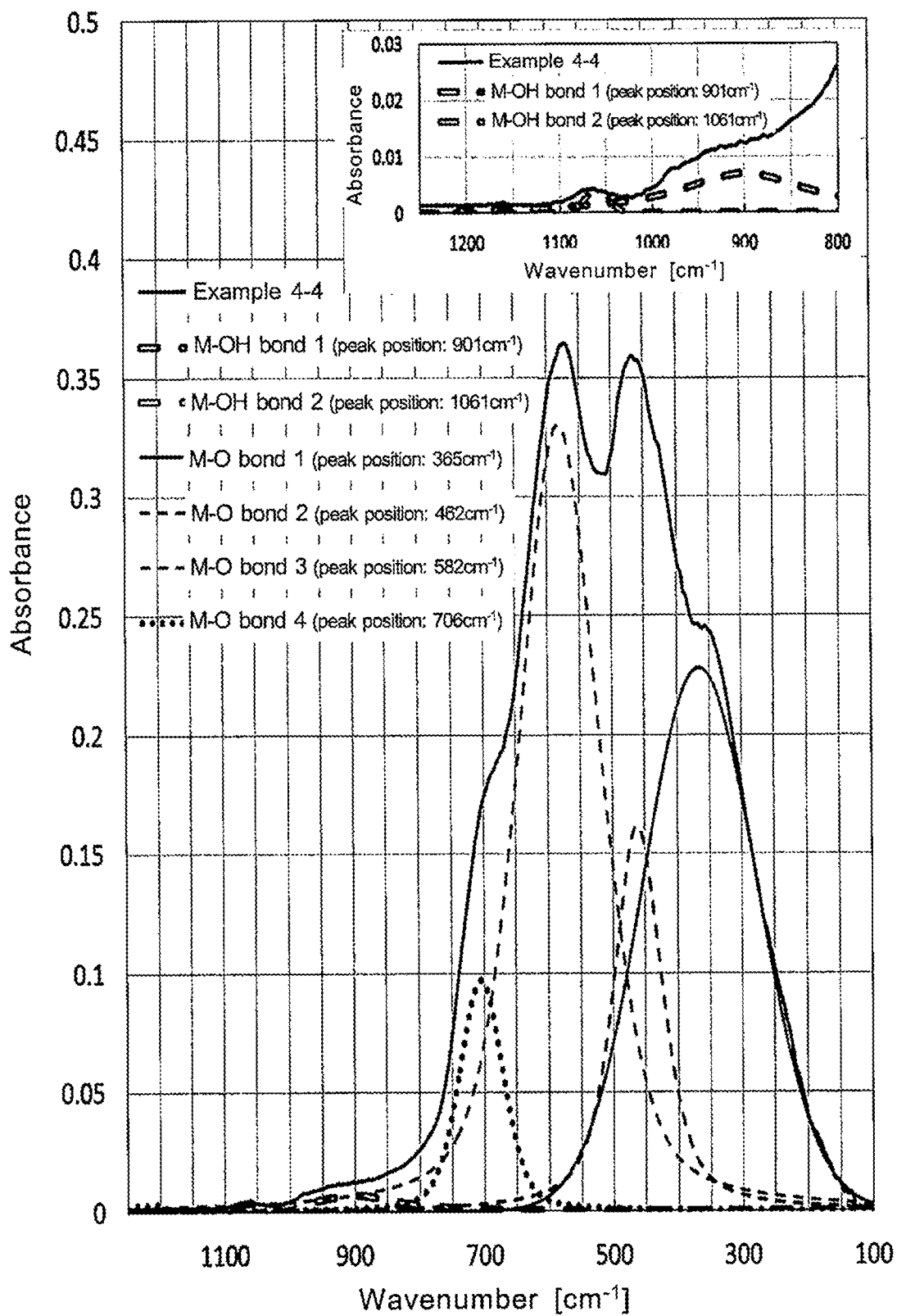
FIG. 38 is a diagram illustrating the results of waveform separation of the IR measurement results of silicon compound-coated iron oxide particles obtained in Example 4-4 of the present invention in a region at wavenumbers of 100 cm$^{-1}$ to 1250 cm$^{-1}$.

The results obtained by waveform separation peaks at wavenumbers of 100 $cm^{-1}$ to 1250 $cm^{-1}$ in the IR measurement are represented in FIG. 37 for Example 4 and FIG. 38 for Example 4-4. In Example 4-4, since the peak waveform-separated to the M-OH bond is very small, it is shown together with the enlarged view of the region at wavelengths of 800 $cm^{-1}$ to 1250 $cm^{-1}$. Compared with Example 4, with respect to the total area of peaks of M-OH bonds, the iron oxide particles obtained in Example 4-4 are smaller than the total area of all waveform-separated peaks, or smaller ratio of M-OH bonds.

Figure 39:
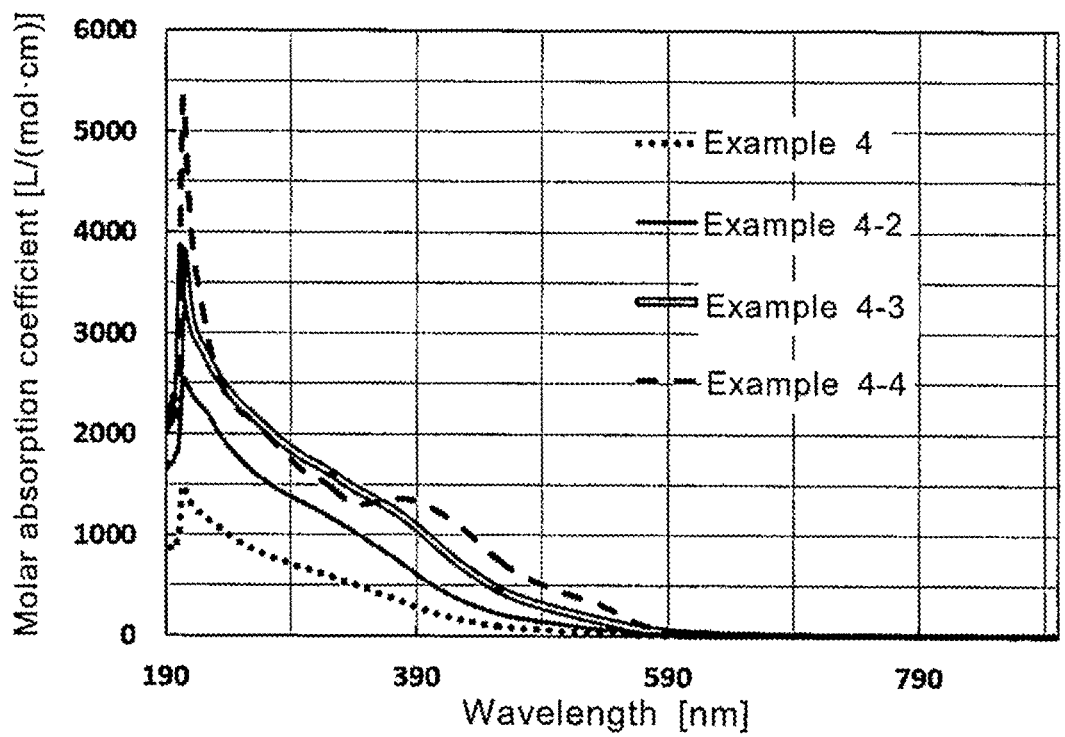
FIG. 39 is a diagram illustrating a molar absorption coefficient of a dispersion medium in which iron oxide particles obtained in Example 4 and Examples 4-2 to 4-4 of the present invention are dispersed in propylene glycol at measurement wavelengths of 190 nm to 780 nm.
Figure 40:
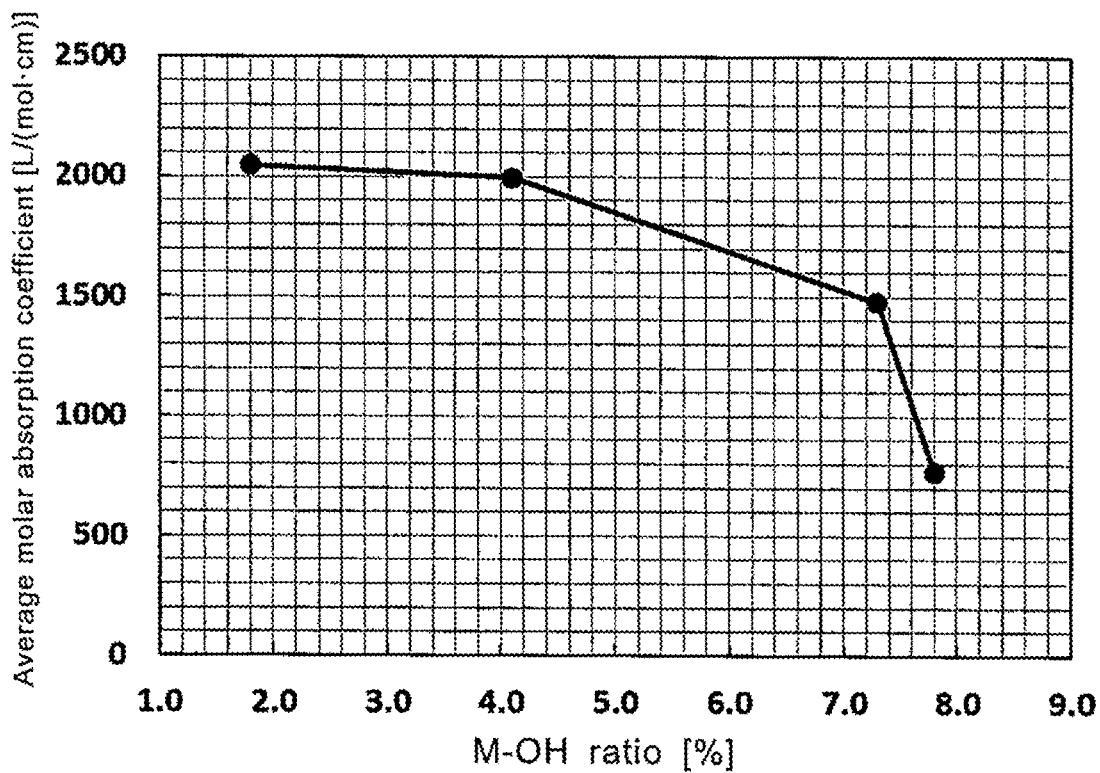
FIG. 40 is a graphic diagram illustrating the average molar absorption coefficient for light rays at wave lengths of 190 nm to 380 nm for a dispersion in which iron oxide particles are dispersed in propylene glycol obtained in each of Example 4 and Examples 4-2 to 4-4.

FIG. 39 is a graph of the molar absorption coefficients of dispersions in which zinc oxide particles obtained in Example 4-4 to Example 4 and Example 4-2 were respectively dispersed in propylene glycol at wavelengths of 190 nm to 780 nm. Table 22 represents the molar absorption coefficient for light rays at wavelengths of 190 nm to 380 nm. FIG. 40 represents a graph of the molar absorption coefficient for light rays at wavelengths of 190 nm to 380 nm with respect to the ratio of M-OH of the iron oxide particles obtained in Example 4 and Example 4-2 to Example 4-2. As is evident from FIG. 39 and Table 22, the molar absorption coefficient for light rays at wavelengths of 190 nm to 380 nm were improved as the M-OH ratio decreased in the order of Examples 4, 4-2, 4-3, and 4-4.

TABLE 22

| | Example | | | |
|---|---|---|---|---|
| | 4 | 4-2 | 4-3 | 4-4 |
| M-OH ratio [%] | 7.8 | 7.3 | 4.1 | 1.8 |
| Average molar absorption coefficient [L/(mol · cm)] (190-380 nm) | 770 | 1477 | 1995 | 2048 |

Further, as is evident from FIG. 40, unlike the silicon compound-coated iron oxide particles obtained in Example 1, an M-OH ratio of 1.5% or more and 7.5% or less in iron oxide particles can attain a molar absorption coefficient of 1000 L/(mol·cm) or more for light rays at wavelengths of 190 nm to 380 nm.

Figure 41:
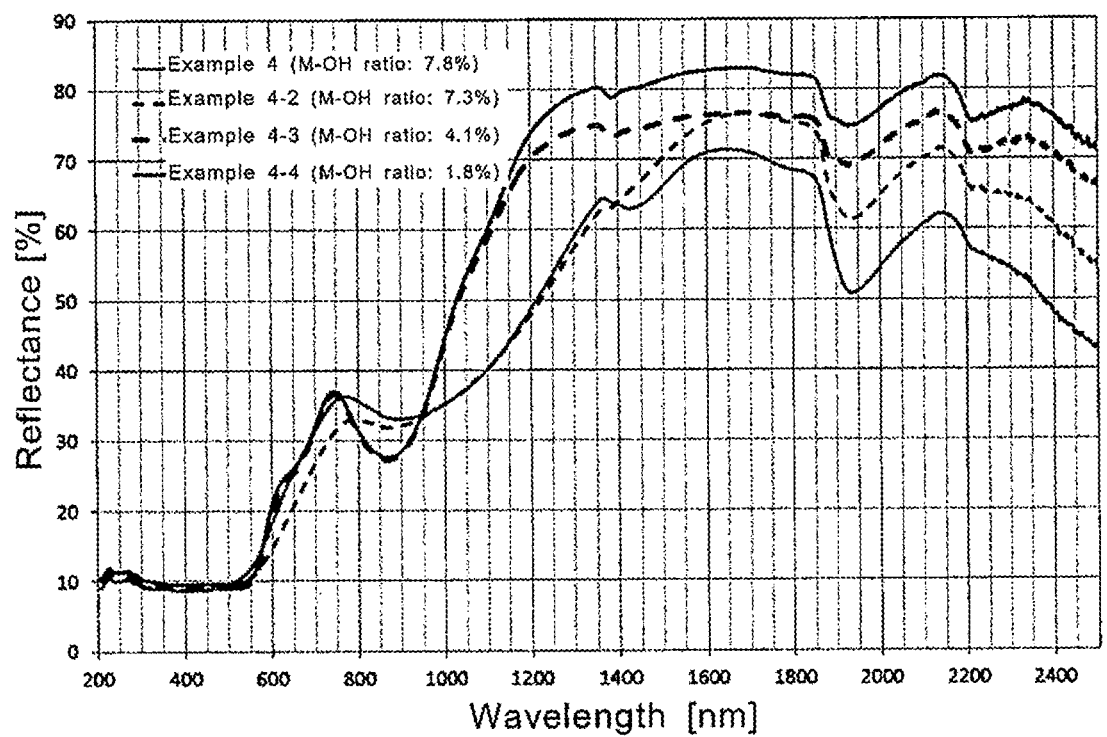
FIG. 41 is a diagram illustrating the results of reflection spectrum measurement of iron oxide particles for light rays at wavelengths of 200 nm to 2500 nm, the oxide particles being obtained in Example 4 and Examples 4-2 to 4-4 of the present invention.
Figure 42:
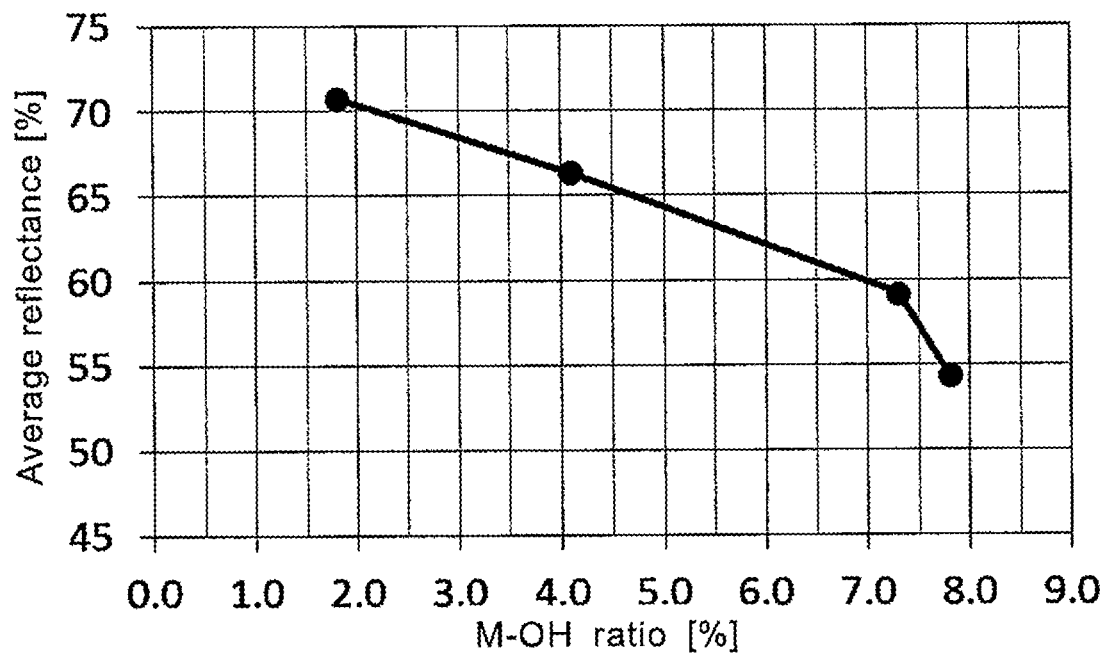
FIG. 42 is a graphic diagram illustrating the average reflectance for light rays at wavelengths of 780 nm to 2500 nm for the ratio of M-OH bonds contained in iron oxide particles obtained in Example 4 and Examples 4-2 to 4-4 of the present invention.

FIG. 41 represents the measurement results of the reflection spectrum of the iron oxide particles obtained in each of Example 4 and Examples 4-2 to 4-4 for light rays at wavelengths of 200 nm to 2500 nm. FIG. 42 represents a graph of the average reflectance of the oxide particles for light rays at wavelengths of 780 nm to 2500 nm in the near-infrared region with respect to the ratio of M-OH calculated from the IR spectrum of each example.

Table 23 represents the average reflectance of the oxide particles for light rays at wavelengths of 780 nm to 2500 nm of the iron oxide particles obtained in Example 4 and Examples 4-2 to 4-4.

TABLE 23

| | Example | | | |
|---|---|---|---|---|
| | 4 | 4-2 | 4-3 | 4-4 |
| M-OH ratio [%] | 7.8 | 7.3 | 4.1 | 1.8 |
| Average reflectance [%] (780-2500 nm) | 54.4 | 59.2 | 66.4 | 70.7 |

As is evident from Table 23 and FIG. 42, the lower the ratio of M-OH, the higher the average reflectance for light rays at wavelengths of 780 nm to 2500 nm tended to be observed. When the ratio of M-OH bond contained in the iron oxide particles was in the range of 1.5% or more and 7.5% or less, the average reflectance value for rays in the near-infrared range at wavelengths of 780 nm to 2500 nm was more than 55%.

Example 4-5 to Example 4-7

Subsequently, iron oxide particles were prepared in a manner similar to Example 4 except that, in Example 4, the dispersion of iron oxide particles were discharged from the fluid treatment apparatus, collected in the beaker, and subjected to the dispersion modifier 100 shown in FIG. 34. Table 24 represents conditions for controlling the ratio of M-OH bonds in the iron oxide particle using the dispersion modifier 100 in FIG. 34. Iron oxide particles with the controlled ratio of M-OH bonds were prepared in a manner similar to Example 1-11 to Example 1-13, excepting of the contents of Table 24.

Both the procedures for dispersing the dispersion of iron oxide particles and procedures for removal of impurities in the dispersion of iron oxide particles were carried out repeatedly until the pH of the dispersion of iron oxide particles reached 7.34 (measurement temperature: 23.6° C.) and the conductivity thereof reached 6.99 μS/cm. The impurities contained in the aggregates of silicon compound-coated iron oxide particles were also removed. Thus, each of the iron oxide particles in the dispersion thereof was modified.

TABLE 24

|  | Processing solution | Examples 4-5<br>Iron oxide particle dispersion liquid |
|---|---|---|
| (1) | 1st amount of solution charged into container 130 | Type: Pure water<br>pH 5.89 (measurement temperature: 22.4° C.)<br>Conductivity 0.80 μS/cm (measurement temperature 22.4° C.)<br>Input: 15 kg |
| (2) | Type, flow rate, and temperature of cross flow cleaning liquid | Type: Pure water<br>pH 5.89 (measurement temperature: 22.4° C.)<br>Conductivity 0.80 μS/cm (measurement temperature 22.4° C.)<br>Flow rate: 1.5 L/min, 21° C. |
| (3) | Dispersing machine 102 | CLEARMIX (product name: CLM-2. 2S, rotor: R1, screen: S 0.8-48, manufactured by M Technique Co., Ltd.) |
| (4) | Removal part 120 | Hollow fiber type dialyzer PN-220 (film area: 2.2 m$^2$, material: polysulfone), manufactured by Nikkiso Co., Ltd. |
| (5) | Rotor speed | 20,000 rpm (peripheral speed: 31.4 m/S) |
| (6) | Start of charging oxide particle dispersion | When the first pure water inside the vessel 130 has been reduced to 1 L |
| (7) | Input of oxide particle dispersion into oxide container 130 | 14 L (ca. 14 kg) |
| (8) | pH of oxide particle dispersion liquid inside vessel 130 | 11.23 (measuring temperature: 25.9° C.) |
| (9) | Conductivity of oxide particle dispersion liquid inside the vessel 130 | 6999 μS/cm (measurement temperature: 25.8° C.) |
| (10) | Flow rate of pump 104 | 8.8 L/min |
| (11) | Flow rate oxide particle dispersion liquid is returned to storage container 130 | 7.3 L/min |
| (12) | Discharge amount (calculated value) of filtrate L3 by removal part 120 | 1.5 L/min |
| (13) | Timing of introduction of diluent into container 130 | When the dispersion amount in storage container 130 is concentrated to 1.5 L |
| (14) | Type and input of 2nd different dilution to storage container 130 | Type: Pure water<br>pH 5.89 (measurement temperature: 22.4° C.)<br>Conductivity 0.80 μS/cm (measurement temperature 22.4° C.)<br>Input: 13.5 L (ca. 13.5 kg) |
| (15) | Concentration of oxide particles in oxide particle dispersion | 0.4 wt % to 2.0 wt % |
| (16) | Pressure gauge | Pa: Both of two are 0.10 MPaG |
| (17) | Pressure gauge | Pb: 0.15 MPaG |
| (18) | Pressure gauge | Pc: 0.02 MPaG |
| (19) | Path length (Lea) | 0.3 m |
| (20) | Pipping inner diameter (Leb) | 0.0105 m |
| (21) | Flow velocity of oxide particle dispersion liquid in immediately preceding transport path | 1.2 m/sec |
| (22) | Time T1 until removal part 120 starts removal of impurities from dispersion container 101 | 0.24 sec |
| (23) | Thermometer placed in the dispersion container 101 | 23° C. to 26° C. |
| (24) | Temperature of oxide particle dispersion | 23° C. to 26° C. |
| (25) | Conductivity measuring machine | Electrical conductivity meter, model number ES-51 manufactured by HORIBA. Ltd. |

By changing the treatment temperature in the modification of the dispersion of iron oxide particles shown in (23) and (24) of Table 24, iron oxide particles having different ratios of M-OH in Examples 4-5 to 4-7 were prepared. Table 25 represents, together with the results of Example 4, the treatment temperature for modifying the dispersion of iron oxide particles, the ratio of M-OH in the resulting iron oxide particles, the average reflectance at wavelengths of 780 nm to 2500 nm, the average reflectance at wavelengths of 380 nm to 780 nm, the average transmittance thereof at wavelengths 380 nm to 780 nm, and the molar absorption coefficient at wavelengths of 190 nm to 380 nm.

TABLE 25

| | Example | | | |
|---|---|---|---|---|
| | 4 | 4-5 | 4-6 | 4-7 |
| Treatment temperature (Table 24: (23)) [° C.] | — | 23-26 | 43-46 | 59-61 |
| Treatment temperature (Table 24: (24)) [° C.] | — | 23-26 | 43-46 | 59-61 |
| M-OH ratio [%] | 7.8 | 7.2 | 6.2 | 5.3 |
| Average reflectance [%] (780-2500 nm) | 54.4 | 58.6 | 62.1 | 64.1 |
| Average molar absorption coefficient [L/(mol · cm)] (190-380 nm) | 770 | 1468 | 1598 | 1798 |

As is evident from FIG. 25, the lower the ratio of M-OH, the higher the average reflectance values thereof at wavelengths of 780 nm to 2500 nm and the molar absorption coefficients thereof at wavelengths of 190 nm to 380 nm tended to be observed. Thus, it is found that the color characteristics of the oxide particles can be controlled by controlling the ratio of M-OH.

Example 4-8

Iron oxide particles were prepared as those of Example 4-8 in a manner similar to Example 4 except that the apparatus described in JP 2009-112892 and procedures for mixing and reacting liquid A (oxide raw-material liquid) with liquid B (oxide precipitation solvent) were employed. Here, the apparatus described in JP 2009-112892 is one described in FIG. 1 of this publication. The inner diameter of a stirring tank was 80 mm, the gap between the outer end of a stirring tool and the inner peripheral side surface of the stirring tank was 0.5 mm, and the rotational speed of the stirring blade was 7,200 rpm. In addition, liquid A was introduced into the stirring tank, and liquid B was then added to a thin film composed of liquid A being pressed against the inner peripheral side surface of the stirring tank to mix and react with each other. As a result of TEM observation, iron oxide particles of approximately 50 nm to 60 nm in primary particle diameter were observed.

The iron oxide particles obtained in Example 4-8 were subjected to a heat treatment using an electric furnace to modify the functional groups contained in the iron oxide particles. The heat treatment conditions were as follows: untreated in Example 4-8; 100° C. in Example 4-9; 200° C. in Example 4-10; and 300° C. in Example 4-11. For each heat treatment temperature, the duration of heat treatment was 30 minutes. Table 26 represents the average primary particle diameter and the ratio of M-OH of the iron oxide particles obtained in Examples 4-8 to 4-11, as well as the average reflectance values thereof at wavelengths of 780 nm to 2500 nm and the molar absorption coefficient thereof at wavelengths of 190 nm to 380 nm. The molar absorption coefficient of the iron oxide particles prepared in Examples 4-8 to 4-11 was measured using propylene glycol as a dispersion medium in the same manner as in Example 4.

TABLE 26

| | Example | | | |
|---|---|---|---|---|
| | 4-8 | 4-9 | 4-10 | 4-11 |
| Average primary particle diameter [nm] | 55.9 | 55.4 | 55.6 | 55.7 |
| M-OH ratio [%] | 8.2 | 7.4 | 3.8 | 1.6 |
| Average reflectance [%] (780-2500 nm) | 53.1 | 59.1 | 63.1 | 69.2 |
| Average molar absorption coefficient [L/(mol · cm)] (190-380 nm) | 695 | 1402 | 1649 | 1888 |

As is evident in Table 26, even in the case of using zinc oxide particles produced by using an apparatus different from those of Examples 1 to 4, the functional groups contained in the zinc oxide particles having primary particle diameters of 100 nm or less can be modified to control the molar absorption coefficient thereof at wavelengths of 190 nm to 380 nm and the average reflectance values thereof at wavelengths of 780 nm to 2500 nm.

Comparative Example 1

Iron oxide particles (special grade iron oxide (III) ($\alpha$-$Fe_2O_3$) manufactured by Wako Pure Chemical Industries, Ltd.) having primary particle diameters of 150 nm to 250 nm were subjected to a heat treatment in an electric furnace to modify the functional groups contained in the iron oxide particles for changing the ratio of M-OH bonds. The heat treatment conditions were as follows: untreated in Comparative Example 1-1; 100° C. in Comparative Example 1-2; and 300° C. in Comparative Example 1-3. For each heat treatment temperature, the duration of heat treatment was 30 minutes. For iron oxide particles of Comparative Examples 1-1 to 1-3, Table 27 represents the ratio of M-OH and the molar absorption coefficient for light rays at wavelengths of 190 nm to 380 nm in a dispersion in which the iron oxide particles were dispersed in a manner similar to Example 4. As is evident from Table 27, in the case of iron oxide particles having primary particle diameters of more than 100 nm or more, even when the ratio of M-OH bonds was changed, the molar absorption coefficient was low, resulting in no observed increasing tendency. In comparison between Comparative Example 1-1 and Example 4-4 in particular, even the iron oxide particles have the ratio of M-OH similar to the iron oxide particles having primary particle diameters of 50 nm or less obtained in Example 4-4, it is found that the iron oxide particles of Comparative Example 1-1 have lower molar absorption coefficients in a region at wavelengths of 190 nm to 380 nm. In the present invention, when the primary particle diameter is as small as 50 nm or less, the ratio of M-OH affects the color characteristics. That is, in a state where the surface area is increased with respect to the same amount of iron oxide particles, color characteristics can be controlled by controlling the M-OH ratio.

TABLE 27

| | Comparative Example | | |
|---|---|---|---|
| | 1-1 | 1-2 | 1-3 |
| M-OH ratio [%] | 1.7 | 1.6 | 1.5 |
| Average molar absorption coefficient [L/(mol · cm)] (190-380 nm) | 331 | 333 | 329 |

Example 5

Example 5 describes zinc oxide particles. Using a high-speed rotation-type dispersion emulsifier CLEARMIX (product name: CLM-2.2S, manufactured by M Technique Co., Ltd.), an oxide raw-material liquid and an oxide precipitation solvent were prepared. Specifically, based on the formulation of the oxide raw-material liquid shown in Example 5 of Table 28, using CLEARMIX at a rotor rotational speed of 20,000 rpm, the respective ingredients of the zinc oxide raw-material liquid were stirred and homogeneously mixed together at a preparation temperature of 40° C. for 30 minutes to prepare an oxide raw-material liquid. Furthermore, based on the formulation of the oxide precipitation solvent shown in Example 5 of Table 28, using CLEARMIX at a rotor rotational speed of 15,000 rpm, the respective ingredients of the oxide precipitation solvent were stirred and homogeneously mixed together at a preparation temperature of 45° C. for 30 minutes to prepare an oxide precipitation solvent. Regarding substances indicated by chemical formulas and abbreviations described in Table 28, 97 wt % $H_2SO_4$ used was concentrated sulfuric acid (manufactured by Kishida Chemical Co., Ltd.), KOH used was potassium hydroxide (manufactured by manufactured by Nippon Soda Co., Ltd.), and ZnO used was zinc oxide (manufactured by KANTOCHEMICAL CO., LTD.).

Subsequently, the prepared oxide raw-material liquid and oxide precipitation solvent were mixed together using a fluid treatment apparatus described in Patent Literature 6 of the present applicant. A method for treating each fluid and a method for collecting the treated liquid were carried out in a manner similar to Example 1. In Example 5, furthermore, third foreword d3 and liquid C were not used (not shown).

Similar to Example 1, Table 29 represents the operating conditions of the fluid treatment apparatus and the average primary particle diameter of the resulting zinc oxide particles calculated from the results of TEM observation. The procedures for pH measurement, analysis, and particle-washing were also carried out in the same manner as in Example 2.

(Haze Value Measurement)

In the evaluation of Example 5, the haze value of a dispersion of zinc oxide particles was also measured. A haze level meter (model HZ-V3, manufactured by Suga Test Instruments Co., Ltd.) was used for haze level measurement. As the optical condition, D65 light was used as a light source by a double beam method corresponding to JIS K 7136 or JIS K 7361. The measurement was performed on the same dispersion as one used for the transmission spectrum measurement in a liquid cell of 1 mm in thickness.

TABLE 28

| Example 5 | | | | | | | | | | | |
|---|---|---|---|---|---|---|---|---|---|---|---|
| Formulation of the 1st fluid (liquid A: Oxide precipitation solvent) | | | | | Formulation of the 2nd fluid (liquid B: Oxide raw material liquid) | | | | | | |
| Formulation | | | | | Formulation | | | | | | |
| Raw material | [wt %] | Raw material | [wt %] | pH | pH [° C.] | Raw material | [wt %] | Raw material | [wt %] | Raw material | [wt %] | pH | pH [° C.] |
| MeOH | 93.71 | 97 wt % $H_2SO_4$ | 6.29 | <1 | — | ZnO | 3.00 | KOH | 46.56 | Pure water | 50.44 | >14 | — |

TABLE 29

| Example 5 | | | | | | | | |
|---|---|---|---|---|---|---|---|---|
| Introduction flow rate (liquid feed flow rate) [ml/min] | | Introduction temperature (liquid feed temperature) [° C.] | | Introduction pressure (liquid feed pressure) [MPaG] | | Discharged liquid | | Average primary particle diameter [nm] |
| Liquid A | Liquid B | Liquid A | Liquid B | Liquid A | Liquid B | pH | Temp. [° C.] | |
| 575 | 50 | 28 | 28 | 0.106 | 0.112 | 13.66 | 24.1 | 9.4 |

Figure 43:
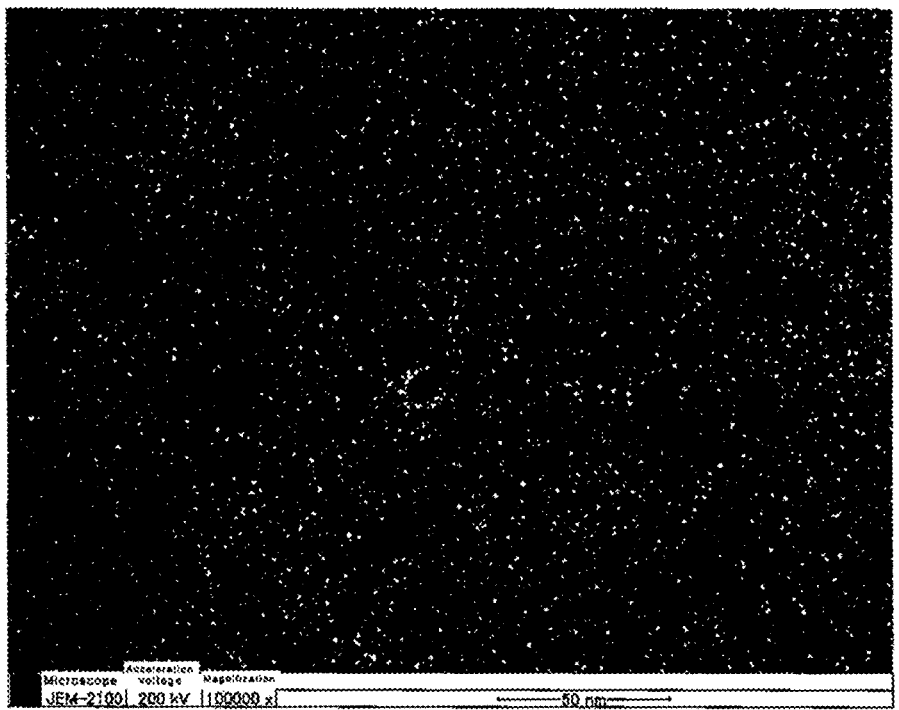
FIG. 43 is a TEM photograph of zinc oxide particles obtained in Example 5 of the present invention.
Figure 43:
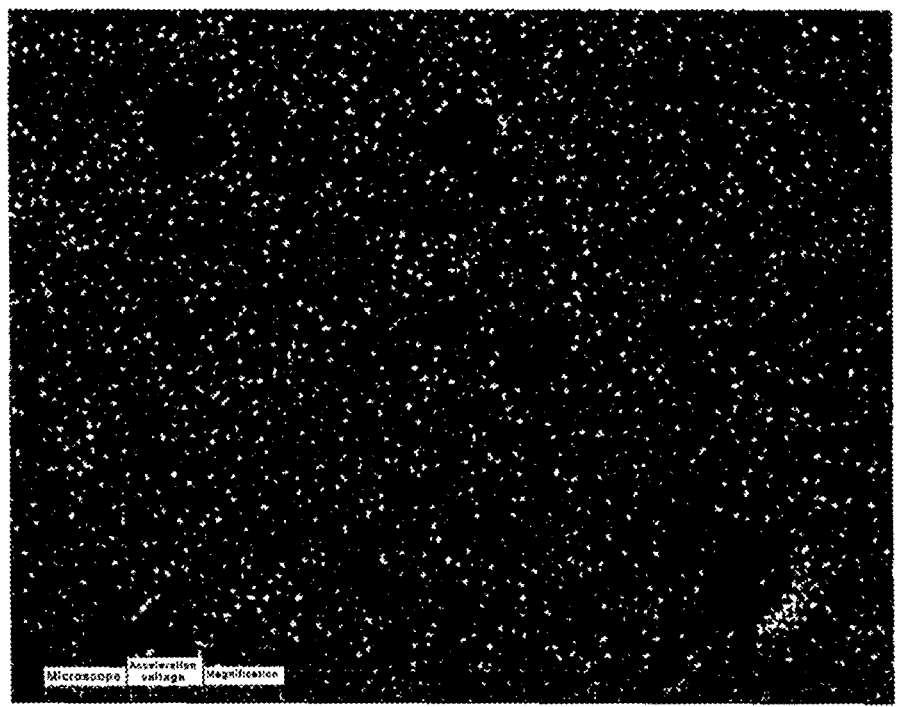

FIG. 43 represents a TEM photograph of zinc oxide particles obtained in Example 5. The zinc oxide particles obtained in Example 5 had primary particle diameters of approximately 5 nm to 15 nm and an average primary particle diameter of 9.4 nm as described in Table 29.

Hydrogen peroxide was acted on the zinc oxide particles obtained in Example 5 to modify the functional groups contained in the zinc oxide particles. Specifically, one part by weight of the zinc oxide particles obtained in Example 5 was charged into 99 parts by weight of propylene glycol (manufactured by Kishida Chemical Co., Ltd.), and subjected to 1-hour dispersion treatment using a high-speed rotation-type dispersion emulsifier CLEARMIX (product name: CLM-2.2S, manufactured by M Technique Co., Ltd) at a rotor speed of 20,000 rpm at 25° C. to prepare a dispersion. Hydrogen peroxide water (manufactured by KANTO CHEMICAL CO., LTD. Purity: 30.9%) was added to the propylene glycol dispersion of the zinc oxide particles and the mixture was then stirred at 25° C. for 15 minutes using the high-speed rotation-type dispersion emulsifier. The resulting treated liquid was centrifuged at 26,000 G for 15 minutes, and the supernatant was then removed to obtain a precipitate. A part of the precipitate was dried at −0.10 MPaG at 25° C. for 20 hours to obtain a dried powder.

Figure 44:
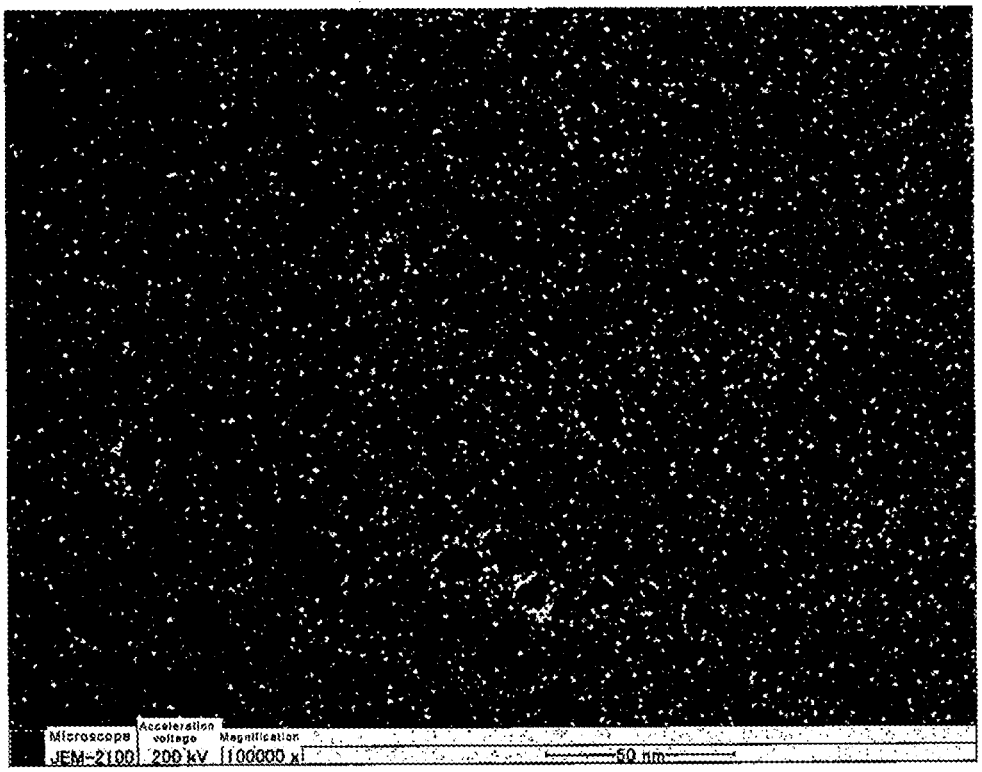
FIG. 44 is a TEM photograph of zinc oxide particles obtained in Example 5-4 of the present invention.
Figure 44:
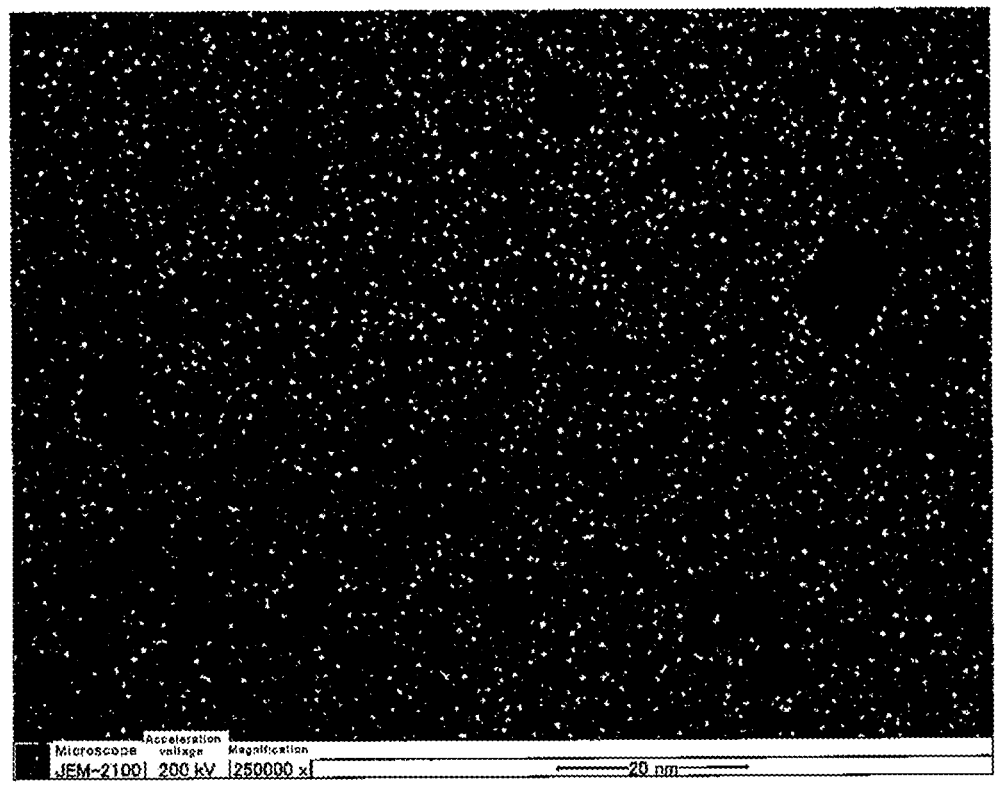

The amount of the hydrogen peroxide liquid was changed, and the treatment was then carried out by changing the molar ratio of hydrogen peroxide to zinc oxide particles. The molar ratio of hydrogen peroxide to zinc oxide particles ($H_2O_2$/ZnO [molar ratio]) is ×0.01 mol for Example 5-2, ×0.50 for Example 5-3, and × 1.00 for Example 5-4. FIG. 44 represents a TEM photograph of zinc oxide particles obtained in Example 5-4. The zinc oxide particles obtained in Example 5-4 also had primary particle diameters of approximately 5 nm to 15 nm and an average primary particle diameter of 9.5 nm.

Figure 45:
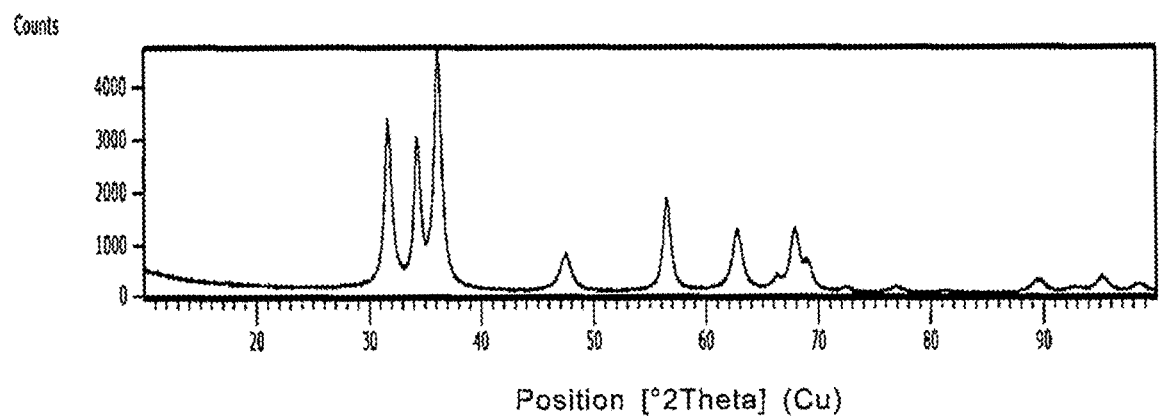
FIG. 45 is a diagram illustrating the results of XRD measurement of zinc oxide particles obtained in Example 5 of the present invention.

FIG. 45 is a diagram illustrating the results of XRD measurement of zinc oxide particles obtained in Example 5 of the present invention. As can be found in FIG. 45, only the peaks that came from zinc oxide (ZnO) were detected in the XRD measurement. Similarly, for the results of XRD measurements in Example 5-2 to 5-4, peaks derived from iron oxide were only detected as illustrated in 45.

Figure 46:
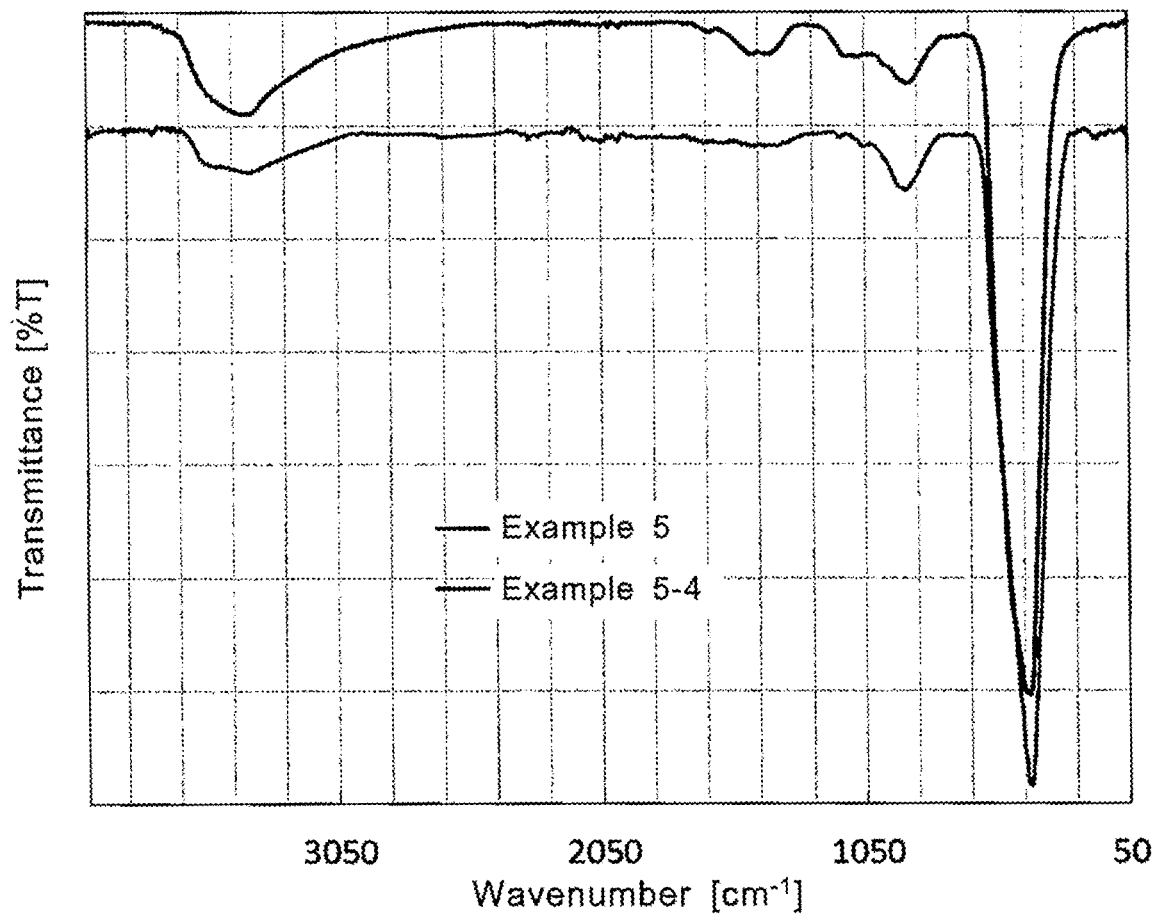
FIG. 46 is a diagram illustrating the results of waveform separation of the IR-measurement results of zinc oxide particles obtained in Example 5 and Example 5-4 of the present invention in a region at wavenumbers of 50 cm$^{-1}$ to 4000 cm$^{-1}$.

FIG. 46 represents the results of FT-IR measurement of the zinc oxide particles obtained in Example 5 and Example 5-4 by the ATR method. From the IR measurement results of the iron oxide particles obtained in Example 5-4, as compared with the results of IR measurement on the iron oxide obtained in Example 5, broad peaks in the vicinity of 750 $cm^{-1}$ to 1250 $cm^{-1}$ originated from the M-OH bonds and peaks in the vicinity of 1300 $cm^{-1}$ to 1500 $cm^{-1}$, which might be caused by reaction of M-OH bonds with carbon oxide, are recognized smaller.

Figure 47:
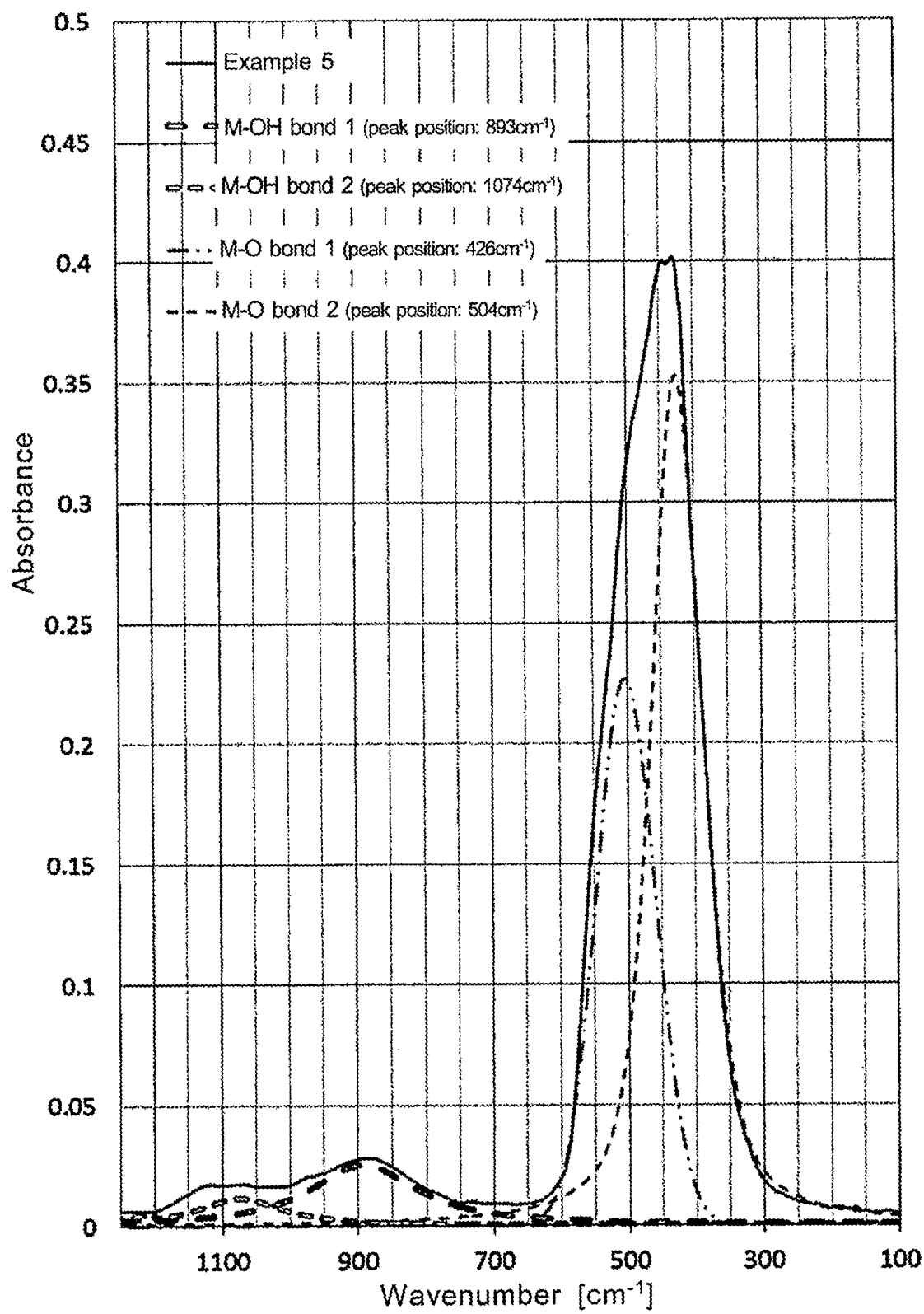
FIG. 47 is a diagram illustrating the results of waveform separation of a region at wavenumbers of 100 cm$^{-1}$ to 1250 cm$^{-1}$ in the IR measurement results of zinc oxide particles obtained in Example 5 of the present invention.
Figure 48:
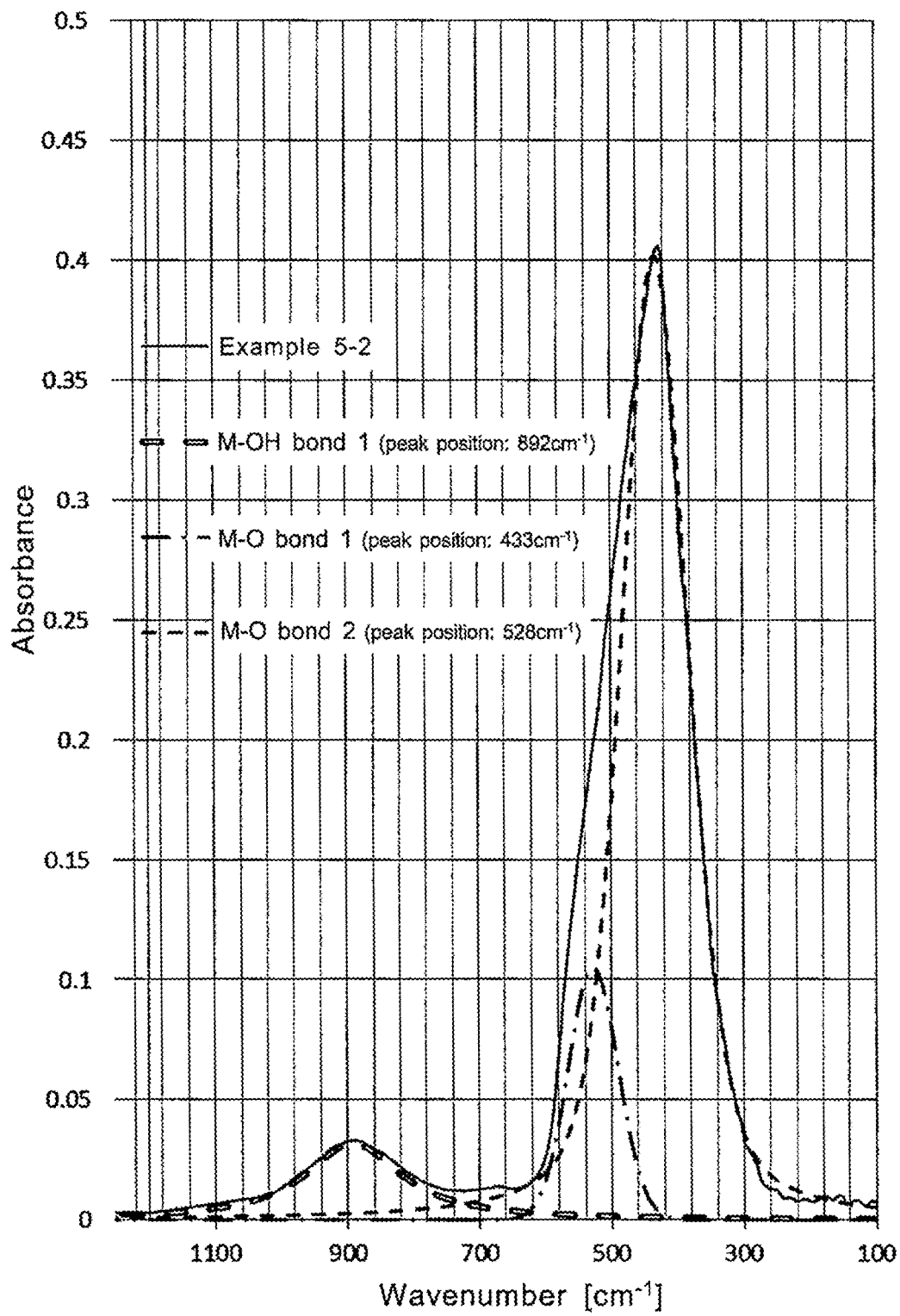
FIG. 48 is a diagram illustrating the results of waveform separation of a region at wavenumbers of 100 cm$^{-1}$ to 1250 cm$^{-1}$ in the IR measurement results of zinc oxide particles obtained in Example 5-2 of the present invention.
Figure 49:
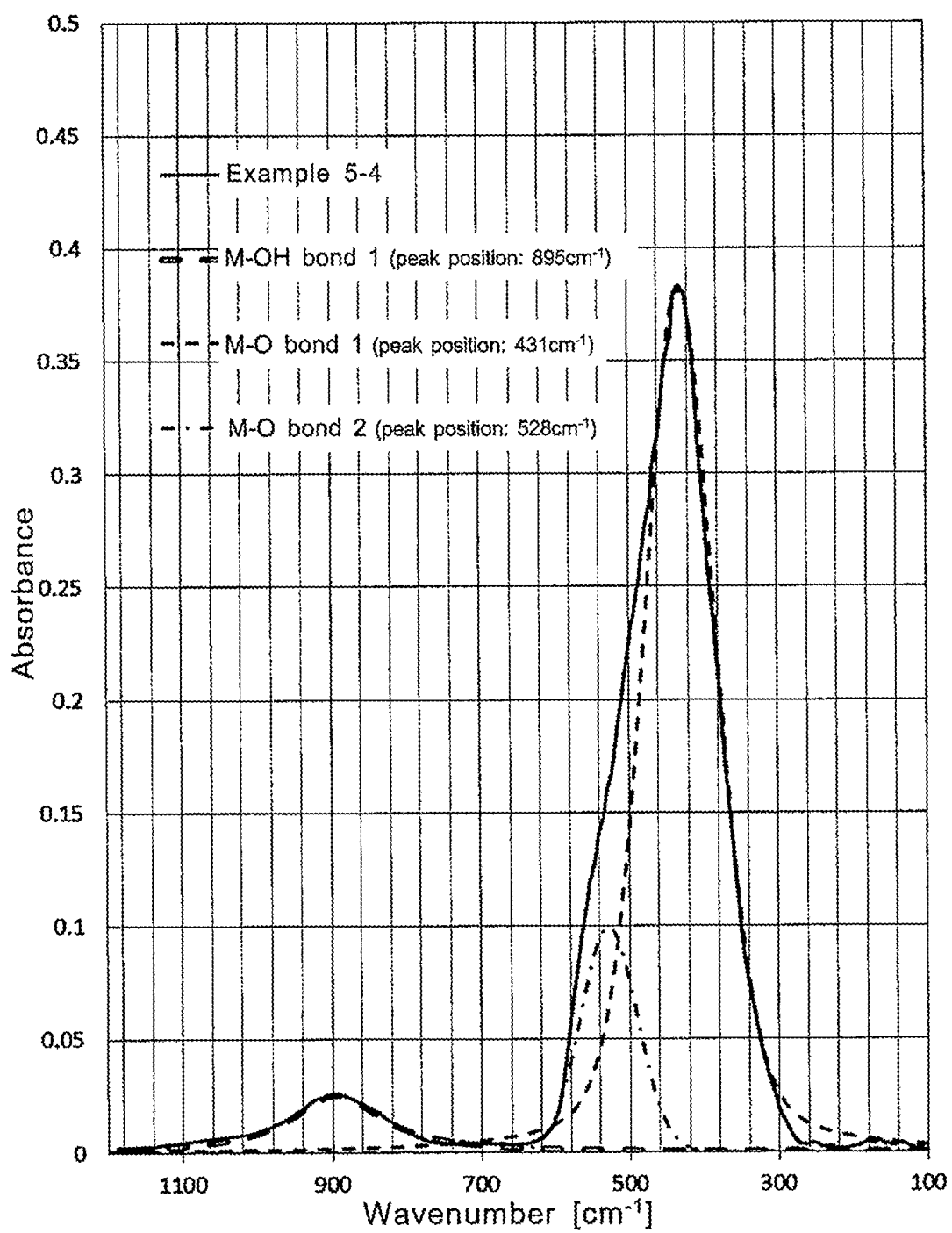
FIG. 49 is a diagram illustrating the results of waveform separation of a region at wavenumbers of 100 cm$^{-1}$ to 1250 cm$^{-1}$ in the IR measurement results of zinc oxide particles obtained in Example 5-4 of the present invention.

The results obtained by waveform separation peaks at wavenumbers of 100 $cm^{-1}$ to 1250 $cm^{-1}$ in the IR measurement are represented in FIG. 47 for Example 5, FIG. 48 for Example 5-2, and FIG. 49 for Example 5-4. With respect to peaks waveform-separated to M-OH bonds, in Examples 5-2 and 5-4, no waveform-separated peak (M-OH bond 2) was confirmed in the vicinity of 1100 $cm^{-1}$. Thus, the peak fitted to the waveform (M-OH bond 2) in the vicinity of 1100 $cm^{-1}$ became smaller to cause a decrease in the ratio of M-OH bonds. Table 30 represents the molar ratio of hydrogen peroxide to zinc oxide particles ($H_2O_2$/ZnO [molar ratio]), the average primary particle diameter of the resulting zinc oxide particles, and the ratio of M-OH. As is evident from Table 30, the ratio of M-OH can be controlled by treating zinc oxide particles with hydrogen peroxide.

Figure 50:
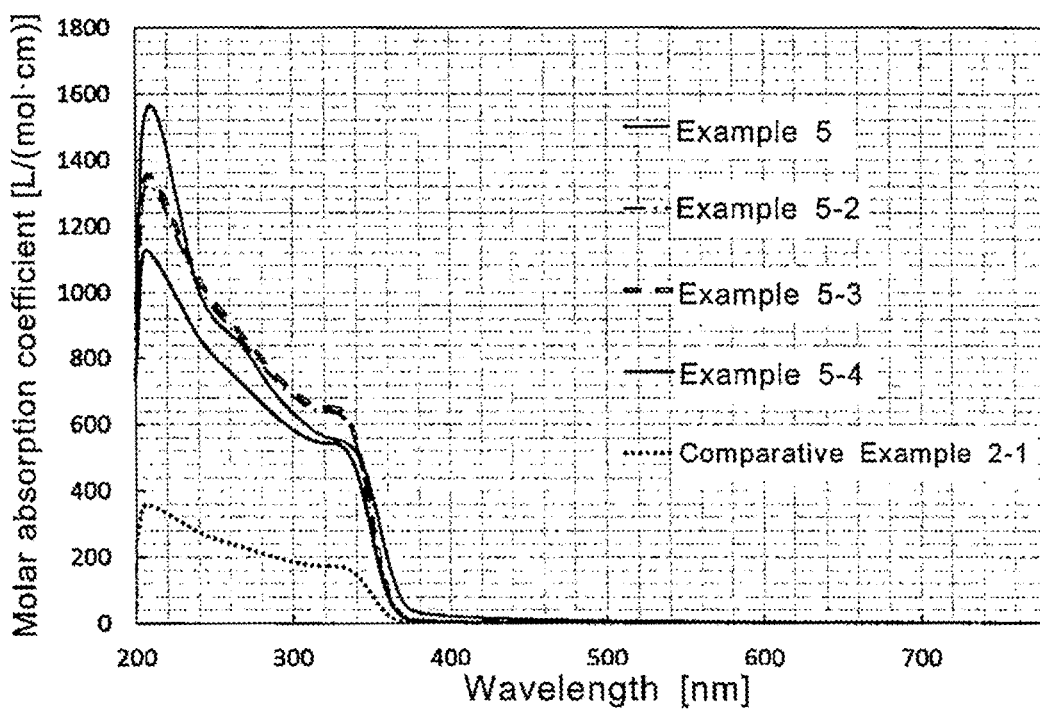
FIG. 50 is a graphic diagram illustrating the molar absorption coefficient for light rays at measurement wave lengths of 200 nm to 780 nm for a dispersion in which zinc oxide particles are dispersed in propylene glycol obtained in each of Example 5 and Examples 5-2 to 5-4.

FIG. 50 is a graph of the molar absorption coefficients of dispersions in which zinc oxide particles obtained in Example 5 and Example 5-2 to Example 5-4 were respectively dispersed in propylene glycol at wavelengths of 200 nm to 780 nm. Table 30 represents the molar absorption coefficients for light rays at wavelengths of 200 nm to 380 nm. As is evident from FIG. 50 and Table 30, the molar absorption coefficients thereof at wavelengths of 200 nm to 380 nm can be controlled by controlling the ratio of M-OH.

Figure 51:
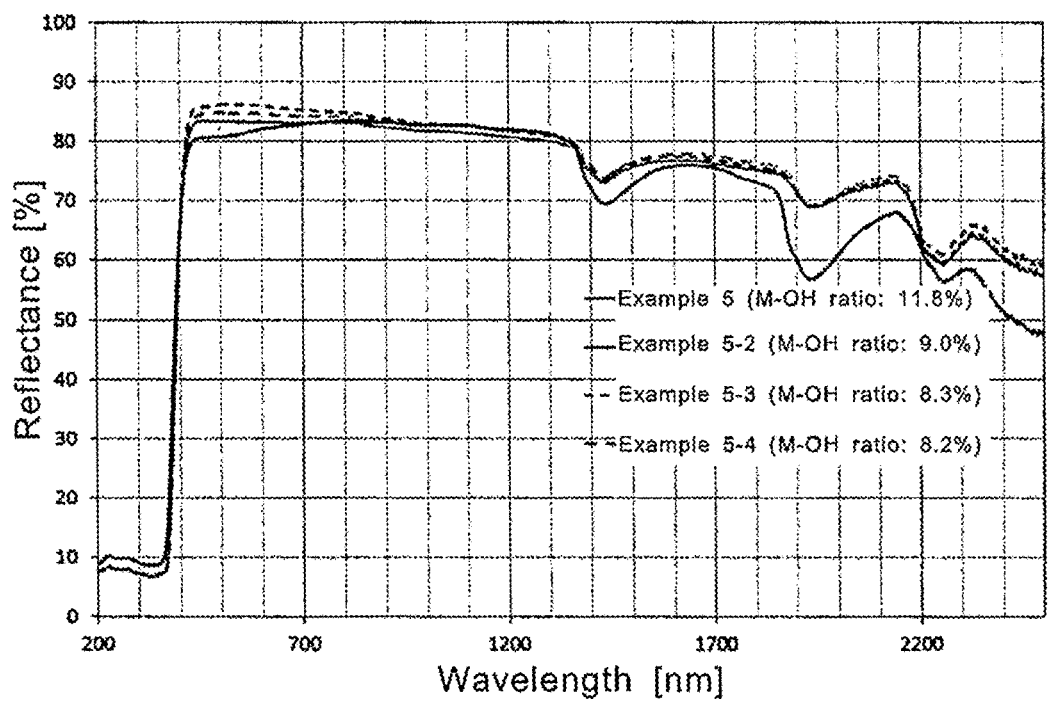
FIG. 51 is a diagram illustrating the results of reflection-spectrum measurement of zinc oxide particles for light rays at wavelengths of 200 nm to 2500 nm, the oxide particles being obtained in each of Example 5 and Examples 5-2 to 5-4 of the present invention.

FIG. 51 represents the reflectance spectra of the zinc oxide particles obtained in Example 5 and Examples 5-2 to 5-4, and Table 30 represents the average reflectance values thereof at wavelengths of 780 nm to 2500 nm. As is evident from FIG. 51 and Table 30, the average reflectance values thereof at wavelengths of 780 nm to 2500 nm can be controlled by controlling the ratio of M-OH.

Figure 52:
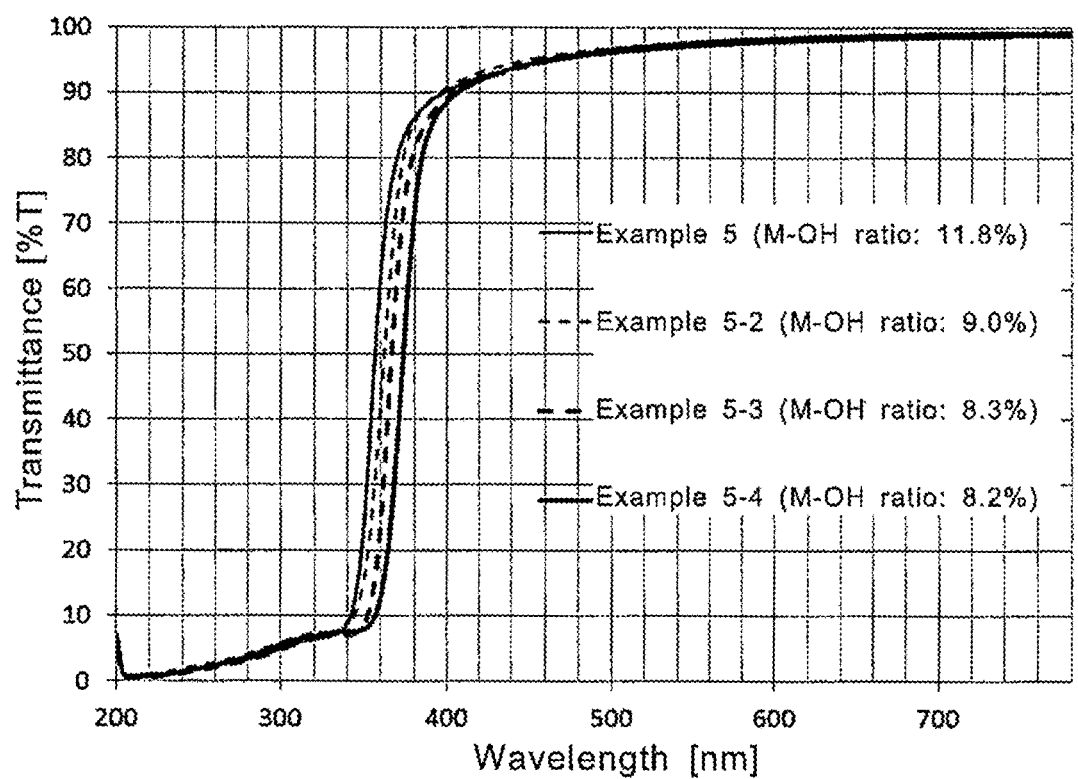
FIG. 52 is a graphic diagram illustrating the transmission spectrum for light rays at wave lengths of 200 nm to 780 nm for a dispersion in which zinc oxide particles are dispersed in propylene glycol obtained in each of Example 5 and Examples 5-2 to 5-4.

FIG. 52 represents transmission spectra of dispersions in which zinc oxide particles obtained in Examples 5 and Example 5-2 to 5-4 were respectively dispersed in propylene glycol as ZnO at a concentration of 0.011% by weight in propylene glycol. It is recognized that the lower the ratio of M-OH, the higher the average reflectance for light rays at wavelengths of 200 nm to 360 nm tended to be shifted to the long wavelength side. It is found that, by controlling the ratio of M-OH, zinc oxide particles suitable for use in a coating composition intended for ultraviolet shielding can be produced. Table 30 represents the transmittance for light rays at wavelengths of 330 nm, the transmittances for light rays at wavelengths 380 nm to 780 nm, and haze values. For all of Example 5 and Example 5-2 to Example 5-4, the transmittance for light rays at a wavelength of 330 nm was 10% or less, the transmittances for light rays at wavelengths 380 nm to 780 nm were 90% or more, and the haze value is 1% or less.

TABLE 30

|  | Example | | | |
| --- | --- | --- | --- | --- |
|  | 5 | 5-2 | 5-3 | 5-4 |
| Average primary particle diameter [nm] | 9.4 | 9.5 | 9.5 | 9.6 |
| $H_2O_2$/ZnO [molar ratio] | 0.00 | 0.01 | 0.50 | 1.00 |
| M-OH ratio [%] | 11.8 | 9.0 | 8.3 | 8.2 |
| Average molar absorption coefficient [L/(mol · cm)] (200-380 nm) | 623 | 723 | 739 | 744 |
| Average reflectance [%] (780-2500 nm) | 68.3 | 72.4 | 74.8 | 75.3 |
| Transmittance [%] (330 nm) | 7.0 | 7.5 | 7.4 | 7.4 |
| Average transmittance [%] (380-780 nm) | 96.4 | 96.5 | 97.0 | 96.9 |
| Haze value [%] | 0.02 | 0.02 | 0.04 | 0.02 |

Figure 53:
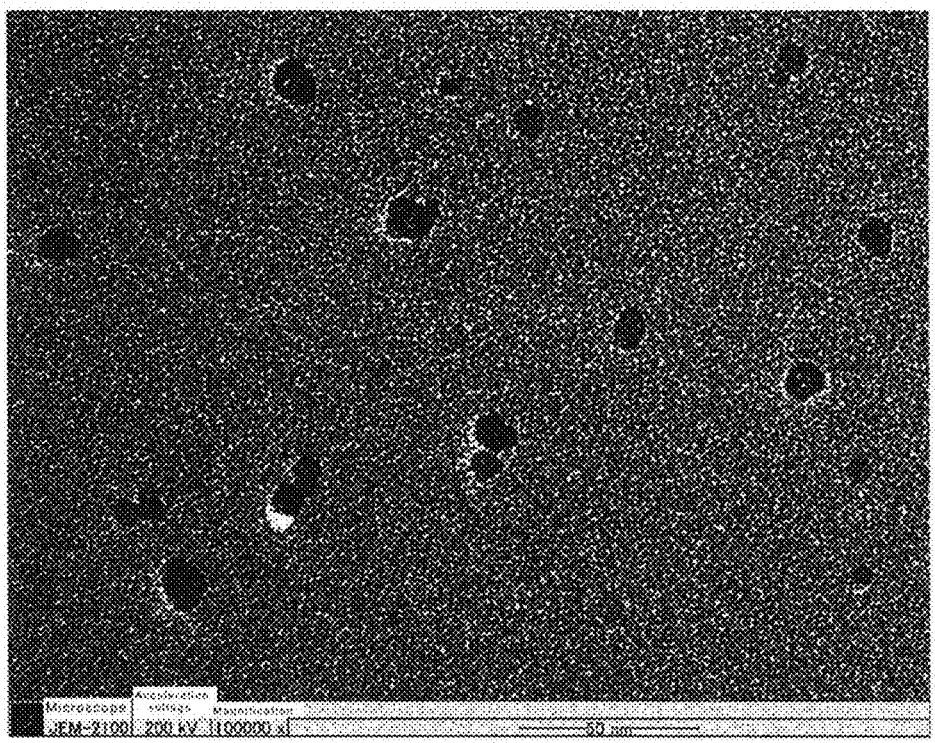
FIG. 53 is a TEM photograph of zinc oxide particles obtained in Example 5-6 of the present invention.
Figure 53:
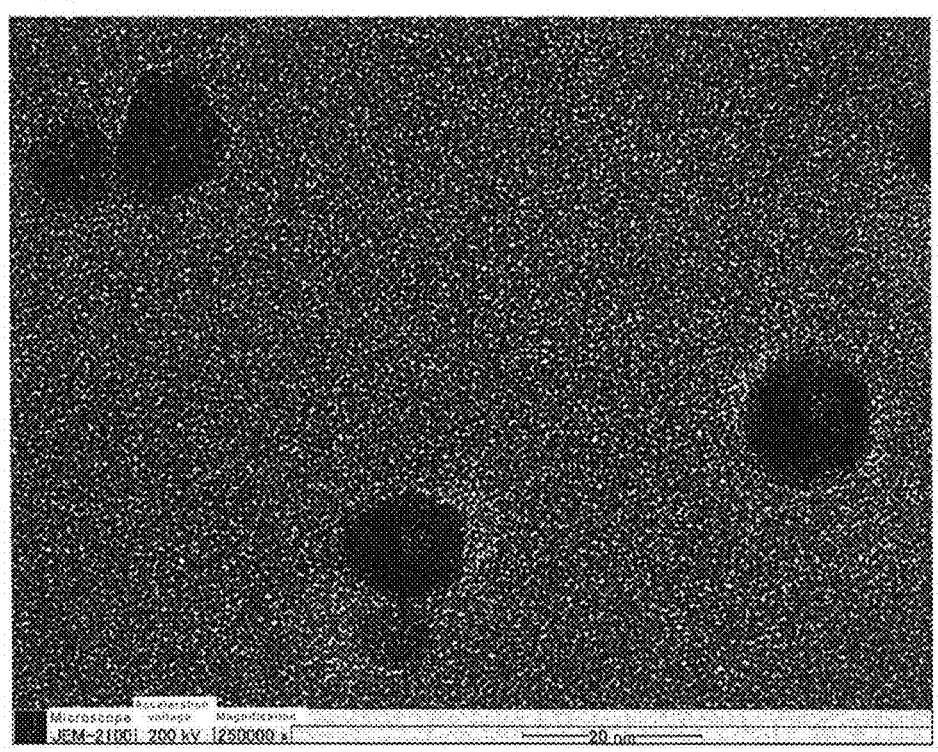

The zinc oxide particles obtained in Example 5 were heat-treated using an electric furnace to modify the functional groups contained in the zinc oxide particles. The heat treatment conditions were as follows: untreated in Example 5; 100° C. in Example 5-5; 200° C. in Example 5-6; and 300° C. in Comparative Example 5-7. For each heat treatment temperature, the duration of heat treatment was 30 minutes. FIG. 53 represents a TEM photograph of zinc oxide particles obtained in Example 5-6. The zinc oxide particles obtained in Example 5-6 had primary particle diameters of approximately 5 nm to 20 nm and an average primary particle diameter of 10.4 nm. Also, the zinc oxide particles obtained in Example 5-5 had an average primary particle diameter of 9.5 nm and Example 5-7 an average primary particle diameter of 9.6 nm.

Figure 54:
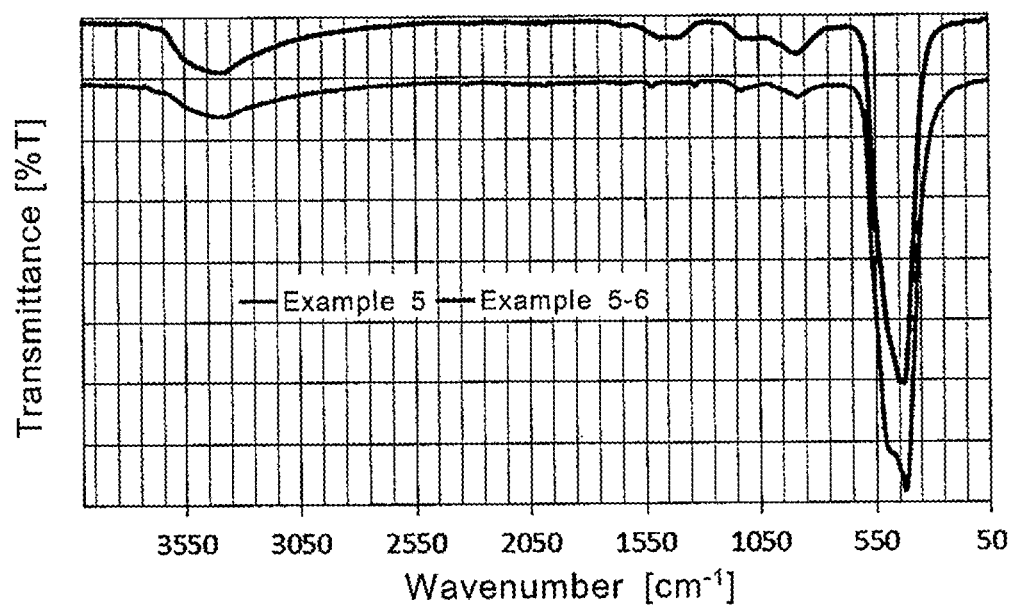
FIG. 54 is a diagram illustrating the results of IR measurement of zinc oxide particles obtained in Example 5 and Example 5-6 of the present invention in a region at wavenumbers of 50 cm$^{-1}$ to 4000 cm$^{-1}$.

FIG. 54 represents the results of FT-IR measurement of the zinc oxide particles obtained in Example 5 and Example 5-6 by the ATR method. Compared to the zinc oxide particles of Example 5, it can be seen that the zinc oxide particles obtained in Example 5-6 have smaller peaks at wavelengths of 800 $cm^{-1}$ to 1250 $cm^{-1}$, which are the peaks of M-OH bonds, or the ratio of M-OH bonds is smaller.

Figure 55:
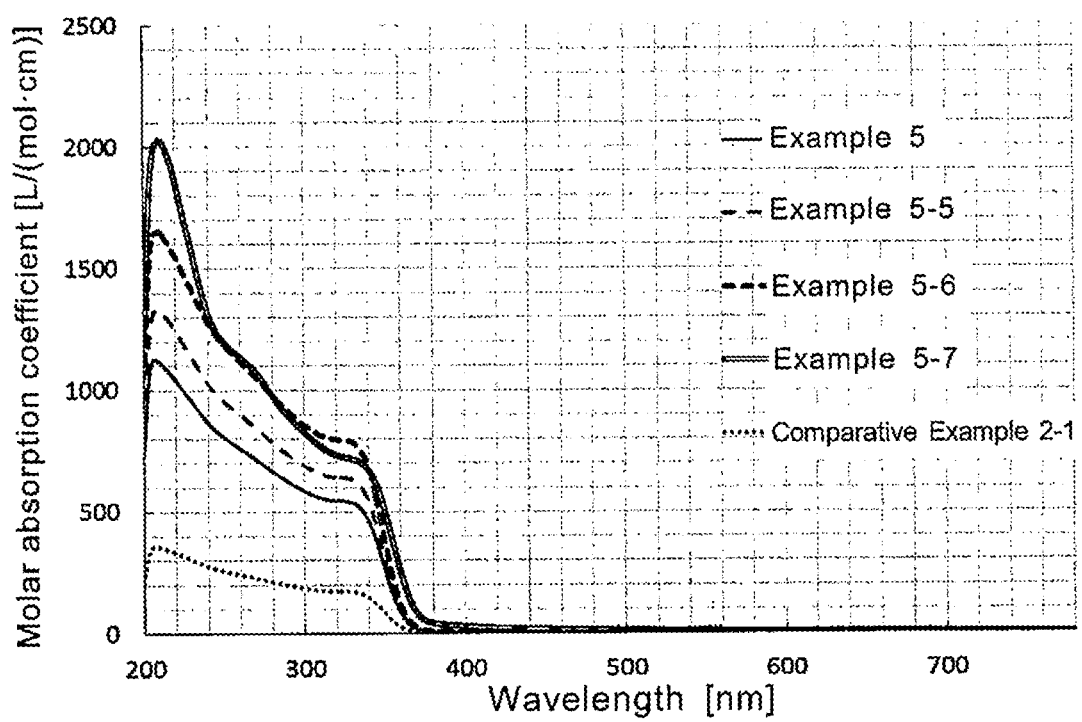
FIG. 55 is a graphic diagram illustrating the molar absorption coefficient for light rays at measurement wave lengths of 200 nm to 780 nm for a dispersion in which zinc oxide particles are dispersed in propylene glycol obtained in each of Example 5, Examples 5-5 to 5-7, and Comparative Example 2-1.

FIG. 55 is a graph of the molar absorption coefficients of dispersions in which zinc oxide particles obtained in Example 5 and Example 5-5 to Example 5-7 and zinc oxide particles having primary particle diameters of more than 50 nm obtained in Comparative Example 2-1, which will be described later, were respectively dispersed in propylene glycol at wavelengths of 200 nm to 380 nm. As is evident from FIG. 55 and Table 31, the molar absorption coefficient for light rays at wavelengths of 200 nm to 380 nm were improved as the M-OH ratio decreases in the order of Examples 5, 5-5, 5-6, and 5-7.

TABLE 31

| | Example | | | |
|---|---|---|---|---|
| | 5 | 5-5 | 5-6 | 5-7 |
| M-OH ratio [%] | 11.8 | 8.7 | 5.3 | 1.4 |
| Average molar absorption coefficient [L/(mol · cm)] (200-380 nm) | 623 | 726 | 902 | 965 |

As is evident from Table 31 and FIG. 55, as the ratio of M-OH bonds (M-OH ratio) of zinc oxide particles became smaller in the range of 12% or less, the molar absorption coefficient for light rays at wavelengths of 200 nm to 380 nm became larger. In the present invention, preferable zinc oxide particles are those in which the ratio of M-OH bonds contained therein is 12% or less and the molar absorption coefficient thereof is 500 L/(cm·mol) or more at wavelengths of 200 nm to 380 nm. More preferable zinc oxide particles are those in which the ratio of M-OH bonds contained therein is 11.2% or less and the molar absorption coefficient thereof is 650 L/(cm·mol) or more at wavelengths of 200 nm to 380 nm.

Figure 56:
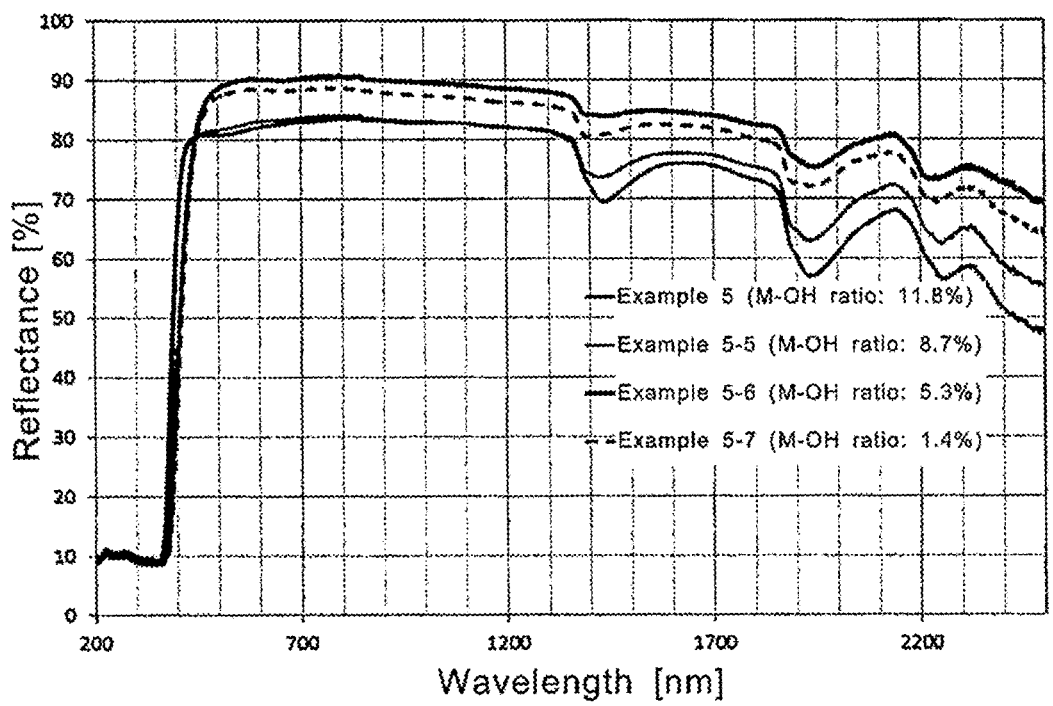
FIG. 56 is a diagram illustrating the results of reflection-spectrum measurement of zinc oxide particles for light rays at wavelengths of 200 nm to 2500 nm, the oxide particles being obtained in each of Example 5 and Examples 5-5 to 5-7 of the present invention.
Figure 57:
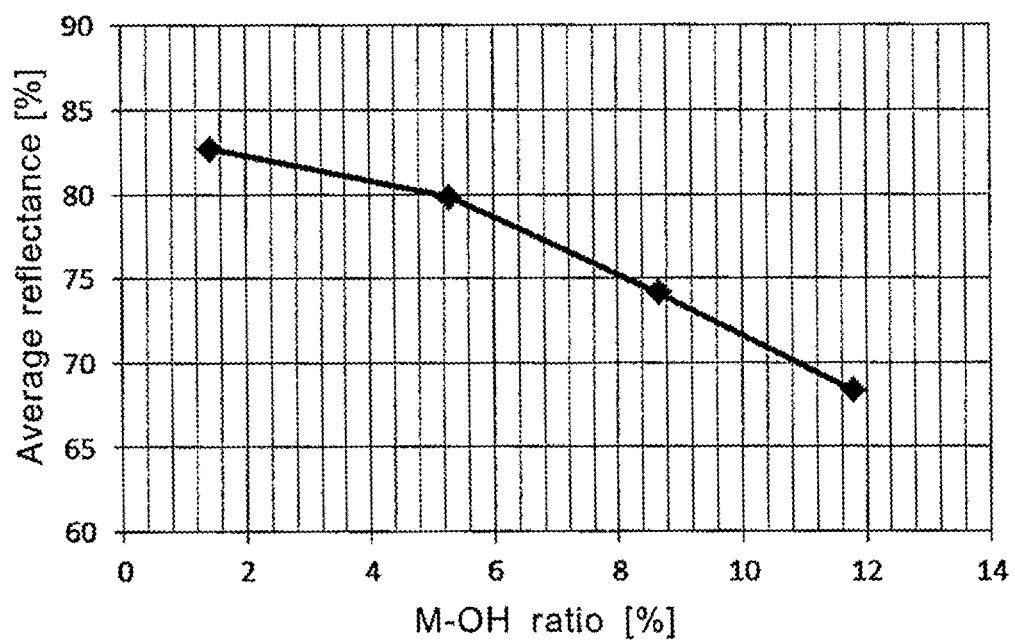
FIG. 57 is a graphic diagram illustrating the average reflectance for light rays at wavelengths of 780 nm to 2500 nm for the ratio of M-OH bonds contained in zinc oxide particles obtained in Example 5 and Examples 5-5 to 5-7 of the present invention.

FIG. 56 represents the reflectance spectra of the zinc oxide particles obtained in Example 5 and Examples 5-5 to 5-7 for light rays at wavelengths of 200 nm to 2500 nm. FIG. 57 represents a graph of the average reflectance for light rays at wavelengths of 780 nm to 2500 nm in the near-infrared region with respect to the ratio of M-OH calculated from the IR spectrum of each example.

Figure 58:
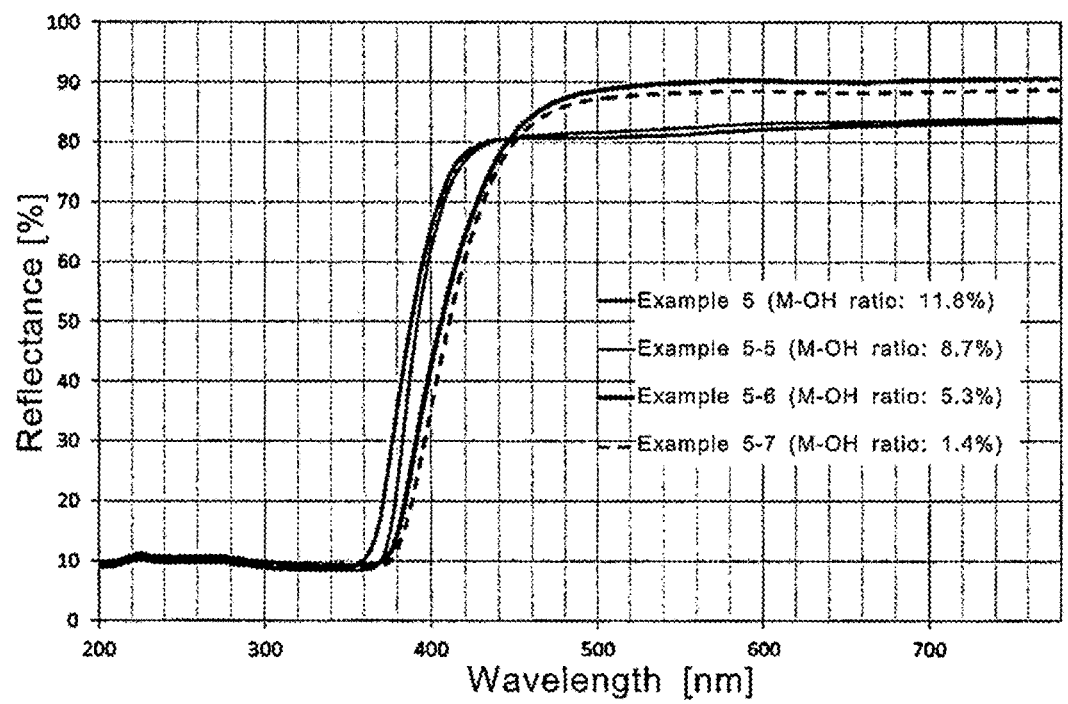
FIG. 58 is a diagram illustrating a reflection spectrum of zinc oxide particles for light rays at wavelengths of 200 nm to 780 nm, the oxide particles being obtained in each of Example 5 and Examples 5-5 to 5-7 of the present invention.

FIG. 58 is a diagram illustrating the results of reflection spectrum measurement of zinc oxide particles for light rays at wavelengths of 200 nm to 780 nm, the oxide particles being obtained in each of Example 5 and Examples 5-5 to 5-7. As is evident from FIG. 58, it is recognized that the lower the ratio of M-OH, the higher the average reflectance for light rays at wavelengths of 200 nm to 360 nm tended to be shifted to the long wavelength side. Table 32 represents: the average reflectance of the zinc oxide particles obtained in Example 5 and Example 5-5 to Example 5-7 for light rays at wavelengths of 780 nm to 2500 nm; the transmittance in a transmission spectrum at wavelengths of 330 nm of the dispersion in which the zinc oxide particles obtained in each of these examples were dispersed as ZnO of 0.011 wt %; an average transmittance for light rays at wavelengths of 380 nm to 780 nm; and haze value.

TABLE 32

| | Example | | | |
|---|---|---|---|---|
| | 5 | 5-5 | 5-6 | 5-7 |
| M-OH ratio [%] | 11.8 | 8.7 | 5.3 | 1.4 |
| Average reflectance [%] (780-2500 nm) | 68.3 | 74.1 | 79.8 | 82.7 |
| Transmittance [%] (330 nm) | 7.0 | 7.5 | 6.9 | 7.4 |
| Average transmittance [%] (380-780 nm) | 96.4 | 97.0 | 96.5 | 96.5 |
| Haze value [%] | 0.02 | 0.02 | 0.03 | 0.04 |

As is evident from FIGS. 56 and 57 and Table 32, the lower the ratio of M-OH, the higher the average reflectance for light rays at wavelengths of 780 nm to 2500 nm tended to be observed. In the zinc oxide particles obtained in Example 5 and Examples 5-5 to Example 5-7, the average reflectance value for rays in the near infrared region at wavelengths of 780 nm to 2500 nm was 65% or more. Further, although the transmittance of the zinc oxide particle dispersion was 10% or less for the light rays at a wavelength of 330 nm, the average transmittance of the zinc oxide particle dispersion for the light ray at wavelengths of 380 nm to 780 nm was 90% or more. In addition, the haze value was a very low value in the range of 0.02% to 0.04%.

Comparative Example 2

Figure 59:
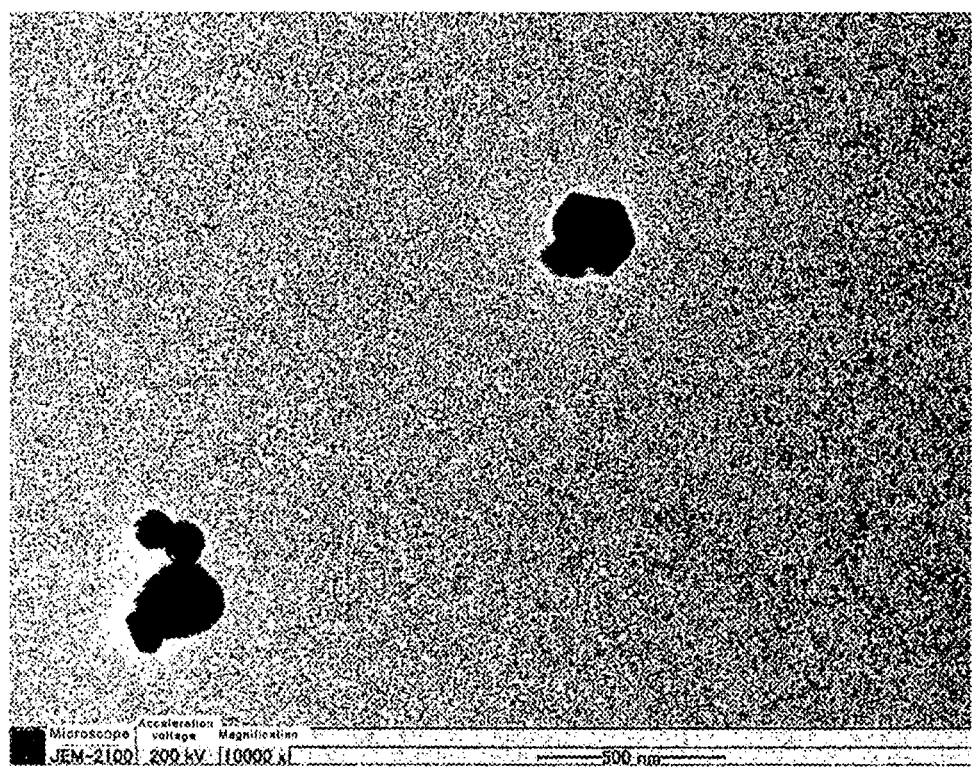
FIG. 59 is a TEM photograph of zinc oxide particles obtained in Comparative Example 2-1 of the present invention.

The ratio of M-OH bonds was changed for zinc oxide particles having primary particle diameters of 150 nm to 300 nm (manufactured by KANTO CHEMICAL CO., LTD. Special grade 3N5). FIG. 59 represents a TEM photograph of Comparative Example 1. The zinc oxide particles were heat-treated using an electric furnace to modify the functional groups contained in the zinc oxide particles. The heat treatment conditions were as follows: untreated in Comparative Example 2-1; 100° C. in Comparative Example 2-2; and 300° C. in Comparative Example 2-3. For each heat treatment temperature, the duration of heat treatment was 30 minutes. Table 33 represents: the M-OH ratio of the zinc oxide particles obtained in each of Comparative Example 2-1 to Comparative Example 2-3; the molar absorption for light rays at wavelengths of 200 nm to 380 nm in the dispersion obtained by dispersing the zinc oxide particles in propylene glycol; the transmittance in a transmission spectrum at wavelengths of 330 nm of the dispersion in which the zinc oxide particles obtained in each of these examples were dispersed as ZnO of 0.11 wt %; an average transmittance for light rays at wavelengths of 380 nm to 780 nm; and haze value. As is evident from Table 33, zinc oxide particles having primary particle diameters of more than 50 nm showed substantially no difference in the aforementioned molar absorption coefficient, transmittance, and haze value even when the ratio of M-OH bonds was changed, thereby having low ultraviolet absorption capacity and low transparency. In comparison between Comparative Example 2-1 and Example 5-7 in particular, even the zinc oxide particles have the ratio of M-OH similar to the zinc oxide particles having primary particle diameters of 50 nm or less obtained in Example 5-7, it is found that the zinc oxide particles of Comparative Example 2-1 have lower molar absorption coefficients in a region at wavelengths of 200 nm to 380 nm. In the present invention, when the primary particle diameter is as small as 50 nm or less, the ratio of M-OH affects the color characteristics. That is, in a state where the surface area is increased with respect to the same amount of zinc oxide particles, color characteristics can be controlled by controlling the M-OH ratio. Furthermore, the average primary particle diameter of Comparative Example 2-1 was 228 nm, the average primary particle diameter of Comparative Example 2-2 was 228 nm, and the average primary particle diameter of Comparative Example 2-3 was 225 nm.

TABLE 33

| | Comparative Example | | |
|---|---|---|---|
| | 2-1 | 2-2 | 2-3 |
| M-OH ratio [%] | 1.6 | 0.8 | 0.2 |
| Average molar absorption coefficient [L/(mol · cm)] (200-380 nm) | 196 | 197 | 199 |
| Transmittance [%] (330 nm) | 15.1 | 15.6 | 15.3 |

TABLE 33-continued

| | Comparative Example | | |
|---|---|---|---|
| | 2-1 | 2-2 | 2-3 |
| Average transmittance [%] (380-780 nm) | 65.1 | 66.4 | 66.5 |
| Haze value [%] | 3.68 | 3.81 | 3.78 |

Comparative Example 3

Figure 60:
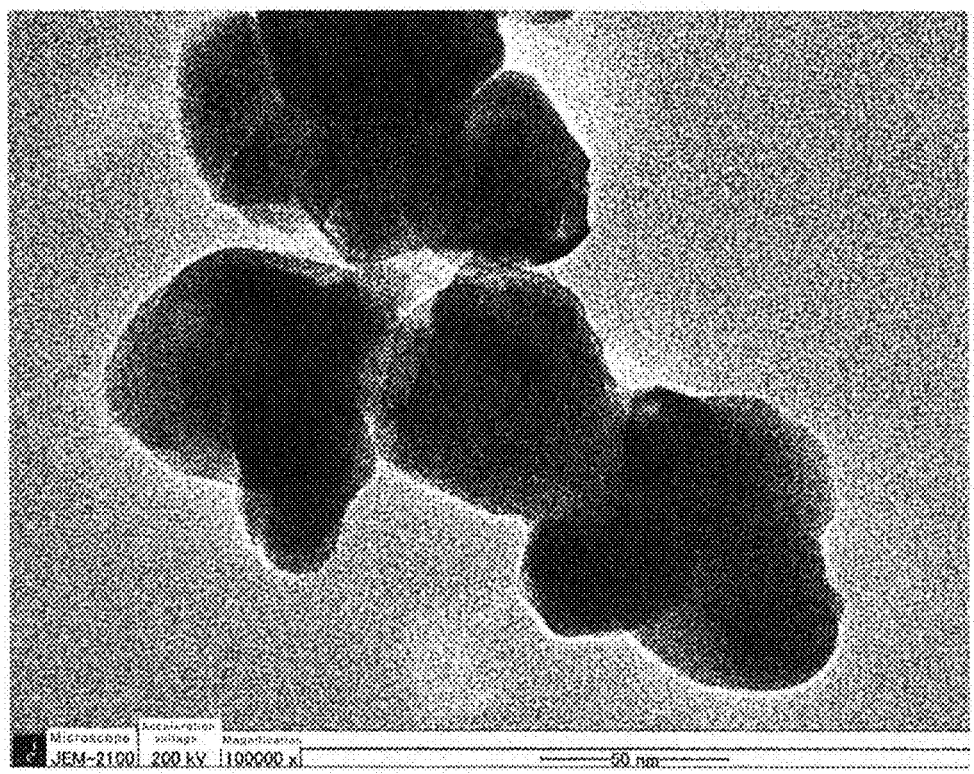
FIG. 60 is a TEM photograph of zinc oxide particles obtained in Comparative Example 3-1 of the present invention.
Figure 61:
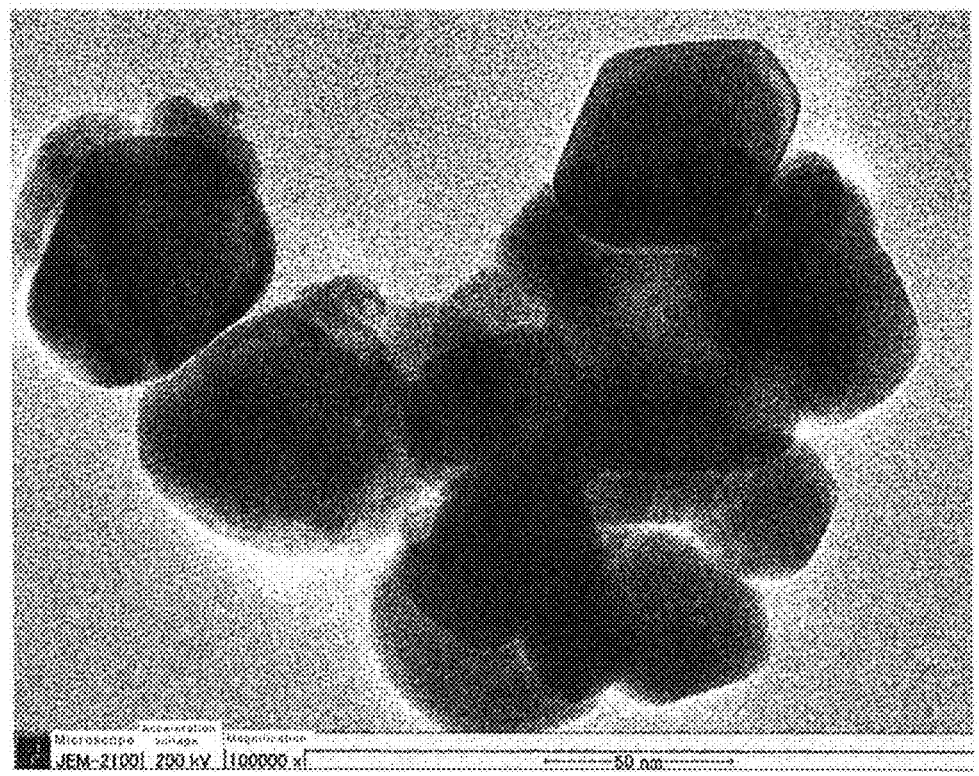
FIG. 61 is a TEM photograph of zinc oxide particles obtained in Comparative Example 3-2 of the present invention.

The zinc oxide particles obtained in Example 5 were heat-treated using an electric furnace to modify the functional groups contained in the zinc oxide particles. The heat treatment conditions were 400° C. (Comparative Example 3-1) and 600° C. (Comparative Example 3-2). For each heat treatment temperature, the duration of heat treatment was 30 minutes. The TEM photographs of zinc oxide particles treated under these heat-treatment conditions are shown in FIG. 60 (Comparative Example 3-1) and FIG. 61 (Comparative Example 3-2), respectively. As illustrated in FIG. 60 and FIG. 61, obvious fusion bonding of the zinc oxide particles was observed, and the primary particle diameters of some of them exceeded 50 nm. Table 34 represents: the M-OH ratio of the zinc oxide particles obtained in each of Comparative Example 3-1 and Comparative Example 3-2; the molar absorption for light rays at wavelengths of 200 nm to 380 nm in the dispersion obtained by dispersing the zinc oxide particles in propylene glycol; the transmittance in a transmission spectrum at wavelengths of 330 nm of the dispersion in which the zinc oxide particles obtained in each of these examples were dispersed as ZnO of 0.11 wt %; an average transmittance for light rays at wavelengths of 380 nm to 780 nm; and haze value.

TABLE 34

| | Comparative Example | |
|---|---|---|
| | 3-1 | 3-2 |
| M-OH ratio [%] | 0.6 | 0.2 |
| Average molar absorption coefficient [L/(mol · cm)] (200-380 nm) | 239 | 237 |
| Transmittance [%] (330 nm) | 13.2 | 13.1 |
| Average transmittance [%] (380-780 nm) | 66.4 | 64.9 |
| Haze value [%] | 2.35 | 2.39 |

As is evident from Table 34, as in Comparative Example 1, zinc oxide particles having primary particle diameters of more than 50 nm showed substantially no difference in the aforementioned molar absorption coefficient, transmittance, and haze value even when the ratio of M-OH bonds was changed, thereby having low ultraviolet absorption capacity and low transparency.

Example 6 zinc oxide particles were prepared as those of Example 6-1 in a manner similar to Example 5 except that the apparatus described in JP 2009-112892 and procedures for mixing and reacting liquid A (oxide raw-material liquid) with liquid B (oxide precipitation solvent) were employed. Here, the apparatus described in JP 2009-112892 is one described in FIG. 1 of this publication. The inner diameter of a stirring tank was 80 mm, the gap between the outer end of a stirring tool and the inner peripheral side surface of the stirring tank was 0.5 mm, and the rotational speed of the stirring blade was 7,200 rpm. In addition, liquid A was introduced into the stirring tank, and liquid B was then added to a thin film composed of liquid A being pressed against the inner peripheral side surface of the stirring tank to mix and react with each other. As a result of TEM observation, zinc oxide particles of approximately 30 nm in primary particle diameter were observed.

The zinc oxide particles obtained in Example 6-1 were subjected to a heat treatment using an electric furnace to modify the functional groups contained in the zinc oxide particles. The heat treatment conditions were as follows: untreated in Example 6-1; 100° C. in Example 6-2; 200° C. in Example 6-3; and 300° C. in Example 6-4. For each heat treatment temperature, the duration of heat treatment was 30 minutes. Table 35 represents, of the zinc oxide particles obtained in Example 6-1 to Example 6-4, the M-OH ratio, the average molar absorption coefficient at wavelengths of 200 nm to 380 nm, the average reflectance for light rays at wavelengths of 780 nm to 2500 nm, the transmittance for light rays at a wavelength of 330 nm, the average transmittance at wavelengths of 380 nm to 780 nm, and haze value. In addition, the transmittances and molar absorption coefficients of zinc oxide particles respectively prepared in Example 6-1 to Example 6-4 were measured using propylene glycol as a dispersion medium in a manner similar to Example 5.

TABLE 35

| | Example | | | |
|---|---|---|---|---|
| | 6-1 | 6-2 | 6-3 | 6-4 |
| Average primary particle diameter [nm] | 35.6 | 36.4 | 35.8 | 35.9 |
| M-OH ratio [%] | 11.2 | 9.2 | 4.8 | 1.0 |
| Average molar absorption coefficient [L/(mol · cm)] (200-380 nm) | 651 | 718 | 909 | 972 |
| Average reflectance [%] (780-2500 nm) | 69.4 | 71.9 | 80.2 | 83.2 |
| Transmittance [%] (330 nm) | 8.6 | 8.8 | 9.1 | 9.2 |
| Average transmittance [%] (380-780 nm) | 92.1 | 93.1 | 92.4 | 93.3 |
| Haze value [%] | 0.29 | 0.31 | 0.35 | 0.39 |

As is evident in Table 35, even in the case of using zinc oxide particles produced by using an apparatus different from those of Examples 1 to 5, the ratio of M-OH can be controlled by modifying the functional groups contained in the zinc oxide particles having primary particle diameters of 50 nm or less to control the molar absorption coefficient thereof at wavelengths of 200 nm to 380 nm and the average reflectance values thereof at wavelengths of 780 nm to 2500 nm. For all of Example 6-1 to Example 6-4, the transmittance for light rays at a wavelength of 330 nm was 10% or less, the transmittances for light rays at wavelengths 380 nm to 780 nm were 90% or more, and the haze value is 1% or less.

Comparative Example 4

As Comparative Example 4-1, zinc oxide particles were prepared in a manner similar to Example 6-1 except that the distance between the gap between the outer end of the stirring tool and the inner peripheral side surface of the stirring tank was 1 mm, and the rotational speed of the stirring blade was one sixth (1,200 rpm) of the rotary speed employed in Example 6. As a result of TEM observation, zinc oxide particles of approximately 70 nm in primary particle diameter were observed.

The iron oxide particles obtained in Comparative Example 4-1 were subjected to a heat treatment using an electric furnace to modify the functional groups contained in the iron oxide particles. The heat treatment conditions were as follows: untreated in Comparative Example 4-1; 100° C. in Comparative Example 4-2; and 300° C. in Comparative Example 4-3. For each heat treatment temperature, the duration of heat treatment was 30 minutes. Table 36 represents, of the zinc oxide particles obtained in Comparative Example 4-1 to Comparative Example 4-3, the M-OH ratio, the molar absorption coefficients thereof at wavelengths of 200 nm to 380 nm, the average reflectance values thereof at wavelengths of 780 nm to 2500 nm, the transmittance for light rays at a wavelength of 330 nm, the transmittances thereof at wavelengths 380 nm to 780 nm, and the haze value. In addition, the transmittances and molar absorption coefficients of zinc oxide particles respectively prepared in Comparative Example 4-1 to Comparative Example 4-2 were measured using propylene glycol as a dispersion medium in a manner similar to Examples 1 to 5.

TABLE 36

|  | Comparative Example | | |
| --- | --- | --- | --- |
|  | 4-1 | 4-2 | 4-3 |
| Average primary particle diameter [nm] | 115.6 | 116.2 | 116.7 |
| M-OH ratio [%] | 8.3 | 6.5 | 3.2 |
| Average molar absorption coefficient [L/(mol · cm)] (200-380 nm) | 231 | 243 | 251 |
| Average reflectance [%] (780-2500 nm) | 55.9 | 56.8 | 57.1 |
| Transmittance [%] (330 nm) | 11.1 | 11.3 | 11.5 |

TABLE 36-continued

|  | Comparative Example | | |
| --- | --- | --- | --- |
|  | 4-1 | 4-2 | 4-3 |
| Average transmittance [%] (380-780 nm) | 76.9 | 75.1 | 73.9 |
| Haze value [%] | 2.18 | 2.11 | 2.26 |

As is evident from Table 36, for zinc oxide particles having primary particle diameters of more than 100 nm, even if the M-OH ratio is changed, the molar absorption coefficients at wavelengths from 200 nm to 780 nm and the average reflectance values at wavelengths of 780 nm to 2500 nm did not change significantly. Under the conditions of Comparative Example 4-1 to Comparative Example 4-3, furthermore, the transmittance for light rays at a wavelength of 330 nm was 10% or more, the transmittances thereof at wavelengths 380 nm to 780 nm was less than 90%, and the haze value exceeded 1%.

Example 7

Subsequently, from the dispersion of zinc oxide particles discharged from the fluid treatment apparatus and collected in the beaker in the Example 5, zinc oxide particles were prepared in a manner similar to Example 1 except that the dispersion was subjected to the dispersion modifier 100 shown in FIG. 34. Table 37 represents the conditions for controlling the ratio of M-OH bonds in the zinc oxide particles using the dispersion modifier 100 of FIG. 34. Zinc oxide particles in which the ratio of M-OH bonds was controlled were obtained in the same manner as in Examples 1-11 to Example 1-13 except for the contents described in Table 37.

Both the procedures for dispersing the dispersion of zinc oxide particles and procedures for removal of impurities in the dispersion of zinc oxide particles were carried out repeatedly until the pH of the dispersion of zinc oxide particles reached 7.01 (measurement temperature: 23.2° C.) and the conductivity thereof reached 0.04 μS/cm. The impurities contained in the aggregates of zinc oxide particles were also removed. Thus, each of the zinc oxide particles in the dispersion thereof was modified.

TABLE 37

|  | Processing solution | Examples 7-1<br>Zinc oxide particle dispersion liquid |
| --- | --- | --- |
| (1) | 1st amount of solution charged into container 130 | Type: MeOH<br>pH 7.00 (measurement temperature; 23.5° C.)<br>Conductivity 0.01 μS/cm (measurement temperature 23.5° C.)<br>Input: 15 L (ca. 12 kg) |
| (2) | Type, flow rate, and temperature of cross flow cleaning liquid | Type: MeOH<br>pH 7.00 (measurement temperature: 23.5° C.)<br>Conductivity (5.01 μS/cm (measurement temperature 23.5° C.)<br>Flow rate: 0.7 L/min, 24° C. |
| (3) | Dispersing machine 102 | CLEARMIX (product name: CLM-2. 2S, rotor: R1, screen: S 0.8-48, manufactured by M Technique Co., Ltd.) |
| (4) | Removal part 120 | Hollow fiber type dialyzer PN-220 (film area: 2.2 m², material: polysulfone), manufactured by Nikkiso Co., Ltd, |
| (5) | Rotor speed | 10,000 rpm (peripheral speed: 15.7 m/S) |
| (6) | Start of charging oxide particle dispersion | When the first pure water inside the vessel 130 has been reduced to 1 L |
| (7) | Input of oxide particle dispersion into oxide container 130 | 15 L (ca. 12 kg) |
| (8) | pH of oxide particle dispersion liquid inside vessel 130 | more then 14 (measuring temperature: 23.2° C.) |
| (9) | Conductivity of oxide particle dispersion liquid inside the vessel 130 | 2999 μS/cm (measurement temperature: 23.2° C.) |
| (10) | Flow rate of pump 104 | 8.8 L/min |
| (11) | Flow rate oxide particle dispersion liquid is returned to storage container 130 | 7.3 L/min |

TABLE 37-continued

| Processing solution | Examples 7-1<br>Zinc oxide particle dispersion liquid |
|---|---|
| (12) Discharge amount (calculated value) of filtrate L3 by removal part 120 | 1.5 L/min |
| (13) Timing of introduction of diluent into container 130 | When the dispersion amount in storage container 130 is concentrated to 1.5 L |
| (14) Type and input of 2nd different dilution to storage container 130 | Type: MeOH<br>pH 7.00 (measurement temperature: 23.5° C.)<br>Conductivity 0.01 μS/cm (measurement temperature 23.5° C.)<br>Flow rate: 0.7 L/min, 24° C. |
| (15) Concentration of oxide particles in oxide particle dispersion | 1.0 wt % to 10.0 wt % |
| (16) Pressure gauge | Pa: Both of two are 0.10 MPaG |
| (17) Pressure gauge | Pb: 0.15 MPaG |
| (18) Pressure gauge | Pc: 0.02 MPaG |
| (19) Path length (Lea) | 0.3 m |
| (20) Pipping inner diameter (Leb) | 0.0105 m |
| (21) Flow velocity of oxide particle dispersion liquid in immediately preceding transport path | 1.2 m/sec |
| (22) Time T1 until removal part 120 starts removal of impurities from dispersion container 101 | 0.24 sec |
| (23) Thermometer placed in the dispersion container 101 | 23° C. to 26° C. |
| (24) Temperature of oxide particle dispersion | 23° C. to 26° C. |
| (25) Conductivity measuring machine | Electrical conductivity meter, model number ES-51 manufactured by HORIBA, Ltd. |

Zinc oxide particles with different M-OH ratios were prepared by changing the treatment temperature for modifying the dispersion of zinc oxide particles shown in (23) and (24) of Table 37. Table 38 represents: the treatment temperature for modifying the dispersion of zinc oxide particles; the ratio of M-OH in the resulting zinc oxide particles the average reflectance values thereof at wavelengths of 780 nm to 2500 nm, the average reflectance value at wavelengths of 380 nm to 780 nm, the average transmittance at wavelengths of 380 nm to 780 nm, the molar absorption coefficients thereof at wavelengths of 200 nm to 380 nm, and the haze value.

TABLE 38

| | Example | | |
|---|---|---|---|
| | 7-1 | 7-2 | 7-3 |
| Average primary particle diameter [nm] | 8.5 | 8.5 | 8.4 |
| Treatment temperature (Table 37: (23)) [° C.] | 23-26 | 43-46 | 59-61 |
| Treatment temperature (Table 37: (24)) [° C.] | 23-26 | 43-46 | 59-61 |
| M-OH ratio [%] | 10.9 | 9.4 | 8.3 |
| Average molar absorption coefficient [L/(mol · cm)] (200-380 nm) | 665 | 712 | 725 |
| Average reflectance [%] (780-2500 nm) | 69.9 | 71.6 | 73.6 |
| Average transmittance [%] (380-780 nm) | 97.3 | 97.5 | 97.6 |
| Haze value [%] | 0.02 | 0.02 | 0.02 |

As is evident from FIG. 38, the lower the ratio of M-OH, the higher the average reflectance at wavelengths of 780 nm to 2500 nm, the average reflectance at wavelengths of 380 nm to 780 nm, the average transmittance at wavelengths 380 nm to 780 nm, and the average molar absorption coefficient at wavelengths of 200 nm to 380 nm tended to be observed. Thus, it is found that the color characteristics of the oxide particles can be controlled by controlling the ratio of M-OH.

Example 8

Example 8 describes cerium oxide particles. An oxide raw-material liquid (liquid A) and an oxide precipitation solvent (liquid B) were prepared using a high-speed rotation-type dispersion emulsifier CLERMIX (product name: CLM-2.2S, manufactured by M Technique Co., Ltd.). Specifically, based on the formulation of the oxide raw-material liquid shown in Example 8 of Table 39, using CLEARMIX at a rotor rotational speed of 20,000 rpm, the respective ingredients of the oxide raw-material liquid were stirred and homogeneously mixed together at a preparation temperature of 40° C. for 30 minutes to prepare an oxide raw-material liquid. Also, based on the formulation of the oxide precipitation solvent shown in Example 8 of Table 39, using CLEARMIX at a rotor rotational speed of 15,000 rpm, the respective ingredients of the oxide raw-material liquid were stirred and homogeneously mixed together at a preparation temperature of 45° C. for 30 minutes to prepare an oxide precipitation solvent. Regarding substances indicated by chemical formulas and abbreviations described in Table 39, DMAE used was dimethyl aminoethanol (manufactured by Kishida Chemical Co., Ltd.) and $Ce(NO_3)_3 \cdot 6H_2O$ used was cerium (III) nitrate hexahydrate (manufactured by Wako Pure Chemical Industries, Ltd.).

Subsequently, the prepared oxide raw-material liquid and oxide precipitation solvent were mixed together using a fluid treatment apparatus described in Patent Literature 6 of the present applicant. A method for treating each fluid and a method for collecting the treated liquid were carried out in a manner similar to Example 1. In addition, Example 8 did not use the third introduction portion d3 and liquid C (not shown).

As in the case with Example 1, Table 40 represents the operating conditions of the fluid treatment apparatus and the average primary particle diameter calculated from the results of the TEM observation of the resulting cerium oxide particles. The procedures for pH measurement, analysis, and particle-washing were also carried out in the same manner as in Example 1. As a result of the TEM observation, the primary particle diameters were approximately 5 nm to 15 nm, and as described in Table 40, the average primary particle diameter was 5.19 nm.

TABLE 39

Example 8

| Formulation of the 1st fluid (liquid A: Oxide precipitation solvent) | | | | | Formulation of the 2nd fluid (liquid B: Oxide raw material liquid) | | | | |
|---|---|---|---|---|---|---|---|---|---|
| Formulation | | | | | Formulation | | | | |
| Raw material | Raw [wt %] | material [wt %] | pH | pH [° C.] | Raw material | Raw [wt %] | material [wt %] | pH | pH [° C.] |
| DMAE | 1.40 | Pure water | 98.60 | 11.4 26.7 | Ce(NO$_3$)$_3$6H$_2$O | 9.00 | Pure water | 91.00 | 3.2 29.0 |

TABLE 40

Example 8

| Introduction flow rate (liquid feed flow rate) [ml/min] | | Introduction temperature (liquid feed temperature) [° C.] | | Introduction pressure (liquid feed pressure) [MPaG] | | Discharged liquid | | Average primary particle diameter [nm] |
|---|---|---|---|---|---|---|---|---|
| Liquid A | Liquid B | Liquid A | Liquid B | Liquid A | Liquid B | pH | Temp. [° C.] | |
| 100 | 40 | 135 | 81 | 0.333 | 0.10 | 7.97 | 29.6 | 5.19 |

The cerium oxide particles obtained in Example 8 were subjected to a heat treatment using an electric furnace to modify the functional groups contained in the iron oxide particles. The heat treatment conditions were as follows: untreated in Example 8; 100° C. in Example 8-2; 200° C. in Example 8-3; and 300° C. in Example 8-4. For each heat treatment temperature, the duration of heat treatment was 30 minutes. The cerium oxide particles obtained in Example 8-2 to Example 8-4 also had primary particle diameters of approximately 5 nm to 15 nm.

Only the peaks that came from cerium oxide particles (CeO$_2$) were detected in the XRD measurement of cerium oxide particles obtained in Example 8 and Example 8-2 to Example 8-4.

Table 41 represents the molar absorption coefficients for light rays at wavelengths of 200 nm to 380 nm together with the ratio of M-OH of the cerium oxide particles obtained in Example 8 and Example 8-2 to Example 8-4. As is evident from Table 41, the molar absorption coefficients for light rays at wavelengths of 200 nm to 380 nm were improved as the M-OH ratio decreases in the order of Examples 8, 8-3, and 8-4.

TABLE 41

| | Example | | | |
|---|---|---|---|---|
| | 8 | 8-2 | 8-3 | 8-4 |
| M-OH ratio [%] | 12.4 | 10.8 | 5.6 | 3.3 |
| Average molar absorption coefficient [L/(mol · cm)] (200-380 nm) | 3655 | 4074 | 4159 | 4218 |

Further, as is evident from Table 41, unlike the silicon compound-coated cerium oxide particles obtained in Example 3, an M-OH ratio of 11% or less in cerium oxide particles can attain a molar absorption coefficient of 4000 L/(mol·cm) or more for light rays at wavelengths of 200 nm to 380 nm. In the present invention, preferable cerium oxide particles are those in which the ratio of M-OH bonds contained therein is 12.5% or less and the molar absorption coefficient thereof is 3500 L/(mol·cm) or more at wavelengths of 200 nm to 380 nm. More preferable cerium oxide particles are those in which the ratio of M-OH bonds contained therein is 11% or less and the molar absorption coefficient thereof is 4000 L/(mol·cm) or more at wavelengths of 200 nm to 380 nm.

Example 8-5 to Example 8-7

Subsequently, from the dispersion of cerium oxide particles discharged from the fluid treatment apparatus and collected in the beaker in the Example 8, cerium oxide particles were prepared in a manner similar to Example 8 except that the dispersion was subjected to the dispersion modifier 100 shown in FIG. 34. Table 42 represents the conditions for controlling the ratio of M-OH bonds in the cerium oxide particles using the dispersion modifier 100 of FIG. 34. Cerium oxide particles in which the ratio of M-OH bonds was controlled were obtained in the same manner as in Examples 1-11 to Example 1-13 except for the contents described in Table 42.

Both the procedures for dispersing the dispersion of cerium oxide particles and procedures for removal of impurities in the dispersion of silicon compound-coated iron oxide particles were carried out repeatedly until the pH of the dispersion of silicon compound-coated iron oxide particles reached 7.22 (measurement temperature: 25.6° C.) and the conductivity thereof reached 7.77 µS/cm. The impurities contained in the aggregates of cerium oxide particles were also removed. Thus, each of the cerium oxide particles in the dispersion thereof was modified.

TABLE 42

| Processing solution | Examples 8-5<br>Cerium oxide particle dispersion liquid |
|---|---|
| (1) 1st amount of solution charged into container 130 | Type: Pure water<br>pH 5.89 (measurement temperature: 22.4° C.)<br>Conductivity 0.80 µS/cm (measurement temperature 22.4° C.)<br>Input: 15 kg |
| (2) Type, flow rate, and temperature of cross flow cleaning liquid | Type: Pure water<br>pH 5.89 (measurement temperature: 22.4° C.)<br>Conductivity 0.80 µS/cm (measurement temperature 22.4° C.)<br>Flow rate: 1.5 L/min, 21° C. |
| (3) Dispersing machine 102 | CLEARMIX (product name: CLM-2. 2S, rotor: R1, screen: S 0.8-48, manufactured by M Technique Co., Ltd.) |
| (4) Removal part 120 | Hollow fiber type dialyzer PN-220 (film area: 2.2 $m^2$, material: polysulfone), manufactured by Nikkiso Co., Ltd. |
| (5) Rotor speed | 20,000 rpm (peripheral speed: 31.4 m/S) |
| (6) Start of charging oxide particle dispersion | When the first pure water inside the vessel 130 has been reduced to 1 L |
| (7) Input of oxide particle dispersion into oxide container 130 | 14 L (ca. 14 kg) |
| (8) pH of oxide particle dispersion liquid inside vessel 130 | 7.69 (measuring temperature: 26.6° C.) |
| (9) Conductivity of oxide particle dispersion liquid inside the vessel 130 | 3131 µS/cm (measurement temperature: 26.6° C.) |
| (10) Flow rate of pump 104 | 8.8 L/min |
| (11) Flow rate oxide particle dispersion liquid is returned to storage container 130 | 7.3 L/min |
| (12) Discharge amount (calculated value) of filtrate L3 by removal part 120 | 1.5 L/min |
| (13) Timing of introduction of diluent into container 130 | When the dispersion amount in storage container 130 is concentrated to 1.5 L |
| (14) Type and input of 2nd different dilution to storage container 130 | Type: Pure water<br>pH 5.89 (measurement temperature: 22.4° C.)<br>Conductivity 0.80 µS/cm (measurement temperature 22.4° C.)<br>Input: 13.5 L (ca. 13.5 kg) |
| (15) Concentration of oxide particles in oxide particle dispersion | 0.4 wt % to 2.0 wt % |
| (16) Pressure gauge | Pa: Both of two are 0.10 MPaG |
| (17) Pressure gauge | Pb: 0.15 MPaG |
| (18) Pressure gauge | Pc: 0.02 MPaG |
| (19) Path length (Lea) | 0.3 m |
| (20) Pipping inner diameter (Leb) | 0.0105 m |
| (21) Flow velocity of oxide particle dispersion liquid in immediately preceding transport path | 1.2 m/sec |
| (22) Time T1 until removal part 120 starts removal of impurities from dispersion container 101 | 0.24 sec |
| (23) Thermometer placed in the dispersion container 101 | 23° C. to 26° C. |
| (24) Temperature of oxide particle dispersion | 23° C. to 26° C. |
| (25) Conductivity measuring machine | Electrical conductivity meter, model number ES-51 manufactured by HORIBA, Ltd, |

By changing the treatment temperature in the modification of the dispersion of cerium oxide particles shown in (23) and (24) of Table 42, cerium oxide particles having different ratios of M-OH were prepared as those of Example 8-5 to Example 8-7. Table 43 represents, together with the results of Example 8, the treatment temperature for modifying the dispersion of cerium oxide particles, the ratio of M-OH in the resulting cerium oxide particles, and the molar absorption coefficients thereof at wavelengths of 200 nm to 380 nm.

TABLE 43

| | Example | | | |
|---|---|---|---|---|
| | 8 | 8-5 | 8-6 | 8-7 |
| Treatment temperature (Table 42: (23)) [° C.] | — | 23-26 | 43-46 | 59-61 |
| Treatment temperature (Table 42: (24)) [° C.] | — | 23-26 | 43-46 | 59-61 |
| M-OH ratio [%] | 12.4 | 11.8 | 10.6 | 7.9 |
| Average molar absorption coefficient [L/(mol · cm)] (200-380 mm) | 3655 | 3888 | 4092 | 4123 |

As is evident from Table 43, the lower the ratio of M-OH the higher the molar absorption coefficient at wavelengths of 200 nm to 380 nm tended to be observed. Thus, it is found that the color characteristics of the oxide particles can be controlled by controlling the ratio of M-OH.

Comparative Example 5

Cerium oxide particles (special grade iron oxide (IV) ($CeO_2$) manufactured by Wako Pure Chemical Industries, Ltd.) having primary particle diameters of 120 nm to 200 nm were subjected to a heat treatment in an electric furnace to modify the functional groups contained in the cerium oxide particles for changing the ratio of M-OH bonds. The heat treatment conditions were as follows: untreated in Comparative Example 1-1; 100° C. in Comparative Example 1-2; and 300° C. in Comparative Example 1-3. For each heat treatment temperature, the duration of heat treatment was 30 minutes. For iron oxide particles of Comparative Examples 1-1 to 1-3, Table 44 represents the ratio of M-OH and the molar absorption coefficient for light rays at wavelengths of 200 nm to 380 nm in a dispersion in which the iron oxide particles were dispersed in a manner similar to Example 8. As is evident from Table 44, in the case of cerium oxide particles having primary particle diameters of more than 50 nm or more, even when the ratio of M-OH bonds was changed, the molar absorption coefficient was low, resulting in no observed increasing tendency. In comparison between Comparative Example 5-1 and Example 8-4 in particular, even the cerium oxide particles have the ratio of M-OH similar to the iron oxide particles having primary particle diameters of 50 nm or less obtained in Example 8-4, it is found that the iron oxide particles of Comparative Example 5-1 have lower molar absorption coefficients in a region at wavelengths of 200 nm to 380 nm. In the present invention, when the primary particle diameter is as small as 50 nm or less, the ratio of M-OH affects the color characteristics. That is, in a state where the surface area is increased with respect to the same amount of cerium oxide particles, color characteristics can be controlled by controlling the M-OH ratio.

TABLE 44

|  | Comparative Example | | |
| --- | --- | --- | --- |
|  | 5-1 | 5-2 | 5-3 |
| MOH ratio [%] | 7.3 | 3.2 | 1.9 |
| Average molar absorption coefficient [L/(mol · cm)] (190-380 nm) | 946 | 951 | 933 |

Example 9 to Example 11

Examples 9 to 11 describe cobalt-zinc-complex oxide particles as oxide particles, which is an oxide comprising cobalt and zinc. An oxide raw-material liquid (liquid A) and an oxide precipitation solvent (liquid B) were prepared using a high-speed rotation-type dispersion emulsifier CLERMIX (product name: CLM-2.2S, manufactured by M Technique Co., Ltd.). Specifically, based on the formulation of the oxide raw-material liquid shown in Example 9 in Table 45, the ingredients of the oxide raw-material liquid were homogeneously mixed by stirring them at 20,000 rpm for 30 minutes at a preparation temperature of 40° C. using CLEARMIX to prepare an oxide raw-material liquid. Based on the formulation of the oxide precipitation solvent shown in Example 9 in Table 45, the ingredients of the oxide raw-material liquid were homogeneously mixed by stirring them at 15,000 rpm for 30 minutes at a preparation temperature of 45° C. using CLEARMIX to prepare an oxide precipitation solvent. Regarding substances indicated by chemical formulas and abbreviations described in Table 45, EG used was ethylene glycol (manufactured by Kishida Chemical Co., Ltd.), $Zn(NO_3)_2.6H_2O$ used was zinc nitrate hexahydrate (manufactured by Wako Pure Chemical Industries, Ltd.), Co $(NO_3)_2.6H_2O$ used was cobalt nitrate hexahydrate (manufactured by Wako Pure Chemical Industries, Ltd.), and NaOH used was sodium hydroxide (manufactured by KANTOCHEMICAL CO., LTD.).

Subsequently, the prepared oxide raw-material liquid and the oxide precipitation solvent were mixed together using a fluid treatment apparatus described in Patent Literature 6 of the present applicant. A method for treating each fluid and a method for collecting the treated liquid were carried out in a manner similar to Example 1. In Examples 9 to 11, furthermore, third foreword d3 and liquid C were not used (not shown).

Table 46 represents the operating conditions of the fluid treatment apparatus, the average primary particle diameters calculated from the TEM observation results of the obtained cobalt-zinc-complex oxide particles, the molar ratios of Co/Zn calculated from TEM-EDS analysis, and calculated values calculated from the formulations and introduction flow rates of liquid A, liquid B, and liquid C. The procedures for pH measurement, analysis, and particle-washing were also carried out in the same manner as in Example 1.

TABLE 45

| | Formulation of the 1st fluid (liquid A: Oxide raw material liquid) | | | | | | | Formulation of the 2nd fluid (liquid B: Oxide precipitation solvent) | | | | | |
| --- | --- | --- | --- | --- | --- | --- | --- | --- | --- | --- | --- | --- | --- | --- |
| | Formulation | | | | | | pH | | Formulation | | | | pH | |
| Example | Raw material | [wt %] | Raw material | [wt %] | Raw material | [wt %] | pH | [° C.] | Raw material | [wt %] | Raw material | [wt %] | pH | [° C.] |
| 9 | $Zn(NO_3)_2$ $6H_2O$ | 3.0000 | $Co(NO_3)_2$ $6H_2O$ | 0.0447 | EG | 96.955 | 4.21 | 21.9 | NaOH | 9.00 | Pure water | 91.00 | >14 | — |
| 10 | $Zn(NO_3)_2$ $6H_2O$ | 3.0000 | $Co(NO_3)_2$ $6H_2O$ | 0.3650 | EG | 96.635 | 4.10 | 22.2 | NaOH | 9.00 | Pure water | 91.00 | >14 | — |
| 11 | $Zn(NO_3)_2$ $6H_2O$ | 3.0000 | $Co(NO_3)_2$ $6H_2O$ | 0.9783 | EG | 96.022 | 3.87 | 23.1 | NaOH | 9.00 | Pure water | 91.00 | >14 | — |

TABLE 46

| Example | Introduction flow rate (liquid feed flow rate) [ml/min] | | Introduction temperature (liquid feed temperature) [° C.] | | Introduction pressure (liquid feed pressure) [MPaG] | | Discharged liquid | | Co/Zn [Molar ratio] | | Average primary particle diameter [nm] |
|---|---|---|---|---|---|---|---|---|---|---|---|
| | Liquid A | Liquid B | Liquid A | Liquid B | Liquid A | Liquid B | pH | Temp. [° C.] | Calc. value | EDS | |
| 9 | 400 | 45 | 160 | 87 | 0.103 | 0.10 | 11.87 | 29.3 | 0.02 | 0.02 | 9.79 |
| 10 | 400 | 45 | 159 | 87 | 0.093 | 0.10 | 11.86 | 28.8 | 0.11 | 0.11 | 9.89 |
| 11 | 400 | 50 | 161 | 86 | 0.087 | 0.10 | 11.78 | 28.9 | 0.33 | 0.33 | 10.16 |

Figure 62:
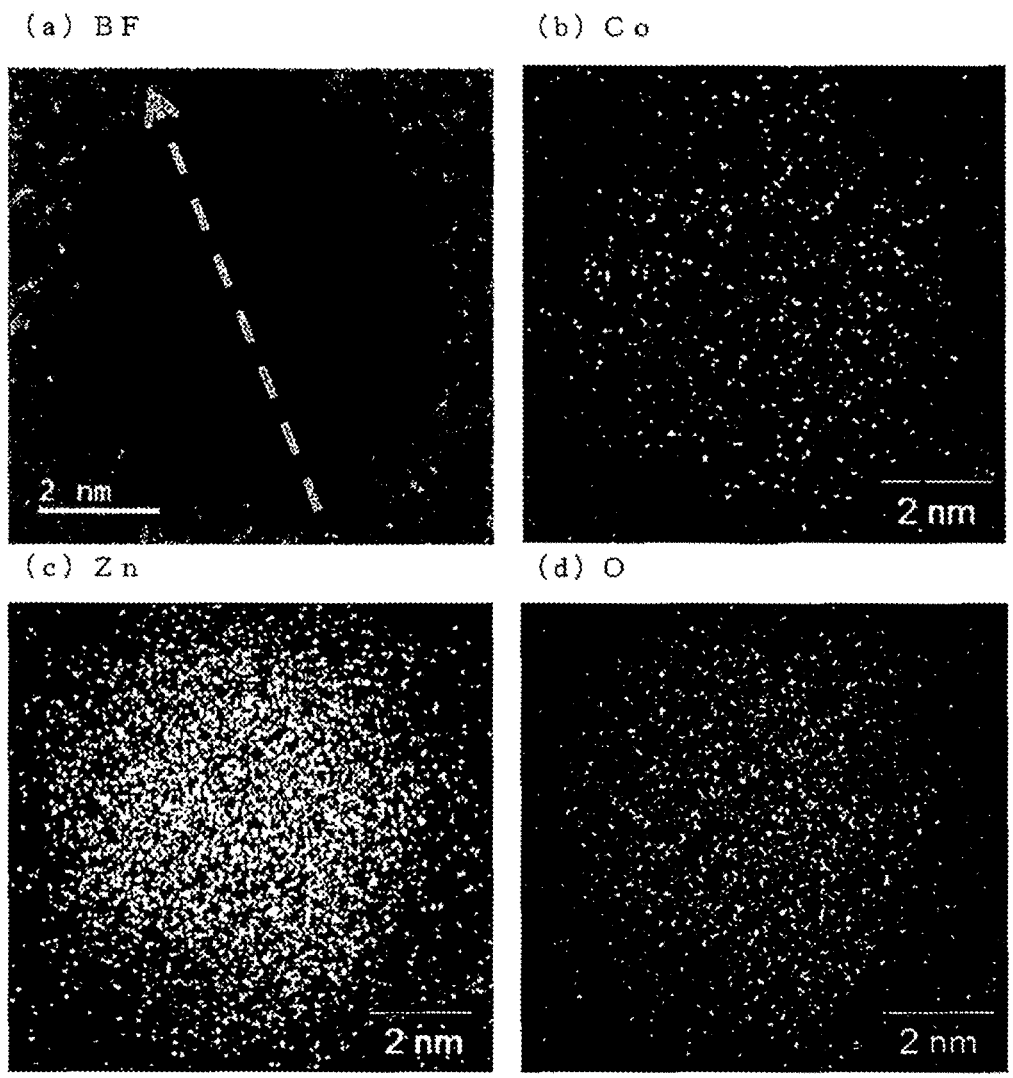
FIG. 62 is a diagram illustrating the results of STEM mapping of cobalt-zinc-complex oxide particles obtained in Example 9 of the present invention.
Figure 63:
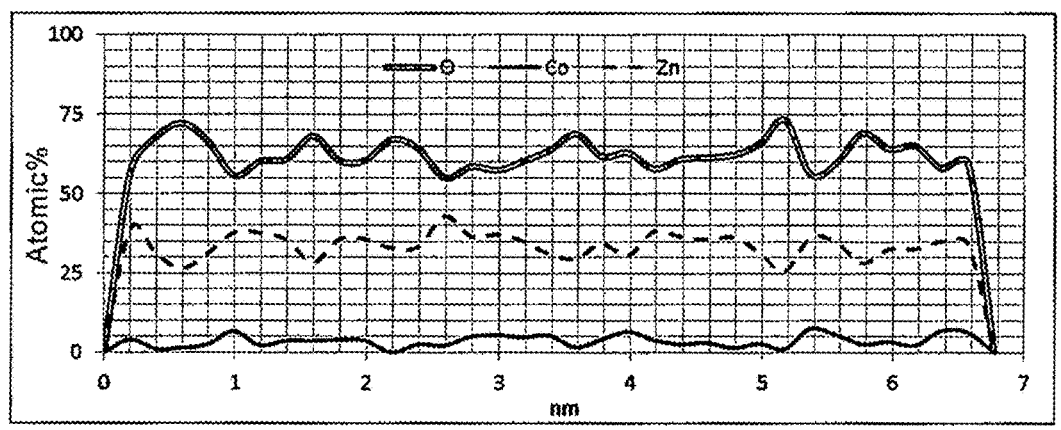
FIG. 63 is a diagram illustrating the results of a line analysis of cobalt-zinc-complex oxide particles obtained in Example 9 of the present invention.
Figure 64:
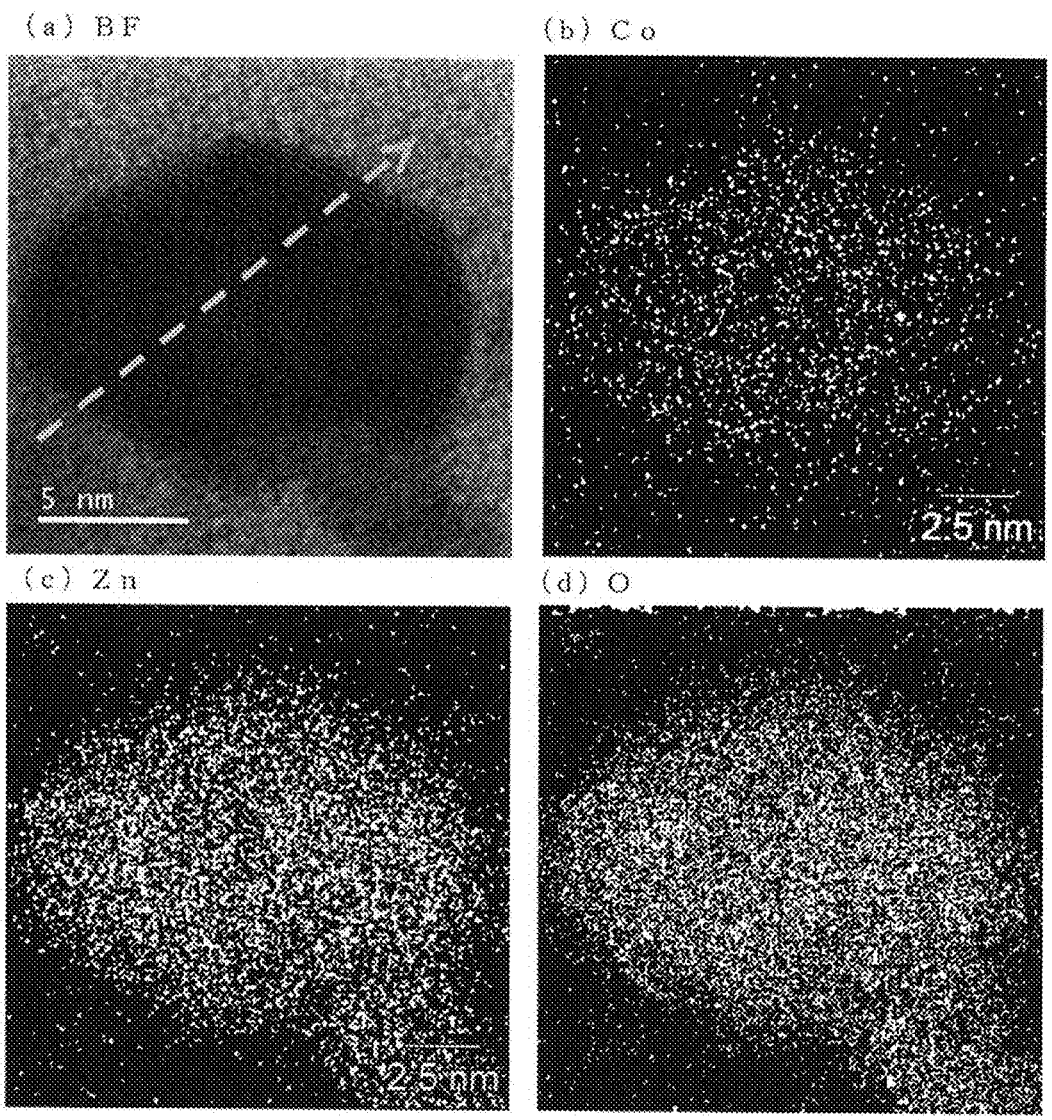
FIG. 64 is a diagram illustrating the results of STEM mapping of cobalt-zinc-complex oxide particles obtained in Example 11 of the present invention.
Figure 65:
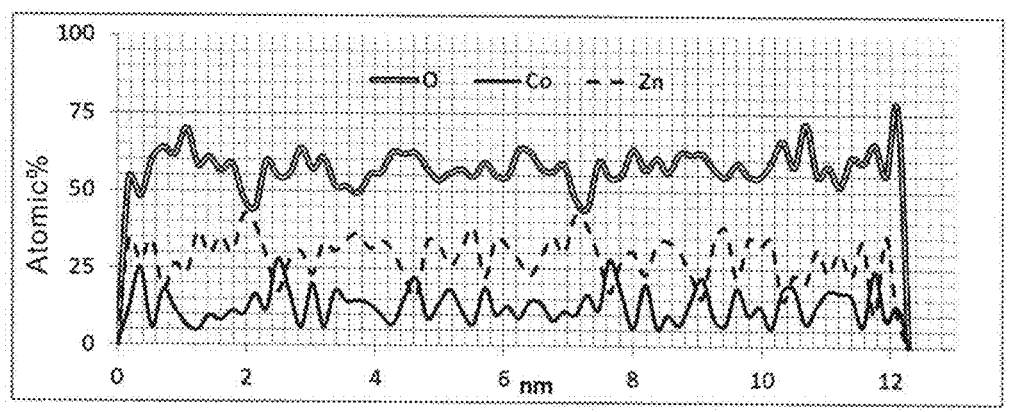
FIG. 65 is a diagram illustrating the results of a line analysis of cobalt-zinc-complex oxide particles obtained in Example 11 of the present invention.

FIG. 62 represents the result of mapping with the STEM of cobalt-zinc-complex oxide particles obtained in Example 9, and FIG. 63 represents the results of the line analysis at the position indicated by the broken line in the BF image (bright field image) of FIG. 62. FIG. 64 represents the result of mapping with the STEM of cobalt-zinc-complex oxide particles obtained in Example 11, and FIG. 65 represents the result of the line analysis at the position indicated by the broken line in the BF image (bright field image) of FIG. 64. As is evident from FIGS. 62 to 65, in the cobalt-zinc-complex oxide particles obtained in Example 9 and Example 11, cobalt and zinc were detected in the entire particles. The cobalt-zinc-complex oxide particles were observed as those in which cobalt and zinc were solid-solved uniformly. Similar particles were also observed in Examples 9-2, 9-3, 10, 10-2, 10-3, 11-2, and 11-3 described later.

The cobalt-zinc-complex oxide particles obtained in Examples 9 to 11 were subjected to a heat treatment with an electric furnace to modify the functional groups contained in the cobalt-zinc-complex oxide particles. The heat treatment conditions were as follows: untreated in Examples 9, 10, and 11; 100° C. in Examples 9-2, 20-2, and 11-2; 200° C. in Examples 9-3, 10-3, and 11-3; and 300° C. in Examples 10-4 and 11-4. For each heat treatment temperature, the duration of heat treatment was 30 minutes.

Figure 66:
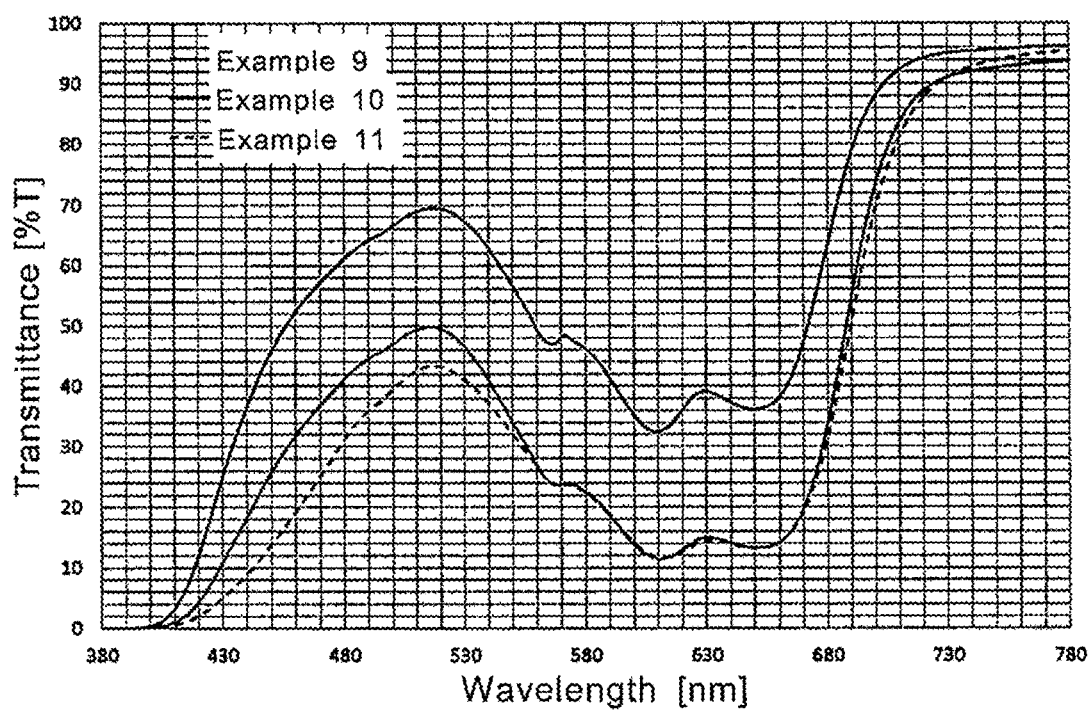
FIG. 66 is a graphic diagram illustrating the transmission spectrum for a dispersion in which zinc oxide particles are dispersed in propylene glycol obtained in each of Examples 9, 10, and 11.
Figure 67:
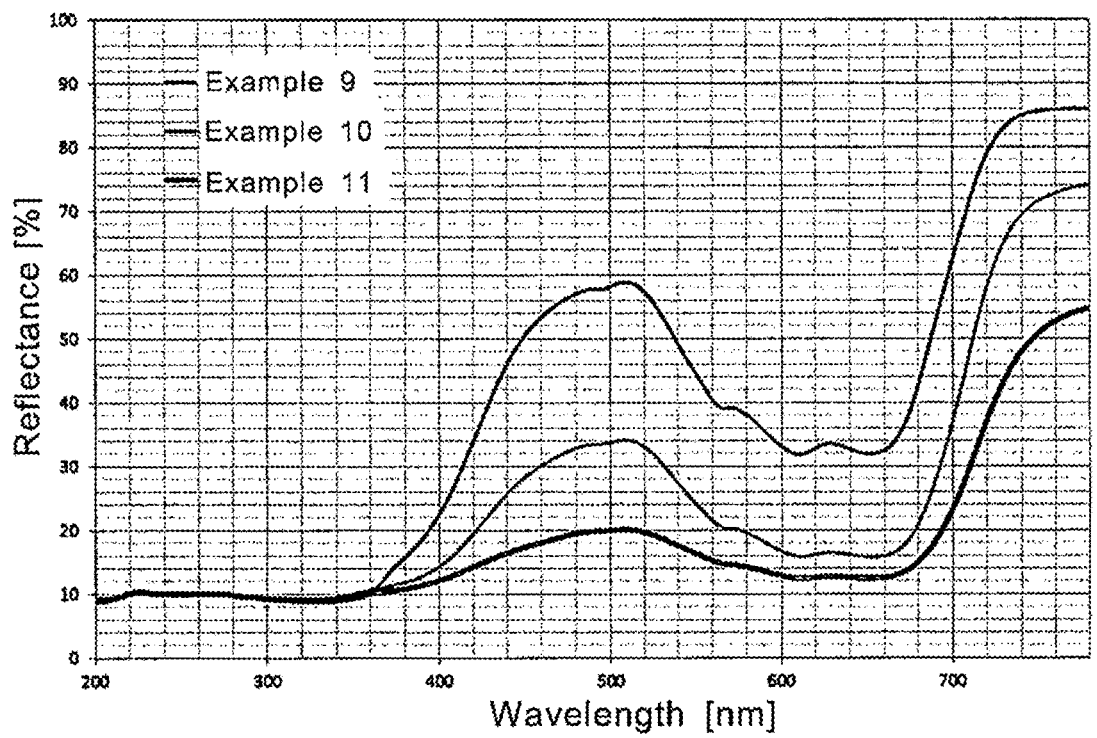
FIG. 67 is a diagram illustrating a reflection spectrum of cobalt-zinc-complex oxide particles obtained in Examples 9 to 11 of the present invention.

FIG. 66 represents transmission spectra of dispersions in which cobalt-zinc-complex oxide particles obtained in Examples 9, 10, and 11 were respectively dispersed at a concentration of 0.05 wt % in propylene glycol for light rays at wavelengths of 380 nm to 780 nm. FIG. 67 represents reflection spectra of the powders of cobalt-zinc-complex oxide particles obtained in Examples 9, 10, and 11 for light rays at wavelengths of 200 nm to 780 nm. As is evident from the figure, the cobalt-zinc-complex oxide particles exhibit colors of green to light blue.

In Table 47 for the cobalt-zinc-complex oxide particles obtained in Example 9 and Examples 9-2 to 9-4, Table 48 for Example 10 and Examples 10-2 to 10-4, and Table 49 for Example 11 and Examples 11-2 to 11-4, the ratio of M-OH contained in the particles, the absorption spectrum of the dispersion in which cobalt-zinc-complex oxide particles were dispersed in propylene glycol and the molar absorption coefficient for light rays at wavelengths of 200 nm to 380 nm calculated from the concentration of cobalt-zinc-complex oxide particles (as ZnO+Co) in a measurement liquid are represented. For comparison, the zinc oxide particles obtained in Example 5 are also shown.

TABLE 47

| | Example | | | | |
|---|---|---|---|---|---|
| | 5 | 9 | 9-2 | 9-3 | 9-4 |
| M-OH ratio [%] | 11.8 | 12.4 | 7.9 | 3.1 | 1.2 |
| Average molar absorption coefficient (L/(mol · cm)] (200-380 nm) | 623 | 781 | 896 | 923 | 999 |

TABLE 48

| | Example | | | | |
|---|---|---|---|---|---|
| | 5 | 10 | 10-2 | 10-3 | 10-4 |
| M-OH ratio [%] | 11.8 | 12.5 | 7.9 | 3.1 | 1.2 |
| Average molar absorption coefficient [L/(mol · cm)] (200-380 nm) | 623 | 779 | 879 | 919 | 987 |

TABLE 49

| | Example | | | | |
|---|---|---|---|---|---|
| | 5 | 11 | 11-2 | 11-3 | 11-4 |
| M-OH ratio [%] | 11.8 | 19.9 | 5.4 | 1.1 | 0.8 |
| Average molar absorption coefficient [L/(mol · cm)] (200-380 nm) | 623 | 772 | 864 | 906 | 979 |

As is evident from Tables 47 to 49, the cobalt-zinc-complex oxide particles also improved the molar absorption coefficient for light rays at wavelengths of 200 nm to 380 nm as the ratio of M-OH bonds contained in the particles became lower. Preferably, furthermore, the cobalt-zinc-complex oxide particles have the ratio of M-OH bonds contained therein of 0.5% or more and 20% less to make the molar absorption coefficient 700 L/(mol·cm) for light rays at wavelengths of 200 nm to 380 nm. It is also found that the cobalt-zinc-complex oxide particles have a higher molar absorption coefficient for light rays at wavelengths of 200 nm to 380 nm than zinc oxide particles. The cobalt-zinc-complex oxide particles with the controlled ratio of M-OH bonds exhibit color of green to light blue. Thus, the cobalt-zinc-complex oxide particles can be effectively used for the purpose of transparency or ultraviolet-shielding ability when used in a film-like composition, such as a coated product or glass.

Example 12 to Example 14

Examples 12 to 14 describe silicon-cobalt-zinc-complex oxide particles as oxide particles. An oxide raw-material liquid (liquid A) and an oxide precipitation solvent (liquid B) were prepared using a high-speed rotation-type dispersion emulsifier CLERMIX (product name: CLM-2.2S, manufactured by M Technique Co., Ltd.). Specifically, based on the formulation of the oxide raw-material liquid shown in Examples 12 to 14 in Table 50, the ingredients of the oxide raw-material liquid were homogeneously mixed by stirring them at a rotor speed of 20,000 rpm for 30 minutes at a preparation temperature of 40° C. using CLEARMIX to prepare an oxide raw-material liquid. Also, based on the formulation of the oxide precipitation solvent shown in Examples 12 to 14 in Table 50, the ingredients of the oxide raw-material liquid were homogeneously mixed by stirring them at a rotor speed of 15,000 rpm for 30 minutes at a preparation temperature of 45° C. using CLEARMIX to prepare an oxide precipitation solvent. Furthermore, based on the formulation of the silicon compound-coated iron oxide particles show in Examples 12 to 14 of Table 50, using CLEARMIX at a rotor speed of 6,000 rpm, the respective ingredients of the silicon compound-coated iron oxide particles were stirred and homogeneously mixed together at a preparation temperature of 20° C. for 10 minutes to prepare silicon compound-coated iron oxide particles.

Regarding substances indicated by chemical formulas and abbreviations described in Table 50, EG used was ethylene glycol (manufactured by Kishida Chemical Co., Ltd.), $Zn(NO_3)_2 \cdot 6H_2O$ used was zinc nitrate hexahydrate (manufactured by Wako Pure Chemical Industries, Co $(NO_3)_2 \cdot 6H_2O$ used was cobalt nitrate hexahydrate (manufactured by Wako Pure Chemical Industries, Ltd.), NaOH used was sodium hydroxide (manufactured by KANTO-CHEMICAL CO., LTD.), 60 wt % $HNO_3$ used was concentrated nitric acid (manufactured by Kishida Chemical Co., Ltd.), and TEOS used was tetraethyl orthosilicate (manufactured by Wako Pure Chemical Industries, Ltd.).

Subsequently, the prepared oxide raw-material liquid, oxide precipitation solvent, and silicon compound-coated iron oxide particles were mixed together using a fluid treatment apparatus described in Patent Literature 6 of the present applicant. A method for treating each fluid and a method for collecting the treated liquid were carried out in a manner similar to Example 1.

Table 51 represents the operating conditions of the fluid treatment apparatus, the average primary particle diameters calculated from the TEM observation results of the obtained silicon compound-coated iron oxide particles, the molar ratios of Si/Co/Zn calculated from TEM-EDS analysis, and calculated values calculated from the formulations and introduction flow rates of liquid A, liquid B, and liquid C. The procedures for pH measurement, analysis, and particle-washing were also carried out in the same manner as in Example 1.

TABLE 50

| | Formulation of the 1st fluid (liquid A: Oxide raw material liquid) | | | | | | | Formulation of the 2nd fluid (liquid B: Oxide precipitation solvent) | | | | | |
|---|---|---|---|---|---|---|---|---|---|---|---|---|---|
| | Formulation | | | | | | | Formulation | | | | | |
| Example | Raw material | [wt %] | Raw material | [wt %] | Raw material | [wt %] | pH | pH [° C.] | Raw material | [wt %] | Raw material | [wt %] | pH | pH [° C.] |
| 12 | $Zn(NO_3)_2 6H_2O$ | 3.0000 | $Co(NO_3)_3 6H_2O$ | 0.0447 | EG | 96.955 | 4.21 | 21.9 | NaOH | 9.00 | Pure water | 91.00 | >14 | — |
| 13 | $Zn(NO_3)_2 6H_2O$ | 3.0000 | $Co(NO_3)_3 6H_2O$ | 0.3650 | EG | 96.635 | 4.10 | 22.2 | NaOH | 9.00 | Pure water | 91.00 | >14 | — |
| 14 | $Zn(NO_3)_2 6H_2O$ | 3.0000 | $Co(NO_3)_3 6H_2O$ | 0.9783 | EG | 96.022 | 3.87 | 23.1 | NaOH | 9.00 | Pure water | 91.00 | >14 | — |

| | Formulation of the 3rd fluid (liquid C: Silicon compound raw material liquid) | | | | | | | | | |
|---|---|---|---|---|---|---|---|---|---|---|
| | Formulation | | | | | | | | pH | |
| Example | Raw material | [wt %] | Raw material | [wt %] | Raw material | [wt %] | Raw material | [wt %] | pH | [° C.] |
| 12 | Pure water | 9.4222 | EG | 90.0000 | 60% $HNO_3$ | 0.0100 | TEOS | 0.5678 | 2.13 | 15.9 |
| 13 | Pure water | 9.4222 | EG | 90.0000 | 60% $HNO_3$ | 0.0100 | TEOS | 0.5678 | 2.13 | 15.9 |
| 14 | Pure water | 9.4222 | EG | 90.0000 | 60% $HNO_3$ | 0.0100 | TEOS | 0.5678 | 2.13 | 15.9 |

TABLE 51

| | Introduction flow rate (liquid feed flow rate) [ml/min] | | | Introduction temperature (liquid feed temperature) [° C.] | | | Introduction pressure (liquid feed pressure) [MPaG] | | |
|---|---|---|---|---|---|---|---|---|---|
| Example | Liquid A | Liquid B | Liquid C | Liquid A | Liquid B | Liquid C | Liquid A | Liquid B | Liquid C |
| 12 | 400 | 39 | 100 | 160 | 86 | 25 | 0.068 | 0.10 | 0.10 |
| 13 | 400 | 40 | 100 | 161 | 85 | 25 | 0.065 | 0.10 | 0.10 |
| 14 | 400 | 49 | 100 | 160 | 87 | 25 | 0.071 | 0.10 | 0.10 |

| | Discharged liquid | | Si/Co/Zn [Molar ratio] | | Average primary particle diameter [nm] |
|---|---|---|---|---|---|
| Example | pH | Temp. [° C.] | Calc. value | EDS | |
| 12 | 10.95 | 20.8 | 20.7/1.2/78.1 | 20.7/1.2/78.1 | 9.64 |
| 13 | 10.02 | 22.6 | 19.3/8.1/72.6 | 19.3/8.1/72.6 | 9.57 |
| 14 | 8.34 | 22.3 | 16.7/20.8/62.5 | 16.7/20.8/62.5 | 9.34 |

Figure 68:
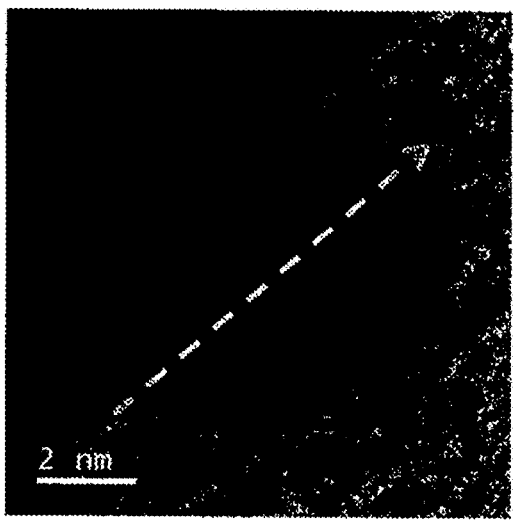
FIG. 68 is a diagram illustrating the results of STEM mapping of silicon-cobalt-zinc-complex oxide particles obtained in Example 13 of the present invention.
Figure 68:
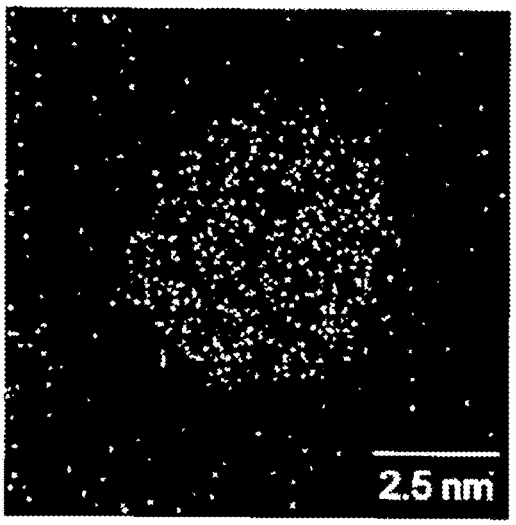
Figure 68:
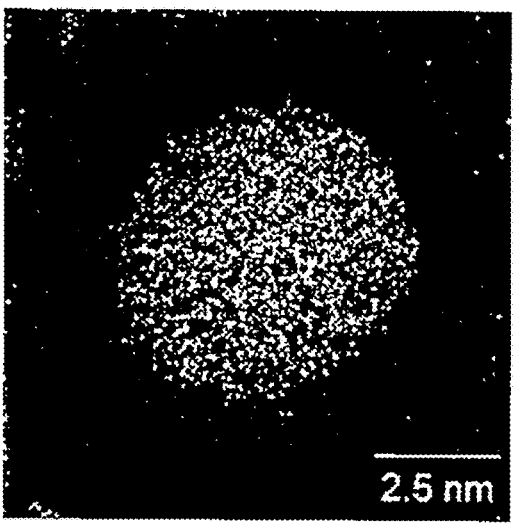
Figure 68:
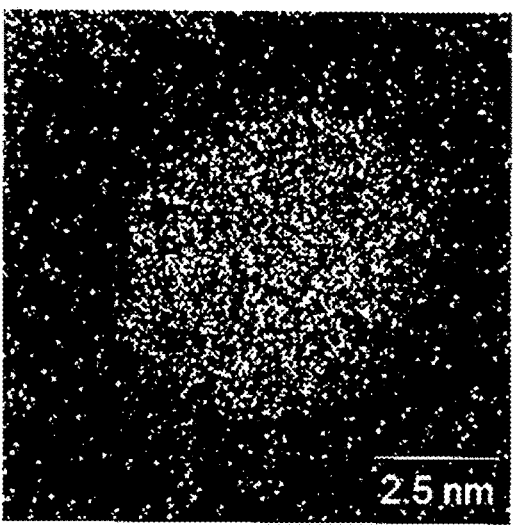
Figure 68:
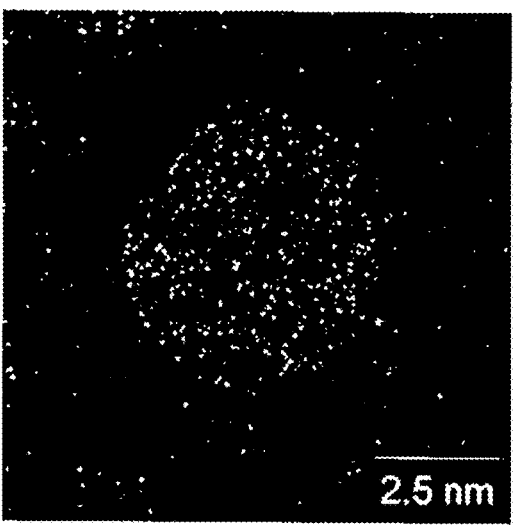
Figure 69:
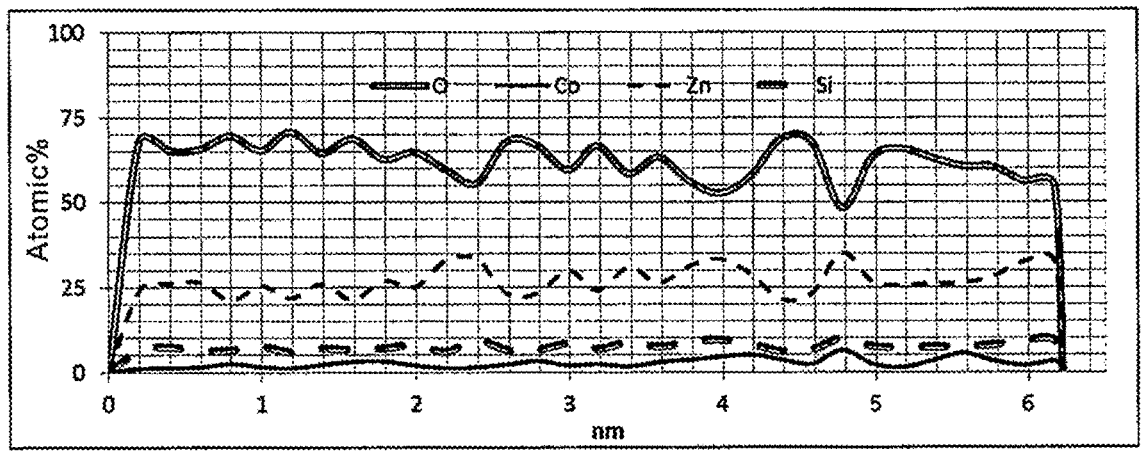
FIG. 69 is a diagram illustrating the results of a line analysis of silicon-cobalt-zinc-complex oxide particles obtained in Example 13 of the present invention.

FIG. 68 represents the result of mapping with the STEM of silicon-cobalt-zinc-complex oxide particles obtained in Example 13, and FIG. 69 represents the result of the line analysis at the position indicated by the broken line in the BF image (bright field image) of FIG. 68. As is evident from FIGS. 68 to 69, in the silicon-cobalt-zinc-complex oxide particles obtained in Example 13, silicon, cobalt, zinc, and oxygen were detected in the entire particles. The cobalt-zinc-complex oxide particles were observed as those in which cobalt and zinc were solid-solved uniformly. Similar particles were also observed in Examples 12, 12-2, 13-2, 13-3, 14, 14-2, and 14-3 described later.

The silicon-cobalt-zinc-complex oxide particles obtained in Examples 12 to 14 were subjected to a heat treatment with an electric furnace to modify the functional groups contained in the silicon-cobalt-zinc-complex oxide particles. The heat treatment conditions were as follows: untreated in Examples 12, 13, and 14; 100° C. in Examples 12-2, 13-2, and 14-2; 200° C. in Examples 12-3, 13-3, and 14-3; and 300° C. in Examples 12-4, 13-4, and 14-4. For each heat treatment temperature, the duration of heat treatment was 30 minutes.

Figure 70:
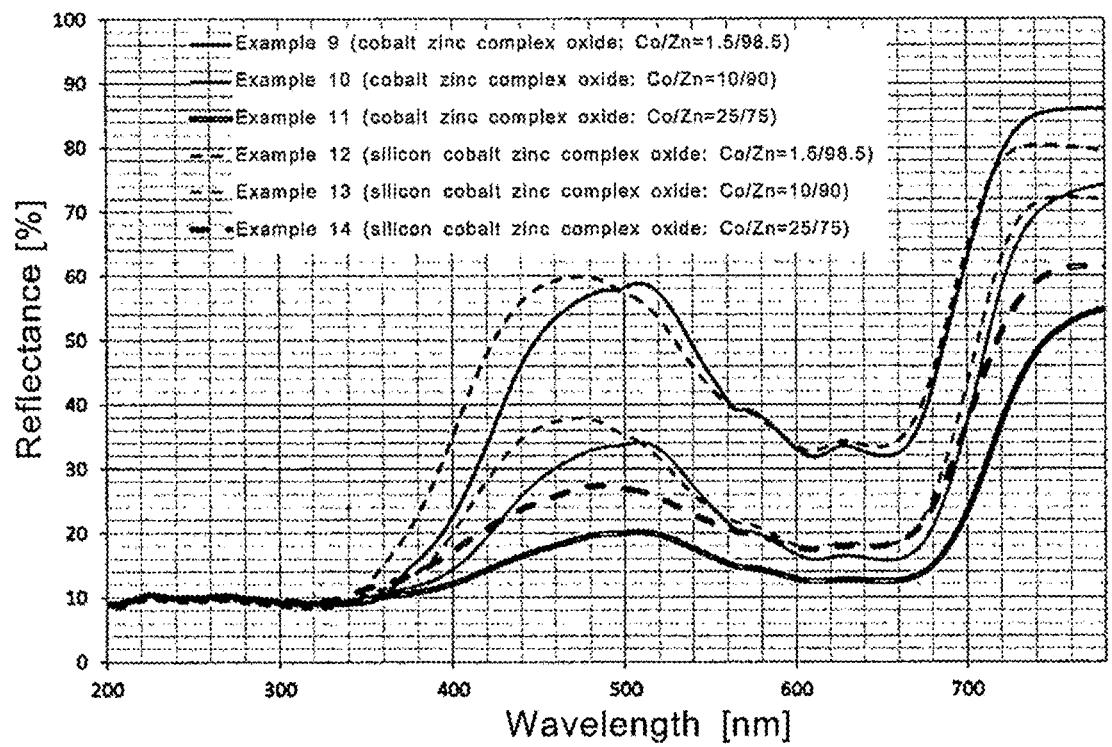
FIG. 70 is a diagram illustrating reflection spectra of cobalt-zinc-complex oxide particles obtained in Examples 9 to 11 and silicon-cobalt-zinc-complex oxide particles obtained in Examples 12 to 14 of the present invention.

FIG. 70 represents reflection spectra of the powders of silicon-cobalt-zinc-complex oxide particles obtained in Examples 12, 13, and 14 for light rays at wavelengths of 200 nm to 780 nm, and, as a comparison, the results of the powders of cobalt-zinc-complex oxide particles obtained in Example 9, Example 10, and Example 11 and having the same Co/Zn (molar ratio) contained therein. As is evident from the figure, in contrast to the cobalt-zinc-complex oxide particles (Example 9 to Example 11) exhibiting color of light blue to green, the silicon-cobalt-zinc-complex oxide particles (Examples 12 to 14) emitted stronger blue color because of their high reflectance for light rays at wavelengths of 400 nm to 450 nm.

With respect to the ratio of M-OH contained in the particles, the absorption spectra of dispersions in which silicon-cobalt-zinc-complex oxide particles were dispersed in propylene glycol, and the molar absorption coefficients for light rays at wavelengths of 200 nm to 380 nm calculated from the concentrations of the cobalt-zinc-complex oxide particles (as ZnO+Co) in measurement liquids of the respective examples, Table 52 represents the silicon-cobalt-zinc-complex oxide particles obtained in Example 12 and Examples 12-2 to 12-4 and the cobalt-zinc-complex oxide particles of Example 9 having the same Co/Zn (molar ratio) as the former but do not contain silicon, Table 53 represents the silicon-cobalt-zinc-complex oxide particles obtained in Example 13 and Examples 13-2 to 13-4 and the cobalt-zinc-complex oxide particles of Example 10 having the same Co/Zn (molar ratio) as the former but do not contain silicon, and Table 54 represents the silicon-cobalt-zinc-complex oxide particles obtained in Example 14 and Examples 14-2 to 14-4 and the cobalt-zinc-complex oxide particles of Example 11 having the same Co/Zn (molar ratio) as the former but do not contain silicon. For comparison, the zinc oxide particles obtained in Example 5 are also shown.

TABLE 52

| | Example | | | | |
|---|---|---|---|---|---|
| | 9 | 12 | 12-2 | 12-3 | 12-4 |
| M-OH ratio [%] | 12.4 | 28.4 | 18.4 | 16.9 | 13.1 |
| Average molar absorption coefficient [L/(mol · cm)] (200-380 nm) | 781 | 849 | 931 | 1009 | 1126 |

TABLE 53

| | Example | | | | |
|---|---|---|---|---|---|
| | 10 | 13 | 13-2 | 13-3 | 13-4 |
| M-OH ratio [%] | 12.5 | 25.9 | 18.6 | 15.1 | 13.3 |
| Average molar absorption coefficient [L/(mol · cm)] (200-380 nm) | 779 | 841 | 925 | 1023 | 1159 |

TABLE 54

| | Example | | | | |
|---|---|---|---|---|---|
| | 11 | 14 | 14-2 | 14-3 | 14-4 |
| M-OH ratio [%] | 19.9 | 32.1 | 25.4 | 23.1 | 20.6 |
| Average molar absorption coefficient (L/(mol · cm)] (200-380 nm) | 772 | 834 | 819 | 1064 | 1202 |

As is evident from Tables 52 to 54, the silicon-cobalt-zinc-complex oxide particles also improved the molar absorption coefficient for light rays at wavelengths of 200 nm to 380 nm as the ratio of M-OH bonds contained in the particles became lower. Preferably, furthermore, the silicon-cobalt-zinc-complex oxide particles have the ratio of M-OH bonds contained therein of 13% or more and 33% or less to make the molar absorption coefficient 800 L/(mol·cm) for light rays at wavelengths of 200 nm to 380 nm. It is also found that the silicon-cobalt-zinc-complex oxide particles have a higher molar absorption coefficient for light rays at wavelengths of 200 nm to 380 nm than cobalt-zinc-complex oxide particles. Furthermore, the silicon-cobalt-zinc-complex oxide particles with the controlled ratio of M-OH bonds exhibit color of light blue to blue (blue green). Thus, the cobalt-zinc-complex oxide particles can be effectively used for the purpose of transparency or ultraviolet-shielding ability when used in a film-like composition, such as a coated product or glass.

According to the present invention, as described above, the color characteristics of oxide particles can be delicately and strictly controlled. Hence, when used in a coating or film-like composition, the oxide particles can strictly control transmission, absorption, hue, color saturation, and molar absorption coefficient for light rays in the ultraviolet, visible, and near infrared regions. When applied to the human body, the oxide particles do not impair the texture and beauty. When used for a coating body or used in the shape of a film for glass or the like, the oxide particles can protect the human body and painted body from ultraviolet rays and near infrared rays without damaging the design.

The invention claimed is:

1. Oxide particles composed of any one oxide of an iron oxide, a cerium oxide, a cobalt zinc complex oxide, a silicon-cobalt-zinc-complex oxide, and a zinc oxide,
wherein a combination of the oxide particles, a ratio of M-OH bonds contained in the oxide particles and color characteristics of the oxide particles, is any one of the following a1 to e4:
a1: the oxide particles are iron oxide particles, the ratio of M-OH bonds contained in the oxide particles is 1.5% or more and 7.5% or less, and in a dispersion in which the oxide particles are dispersed in a dispersion medium, an average molar absorption coefficient for light rays at wavelengths of 190 nm to 380 nm is 1000 L/(mol·cm) or more;
a2: the oxide particles are iron oxide particles, the ratio of M-OH bonds contained in the oxide particles is 1.5% or more and 7.5% or less, and the average reflectance of the oxide particles for light rays at wavelengths of 780 nm to 2500 nm is 55% or more;
b1: the oxide particles are cerium oxide particles, the ratio of M-OH bonds contained in the oxide particles is 12.5% or less, and in a dispersion in which the oxide particles are dispersed in a dispersion medium, an average molar absorption coefficient for light rays at wavelengths of 200 nm to 380 nm is 3500 L/(mol·cm) or more;
b2: the oxide particles are cerium oxide particles, the ratio of M-OH bonds contained in the oxide particles is 11% or less, and in a dispersion in which the oxide particles are dispersed in a dispersion medium, an average molar absorption coefficient for light rays at wavelengths of 200 nm to 380 nm is 4000 L/(mol·cm) or more;
c1: the oxide particles are cobalt zinc complex oxide particles, the ratio of M-OH bonds contained in the oxide particles is 0.5% or more and 20% or less, and, in a dispersion in which the oxide particles are dispersed in a dispersion medium, an average molar absorption coefficient for light rays at wavelengths of 200 nm to 380 nm is 700 L/(mol·cm) or more;
d1: the oxide particles are silicon-cobalt-zinc-complex oxide particles, the ratio of M-OH bonds contained in the oxide particles is 13% or more and 33% or less, and, in a dispersion in which the oxide particles are dispersed in a dispersion medium, an average molar absorption coefficient for light rays at wavelengths of 200 nm to 380 nm is 800 L/(mol·cm) or more;
e1: the oxide particles are zinc oxide particles having a primary particle diameter of 50 nm or less, the ratio of M-OH bonds contained in the oxide particles is 12% or less, and in a dispersion in which the oxide particles are dispersed in a dispersion medium, an average molar absorption coefficient for light rays at wavelengths of 200 nm to 380 nm is 500 L/(mol·cm) or more;
e2: the oxide particles are zinc oxide particles having a primary particle diameter of 50 nm or less, the ratio of M-OH bonds contained in the oxide particles is 11.2% or less, and in a dispersion in which the oxide particles are dispersed in a dispersion medium, an average molar absorption coefficient for light rays at wavelengths of 200 nm to 380 nm is 650 L/(mol·cm) or more;
e3: the oxide particles are zinc oxide particles having a primary particle diameter of 50 nm or less, the ratio of M-OH bonds contained in the oxide particles is 12% or less, and the average reflectance of the oxide particles for light rays at wavelengths of 780 nm to 2500 nm is 65% or more; and
e4: the oxide particles are zinc oxide particles having a primary particle diameter of 50 nm or less, the ratio of M-OH bonds contained in the oxide particles is 12% or less, in a dispersion in which the oxide particles are dispersed in a dispersion medium, a transmittance for light rays at a wavelength of 330 nm is 10% or less, and an average reflectance for light rays at wavelengths of 380 nm to 780 nm is 90% or more.

2. The oxide particles according to claim 1, wherein the primary particle diameter of the oxide particles is 100 nm or less.

3. The oxide particles according to claim 1, wherein the haze value of an oxide dispersion obtained by dispersing the oxide particles in a dispersion medium is 1% or less.

4. A coating or film-like oxide composition comprising the oxide particles described in claim 1.

5. A paint comprising the coating or film-like oxide composition according to claim 4.

6. A coating film comprising the coating or film-like oxide composition according to claim 4.

7. A vehicle equipped with the coating film according to claim 6.

8. A coating or film-like oxide composition comprising the oxide particles composed of any one oxide of an iron oxide, a zinc oxide, and a cerium oxide,
wherein at least a part of a surface of the oxide particles is coated with a silicon compound,
wherein the silicon compound is able to change the color characteristics of the oxide particles by coating at least a part of the surface of the oxide particles, and
wherein a combination of the oxide particles, a ratio of M-OH bonds contained in the oxide particles and color characteristics of the oxide particles, is any one of the following f1 to h1:
f1: the oxide particles are iron oxide particles, the ratio of M-OH bonds contained in the oxide particles is 8% or more and 14.5% or less, the average reflectance of the oxide particles for light rays at wavelengths of 780 nm to 2500 nm is 50% or more;

f2: the oxide particles are iron oxide particles, the ratio of M-OH bonds contained in the oxide particles is 10% or more and 15% or less, and the maximum reflectance of the oxide particles for light rays at a wavelength of 400 nm to 620 nm is 18% or less;

f3: the oxide particles are iron oxide particles, the ratio of M-OH bonds contained in the oxide particles is 9.5% or more and 13% or less, and the average reflectance of the oxide particles for light rays at wavelengths of 620 nm to 750 nm is 22% or less;

f4: the oxide particles are iron oxide particles, the ratio of M-OH bonds contained in the oxide particles is 8% or more and 15% or less, and hue H ($=b^*/a^*$) in an $L^*a^*b^*$ colorimetric system is in the range of 0.5 to 0.9;

f5: the oxide particles are iron oxide particles, the ratio of M-OH bonds contained in the oxide particles is 9% or more and 15% or less, and, in a transmission spectrum of a dispersion in which the oxide particles are dispersed in a dispersion medium, the transmittance for light rays at a wavelength of 380 nm is 5% or less and the transmittance for light rays at a wavelength of 600 nm is 80% or more;

f6: the oxide particles are iron oxide particles, the ratio of M-OH bonds contained in the oxide particles is 9% more and 15% or less, and, in a dispersion in which the oxide particles are dispersed in a dispersion medium, an average molar absorption coefficient for light rays at wavelengths of 190 nm to 380 nm is 2200 L/(mol·cm) or more;

f7: the oxide particles are iron oxide particles, the oxide particles include ester bonds, and the ratio of M-OH bonds contained in the oxide particles is 9% or more and 13% or less, and the average reflectance of the oxide particles for light rays at wavelengths of 780 nm to 2500 nm is 50% or more;

f8: the oxide particles are iron oxide particles, the ratio of M-OH bonds contained in the oxide particles is 8% or more and 9.3% or less, or 13.3% or more and 15% or less, and the average reflectance of the oxide particles for light rays at wavelengths of 620 nm to 750 nm is higher than 22%;

g1: the oxide particles are zinc oxide particles, the ratio of M-OH bonds contained in the oxide particles is 30% or more and 39% or less, and the average reflectance of the oxide particles for light rays at wavelengths of 780 nm to 2500 nm is 72% or more;

g2: the oxide particles are zinc oxide particles, the ratio of M-OH bonds contained in the oxide particles is 30% or more and 36% or less, and a wavelength at which the reflectance of the oxide particles is 15% is 375 nm or more;

g3: the oxide particles are zinc oxide particles, the ratio of M-OH bonds contained in the oxide particles is 38% or more and 42% or less, and an average reflectance for light rays at wavelengths of 380 nm to 780 nm is 86% or more;

g4: the oxide particles are zinc oxide particles, the ratio of M-OH bonds contained in the oxide particles is 31% or more and 39% or less, and a color saturation $C(=((a^*)^2+(b^*)^2)^{1/2})$ in an $L^*a^*b^*$ colorimetric system is in the range of 0.5 to 13;

g5: the oxide particles are zinc oxide particles, the ratio of M-OH bonds contained in the oxide particles is 38% or more and 42% or less, and, in a transmission spectrum of a dispersion in which the oxide particles are dispersed in a dispersion medium, the transmittance for light rays at a wavelength of 340 nm is 10% or less and the average transmittance for light rays at wavelengths of 380 nm to 780 nm is 92% or more;

g6: the oxide particles are zinc oxide particles, the ratio of M-OH bonds contained in the oxide particles is 30% or more and 36% or less, and, in a transmission spectrum of a dispersion in which the oxide particles are dispersed in a dispersion medium, a wavelength at which the reflectance of the oxide particles is 15% is 365 nm or more;

g7: the oxide particles are zinc oxide particles, the ratio of M-OH bonds contained in the oxide particles is 30% or more and 42% or less, and, in a dispersion in which the oxide particles are dispersed in a dispersion medium, an average molar absorption coefficient for light rays at wavelengths of 200 nm to 380 nm is 700 L/(mol·cm) or more;

g8: the oxide particles are zinc oxide particles, the ratio of M-OH bonds contained in the oxide particles is 31% or more and 39% or less, a color saturation $C(=((a^*)^2+(b^*)^2)^{1/2})$ in an $L^*a^*b^*$ colorimetric system is in the range of 0.5 to 13, and an $L^*$ value in the $L^*a^*b^*$ colorimetric system is in the range of 95 to 97, and h1: the oxide particles are cerium oxide particles, the ratio of M-OH bonds contained in the oxide particles is 25% or more and 35% or less, and in a dispersion in which the oxide particles are dispersed in a dispersion medium, an average molar absorption coefficient for light rays at wavelengths of 200 nm to 380 nm is 4000 L/(mol·cm) or more.

9. A paint comprising the coating or film-like oxide composition according to claim 8.

10. A coating film comprising the coating or film-like oxide composition according to claim 8.

11. A vehicle equipped with the coating film according to claim 10.

12. A method for producing the oxide particles according to claim 1, comprising controlling color characteristics of the oxide particles by controlling the ratio of M-OH bonds, the binding of one or more different elements (M) other than oxygen or hydrogen with hydroxyl group (OH) in oxide particles selected from metal oxide particles and metalloid oxide particles.

13. The method for producing oxide particles according to claim 12, wherein the ratio of M-OH bonds is calculated by a waveform separation of a peak derived from the oxide particles at a wavenumber of 100 cm$^{-1}$ to 1250 cm$^{-1}$ in an infrared absorption spectrum, wherein the color characteristics are controlled by controlling an area ratio of the waveform-separated peak derived from the M-OH bonds to the total area of each waveform-separated peak.

14. The method for producing oxide particles according to claim 12, wherein the color characteristics are any one of reflectance, transmittance, molar absorption coefficient, hue, and color saturation.

15. The method for producing oxide particles according to claim 12, wherein the ratio of M-OH bonds contained in the oxide particles is controlled by modifying a functional group contained in the oxide particles.

16. The method for producing oxide particles according to claim 15, wherein the modification of the functional group is any one of an addition reaction, an elimination reaction, a dehydration reaction, and a displacement reaction.

17. The method for producing oxide particles according to claim 15, wherein the modification of the functional group is esterification.

18. The method for producing oxide particles according to claim 12, wherein the ratio of M-OH bonds is controlled by a state of a dispersion in which the oxide particles are dispersed in a dispersion medium.

19. The method for producing oxide particles according to claim 12, wherein the ratio of M-OH bonds is controlled using a dispersion-improving apparatus comprising a removal unit with a membrane filter.

20. The method for producing oxide particles according to claim 18, wherein the dispersion is in the form of a coating film, and the color characteristics of the oxide particles are controlled by subjecting the coating film-like dispersion to a heat treatment.

21. The method for producing oxide particles according to claim 12, wherein the oxide particles are oxide particles in which at least a part of the surface of a single oxide particle or at least a part of the surface of an aggregate formed by aggregation of a plurality of oxide particles is coated with a silicon compound.

22. The method for producing oxide particles according to claim 12, wherein the particle diameter of the oxide particle or the aggregate of oxide particle is 1 nm or more and 50 nm or less.

23. The method for producing oxide particles according to claim 12, wherein the average reflectance for light rays at wavelengths of 780 nm to 2500 nm is controlled to be high by controlling the area ratio of the waveform-separated peak derived from the M-OH bonds to the total area of each waveform-separated peak to be low.

24. The method for producing oxide particles according to claim 12, wherein an average molar absorption coefficient for light rays at wavelengths of 190 nm to 380 nm is controlled to be high by controlling the area ratio of the waveform-separated peak derived from the M-OH bonds to the total area of each waveform-separated peak to be low.

* * * * *